(12) United States Patent
Yokomizo et al.

(10) Patent No.: US 6,321,266 B1
(45) Date of Patent: Nov. 20, 2001

(54) INPUT/OUTPUT APPARATUS CONNECTED TO A PLURALITY OF HOST COMPUTERS VIA A NETWORK

(75) Inventors: Yoshikazu Yokomizo, Yokohama; Susumu Sugiura, Atsugi; Yoshinobu Mita, Kawasaki; Makoto Takaoka, Yokohama; Mitsumasa Sugiyama, Kawasaki; Shigetada Kobayashi, Tokyo; Junichi Shishizuka, Kawasaki; Tsutomu Negishi, Tokyo; Osamu Yamada, Yokohama; Yukari Toda, Yokohama; Kazuhiro Saito, Yokohama; Masanari Toda, Yokohama; Yasuhiko Hashimoto, Tokyo; Yasuo Fukuda, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/657,531

(22) Filed: Jun. 4, 1996

Related U.S. Application Data

(63) Continuation of application No. 08/182,964, filed on Jan. 18, 1994, now abandoned.

(30) Foreign Application Priority Data

Jan. 18, 1993 (JP) ...................................................... 5-021703

(51) Int. Cl.⁷ ...................................................... G06F 13/00
(52) U.S. Cl. ............................................ 709/226; 358/400
(58) Field of Search ............................... 395/200.01, 114; 709/217, 203, 226, 206; 358/400

(56) References Cited

U.S. PATENT DOCUMENTS

| | | | |
|---|---|---|---|
| 4,057,849 | * 11/1977 | Ying et al. ............................. | 345/141 |
| 4,713,780 | * 12/1987 | Schultz et al. ........................ | 709/206 |
| 4,754,428 | * 6/1988 | Schultz et al. ........................ | 709/246 |

(List continued on next page.)

FOREIGN PATENT DOCUMENTS 40-5292240 * 11/1993 (JP) .

OTHER PUBLICATIONS

Xerox LAN/Fax Express 21; Supervisor Handbook; pp. 1–1 thru 1–11, 2–8, 2–9, 2–10, glossary, Aug. 1991.*
Xerox 7033 LAN Fax Server, Supervisor Handbook; pp. 1–1 thru 1–11, glossary, Jul. 1992.*
Iizawa et al.; Avital, A Private Teaching System by Fax Communication; Proc. of the 2nd Intern'l Conf. on Systems Integration; ICSI 1992; pp. 293–301, Jun. 1992.*
Xerox Telecopier 7032/7033; User Handbook; pp. 2–1 thru 2–5, 4–1, 4–10 thru 4–15, 6–65, 6–66, 1991.*
Teresa T. Lau; "Building a Paperless Office With Document Image Processing System"; IPCC 90 Communication Across the Sea: North American and European Practices; pp. 40–42, Sep. 1990.*
W. Stallings; Data and Computer Communications; pp. 9, 391–397, 406–413, 1988.*

Primary Examiner—Kenneth R. Coulter
(74) Attorney, Agent, or Firm—Fitzpatrick, Cella, Harper, & Scinto

(57) ABSTRACT

An input/output apparatus is connected to a plurality of host computers via a network and executes both a scanning function and a printing function. The apparatus includes a portion that generates image data from data input from a first one of the host computers and prints the generated image data by executing the printing function, and further includes an output device that scans image data by executing the scanning function and outputs the scanned image data to a second one of the host computers in response to a request command. As a result, the input/output apparatus may operate in coordination with a plurality of personal computers by using the network to transfer image data therebetween.

51 Claims, 70 Drawing Sheets

U.S. PATENT DOCUMENTS

| | | | |
|---|---|---|---|
| 4,984,162 | * 1/1991 | Torii et al. | 707/530 |
| 5,041,918 | * 8/1991 | Ishida et al. | 358/442 |
| 5,095,301 | * 3/1992 | Guttag et al. | 345/155 |
| 5,173,853 | * 12/1992 | Kelly et al. | 707/530 |
| 5,187,592 | 2/1993 | Sugiyama et al. | 358/430 |
| 5,216,461 | * 6/1993 | Maekawa et al. | 399/8 |
| 5,220,380 | * 6/1993 | Hirata et al. | 399/8 |
| 5,251,020 | 10/1993 | Sugiyama | 358/500 |
| 5,257,069 | * 10/1993 | Hirata et al. | 399/8 |
| 5,274,470 | * 12/1993 | Karita et al. | 358/448 |
| 5,295,236 | * 3/1994 | Bjorge et al. | 345/434 |
| 5,300,980 | * 4/1994 | Maekawa et al. | 399/8 |
| 5,404,199 | * 4/1995 | Hirata et al. | 399/8 |
| 5,424,844 | * 6/1995 | Koyanagi et al. | 358/296 |
| 5,544,317 | * 8/1996 | Berg | 709/235 |
| 5,579,087 | * 11/1996 | Salgado et al. | 399/1 |
| 5,657,461 | * 8/1997 | Harkins et al. | 345/333 |
| 5,720,013 | * 2/1998 | Uda et al. | 358/1.15 |
| 5,822,507 | * 10/1998 | Uda et al. | 358/1.15 |
| 5,911,044 | * 6/1999 | Lo et al. | 709/203 |
| 6,115,739 | * 9/2000 | Ogawa et al. | 709/215 |
| 6,167,462 | * 12/2000 | Davis et al. | 710/5 |

* cited by examiner

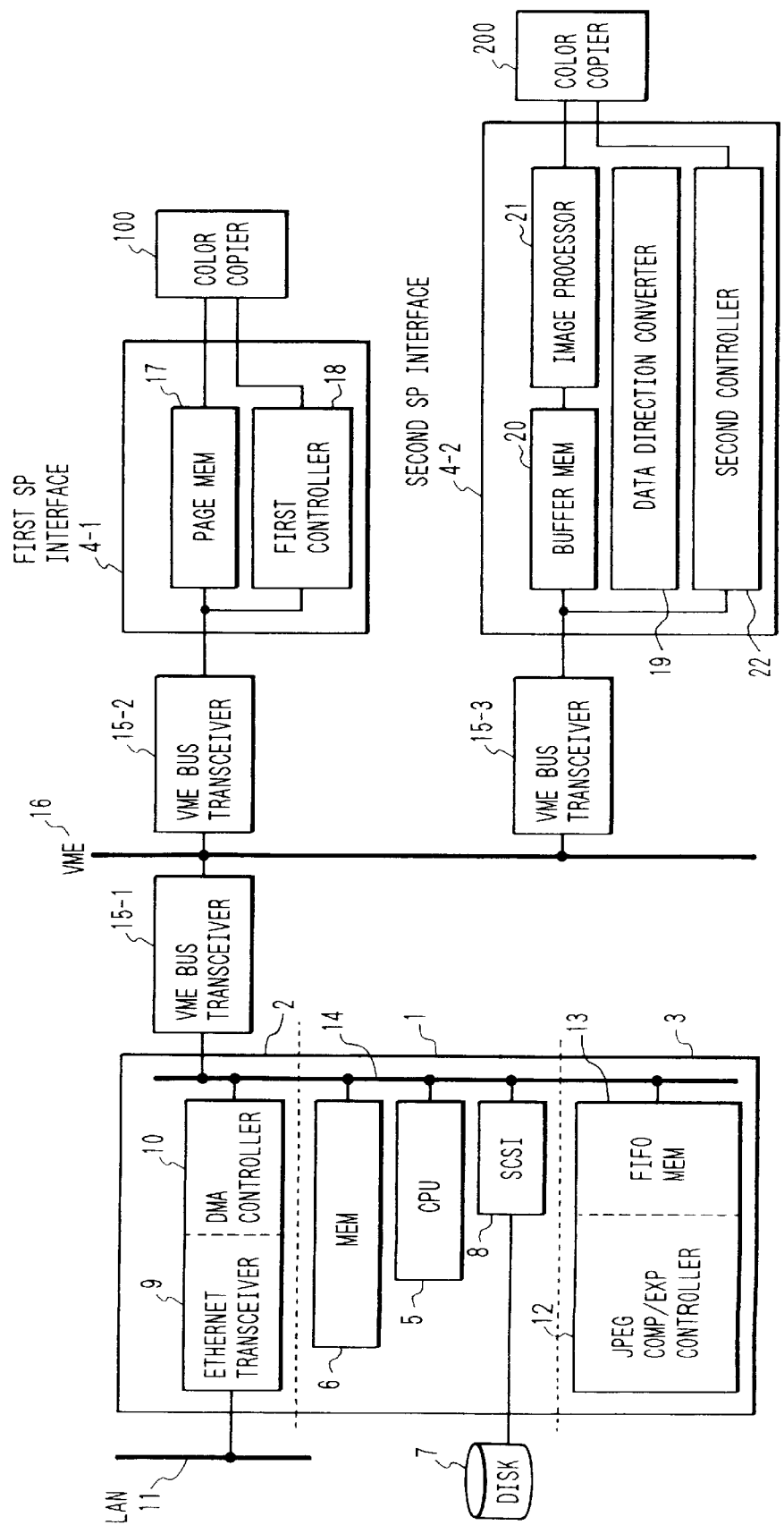

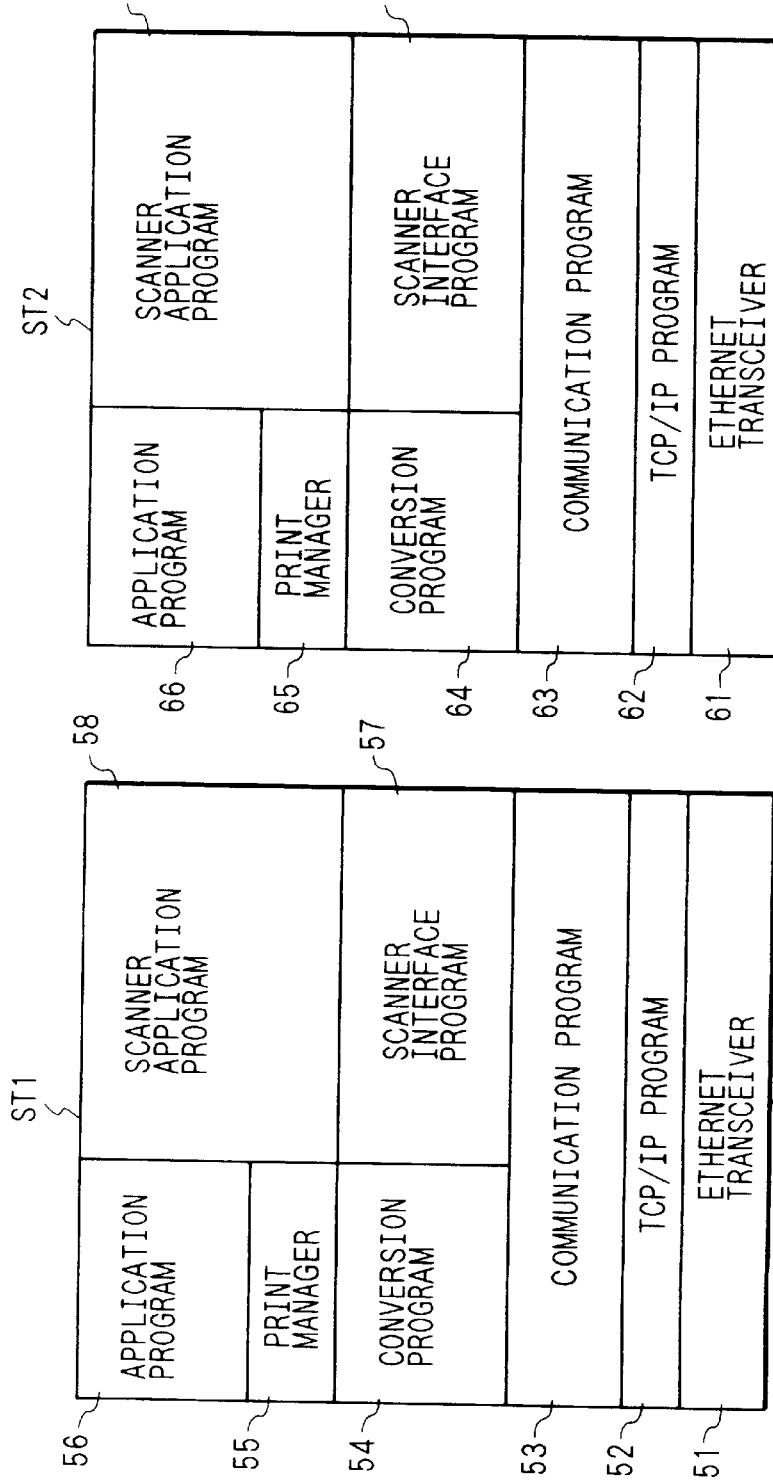

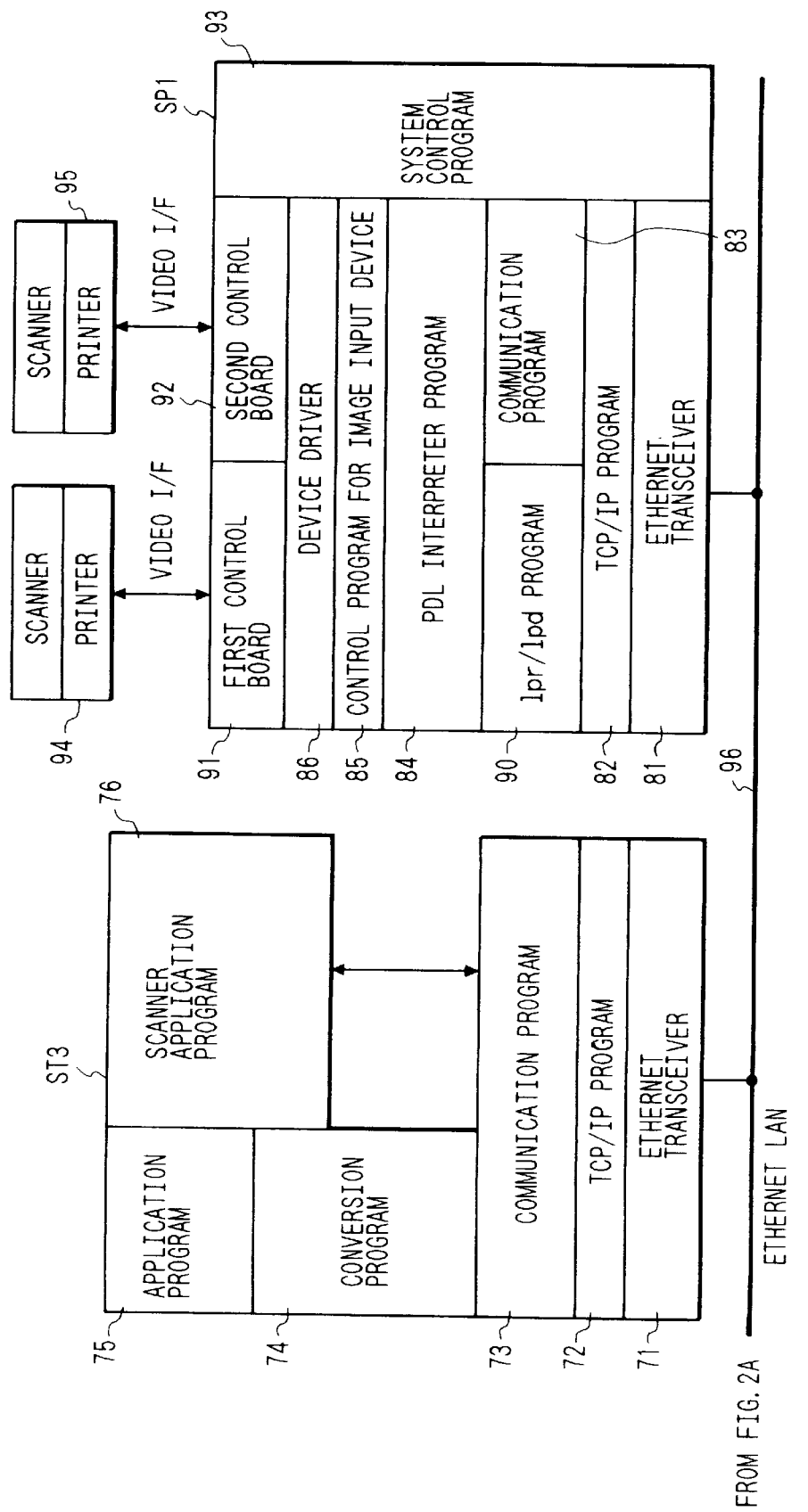

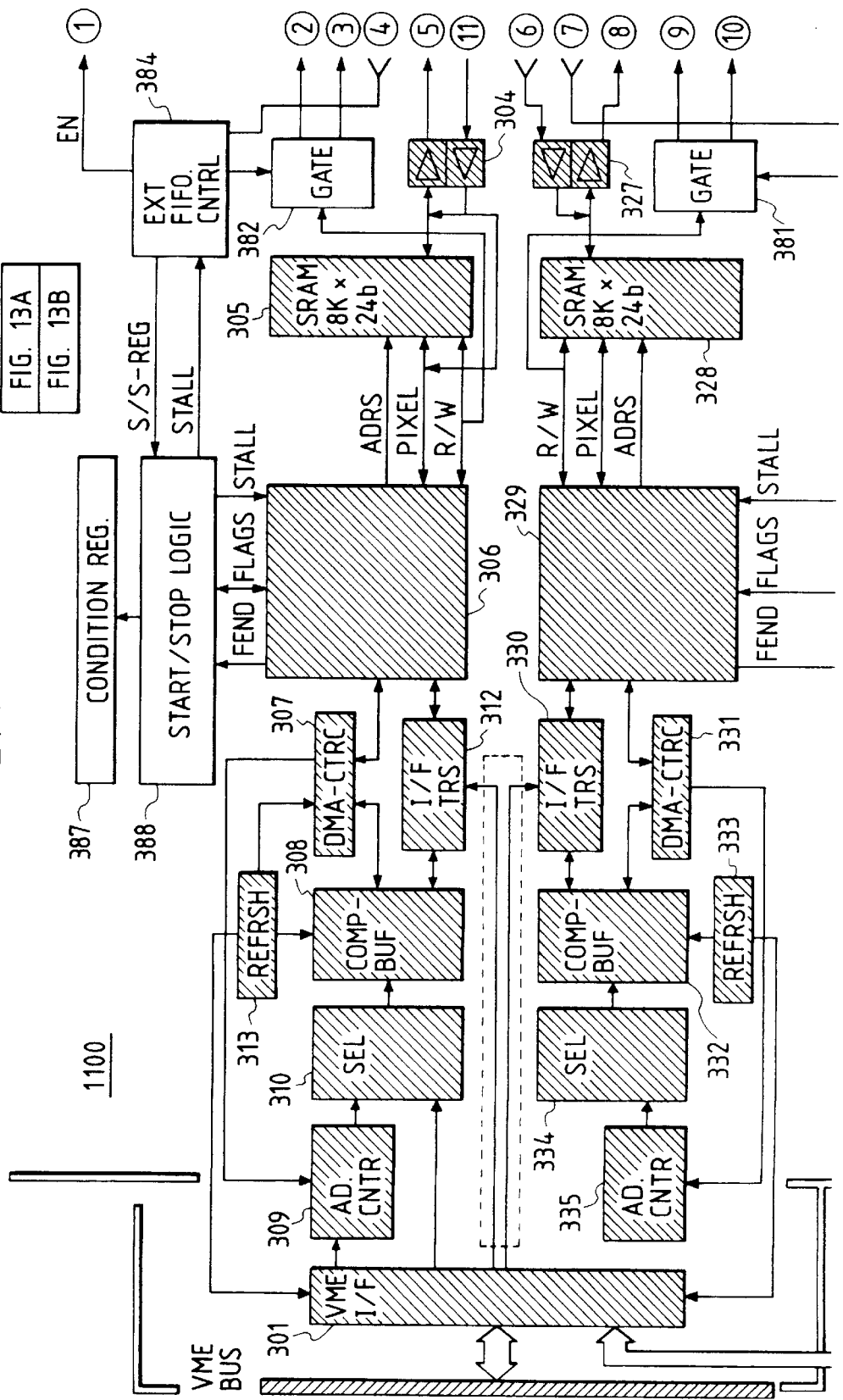

HEAD SCANNING

DATA SCANNING

RASTER SCANNING

| SIGNAL | I/O (PRINTER) | REMARKS |
|---|---|---|
| DATA STB | INPUT | |
| DATA 1 ⸦ DATA 8 | INPUT | |
| ACK | OUTPUT | |
| BUSY | OUTPUT | |
| PE | OUTPUT | PAPER END |
| SELECT | OUTPUT | PRINTER SELECT |
| SG | | SIGNAL GROUND |
| FG | | FRAME GROUND |
| +5V | | |
| INPUT PRIME | INPUT | INITIALIZE (PRINTER) |
| FAULT | INPUT | ERROR |
| SG | | GROUND |

FIG. 27

```
ESC [? 0 K              DESIGNATE PROPORTIONAL PITCH
ESC [38m                DESIGNATE COLOR MODE
ESC [11h                DESIGNATE UNIT
ESC [7 I                DESIGNATE DOT
ESC [22m                MEDIUM
ESC [3m                 ITALIC
ESC [? 0;3;255;0%p      Y=255,M=255,C=0
ESC [2 I                DESIGNATE 1/720 INCH
ESC [453 C              45.3 POINT
ESC7 I                  DESIGNATE DOT
ESC [400;300f           DRAW "CANON
CANON                   AT DOT (400,300)

ESC [? 0;2;0;0;0;255%p  Y=0,M=0,C=0,K=255
ESC [700;500f           AT DOT (700,500)
ESC [7m                 HILIGHT START
R                       DRAW "R"
ESC27m                  HILIGHT END

ESC [1000;1000f         AT DOT (1000,1000)
ESC [786432;512;200;0;512;8;12.R   TOTAL NO.OF BYTES;WIDTH;
                                   RESOLUTION;COMPRESSION;
                                   HEIGHT;BIT/PIX
IMAGE DATA, IMAGE DATA ········
```

FIG. 28

| START BAND | END BAND | FIGURE | | |
|---|---|---|---|---|
| 1 | 2 | CIRCLE | 80 | 100 ···· |
| 2 | 4 | RECTANGLE | 120 | 180 ···· |

|    | STATUS | PRIORITY | I/F  | JOB  | FINAL PAGE | INTR JOB ID |
|----|--------|----------|------|------|------------|-------------|
| 25 | ESTOP  | LEVEL 2  | BMEM | CLCP | 1          |             |
| 26 | STOP   | LEVEL 2  | BMEM | BJP  | 2          | 27          |
| 27 | RUN    | LEVEL 2  | BMEM | BJS  | 1          |             |
| 28 | WAIT   | LEVEL 0  | CNTR | PDLP | 0          |             |
|    |        |          |      |      |            |             |

FIG. 48

| ID | STATUS | PRIORITY | I/F | JOB | FINAL PAGE | INTR JOB ID |
|---|---|---|---|---|---|---|
| 25 | WAIT | LEVEL 0 | BMEM | CLCP | 0 | |
| | | | | | | |
| | | | | | | |
| | | | | | | |
| | | | | | | |

FIG. 49

| ID | STATUS | PRIORITY | I/F | JOB | FINAL PAGE | INTR JOB ID |
|---|---|---|---|---|---|---|
| 25 | RUN | LEVEL 0 | BMEM | CLCP | 1 | |
| 26 | WAIT | LEVEL 1 | BMEM | BJP | 0 | |
| | | | | | | |
| | | | | | | |
| | | | | | | |

FIG. 50

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | WAIT | LEVEL 1 | BMEM | BJP | 0 | |
| | | | | | | |
| | | | | | | |
| | | | | | | |

FIG. 51

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | RUN | LEVEL 1 | BMEM | BJP | 1 | |
| | | | | | | |
| | | | | | | |
| | | | | | | |

FIG. 52

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | RUN | LEVEL 1 | BMEM | BJP | 2 | |
| 27 | WAIT | LEVEL 2 | BMEM | BJS | 0 | |
| | | | | | | |
| | | | | | | |

FIG. 53

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | STOP | LEVEL 2 | BMEM | BJP | 2 | 27 |
| 27 | RUN | LEVEL 2 | BMEM | BJS | 1 | |
| 28 | WAIT | LEVEL 0 | CNTR | PDLP | 0 | |
| | | | | | | |

FIG. 54

| ID | STATUS | PRIORITY | I/F | JOB | FINAL PAGE | INTR JOB ID |
|---|---|---|---|---|---|---|
| 25 | WAIT | LEVEL 2 | BMEM | CLCP | 1 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 55

| ID | STATUS | PRIORITY | I/F | JOB | FINAL PAGE | INTR JOB ID |
|---|---|---|---|---|---|---|
| 25 | RUN | LEVEL 2 | BMEM | CLCP | 2 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 56

| ID | STATUS | PRIORITY | I/F | JOB | FINAL PAGE | INTR JOB ID |
|---|---|---|---|---|---|---|
| 26 | WAIT | LEVEL 2 | BMEM | BJP | 2 | |
| 28 | RUN | LEVEL 0 | CNTR | PDLP | 0 | |
| | | | | | | |
| | | | | | | |
| | | | | | | |

| ID | STATUS | PRIORITY | I/F | JOB | FINAL PAGE | INTR JOB ID |
|----|--------|----------|-----|-----|------------|-------------|
| 28 | RUN | LEVEL 0 | CNTR | PDLP | 0 | |
| | | | | | | |
| | | | | | | |
| | | | | | | |
| | | | | | | |

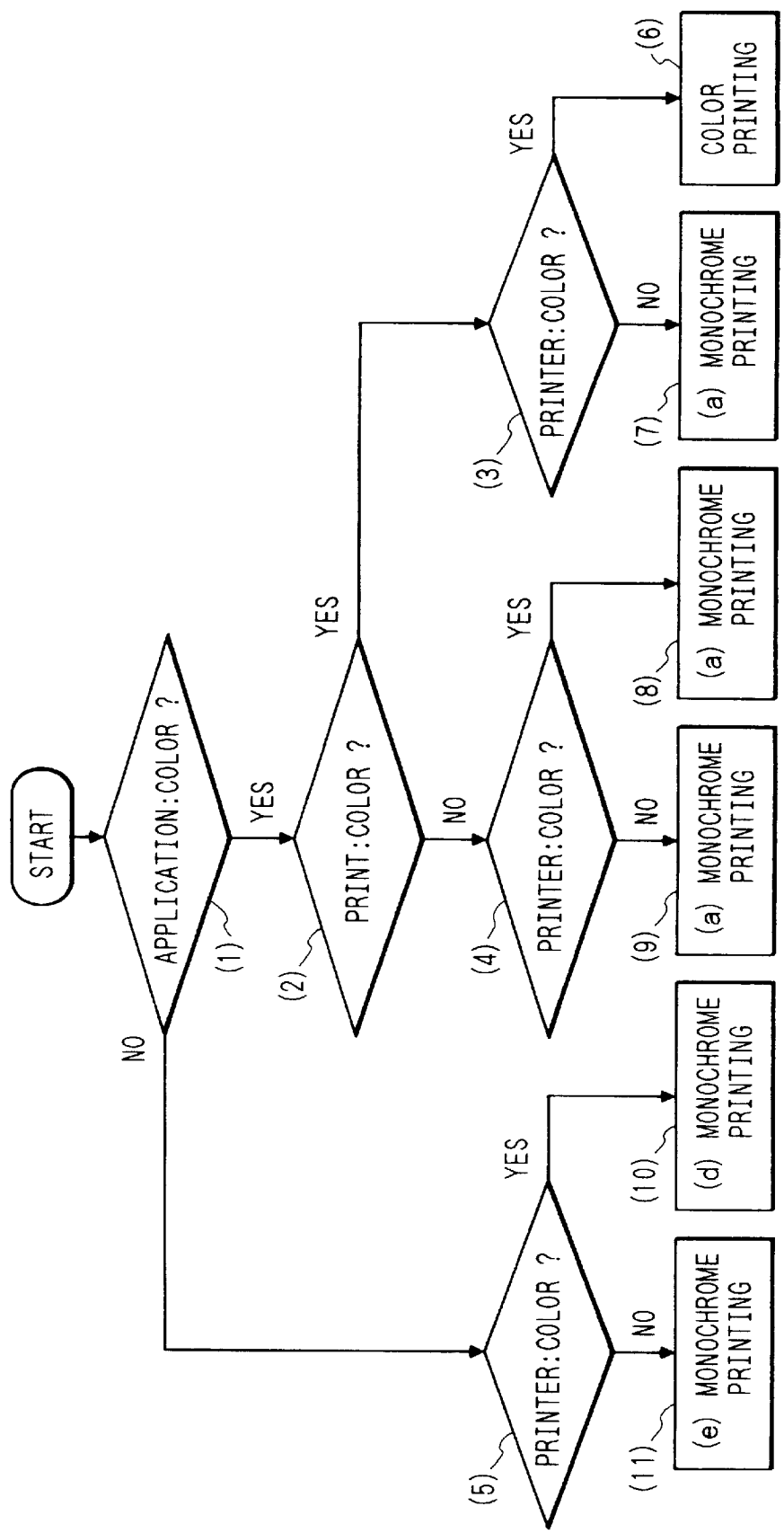

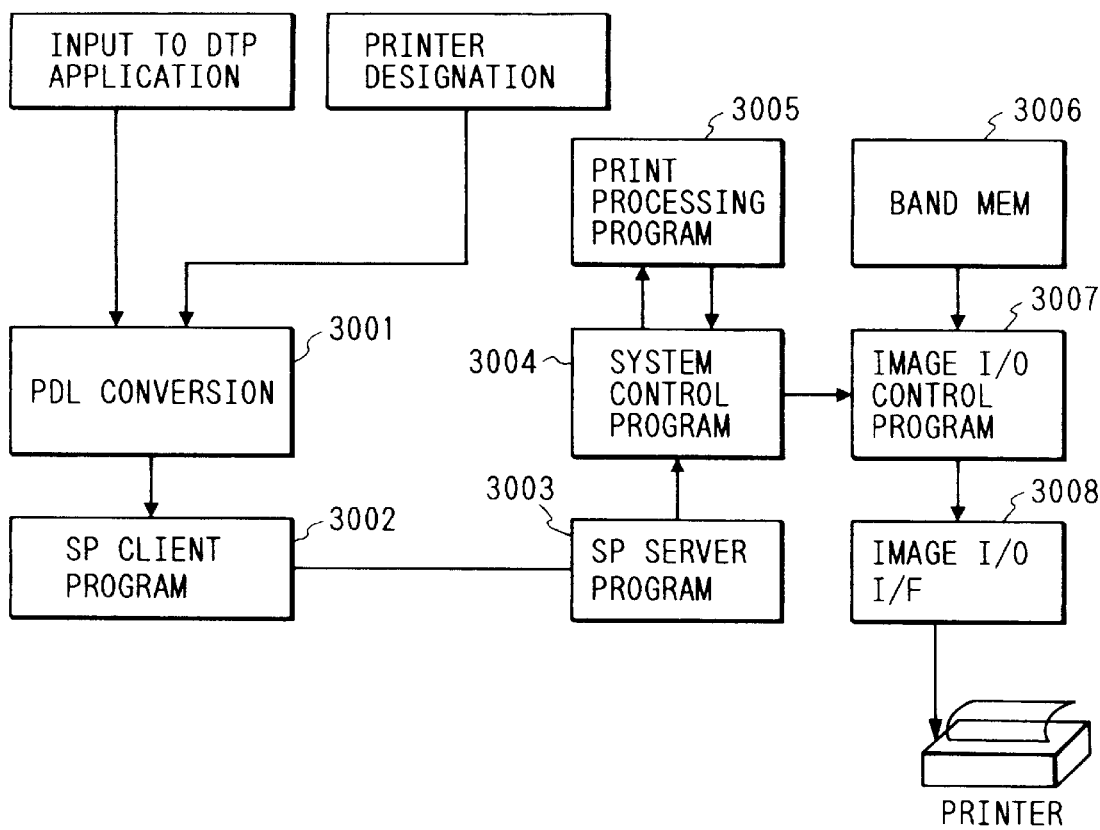

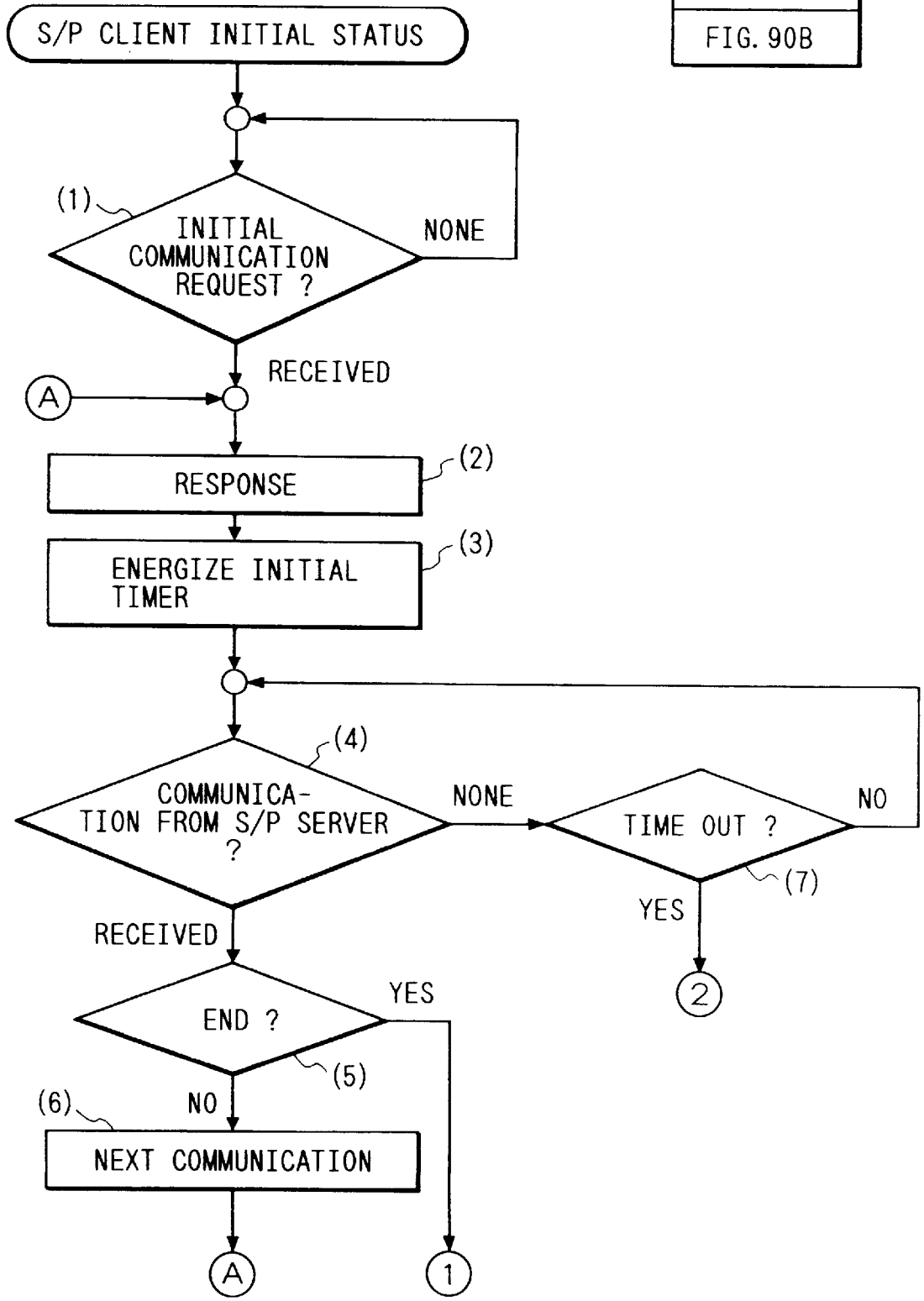

INPUT/OUTPUT APPARATUS CONNECTED TO A PLURALITY OF HOST COMPUTERS VIA A NETWORK

This application is a continuation, of application Ser. No. 08/182,964 filed Jan. 18, 1994, now abandoned.

BACKGROUND OF THE INVENTION

1. Field of the Invention

The present invention relates to an information input/output control device and a method therefor which executes a required functional operation by converting data having the first data format needed to be processed into the data having the second data format and by outputting the data having the second data format at a designated information terminal in a network environment under which plural kinds of information terminals are available to be used.

2. Related Background Art

This kind of terminal devices, particularly printers, have been directly connected with a host computer through a parallel interface called as Centronics or through a serial interface called as RS-232C.

Scanners (document reading device) have been directly connected to the computer through a non-standard video interface or through a SCSI interface.

Under the above interfaces, each computer must be connected both a printer and a scanner to realize an excellent utilization environment, which fails to use the source efficiently. Since it was practically impossible for all computers to be connected with a printer and a scanner, other computers have been borrowed with a floppy disk or a Centronics branch box has been commonly used for character base printers.

A new development of network technology has recently commercialized a printer incorporating therein a LAN interface. Any computer in the network can easily print data by connecting the computers with the printers through the LAN.

These network printers have mostly incorporated thereinto Post Script, a page description language developed by Adobe Co., Ltd. in U.S.A. and almost quasi-standardized in the market.

Programs have been such constructed to have multi-tasks (multi-processes) by dividing the conventional communication protocol structure into a plurality of layers, each of which has an independent packet format and is assigned to its own tasks (processes) so that a function of each layers is clearized, thereby facilitating an independent design. There is also an advantage that a lower layer can concentrate into providing a service entity to a higher layer.

Further, a stand alone type scanner or printer has been utilized in a manner that it is directly connected with a host computer. Since an integral type scanner/printer has been generally utilized as a copier, it has not been utilized in a manner that it serves a scanner printer server when connected with a network.

On the other hand, there has been a structure in which a printer is connected with a printer server in the network and is commonly utilized.

Under such a printer server, data has been usually transmitted from the host computer to satisfy a specification of the printer.

There has been conventionally no method for using a network scanner with which scanning operations are performed by a remote host connected to the network.

Accordingly, the host device requesting a scanning operation must have fed a video image from a scanner connected to the host computer itself. Alternatively, the video image was read from the scanner connected with the other host computer in the network and transferred to the requesting host through the network.

When the video image fed by the scanner is printed out together with the other informations, such as characters, drawings etc., the scanned video image and the other informations are usually synthesized in the host device requesting the printing operation and output to a printer connected to the network.

There have been the following kinds of data processing method in a conventional server device.

(1) The video image data expanded into a bit image format in the host is transferred from the host to the printer through an exclusive user interface. The host takes care of all the interface operations with the network. This method has been mainly utilized in an intelligent host, such as a work station.

(2) The host transmits only a page description language. The printer incorporating an interpreter function converts it into a bit image format, which is so called as a network printer.

(3) The device, which converts a page description language transmitted from the host into an exclusive user bit image, further transmits the image data to a printer through an exclusive use interface.

There have been frequently used the following down load methods for a seven device existing in a conventional network.

(a) Necessary programs have been down loaded from a down load host when the server device is activated.

(b) Fonts, filters and the like have been down loaded by the host computer requesting a printing procedure to a printer.

NIS (Network Information System), which has been widly utilized under a UNIX environment, has been used, as a parameter management system under a conventional network environment, in order to control hosts and users in the network.

In the NIS, a master server device, a slave server device and a client are provided in a domain of the network and parameters for controlling hosts or users in the domain are usually managed by the master server.

An alteration information of the master server is automatically transferred to the slaver server. Accordingly, the parameter information can be referred without being aware of the master server device and the slave server device.

However, in case of connecting a printer, which can be commonly used, with the network in the system constructed by utilizing the page description language, namely, in case of connecting a printer without restriction by standardizing the network printer interface, there are two principles.

①An application software must not depend on languages or control methods for each printer.

②A printer does not care the difference of codes output by each application.

As being such above, there must exist a mechanism which absorbs the usage difference between the both application software and printer, namely, a printer driver (Program).

In using the post script, since the application software outputs a script code and the printer interprets the post script, a printing can be normally accomplished. In other words, it can be said that the application software depends on the post script of a printer language and the printer depends on the post script code output by the application software.

The post script is dedicated to a printer and not utilized for a scanner.

In this manner, when a scanner request and a printer request from each host computer have been attempted to be processed by utilizing, as a common resource, a scanner printer (copier) having a scanner and a printer, the application software may encounter with some restrictions due to the usage restriction of the post script, thereby unabling to practice the specification of the scanner printer.

Further, when a protocol in the communication network is constituted as a layer structure, a task to task communication, which has not been used in a fundamental inter network communication, will increase so that the CPU becomes over-loaded in processing and data processing efficiency will be reduced.

There also arises a problem to consume memory resources because each task consumes buffer memories.

There has been recently developing a network, for example, a large scale network in which LAN (Local Area Network) is stretched around in an intelligent building.

There has been also developing a world wide network, namely, WAN (Wide Area Network) directly connecting the LAN with the public communication line, and further a high intelligence information network like ISDN.

Accordingly, it has been becoming possible that a host computer installed at a certain floor in the building can be accessed from the other floor of the same building or even from the other building, and that a host computer located in Tokyo can be accessed from Osaka, so that the printer server can be widely utilized in comparison with the limited usage in the past.

A scanner and a printer have been also progressing to a direction with an intelligent function, a high resolution and a color, so that a document can be read from various types of scanners and output at any printer.

In a conventional scanner or a printer, which is directly connected with a host computer, the host computer has been setting each terminal device and inputting/outputting video image data. There has been no problem to employ independently within a system an own interface (I/F), a video image format, a communication speed and the like because each host computer has corresponded to each terminal device.

On the other hand, since a scanner and a printer connected with the network through an SP server system can be utilized by a plurality of host computers, there have been advantage to commonly use the resources and to provide a common utilization environment to various types of host computers, thereby being efficient.

However, since the terminal devices have been commonly utilized in the network, there arises the following new problem.

Firstly, the terminal devices are utilized with various different times and sometimes simultaneously with each other. When a user B issues a request for using a printer while a user B has been using the printer through an SP server system, it is doutful whether the SP server provides the users A and B with the same service.

Secondly, when an error occurs while a user A has been using a printer in the same way described above, it may cause some problems how to inform the user A of the error or how a user B should be informed that the printer is not available.

Thirdly, when a mulfunction occurs either on the SP server system or the host computer, communication between the SP server system and the host computer will be disconnected so that either one will become a command waiting state thereby causing dead lock of the system.

A timer watching function may be employed to avoid the above described phenomenon. In this case, a response to each command has been waited for a predetermined period of time and resending requests will be issued several times whenever the predetermined period of time lapses. If no response has been received, the communication will be terminated and initializing procedure will be performed.

However, the above communication control encounters the following new problems.

In a large scale network in which a network is connected with the other networks through a gate way or a router and an SP server system connected to a scanner and a printer and a host computer are respectively located in different networks with each other, a predetermined time set by a timer watching function happens to lapse if either one of the networks functions with a delay to the other one even though a response to each command reveals normal. The above phenomenon will occur if a delay is substantial among the gateways or the routers and if either one of networks is abnormally crowded.

When the above phenomenon would happen, even though a normal communication has been performed with a large communication delay between the networks, the SP server system or the host computer actuates the timer watching function to issue a resending request automatically, thereby the network being initialized automatically.

Accordingly, there has been a problem that users cannot utilize resources, that is, a scanner or a printer even in a normal communication.

Further in a data down load method and a parameter managing method in a conventional server device, a down loading procedure and its management to a program, a filter, a font, a parameter and the like have not been conducted by a commonly used device in a domain of the network, when viewed from a specific server device (in the above case, a master and a slave independently perform the down loading procedure or the like).

Accordingly, there arises a problem how to deal with a down load and a parameter management for a server device processing a scanner request and a printer request from each client, with a scanner printer being connected to the network.

In other words, when a scanner/printer (S/P) server device is disposed in the network, the conventional data down loading method and parameter management method cannot instruct the S/P server device to manage the program, the filter, the font and the parameter totally so that the S/P server device cannot cope with an unexpected break down of the system.

When a master host and a slave host are set among a plurality of down loaded hosts, since a mutual communication between the slave hosts has not been made, the alternation of the parameter, and the like cannot be possible if the master host would happen to break down, which prohibits to provide a system service.

SUMMARY OF THE INVENTION

The present invention is made to overcome the forgoing problems. Therefore, it is an object of the present invention to provide an information input/output control device and a method therefor which converts a first data format of data necessary to be processed into a second data format, outputs the data necessary to be processed with the second data format at a designated information terminal device, and instructs an execution of a desired functional operation.

BRIEF DESCRIPTION OF THE DRAWINGS

FIG. 1 is a system block diagram illustrating a schematic view of a server device of the first embodiment in accordance with the present invention;

FIG. 2 is comprised of FIGS. 2A and 2B showing system block diagrams illustrating a schematic view of a network system to which the server device shown in FIG. 1 is applied;

FIG. 27 is a view illustrating a main portion of a code system applied with necessary modifications to a page description language in a server device according to the present invention;

FIG. 28 is a view illustrating a substitutional procedure into an intermediate code conducted by a layouter in a server device according to the present invention;

FIG. 48 is a table illustrating a content of a job table in response to a job processing in a server device according to the present invention;

FIG. 49 is a table illustrating a content of a job table in response to a job processing in a server device according to the present invention;

FIG. 50 is a table illustrating a content of a job table in response to a job processing in a server device according to the present invention;

FIG. 51 is a table illustrating a content of a job table in response to a job processing in a server device according to the present invention;

FIG. 52 is a table illustrating a content of a job table in response to a job processing in a server device according to the present invention;

FIG. 53 is a table illustrating a content of a job table in response to a job processing in a server device according to the present invention;

FIG. 54 is a table illustrating a content of a job table in response to a job processing in a server device according to the present invention;

FIG. 55 is a table illustrating a content of a job table in response to a job processing in a server device according to the present invention;

FIG. 56 is a table illustrating a content of a job table in response to a job processing in a server device according to the present invention;

FIG. 72 is a flow chart illustrating an example of a color/monocolor printing control procedure in a printer connected with a server device according to the present invention;

FIG. 73 is an explanatory view illustrating a flow of a printing job in a server device according to the present invention;

FIG. 74 is a view illustrating an absorbing condition in monocolor printing shown in FIG. 73;

DETAILED DESCRIPTION OF THE PREFERRED EMBODIMENT

Figure 3:
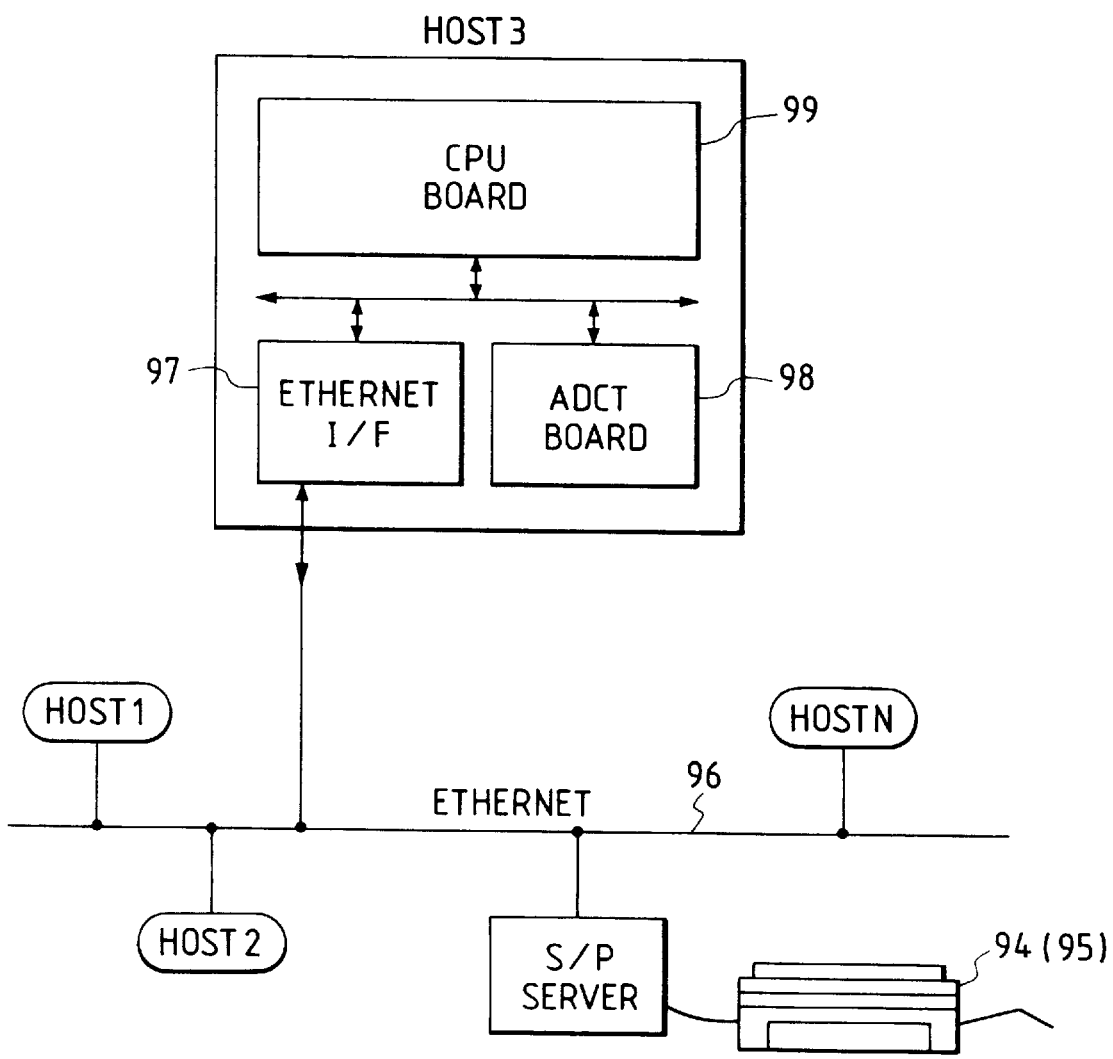
FIG. 3 is a view illustrating a network structure between a server device according to the present invention and its host device.

A detailed description of the preferred embodiment will be made hereinafter referring to a server device to as an example of an information processing device according to the present invention to which a plurality of terminal devices executing scanning and printing functions are connected through a predetermined interface and is communicably connected to a plurality of host devices through a predetermined network.

Although the description will be further made referring to a data transmission procedure between the host computer communicably connected to the server device and its application, the present invention can be, needless to say, applicable to a host computer communicably connected to the server device which is further communicably connected to a plurality of host computers through a predetermined network and also connected to a plurality of output terminal devices executing the printing function through a predetermined interface.

FIG. 1 is a system block diagram schematically illustrating a server device according to the first embodiment of the invention. A detailed system block diagram will be explained later.

A scanner/printer (SP) server not shown in FIG. 1 will be explained later. This system briefly comprises a main CPU circuit 1, an Ethernet circuit 2, JPEG compression/expansion (hereinafter as called "compansion") circuit 3 and a scanner/printer interface circuit 4.

When plural scanners an d printers are necessary to be connected to the scanner/printer (SP) server, the necessary number of scanner/printer interface circuits 4 have to be installed. To facilitate increase or decrease the number, the scanner/printer interface circuit 4 is constituted on an independent board and connected to its main body through a VME bus 16 which will be described later. The remaining three circuits 1, 2 and 3 are constituted on a single board and coupled each other through a local bus.

The reference numeral 4-1 denotes a first scanner/printer interface circuit (hereinafter called as the first SP interface circuit) and serves as an interface between a digital color copier 100 (laser beam color copier), for example, "CLC-500" (product name) and the VME bus 16.

The reference numeral 4-2 denotes a second scanner/printer interface circuit (the second SP interface circuit) and serves as an interface between a digital color copier 200 (thermal jet color copier), for example, "Piccel Jet" (product name) and the VME bus 16.

The main CPU circuit 1 is constituted of a CPU 5, for example, R3000 (product name) and a memory 6, which constitutes an operating system "OS." For example, under the control of VxWorks (product name), all programs are executed. A hard disk 7 is provided as an auxiliary device for the memory 6. The numeral 8 denotes a SCSI interface. The Ethernet circuit 2 comprises an Ethernet transceiver 9 and a DMA controller 10 which transfers data to the memory 6 in a DMA mode.

The Ethernet transceiver 9 is connected to an "Ethernet Local Area Network" (product name: LAN) 11.

The JPEG compansion circuit 3 comprises a JPEG compression, expansion controller 12 and an FIFO memory 13. A local bus, which couples the main CPU circuit 1, Ethernet circuit 2 and the JPEG compansion circuit 3 interrelatedly, is connected to the VME bus 16 through a VME bus transceiver 15-1.

The first SP interface circuit 4-1 comprises a page memory 17 and a first control circuit 18. Although the page memory 19 requires one page size memory area, this is because when the digital color copier 100 initiates printing or scanning functions, the flow control cannot be possible any more. The memory 17 is constituted as a compression memory because its price is very expensive.

An ADCT compression technique, which can achieve non-reversible, high compression rate compression, is employed on the memory 17 in view of the fact that the data stored in the memory 17 is only those rasterized by the memory 6. An ADCT compression chip not shown in FIG. 1 can be used with the same chip used in the JPEG compansion controller 12.

The compression data stored in the page memory 17 by using the ADCP compression technique is only used in a closed circuit herein and is not output herefrom so that no normalization is necessary. In fact, an improved JPEG is utilized as an effective method.

The first control circuit 18 is constituted of a CPU, for example, "Z-80" (product name) and used to send and receive control signals other than video signals to/from the copier 100.

A control command is serially transmitted in order to reduce a number of the interface.

The first SP interface circuit 4-1 is connected through the VME bus transceiver 15-2 to the VME bus 16.

The second SP interface circuit 4-2 which comprises a data direction converter 19, a buffer memory 20, a video processing circuit 21 and a second controller 22, is connected to the VME bus 16 through the bus transceiver 15-3. The data direction converter 19 converts a video data format into a vertical direction relative to the scanning direction in printing and converts a video data format which is a vertical direction relative to the scanning direction into the scanning direction, for which the buffer memory 20 is utilized.

The video processing circuit 21 is employed to supplement a video processing function which is lacked on the copier 200. The second controller 22, which provides the same functions as those of the first controller 18, is constituted of a CPU, for example, "Z-80" (product name).

Hereinafter, operations will be explained. The first example is how to execute a network printing.

A page description language i.e., "CaPSL" (product name) input from LAN 10 through the Ethernet transceiver 9 is stored directly into a specific region (receiving buffer) of the memory 6 by the DMA controller 10, and converted into a raster image by a page description language interpreter program, which will be described later.

Although the JPEG compression video image signal can be expanded by the page description language (hereinafter called as PDL), the JPEG compansion circuit 3 is utilized for expanding in a high speed.

Figure 61:
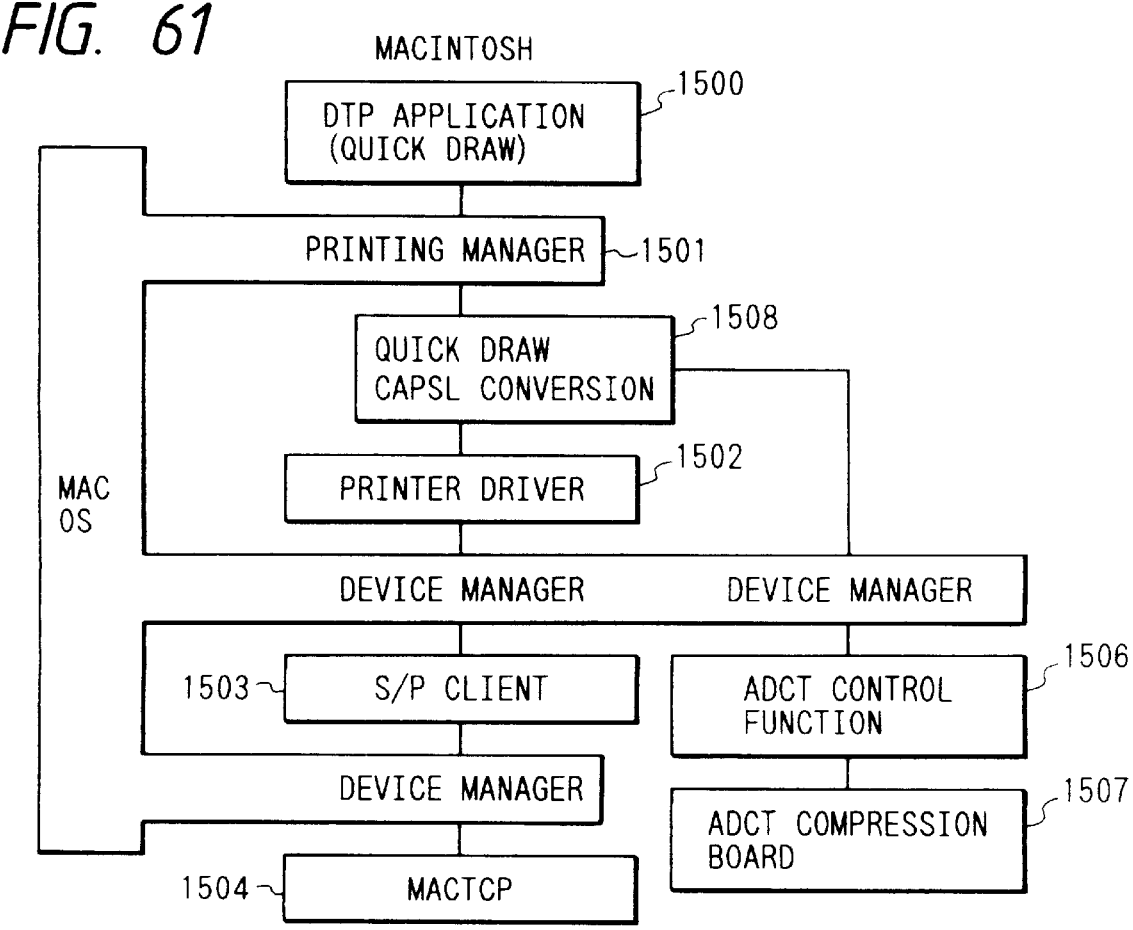
FIG. 61 is a detailed view illustrating a relation between each driver and an OS of the second station shown in FIG. 60.
Figure 60:
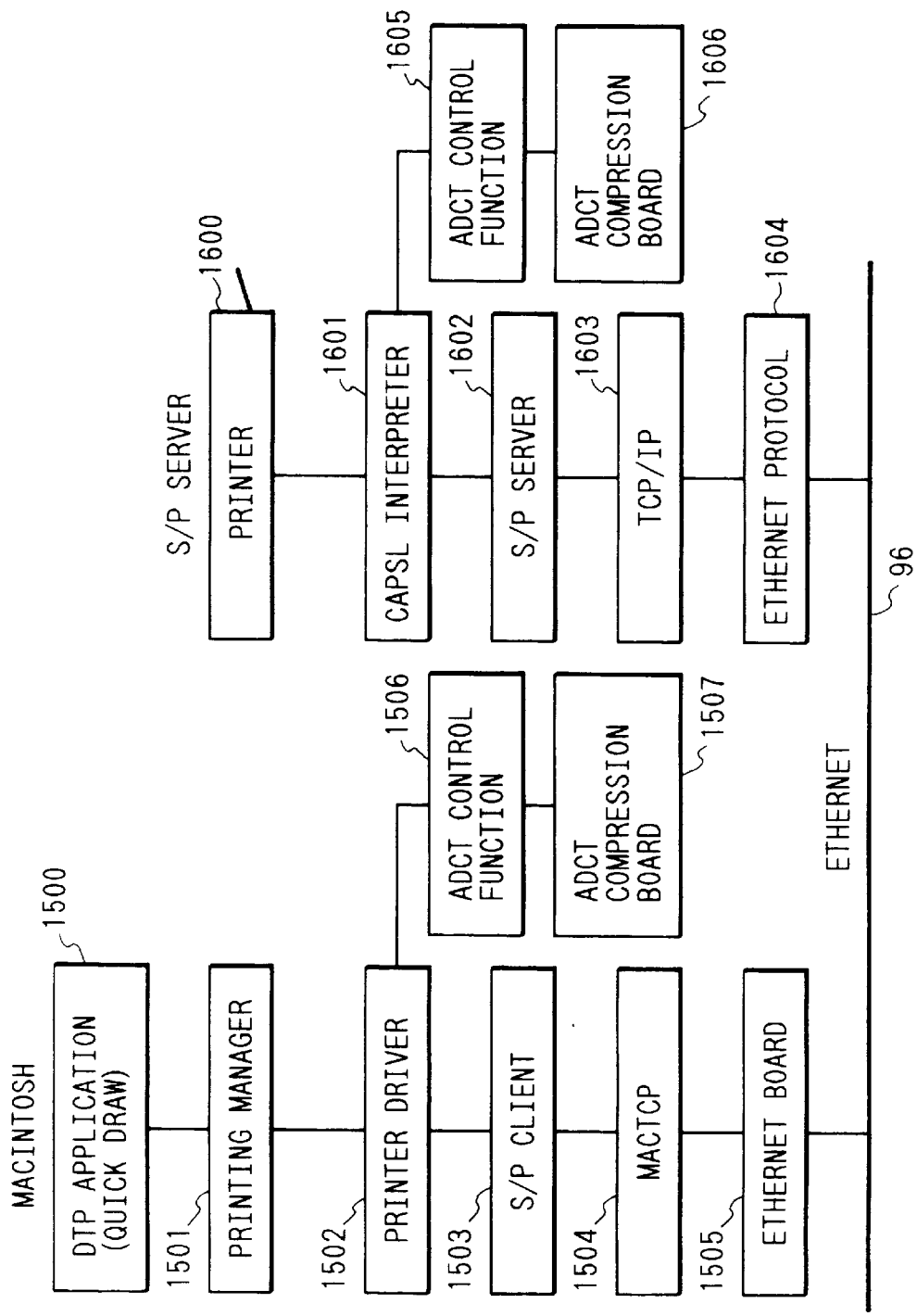
FIG. 60 is an explanatory view illustrating a software structure of the first station shown in FIGS. 2A and 2B.

In the first server device constituted above, the first video output control circuit (i.e., main CPU circuit 1) controls outputs, to the respective terminal devices, of the first video information signal input from the respective host through the network, the second video information signal read from the respective terminal devices (copier 100, 200) in accordance with instructions from the respective hosts and the third video information signal combined the first video information with the second one in accordance with instructions of the respective hosts, in accordance with flow charts shown in FIGS. 60 and 61. Accordingly, either of the first to third video information signals can be directly produced and directly output from the respective terminal devices in accordance with instructions of the respective hosts.

Further, since the second video output control circuit controls the second video information signal being output to the first host which requests the information or to the second host which is designated by the first host, the second video information fed from the respective terminal devices in response to instructions from the hosts can be directly transferred to the other host including its own host.

Since the memory 6 does not have enough capacity due to economical reasons to store one page data created by rasterizing a video plane, is employed a bunding method which executes partially the PDL, for example CaPSL for one time and proceeds multiple times in total. The rasterized data is transferred to either the first SP interface circuit 4-1 or the second interface circuit 4-2 and then output to the respective printers. A network scanning procedure will be described later.

FIGS. 2A and 2B are system block diagrams schematically illustrating a network system in which the server device shown in FIG. 1 is incorporated.

The network system in the embodiment is so constructed that a small number of scanners or printers connected thereto through the network can be commonly utilized from application softwares of the commercialized host computers, such as Macintosh (product name), IBM-PC (product name), SUN (product name), etc.

The network system shown in FIGS. 2A and 2B is divided into four blocks, namely from the left, Macintosh work station ST1, IBM-PC work station ST2, SUN work station ST3 and a color SP server SP1. Three work stations ST1–ST3 are commercialized host computers and the color SP server SP1 is an interface unit designed by the inventors of the present invention.

These blocks are mutually connected through a local area network 96, for example, Ethernet (product name). Numerals 94 and 95 denote a first color scanner/printer and a second color scanner/printer, respectively.

Macintosh work station ST1, IBM-PC work station ST2, SUN work station ST3 and the color SP server SP1 employ a common communication interface for mutual communication.

Numerals 51, 61, 71, and 81 denote Ethernet transceivers which are used for communication with the local area network (LAN) 96. Numerals 52, 62, 72, and 82 denote communication programs TCP/IP (product name) which are constructed on the LAN 96 and standards of U.S. Department of Defense.

The TCP/IP program provides an error-free data communication service (function) in End-to-End. Numerals 53, 63, 73, and 83 denote communication programs which provides services (functions) for special purposes to be utilized commonly from either Macintosh work station ST1, IBM-PC work station ST2 or SUN work station ST3. Numerals 53 and 63 denote communication programs to provide a client type service as an S/P client program and numeral 83 denotes a communication program to provide a server type service as an S/P server program.

Now, an Explanation will be made how to print on the first color scanner/printer 94 from Macintosh station ST1. In order to print the document produced by a commercialized application program 56, the "OS" called as Printing Manager 55 undertakes partially the control and initiates the control for printing.

The data format is standardized as "Quick Draw" (product name) in case of Macintosh.

Printing Manager 55 calls image drawing function groups of the conversion program 54 in a manner as they are written in the document.

The conversion program 54 consecutively converts Quick Draw into, for example, CaPSL (Canon Printing System Language) codes in the call and stores them into an unshown memory.

The communication program 53 transfers the obtained CaPSL codes to the color SP server SP1 in accordance with TCP/IP program 52 through Ethernet transceiver 51, LAN 96, Ethernet transceiver 81, TCP/IP program 82 and the communication program 83. The conversion programs 54, 64, 74, the communication programs 53, 63, 73, the scanner interface programs 57, 67, TCP/IP programs 52, 62, 72 can be supplied to the host computers either in a form of a floppy disk or an Ethernet transceiver, for example, a board circuit.

The whole operations of the color SP server (S/P server device) SP1 are controlled by a system control program 93. A receipt of the CaPSL codes is also informed to the system control program 93. The system control program 93 requests a PDL interpreter program 84, which will be described later, to rasterize the CaPSL coded document into a bit map video image.

The video image data rasterized into the bit map video image is transferred to a device driver 86 and further transferred to the first color scanner/printer 94 from the video interface Video I/F through, for example, the first printer control board 91 to be printed.

Although similar data flow is made when printed by using IBM-PC station ST2, a data format of the printed document is standardized as "GDI" (product name). The conversion program 64 mainly serves as GDI/CaPSL conversion program.

When printed by using SUN work station ST3, since the functions corresponding to the conversion programs 54, 64 are not standardized, communications are directly made by the application program 75 through the communication program 73.

In order to print by using a commercialized application program, for example, "Frame Maker" (product name), the conversion program 74 for MIF/CaPSL conversion is provided therebetween.

In case of scanning (reading) by using, for example, Macintosh station ST1, a scan request is issued by the scanner application program 58 through the scanner interface program 57. Then, the communication program 53 keeps an End-to-End communication route to the communication program 83 through Ethernet transceiver 51, LAN 96, Ethernet transceiver 81 and TCP/IP program 82. The scan instruction is also transferred to the system control program 93 and the system control program 93 requests the scanner control program to scan the first color scanner/printer 94.

The video image data of the scanned document is reversely transmitted from the first control board 91, through the device driver 86, the communication program 83. TCP/IP program 82, Ethernet transceiver 81, LAN 96. Ethernet transceiver 51, TCP/IP program 52, the communication program 53, the device driver 57, to the application program 58.

When scanned by using IBM-PC station ST2, a similar function will be made.

However, when scanned in SUN work station ST3, since the functions corresponding to the device driver 57 and the scanner interface program 67 are not standardized, communications are directly made by the scanner application program 76 through the communication program 73.

The scanner interface programs 57, 67 perform data control between the scanner application and the communication program.

The color SP server SP1 is connected to another scanner/printer, the second color scanner/printer 95, which controls the second color scanner/printer 95 as well through the second control board 92.

All programs including the system control program 93 of the color server SP1 work under control of the operating system "OS", for example, VxWorks (commercial name).

In order to receive requests from the UNIX work stations in which no such special programs such as the communication program 73 and the conversion program 74 are installed, there is installed a quasi-standard 1pr/1pd communication program 90 in parallel with the communication program 83.

FIG. 3 is a view illustrating a network structure between a server device according to the invention and its host computers.

In the drawing, either Macintosh (commercial name), IBM-PC (commercial name) or SUN (commercial name) computer each "OS" of which controls its own data processing can be used as each of host computers HOST 1–N.

Each of the host computers HOST 1–N respectively incorporates an Ethernet interface board 97, a video image compansion (ADCP) board 98, and a CPU board 99 to communicate with LAN 96.

ADCT board 98 can be replaced by a software which realizes the same function on a memory.

In case of not using a compression/expansion technique at the time of input/output of the video image data, there is unnecessary to provide the ADCP board 98. Although the embodiment employs "Ethernet" as the LAN 96, the other alternative "Apple talk" (commercial name), or "Taken Ring" (commercial name) can be also utilized.

This invention is also applicable to a system employing OS1 or IPX (both commercial names) instead of the communication program TCP/IP program.

Figure 4:
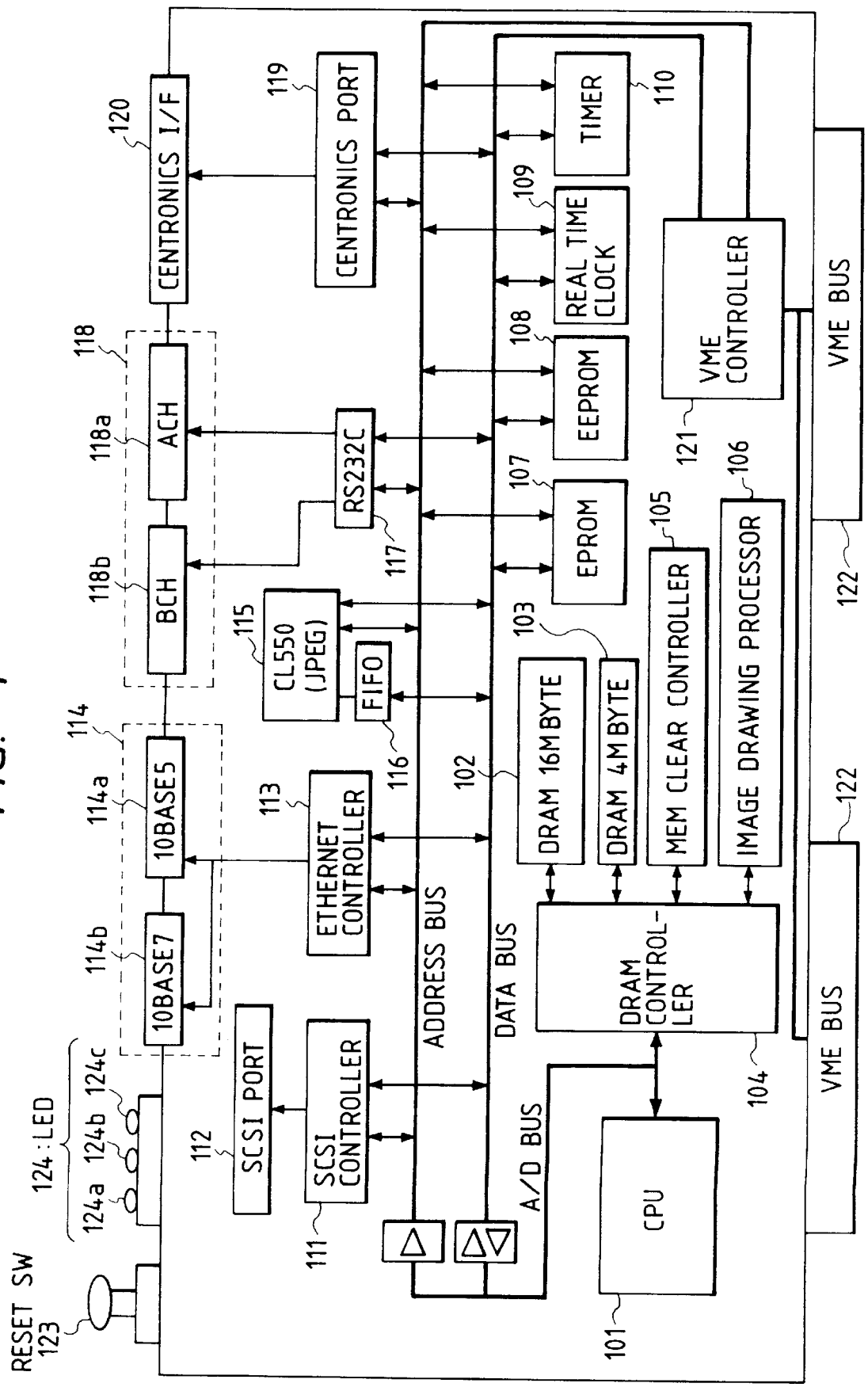
FIG. 4 is a circuit diagram illustrating a detailed structure of a main CPU board circuit shown in FIG. 1.

FIG. 4 is a circuit block diagram illustrating a detailed structure of a board circuit constituted of the main CPU circuit 1, the Ethernet circuit 2 and the JPEG compression circuit 3 shown in FIG. 1.

In the drawing, a CPU 101 which is constituted of, for example, IDT 79R3051 (commercial name) controls whole operations of the board circuit. A real time OS is incorporated on the board circuit.

The CPU 101 activates the communication program 83, the system control program 93, the scanner control program 85, and PDL interpreter program 84, all of which have been activated under the above OS's and controls all operations in multi-processes.

A main memory 102 serves as a work memory of the CPU 101. When the system turns on, the programs stored in an EPROM 107, in an auxiliary memory device such as a hard disk connected to a SCSI port 112, or in a host computer in the network are down loaded and arranged into the memory 102. Therefore, the program itself of each processes is located on the main memory 102 and works there.

A band memory 103 can store a few lines of video image data in use of a raster method. The band memory 103 expands the PDL data into a bit map data. Although PDL usually delivers one page bit map data to a printer engine, this system employs a method that one page is divided into a few bands and expanded into a bit map data.

This can be realized in that the PDL interpreter program 84 rearranges the PDL data. The bit map data expanded into the band memory 103 is delivered to a printer. Then, the next band is expanded and delivered again to a printer.

One page printing can be accomplished by repetition of the above operations.

The video image data read from the scanner, is also temporarily stored in the band memory. The CPU 101, or a block transfer function of a direct memory access (DMA) which is not described in the system, can read the video image data from the band memory 103 and delivers it to the host computer through a hard disk connected to the SCSI port 112 or the network connected to the Ethernet port 114. When one band data is delivered, next band scan data is input and repeated in the same way described above.

A memory access controller 104 controls access and refresh functions of the main memory 102 and a DRAM constituting the band memory 103.

Though there are usually several kinds of methods for accessing DRAMs; a method for accessing word (8, 16, 32, - - - bits) by word; a method for accessing serially with a predetermined bit length (page READ, Write); and an interleave method in which divided DRAM banks are alternatively accessed and addresses are generated in advance, all the above methods can be applied so as to speed up the memory access. When the main memory 102 and the band memory 103 are constituted of SRAMs, it is not required to refresh. A memory clear controller 105 clears the data in the band memory 103 in a high speed.

Figure 5:
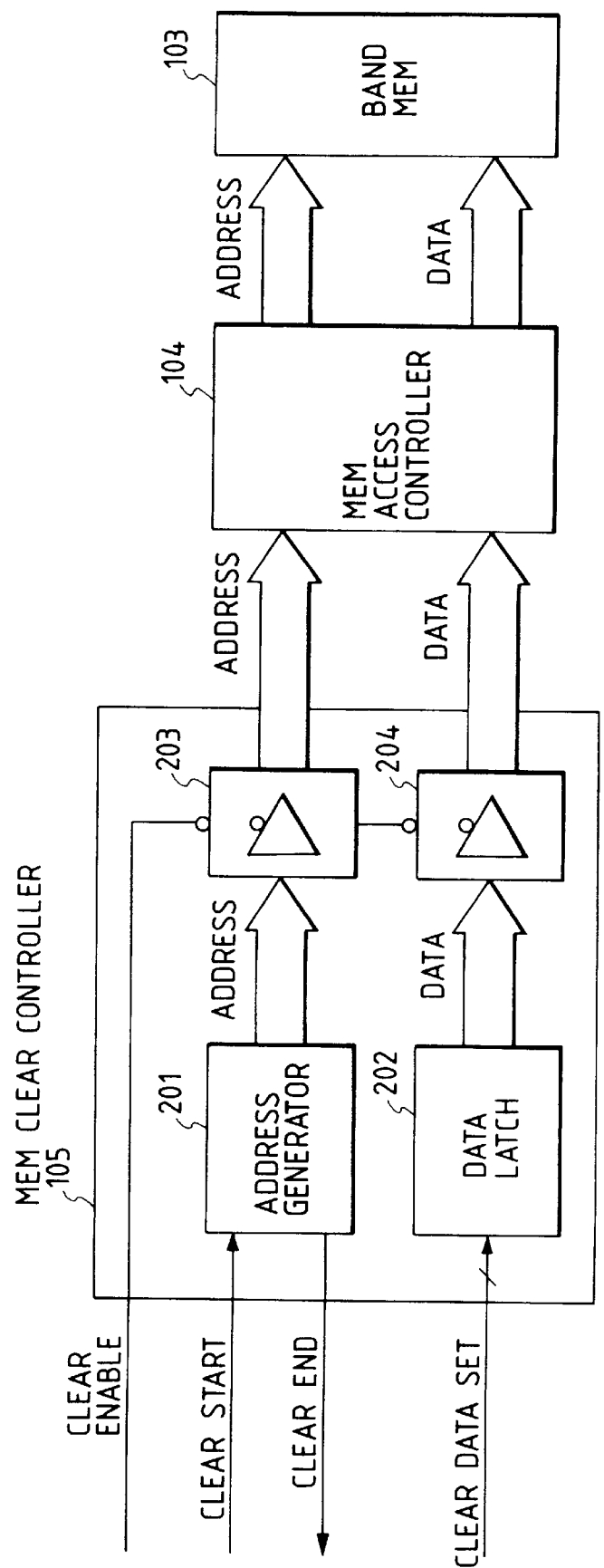
FIG. 5 is a block diagram illustrating a detailed structure of a memory clear controller shown in FIG. 4.

FIG. 5 is a block diagram illustrating a detailed structure of the memory clear controller 105 shown in FIG. 4.

In the drawing, an address generator 201 outputs addresses to be cleared at an address buffer 203 in response to a clear start signal. A data latch 202 outputs the clear data at a data buffer 204.

In the board circuit constituted of the main CPU circuit 1, the Ethernet circuit 2 and the JPEG compression circuit 3, when the CPU 101 confirms that the data of the band memory 103 is transferred to the other memory or interfaces, the address buffer 203 and the data buffer 204 are enabled, whereas the other access means to the band memory 103 are disabled. System initializing data, for example, "00" have been set in the data latch 202. The CPU 101 delivers a clear start signal to an address generator 201. In response to that, the address generator 201 generates consecutive addresses and the data latched at the data latch 202 is written in the band memory 103 through the memory access controller 104. After completion of writing into the whole memories, the address generator 201 sends a clear end signal to the CPU 101 and the clear operations are terminated.

A clear operation will be made after the video image data of the band memory 103 is delivered to a printer device. The video image data of the next band is expanded by the PDL interpreter program 84. On this moment, the PDL interpreter program 84 expands only the necessary portion into a bit map.

Figure 6:
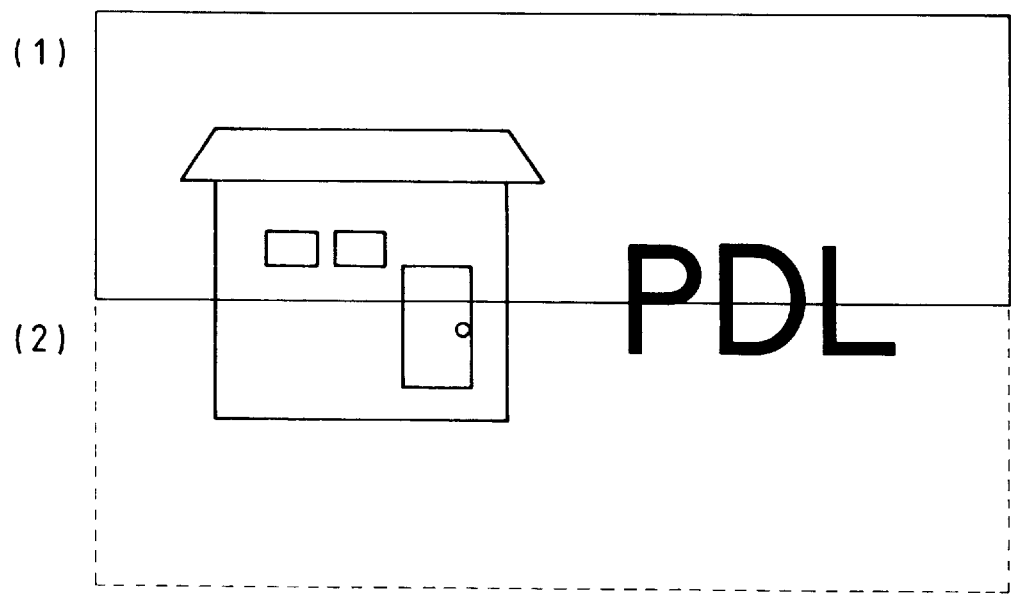
FIG. 6 is an explanatory view illustrating a band expansion process of video image information to a band memory shown in FIG. 5.

For example, as to the band expansion shown in FIG. 6 (1), (2), only the video image belonging to the area (2) is written. Accordingly, the video image data already transferred in FIG. 6, (1) remains as an unnecessary data.

If not cleared on the memory, the video image data mixing the area (1) and the area (2) stays in the band memory 103.

For that reason, the memory clear procedure is necessary. The memory clear controller 105 is constituted of hardware to proceed the memory clear procedure so that a high speed procedure can be realized.

The image drawing processor 106 is constructed in order to support with hardware drawing functions of the PDL interpreter program 84. The PDL interpreter program 84 requires relatively much time to draw lines and paint drawings.

Figure 7:
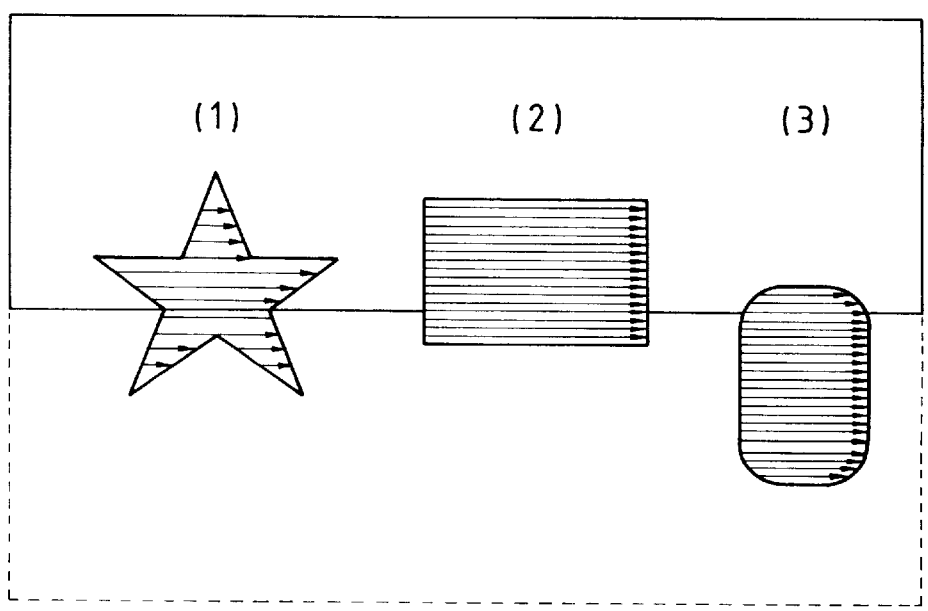
FIG. 7 is an explanatory view illustrating a band expansion process of video image information to a band memory shown in FIG. 5.

In order to paint, for example, the area enclosed with drawings (1) to (3) shown in FIG. 7, the painting procedure is performed in a direction shown as arrows in FIG. 7.

Figure 8:
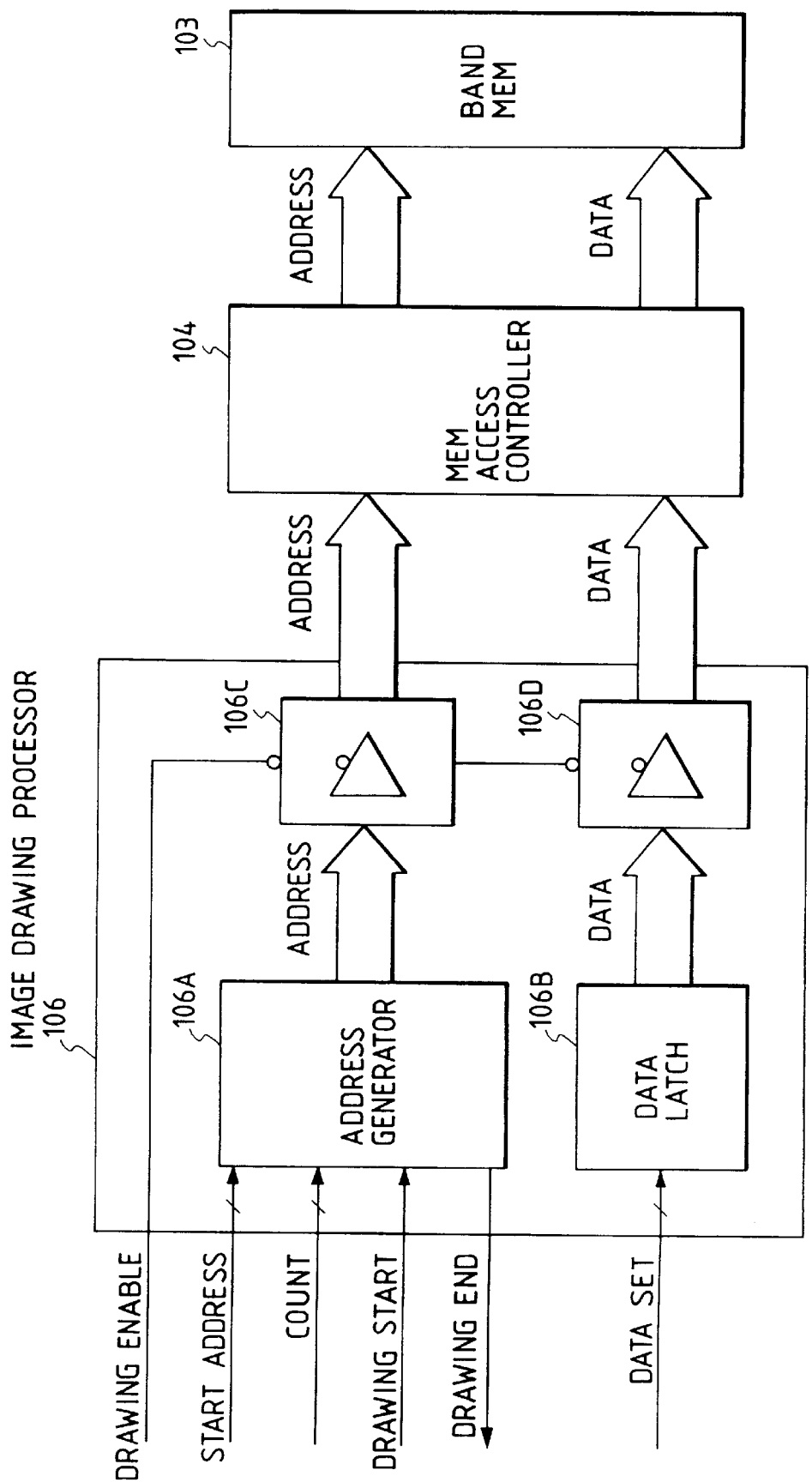
FIG. 8 is a block diagram illustrating a detailed structure of an image drawing processor circuit shown in FIG. 5.

FIG. 8 is a block diagram illustrating a detailed structure of the image drawing processor 106 shown in FIG. 5.

In the drawing, an address generator 106A delivers an address to be cleared to an address buffer 106C in response to a drawing start signal. A data latch 106B delivers a drawing data to a data buffer 106D.

In the board circuit constructed above, the CPU 101 instructs the image drawing processor 106 in view of the executed result by the PDL interprogram 84 when there exists drawing of lines or painting of drawings in the present band width.

The drawing data is firstly latched in the data latch 106B. Then, a start address and a count number (one line drawing volume) are set on the address generator 106A. The count number may be replaced by an end address. Next, the address buffer 106C and the data buffer 106D are enabled. In the contrary, the other access means to the band memory 103 are disabled. The CPU 101 delivers the drawing start signal to the address generator 106A. In response to that, the address generator 106A generates a series of sequential addresses from the start address value and the data latch 106B delivers its storing data to the band memory 103 through the memory controller 104.

When the counted number reaches to the predetermined number (end address), memory writing stops and the drawing end signal is delivered.

The memory writing will be restarted after the next start address and count number are determined and repeated up until the band is completely drawn.

The drawing operations are speeded up by employing hardware as the clearing operations are as well. Other structures can be employed wherein the specialized LSI undertakes the drawing procedure so that the supplemental operation of the CPU 101 is reduced.

In FIG. 4, the EPROM 107 in which above mentioned various programs for controlling the system are stored is firstly accessed by the CPU 101 when the power turns on.

There can be two methods for memorizing into the EPROM 107. The first method is to memorize in a manner that the programs can be executed as they are, whereas the second method is to compress and memorize the whole programs reversibly and to rearrange in the main memory 102 by expanding them when the power turns on.

The first method can save the main memory 102 then the method rearranging on the main memory 102 because the EPROM 107 can be executed without further ado. However, the first method has the shortcomings, that is, it requires much memory size of the EPROM 107 and an access time of the EPROM is relatively slow.

The second method can store a lot of programs in the EPROM 107 so that the memory size of the EPROM 107 can be reduced. And, since rearrangement is made on the main memory, an access time becomes relatively faster. However, it requires much memory size of the main memory 102.

In this embodiment, the second method is employed.

An EEPROM 108 is a device which does not loose the stored data even if the power turns off and can be rewritten data when the power turns on. Accordingly, it is well utilized for memorizing addresses on the network and for memorizing setting parameters of scanners and printers.

A time adjustable clock circuit (RTC) 109 is employed and time progresses even when the power turns off because it contains an internal battery, whereby real time can be known and utilized an information for scanning and printing. A timer 110 is an interval timer. Programs of the system are operated with a multi-program mode and its control is made by a real time OS.

The timer 110 informs the CPU 101 of interval time with a few milliseconds.

Each programs are assigned to the CPU 101 in accordance with the timer 110 and a priority order scheduler.

A SCSI controller 111 controls a SCSI which is a standard for a peripheral device interface. A SCSI port 112 is a parallel input/output I/F port for connecting a peripheral device.

An Ethernet controller 113 connects the system with LAN 96, which is one of the network systems, and functions as a controller for data communications.

The Ethernet controller 113, in which a small buffer memory is incorporated, takes time matching between the nonsynchronous CPU and the synchronous network.

The data transferred from the network is stored in the buffer memory and the data to be transferred to the network is also delivered from the buffer memory.

The Ethernet controller 113 performs a control of electric timings and a control of data transmission and receipt. TCP/IP communication program 82 is controlled by the CPU 101 by utilizing the Ethernet controller 113.

The Ethernet 114 is made of a thick coaxial cable 114a, the interface I/F of which is constituted of a connector having 15 pins. The twist pain type port 114b is made of four line medium, the interface I/F of which is constituted of a modular jack having 8 pins. These ports are utilized for connection with the Ethernetwork. An ADCT compression/expansion circuit 115 compresses or expands intermediate tone data (each color has 8 bit length) which are constituted of RGB (RED, GREEN, BLUE) by employing a JPEG algorithm standardized in CCITT.

In case of compression of color intermediate tone data read from a scanner, real video image data read from the scanner is compressed by the ADCT compression/expansion circuit 115 to reduce the memory size.

Accordingly, speed up of network transfer and reduction of stored memories can be realized.

The compressed video image data transferred through the network is expanded by the ADCT compression/expansion circuit 115 into color intermediate tone data and stored in the band memory 103. Then, they are transferred to a printer interface I/F to be printed by a printer device.

An FIFO memory 116 is used for transmitting or receiving compressed video image data to/from the ADCT compression/expansion circuit 115. The FIFO memory 116 is used for absorbing a data transfer timing gap due to data volume difference between compressed data and expanded data (real video image data) in compression and expansion operations.

An RS232C controller 117 controls a standard serial interface I/F. An RS232C port having two ports, A channel 118a and B channel 118b, has one port used for connecting terminal devices to display or to input data from a key board. Another port is used for connecting with a device having a serial interface, to which a character printer, like a laser beam printer, or a simple type scanner can be connected.

In this system, A channel is used for terminal devices and is used to receive command inputs or to change parameters. This system also employs a quasi terminal function in which a similar function of A channel can be achieved by making r-login from a host computer in the network.

Centronics I/F controller 119 performs an I/F control for connecting a printer with a modified Centronics type I/F.

If, in fact, outputs 8 bits data after confirming the status (BUSY/non) of a device to be connected. By repeating the above operation, data is delivered. The controller 119 performs other signal controls based on the modified Centronics I/F. Centronics I/F port 120 is electrically connected to a printer with a cable.

A VME controller 121 controls the CPU 101 of the system to access the other board having a modified VME bus standard. The VME bus standard permits address buses A16, A24, A32 and data buses D8, D16, D24, D32 be accessed. A bus usage right is given in accordance with an arbitration method. The circuit further realizes a control suitable for the VME bus standard.

A VME bus port 122 is electrically connected to a double height VME bus. The VME bus port 122 is constituted of two connector having 6 pins, among which an address bus and a data bus are disposed.

A reset switch 123 is finally depressed to restart the system when a system error occurred. Although the reset switch 123 is constituted of a hardware switch mechanism in this embodiment, a program RESET (warm RESET) can be employed which resets by using programs from a terminal connected to the above mentioned RS232C port 118 or a quasi terminal r-logged-in from the network.

An LED 124 is constituted of an LED 124a which indicates power ON, an LED 124b which indicates the CPU 101 is executing and an LED 124c which can be turned on by each program. An operator can visually confirm that the system is turned on when the LED 124a is turned on. An operator can also visually confirm that the CPU 101 is executing when the LED 124b is turned on and that the CPU 101 is waiting when the LED 124b is turned off. When the LED 124c turns on frequently, an operator can visually confirm that any procedure is currently executing. An operator can identify the program with which the LED is turned on by watching a duration time, a turning on interval and a turning on number.

A detailed description of a data flow will be made hereinafter under a process of a request for printing issued by a host computer in the network.

When the network, that is, the host computer connected with LAN 96 desires to print data, it transmits to a SP server system information designating the data and an output destination.

In this instance, when a hard disk is connected to the SCSI port, the data is temporarily stored (spooled) in the hard disk.

When a hard disk is not connected, the data is temporarily stored in the main memory 102. Transferred data formats are shown hereunder as (1) to (3). (1) data with a PDL format, (2) data revealing a real video image and (3) data revealing a compressed video image.

In case of (1) the data with a PDL format, the PDL interpreter program 84 is activated and each band is expanded into a bit map which is written in the band memory 103. When the band memory fills the data, it transmits them to the printer and next band is expanded into a bit map.

In case of (2) the data revealing a real video image, the band memory 103 stores the data of each band width and transfers them to a designated printer. Then, the data of next band width is prepared. Since the data revealing a real video image contains much data volume, the host computer does not transfer all the data in the lump but transfers with being divided.

Accordingly, a job receiving the data from the network has been proceeded during the time of printing.

Further, in case of (3) the data revealing a compressed video image, the compressed video image data is stored in the FIFO memory 116 and converted by the ADCT expansion circuit 115 into a real video image data. The expanded data of each band width is stored in the band memory 103 and transferred to a designated printer. Hereinafter, the similar procedure will be repeated.

In some cases, the data format of video image data happens to be not a single format but a complexed format combining the above described data formats. In case of (1) data format and (2) data format or (1) data format and (3) data format both in combination the above described procedures are applied.

There are three cases in using an interface I/F of a printer device which transfers a video image data. The first case is to be connected through an interface board construct on the VME bus 122.

The second case is to be connected with the RS232C port 118. The third case is to be connected with the Centronics I/F port 120. The host computer determines its destination depending on which interface I/F connected to printers is used for printing.

Whenever the data of each band width in the band memory 103 is transferred the band clear controller 105 clears the memory. After that, the PDL expansion is again performed, with making the band width uniform, so that the data is transferred to an interface circuit designated by a printer and output at the printer under a control of an interface circuit (control board) by the device driver 86. The above procedures are repeated.

When a video image data is desired to be input from a scanner, the system receives from the host computer a designated information to activate the scanner and starts a video image input. There are two cases in using an interface I/F of a scanner device, one of which is to be connected through an I/F board constructed on the VME bus 122 and the other of which is to be connected with the RS232C port 118.

The above designation will be made by the host computer.

The video image data of each band width delivered from the scanner is stored in the band memory 103. In case that the video image data from the scanner is transferred to the designated host computer, the following two processings will be made depending on the scanner control program 85.

The first processing is to form a real video image data supplemented with a tag recording a video image information, and the second processing is to form a compressed video image data.

In case of the first processing, there are two methods; one of which is to transfer the data in the band memory 103 to a designated host computer consecutively through the network; the other of which to store the data temporarily in a hard disk connected with the SCSI port 112.

Either of both methods is chosen by the designated information from the host computer.

When a tag recording a video image information is supplemented, the data is transferred together with the tag.

In case of the second processing, the data in the band memory 103 is delivered to the ADCT compression circuit 115 so as to be compressed and the compressed data is written in the FIFO memory 116. Whenever the data is read out from the FIFO memory 116, it is transferred to the host computer and the next band data is processed repeatedly to obtain a compressed video image data. In case of using a hard disk, almost the same procedure, except temporarily storing the data in the hard disk, will be conducted.

Hereinafter, referring to a circuit block diagram shown in FIG. 9, a detailed structure will be explained of the first SP interface circuit 4-1 shown in FIG. 1.

Figure 9:
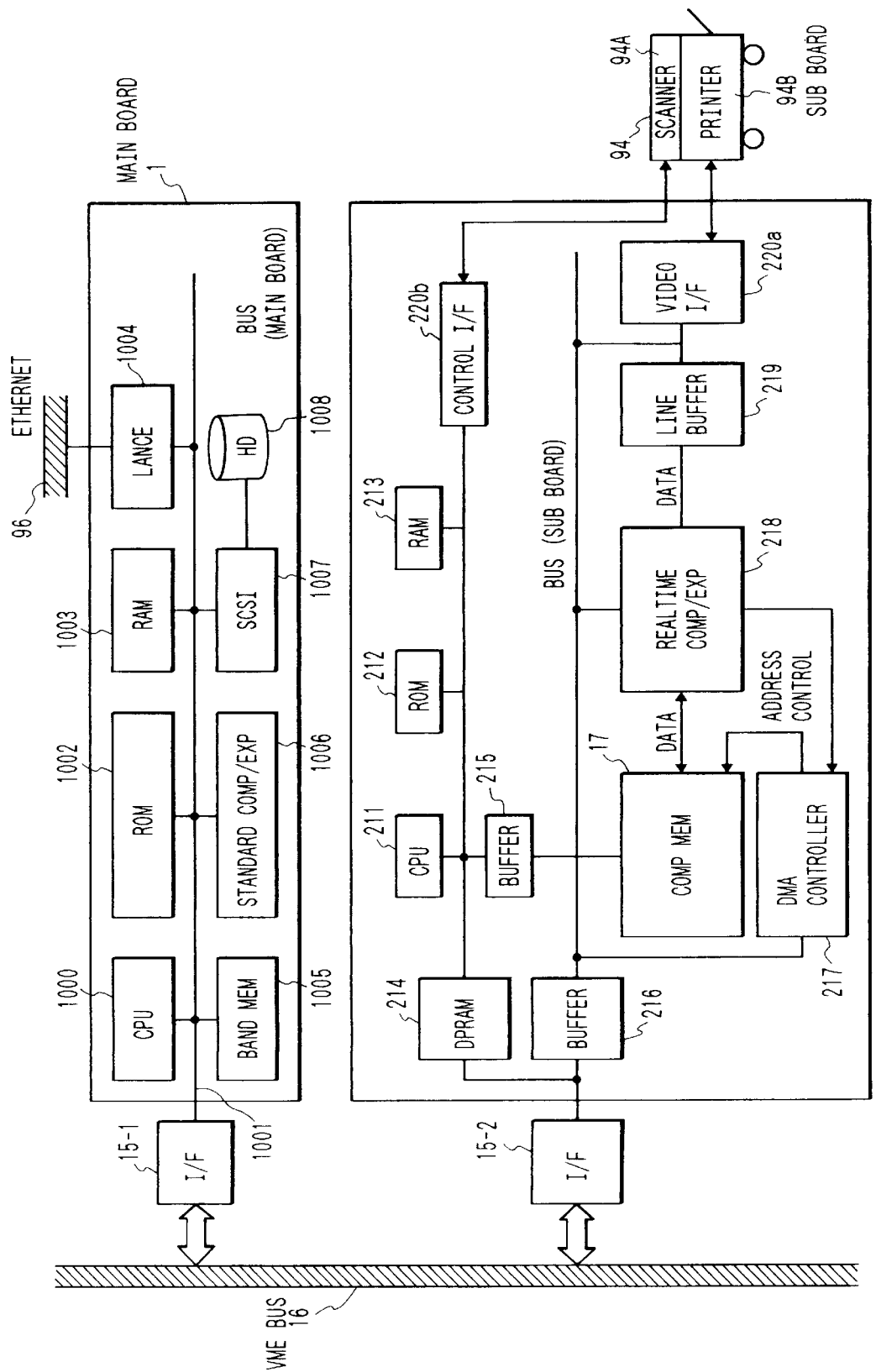
FIG. 9 is a block diagram illustrating an internal structure of the first interface circuit shown in FIG. 1.

FIG. 9 is a block diagram illustrating an internal structure of the first SP interface circuit 4-1 shown in FIG. 1. Identical elements shown in FIG. 1 bear the same reference numerals.

In the drawing, a CPU 1000 controls each device connected to an internal bus 1001 of the board circuit in response to the above mentioned various control programs stored in a ROM 1002. A RAM 10003 functions as, for example, a work memory of the CPU 1000. A network controller 1004 controls an access to a station connected to the LAN 96.

A band memory 1005 stores data of each band width. A standard COMP/EXP 1006 compresses and expands a video image data. A SCSI controller 1007 is connected with a hard disk 1008.

A CPU 211 which generally controls the first SP interface circuit 4-1 control each device connected to the board internal bus in response to control programs (supplemental programs for the device driver 86) stored in the ROM 212, makes initial setting of the necessary portions of the device and transacts commands with scanners and printers. A RAM 213 functions as, for example, a work memory of the CPU 211. A DPRAM 214 which transacts commands between the first SP interface circuit 4-1 and the board circuit is constructed such that both the CPU 211 and the CPU 1000 in the board circuit are mutually and independently accessed with each other through the VME bus 16.

Buffer memories 215, 216 are provided to avoid collision between the CPU 211 and the CPU 1000.

A real time COMP/EXP 218 is provided to compress and expand a multi-value video image data in real time.

Real time means to proceed with the same speed, for example, approximately 15 MHz (32 bits) with which a video image data is transacted, i.e., inputted through the video interface 220.

A COMP memory 17 stores data compressed by the real time COMP/EXP 218. A line buffer 219 is provided to preserve eight line data of a raster direction. The line buffer 219 can be randomly accessed by the real time COMP/EXP 218 applying with 8×8 matrix correspondingly to ADCT compression.

A DMA controller 217 transfers data between the COMP memory 17 and the real time COMP/EXP 218 without passing through the CPU 211.

A video interface 220a is provided to have an interface with a scanner 94A and a printer 94B. A reference numeral 220b denotes a control interface.

The first to the fourth mode procedures in response to the designated information from the host computer will be hereunder described in reference to FIG. 9.

Each mode procedure is performed by executing the control program 85 for image input device stored in the ROM 1002 and the device driver 86 stored in the ROM 212.

The First Mode Procedure

In the first mode procedure (video image print mode procedure) a real video image data stored in the band memory 1005 of the main CPU circuit 1 is received through the VME bus, compressed by the real time COMP/EXP 218, and stored temporarily in the COMP memory 17 as a form of compressed video image. This operation is performed with one page. When one page (one picture) is compressed, the printer 94B is actuated. The DMA controller 217 reads out the compressed video image data temporarily stored in the COMP memory 17 as a compressed video image and delivers it to the real time COMP/EXP 218. On this moment, it is restored into an unprocessed image data by the expansion circuit. The expanded unprocessed image data is consecutively transferred from the video interface 220 to the printer 94B. The video image expansion is performed in an ultra high speed synchronized with a data processing speed of the printer 94B.

In some cases, data is transferred to the printer 94B after the video image processing to perform the printer processing.

The Second Mode Procedure

In the second mode procedure (video image scan mode procedure), a video image data received from the scanner 94A through the video interface 220a is compressed by the real time COMP/EXP 218 in an ultra high speed synchronized with its speed and the output compressed video image data is temporarily stored in the COMP memory 17. After the scan of one picture is completed, the CPU 1000 of the board circuit has the compressed video image data stored in the COMP memory 17 expanded again by using the expansion circuit of the real time COMP/EXP 218 to achieve the real video image data. The real video image data is transferred to the board circuit through the VME bus 16.

The board circuit transfers the real imge data as it is to a designated host computer if the host computer is requesting it, and transfers the compressed video image data, which is achieved by compressing the real video image data, to the host computer if it is requested by the host computer.

The Third Mode Procedure

In the third mode procedure (standard compressed video image print mode procedure), when the board circuit receives the compressed video image data from the host computer in the network, it transfers the compressed video image data as it is to a designated first SP interface circuit 4-1 without expanding. The first SP interface circuit 4-1 stores the compressed video image data in the COMP memory 17, activates the designated printer 94B, and expands the compressed video image data in synchronization with a printing speed of the printer 94B by using the real time COMP/EXP 218 in order to be printed.

The Fourth Mode Procedure

In the fourth mode procedure (standard compressed video image scan mode procedure), a real video image data is compressed by the real time COMP/EXP 218 in an ultra high speed synchronized with a scanning speed of the scanner 94A and stored temporarily in the COMP memory 17. After the scan of one picture is completed, the CPU 1000 of the board circuit retrieves the compressed video image data as it is through the VME bus 16.

In the first and second mode procedures, since the first SP interface circuit 4-1 is interfaced with a real video image data, the standard compression/expression procedure which is necessary for video image communication is not always needed in the first SP interface circuit 4-1 so that an independent compression/expansion procedure can be employed in accordance with a high speed demand or the other purposes.

In the second and fourth mode procedures, although the data read from the scanner 94A is directly compressed, it is not restricted for the real time COMP/EXP 218 to compress the data achieved by applying video image processing such as a line density conversion, a color space conversion, etc. to the data read from the scanner.

The video image processing means may be disposed between the video image COMP/EXP and the scanner 94A/printer 94B. The video image COMP/EXP may also be disposed in the scanner 94A/printer 94B.

The structure and the function of the real time COMP/EXP 218 will be explained hereunder referring to a block diagram shown in FIG. 10.

Figure 10:
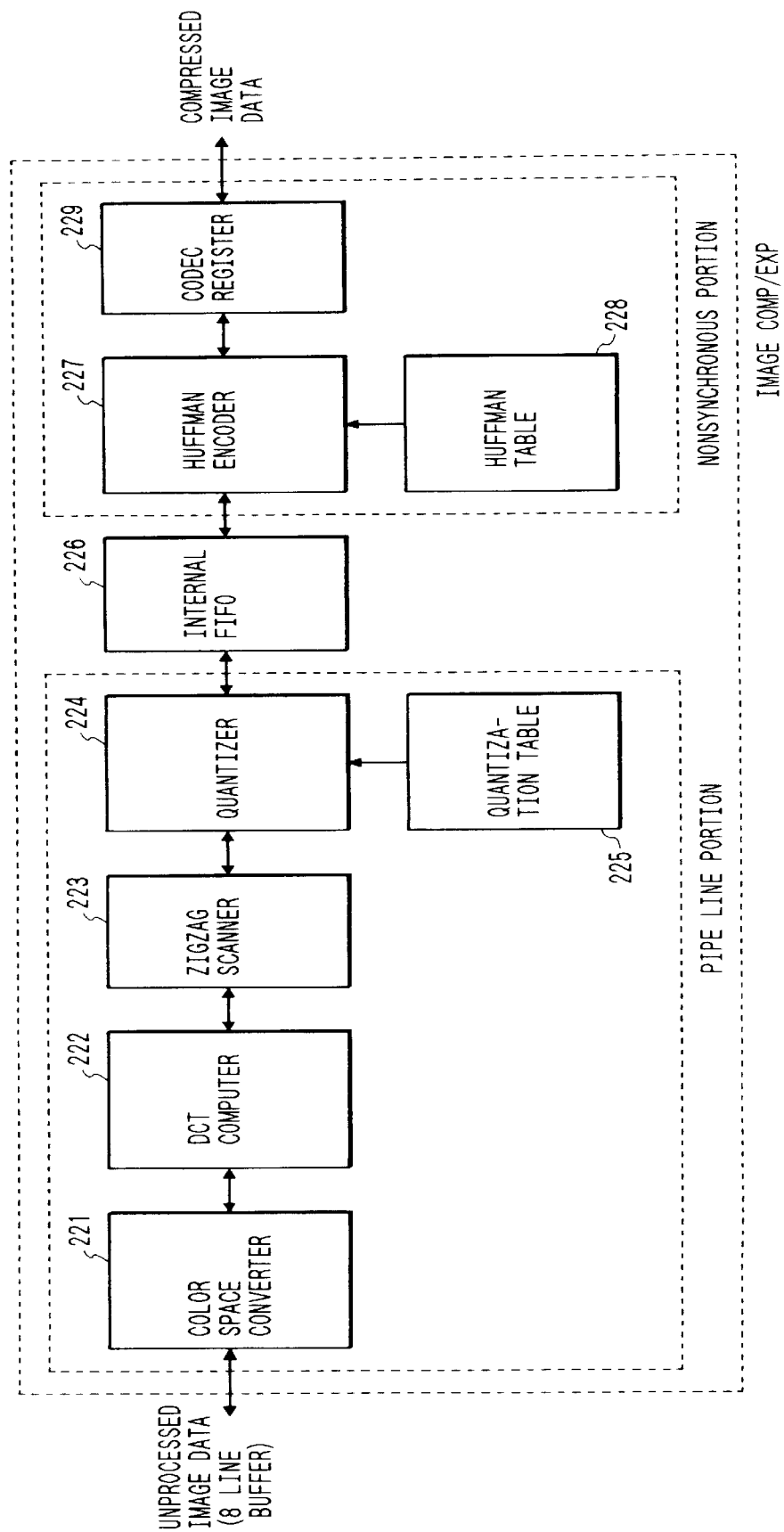
FIG. 10 is a block diagram illustrating an example of a detailed structure of a real time Compression/Expansion circuit shown in FIG. 9.

FIG. 10 is a block diagram illustrating a detailed construction of the real time COMP/EXP 218 shown in FIG. 9. An ADCT method is, in particular, employed as a compression/expansion method in the embodiment.

Figure 11:
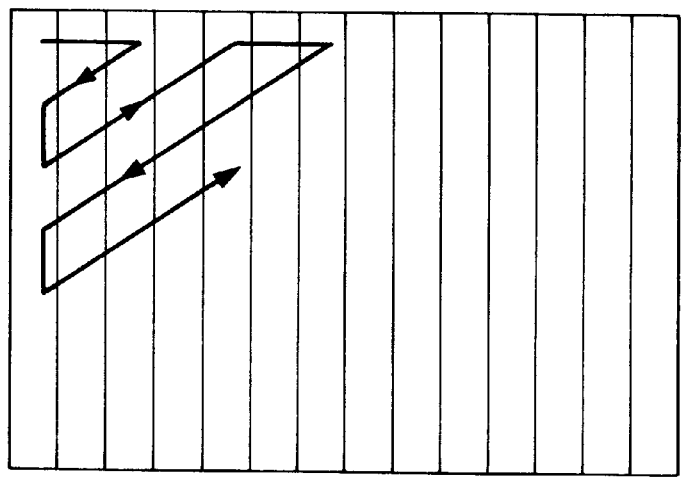
FIG. 11 is a view illustrating an example of a zigzag scan path made by a zigzag scanner shown in FIG. 10.

In a data compression, a real video image data is firstly stored in an external line buffer 219 and transferred to a color space converter 221 in which RGB data is converted into a color space data having Y, Cr, Cb data. In some cases, Cr, Cb data is sub-sampled as color difference components to discard the redundancy of the video image. Each of 8×8 picture elements is converted on a frequency space by a DCT computer 222. Then, as shown in FIG. 11, a DCT coefficient is scanned by a zigzag scanner 223 and quantized by a quantizer 224.

On this moment, a quantization coefficient which corresponds to 8×8 DCT coefficient has been stored in a quantization table 225. The compressed video image data, which is made by codifying data temporarily stored in an internal FIFO memory 226 in a predeterming timing referring to a Huffman table 228 by a Huffman encoder 227, is stored in a CODEC register 229 which can be accessed by an external host computer.

The color space converter 221, the DCT computer 222, the zigzag scanner 223, the quantizer 224 and the quantization table 225 constitute a pipe line operational block operable at a high speed in synchronization with a timing clock. The Huffman encoder 227, the Huffman table 228 and the CODEC register 229 constitute a non-synchronous operational block operable at a not high but compatible speed with those of CPU and DMA in synchronization with a speed at which the external CPU accessed the CODEC register 229. The pipe line operational block is constructed in such a manner to be able to operate at a high speed so that it can follow a video image transfer clock of the scanner 94A/printer 94B.

Accordingly, the internal FIFO memory 226 serves an operational speed buffer between the synchronous pipe line operational block and the non-synchronous operational block.

If the compression ratio is reduced to improve the image quality, compressed data will increase, the amount of data to be processed by the nonsynchronous operating part will increase and the operating speed of the nonsynchronous operating part will be insufficient for processing. However, in processed image data interface of the color space connecter 221 can be connected to the portions other than the scanner 94A and the printer 94B and a nonsynchronous access from the CPU or the like can be received by a FIFO memory which is externally provided. In this case, the pipeline operating part can be operated at a low speed or temporarily stopped. Therefore, there will be no problem in the operating speed of the nonsynchronous operating part.

In this embodiment, a plurality of image compression/expansion parts (for example, two parts) are provided to divide unprocessed image data into a plurality of data blocks and supply these data blocks to the image compression/expansion parts, respectively, thus enabling connection to the scanner and the printer which operate at high speeds. As in compression of a plurality of image data divided as described above, the problem of the operating speed can be similarly solved.

Operation for expansion is basically a reverse process to compression and, when compressed image data is transferred to the CODEC register, the image data is reversely Huffman-coded or decoded in the Huffman encoding part 227 while referring to the Huffman table 228. The values obtained are inversely quantized in the quantizer 224 after having been speed-controlled in the FIFO memory 226. Inverse quantization is carried out by multiplying the values by a quantizing coefficient 8×8 of the quantizing table 225. Image data is zigzag-scanned by the zigzag scanner 223 and transferred DCT coefficient to the DCT computer 222. Then the image data is returned from Y, Cr, Cb and the like which are compressed color spaces to original RGB space or the like in the color space converter 221.

The DCT computer 222 processes DCT computation and inverse DCT computation in the same circuit only by changing parameters. Also in the color space converter 221, linear transformation can be similarly carried out by converting parameters.

In addition, the quantizer 224 carries out division for quantization and multiplication for reverse quantization. In this case, division is a kind of multiplication if the quantizing coefficient for division serves as a reciprocal and therefore compression and expansion can be done in the same circuit. The following describes in detail the operations of respective modes of the first SP interface circuit 4-1 as an example while referring to FIGS. 12 to 15.

Figure 12:
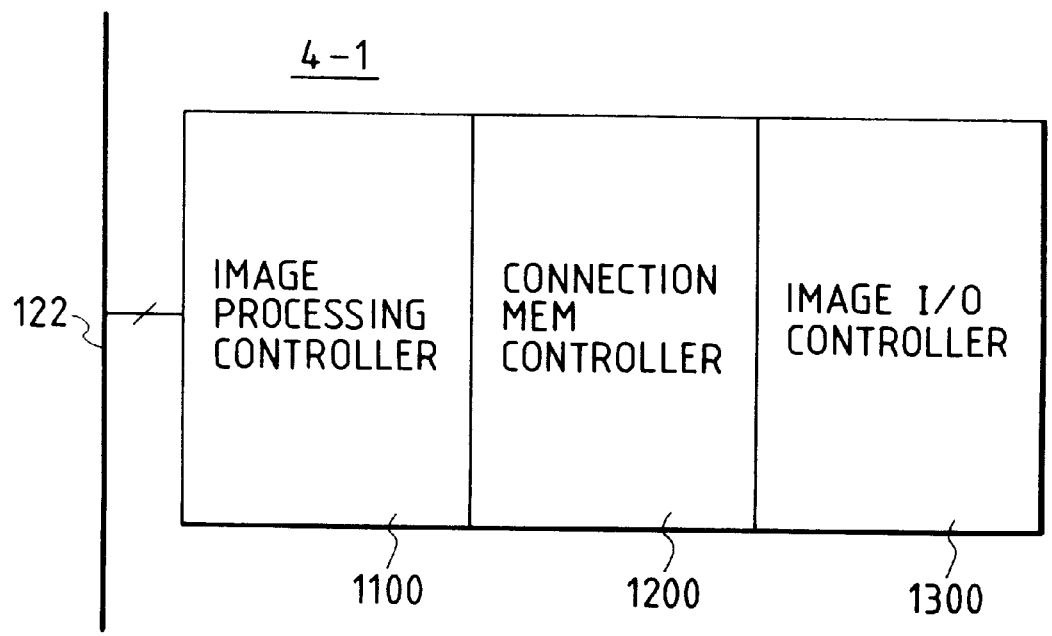
FIG. 12 is a block diagram illustrating a partial schematic structure of the first SP interface circuit shown in FIG. 1.
Figure 13B:
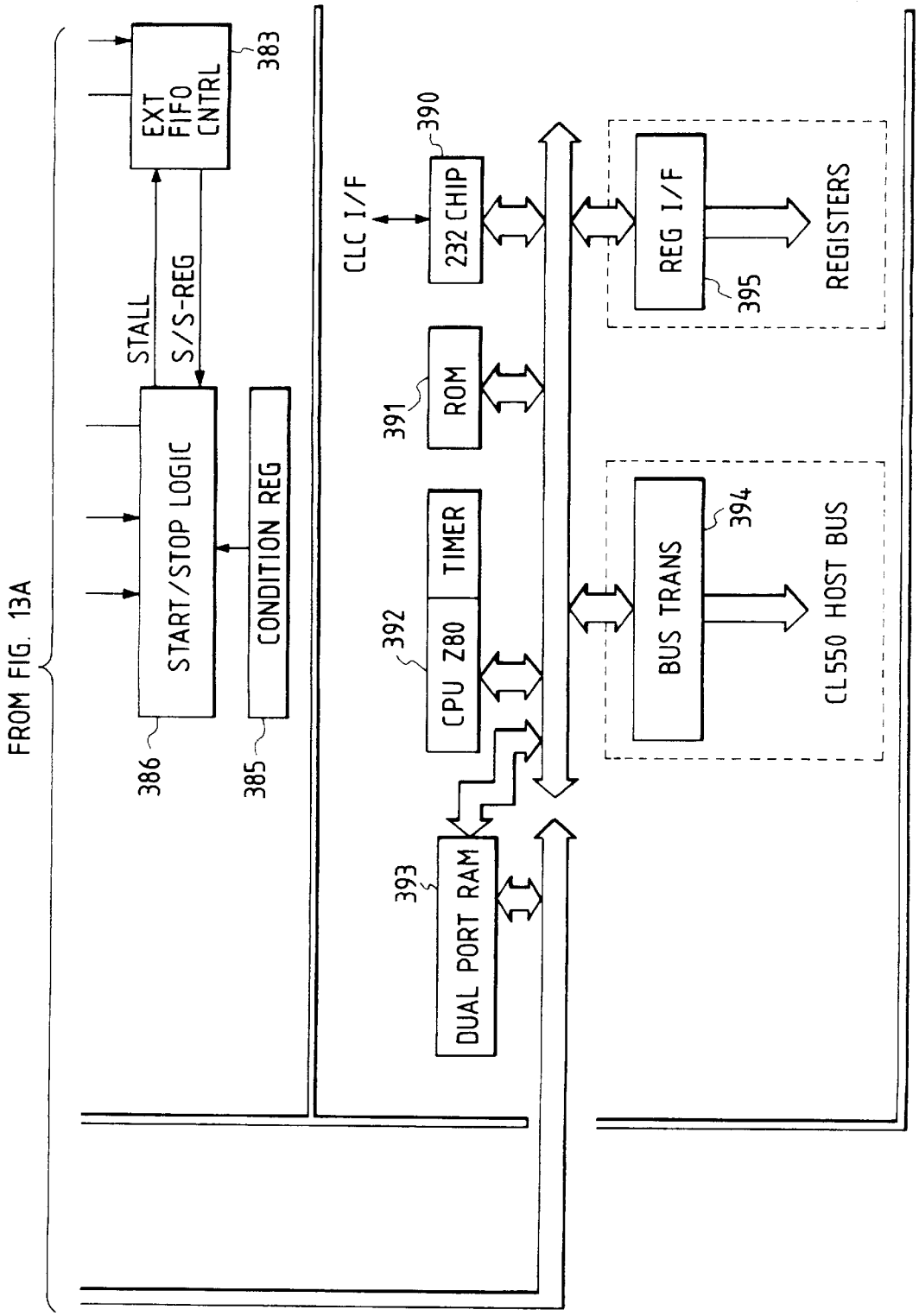
FIG. 13 is comprised of FIGS. 13A and 13B showing circuit diagrams illustrating a detailed internal structure of the first SP interface circuit shown in FIG. 1.
Figure 14:
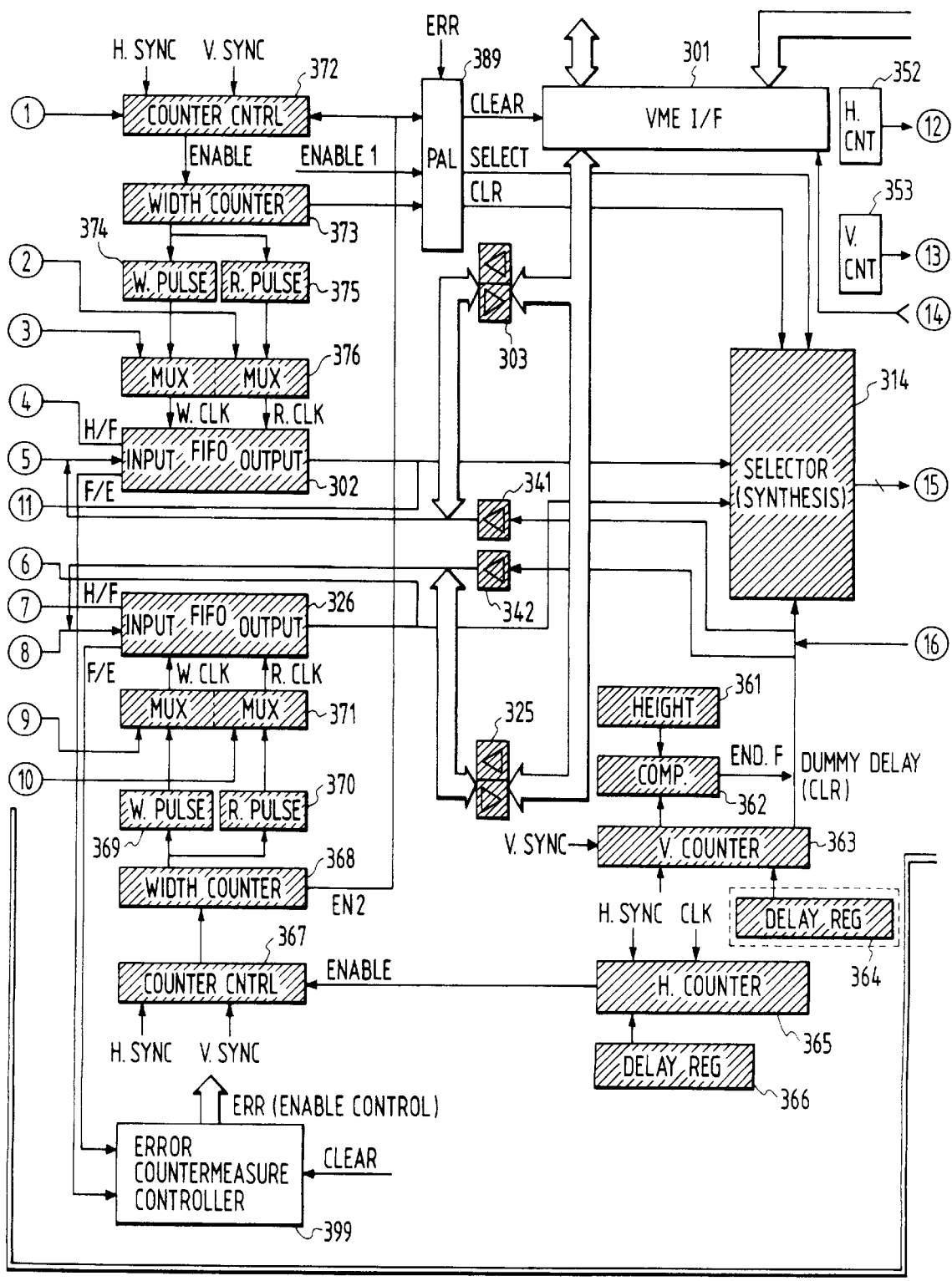
FIG. 14 is a circuit diagram illustrating a detailed internal structure of the first SP interface circuit shown in FIG. 1.
Figure 15:
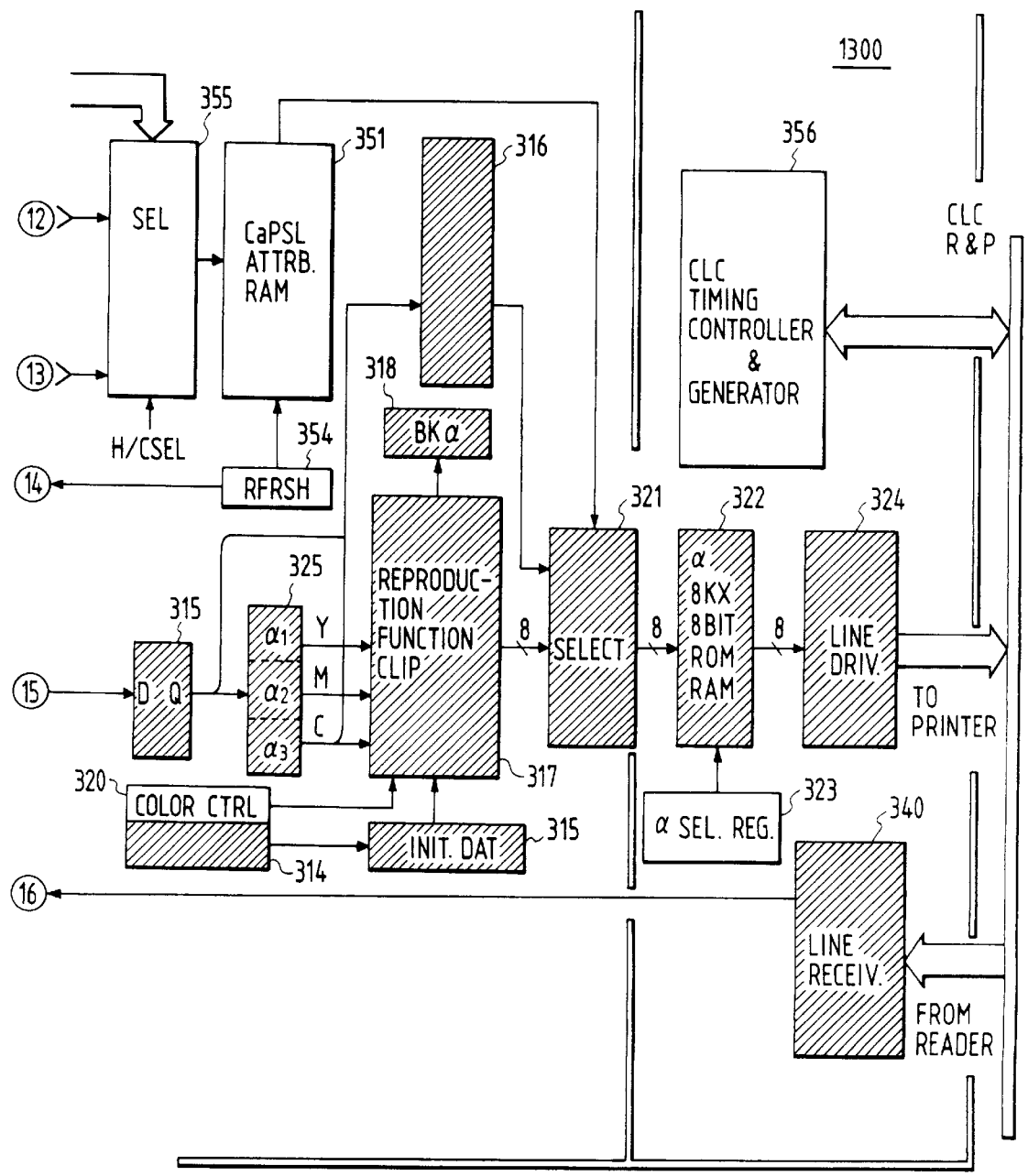
FIG. 15 is a circuit diagram illustrating a detailed internal structure of the first SP interface circuit shown in FIG. 1.

FIG. 12 is a block diagram illustrating an outline of the partial configuration of the first SP interface circuit 4-1.

In FIG. 12, 1100 is an image processing controller which comprises a VME bus interface, image compression/expansion part and a CPU circuit. The details are shown later in FIGS. 13A and 13B. 1200 is a connection memory controller whose details are shown later in FIG. 14. 1300 is an image I/O controller which controls I/O operation to/from the scanner, the color laser copier (CLC) provided with a printer, scanner and the thermal jet color copier (BJC) with a printer. The details are shown later in FIG. 15.

FIGS. 13A to 15 are respectively a block circuit diagram illustrating the detailed interval configuration of the first SP interface circuit 4-1 shown in FIG. 1 and the same components as in FIG. 1 are given the same reference numbers.

In processing of the right-side data frame of a two-divided image from the CPU 1000 of the board circuit shown in FIG.

9, image data is written from the VME interface 301 into the FIFO memory 302 through the buffer 303. Image data is temporarily stored from the FIFO memory 302 into the RAM 305 through the buffer 304. The SRAM 305 operates synchronized with the pipe line part of the image compression/expansion part. When the data as much as 8 lines in the vertical direction of the image are stored in the RAM 305, the image compression/expansion part 306 reads every horizontal and vertical 8×8 units from the SRAM 305 and the compressed data obtained are sequentially written into the DRAM 308 through the DMA controller 307. At this time, the DMA controller 307 operates the address counter 309 to generate an address or counts up the address to give it to the DRAM 308 through the selector 310. In the third mode, the CPU 1000 of the board circuit issues the address through the VME interface 301 and the selector 310 and up dates the data in conjunction with the DRAM 308 through the interface converter 312. Accordingly, the compressed data can be directly sent to the DRAM 308 and standard compressed data for which the image is not divided into two portions can be processed. However, such processing is unsuitable for those data of a low compression ratio.

The DRAM 308 is always refreshed by the refresh circuit 313 and the data is maintained. The following describes the operation for outputting the data of the DRAM 308 to the printer 94B. When data is read out from the DRAM 308 to the compression/expansion part 306 in the same control as in the write operation by the DMA controller 307, unprocessed data from the buffer 304 and output data from the FIFO memory are supplied to the latch 315 since one of right and left frames of the image is selected by the selector.

Next, the image data is gamma-converted or LOG-converted by the gamma converter. Then, masking for CG is carried out by the masking circuit 316 and masking for a natural image is carried out by the masking circuit 317, and one of these masked images is selected by the selector 321 in accordance with the nature of the image. Finally, the image is converted by the output gamma controller 322 and outputted to the printer 94B through the line driver. In this case, the output gamma controller 322 is controlled by the gamma setting register 323. The masking circuit 316 comprises a ROM and the masking circuit 317 is a logic circuit to which a black table for generating the black color is connected and a timing controller 320 is connected to its periphery so that a value of the initial data ROM 319 may be initially loaded. If the printer 94B is for the plane sequential system, expansion is carried out as many times as the number of planes and the masking circuits 316 and 317 perform masking in response to the output color.

The above describes the processing flow for the right side frame of a frame which is divided into two parts and the same processing flow is carried out for the left-side frame. In other words, 8-line image data stored in the SRAM 328 through the buffer 325, FIFO memory 302 and the buffer 327 is compressed in the image expansion part 329 and controlled by the DMA controller 331, address controller 335 and selector 334 and written as compressed data in the DRAM 332. As a matter of course, the CPU 1000 of the board circuit can directly write compressed data through the VME interface 311 to the selector 334 and the interface converter 330. A refresh circuit 333 refreshes and maintains the data of the DRAM 332. In printing an image, the data read out from the DRAM 332 is controlled by the control 331 of the DMA controller 331, expanded by the image compression/expansion part 339, supplied to the selector 314 through the SRAM 328, buffer 327 and FIFO memory 326 and outputted after having been processed as described above. The processing of mode 1 is carried out as described above.

The following describes the processing of the second mode below.

Image data which are transmitted from the scanner 94A after various image processings are received by the line receiver, and the right-side frame of the image is stored through the buffer 341 and the left-side frame, through the buffer 342 into FIFO memories 303 and 326 in sequence. Subsequent operations are the same as in the first mode. In other words, the processing of the right-side frame is such that, of image data written into the FIFO memory 302, those image data as much as eight lines are read out and stored in the SRAM 305 through the buffer 304, then compressed data is generated in the DRAM 308 by the compression/expansion part 306.

On the other hand, in the fourth mode, the CPU 1000 of the board circuit is able to directly read compressed image data through the VME interface 311, interface converter 312 and selector 310. In the second mode, however, compressed data of the DRAM 308 is expanded and transferred to the CPU 1000 of the board circuit. Compressed image data from the DRAM 308, which have been controlled through the interface converter 312 DMA controller 307, address counter 309 and selector 310 and read out in the sequence of write, are expanded in the image compression, expansion part 306, written into the SRAM 305 in terms of 8×8 unit, continuously read out in the horizontal direction through the buffer 304 at a timing when all data for eight lines are written and stored in the FIFO memory 302. Image data of the FIFO memory 302 is read out as unprocessed image data to the CPU 1000 of the board circuit through the buffer 303 and the VME interface 301 in accordance with the timing of the CPU 1000 of the board circuit.

The selector 321 is controlled to select one of two masking circuits 316 and 317 according to the data which is obtained by generating the addresses of positions of pixels to be processed by a horizontal direction counter 352 and a vertical direction counter 353 in response to the attribute of the image as to the CG image or the natural image which is stored in the RAM 351, stored in the RAM 351 through the selector 355 and read out for such selection. Therefore, the attribute of the image is stored in advance on the RAM 351. The interface between the scanner 94A and the printer 94B is controlled by the S/P timing controller 356.

The following describes the changeover of the right and left-side frames of the image.

A vertical direction counter 363 is for transmitting effective image signals of an effective portion of an image in the vertical direction and a delay register 364 is for setting a margin portion of the top end of the image. A length register 361 is used to set an effective length of the image and sends effective image signals to respective corresponding portions if the length of the image is within the effective length in a comparator 362. A delay register 366 is for setting a margin length in the horizontal direction in addition to the effective image range in the vertical direction is connected to generate an effective signal after the left end of the image is counted. The counter controller 367 starts a horizontal left width counter 368 when the above effective signal is received. This horizontal left width counter 368 functions as a down counter to count the width of the image and generates an enable signal of the left-side image during counting. When the counting of the left-side image is finished, the counter 368 generates an enable signal to the counter controller 372, which counts the width of the right-side image at its width counter 373 and gives the information of completion to the controller 389. The controller 389 informs the selector 314 of the end of the effective image width and clears the output. The width counter 368 causes the light pulse generator 369 to generate the signal of the effective width of the left-side image in compression, writes the scanner data of the left-side image in the FIFO memory 326 through the multiplexer 371, and supplies the read pulse of the compression/expansion part 329 through the gate 381 and the multiplexer 371.

For expansion of image data, the read pulse generator 370 receives the effective signal of the left-side image from the width counter 368 and outputs from the FIFO memory 326 to the printer 94B through the multiplexer 371.

On the other hand, a write pulse of the image compression/expansion part 329 is supplied to the multiplexer 371 through the write pulse gate 381 and expanded data is written.

For the right-side image, of course, the write pulse generator 374, read pulse generator 375, multiplexer 376 and gate 382 similarly operate as described above. In the image compression/expansion part 329, the status of the interval FIFO memory 302 is given to a start/stop logic 386 and the status of a register 385 for detecting the peripheral status is given to the start/stop logic 386. In addition, the status of the external FIFO memory 326 is given to the start/stop logic 386 through the FIFO memory controller 383 to enable to control the internal FIFO memory 302 and the external FIFO memory 326 so that an overflow or underflow does not occur therefrom and stop or start the pipe line 329 of the image compression/expansion in accordance with the situation.

Similarly, the pipeline of the compression/expansion part 306 is controlled to start or stop by the status register 387, start/stop logic 386 and FIFO controller 384. In start/stop operations, the internal FIFO memory 302 may overflow due to excessively high transmission rate of the pipeline at the time of compression, the internal FIFO memory 302 may underflow due to excessively high transmission rate of the pipeline at the time of expansion, the external FIFO memory 326 may underflow due to excessively high processing speed of the image compression/expansion part at the time of compression, and the external FIFO memory 326 may overflow due to excessively high processing speed of the image compression/expansion part at the time of expansion.

Since the external FIFO memory 326 and the internal FIFO memory 302 overflow or underflow when the processing speed of the image compression expansion part 306 delays due to excessively high operating speed of the scanner 94A and the printer 94B, the counter error controller 399 temporarily stops video signals (video=image) at the scanner 94A and the printer 94B. Simple error processing is carried out so that video signals in the unit of one line are abandoned from the scanner 94A and margin data in the unit of one line is outputted from the printer 94B to prevent of the flow of video signals from destruction due to the overflow or underflow from the FIFO memory. Accordingly, when the counter error controller transfers error information to the controller 388, the controller 389 checks a margin of one line and effective parts of left-side image and right-side image and outputs an error cancel signal at the delimitation of one line, while the controller 389 indicates other related parts to clear input/output data of the scanner 94A and the printer 94B and enables the image compression/expansion part 306 to carry out compression or expansion up to the delimiting point of one horizontal line despite that the image compression/expansion part 306 operates behind the processing of the scanner 94A and the printer 94B during processing of the error. This permits error resetting again at the delimitation of one line. However, for compression, the white line is compressed during error processing to accelerate the compression speed and, for expansion, image data is abandoned because it cannot be sent in time to the printer 94B.

Though the above description states that the CPU 1000 of the board circuit carries out almost all controls, the first SP interface circuit 4-1 according to this embodiment is provided with an internal CPU 392 which is capable of sharing the processing which can be handled in the first SP interface circuit 4-1. The first SP interface circuit 4-1 is also provided with a dual-part RAM 393 both parts of which are connected to the CPU 1000 of the board circuit through the XEM bus interface 311 and the internal CPU 392 through the internal CPU bus. Information is thus communicated to the CPU 1000 of the board circuit and the internal CPU 392 through this dual-port RAM 393.

Therefore the accesses from these CPU 1000 and CPU 392 to the VME bus in the first SP interface circuit 4-1 will not come in collision. In this case, the image compression/expansion parts 306 and 329 are interfaced by a bus convertor 394 connected to the internal bus of the CPU 392. The bus converter 394 has the same functions as the interface converters 312 and 330 to interface with the registers in the board through a register interface 395 and has also the function as the interface for the VEM bus.

In addition, the internal CPU bus has a ROM 391 for storing the programs of the CPU 392 and a serial communication part 390. A command for controlling the operation in conjunction with the scanner 94A and the printer 94B is sent to the serial communication part 390. Accordingly this embodiment is adapted so that the CPU 1000 of the board circuit shown in FIG. 9 controls the scanner 94A and the printer 94B through the internal CPU 392 shown in FIGS. 13A and 13B or directly controls the scanner 94A and the printer 94B. Control commands for the CPU 1000 include an activation command for the scanner 94A and the printer 94B as well as a status detection command and a status setting command as execution commands. The status detection commands are intended to detect the presence of print sheet, presence and size of the cassette, remaining amount of toner, and jamming of print sheet as well as current operation mode, that is, distinction of monochrome, three colors or four colors, resolution, and other parameters for image processing as to the printer 94B. These commands are almost identical to the scanner 94A, enabling to know the presence of the original on the original rest plate and wire break of a lamp.

On the other hand, the status setting command are intended to set the parameters for the image processing system such as selection of a cassette size, selection of an upper or lower stage of the cassette, operation mode, the number of print sheets and so on.

For the scanner 94A, the status setting commands similarly cover, for example, setting of the variation and magnification, setting of binary 1 multi-valued system, standard color space conversion, specific color space conversion, precision (resolution conversion), setting of area designation, and setting of gamma conversion.

In this embodiment, the scanner 94A has many image processing functions and therefore the image data is not processed on the first SP interface circuit 4-1 and is compressed. In addition, RGB data is received from the scanner 94A.

On the other hand, the input to the printer 94B is CMYK input, and masking, gamma conversion, LOG conversion and CMYK generation are processed on the first SP interface circuit 4-1 since the printer section is not provided with so many functions for image processing.

Figure 16:
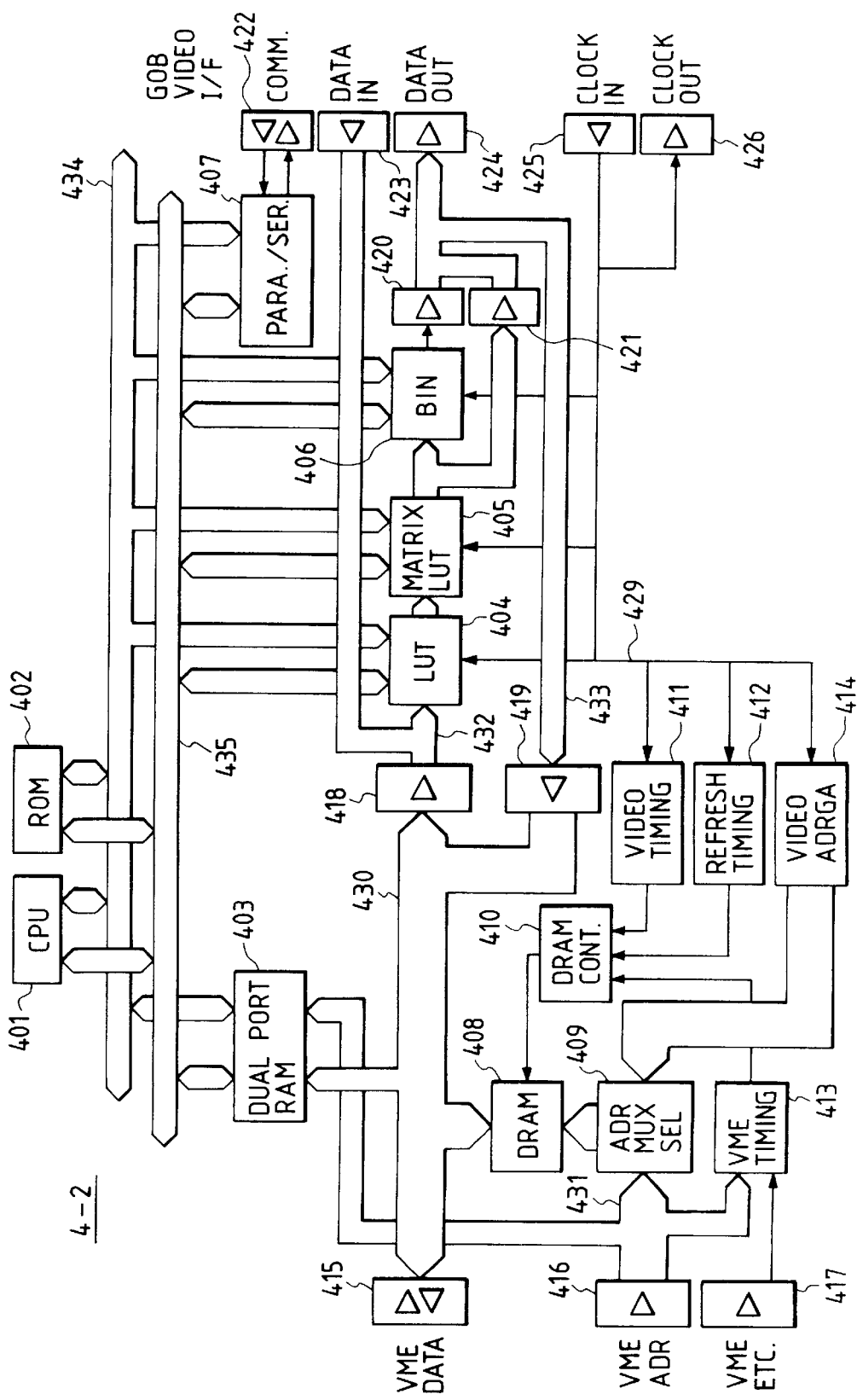
FIG. 16 is a circuit diagram illustrating a detailed internal structure of the second SP interface circuit shown in FIG. 1.

FIG. 16 is a block diagram illustrating a detailed configuration of the second SP interface circuit 4-2 shown in FIG. 1 and this second SP interface circuit 4-2 interfaces a thermal jet type scanner printer 95 (printer 95B and scanner 95A) and an S/P server unit SP1. The second SP interface circuit 4-2 is formed as an integrated interface board.

In FIG. 16, a CPU 401 receives a command from the board circuit connected to the VEM bus through the dual port RAM 403, interprets the command and internally controls the second SP interface circuit 4-2. The CPU 401 generates an interrupt of every 2 m seconds from the built-in interval timer and communicates a command to the thermal jet type printer 95B and the scanner 95A. The CPU 401 initializes and changes various parameters for image processing circuits 404, 405 and 406.

A ROM 402 for programming stores a control program (a program which supplements the device driver 86) to be executed by the CPU 401 and the initial values and the preset values of image processing circuits 404, 405 and 406.

A dual port RAM 403 functions as a work area for the CPU 401 and accesses to both the CPU 1000 of the board circuit and the CPU 401 to execute communications between these CPUS.

The image processing circuit 404 is formed as an image processing ASIC to carry out graduation conversion according to the lookup table. For example, the image processing part 404 performs LOG conversion when converting RGB data to CMYK DATA. This can be implemented by providing in advance a conversion table in the ROM 402 and transferring it to the RAM in the image processing circuit 404.

The image processing circuit 405 is formed as an image processing ASIC and carries out graduation conversion according to 4×5 matrix operation and a lookup table. This circuit 405 carries out NTSC-RGB color space conversion as the RGB spaces and the standard color space of the characteristics of the sensor of the scanner 95A, or conversion (referred to as masking) from CMY(K) after conversion by the image processing circuit 404 to CMYK adjusted to the characteristics of the printer 95B through this matrix operation. In addition, color balance can be adjusted by the lookup table. These processings are set by preparing various tables, storing these tables in the ROM and selecting the tables in accordance with the application as in the case of the image processing circuit 404.

The image processing circuit 406 is formed as an image processing ASIC to carry out a binary-coding processing. The binary coding algorithm used in this embodiment is an average density preserving method. A serial/parallel converter 407 converts 8-bit parallel data from the CPU 401 to serial data for communications to the scanner 95A and the printer 95B.

A DRAM 408 for images is an image memory adapted to the type of band adjusted to the number of pixels of the head of the printer 95. In the scanner 95A or the printer 95B, data flows according to the clock signals for images during one scanning and the operation cannot be stopped and therefore a buffering for the size of one band is requires. Therefore, the image data as much as are band to be scanned by the scanner 95A and printed by the printer 95B are buffered.

A scanning system is converted between a raster type access from the VME bus side and a vertical access from the printer 95B.

An address selector 409 for the DRAM which serves as a multiplexer changes over the address for the access from the VEM bus to the DRAM 408 and the access from the scanner 95A and the printer 95B to the DRAM 408. The address to the DRAM 408 is supplied as being divided to a ROW address and a COLUMN address and the DRAM 408 carries out this multiplexing.

A timing controller 410 for the DRAM generates the signals for controlling DRAM such as RAS, CAS, WE and OE and carries out arbitration with refresh signals.

A timing circuit 411 generates a timing signal for accessing of the scanner 95A and the printer 95B. This circuit serves to generate the access timing based on a image clock and a sync signal from the scanner 95A and the printer 95B.

A refresh timing controller 412 generates a timing signal for a refresh signal to the DRAM 408. This controller utilizes an interval between the accesses by the scanner 95A and the printer 95B and controls to avoid collision of accesses of the scanner 95A and the printer 95B.

A VME timing controller 413 processes the control signals for accessing from the VME bus, including decoding of AM codes and high order addresses and interrupts.

An access address generator 414 for the scanner 95A and the printer 95B generates an address for specific access for the scanner 95A and the printer 95B to the memory contents written in the raster system for accessing from the VME bus since the accesses of the scanner 95A and the printer 95B differ from an ordinary raster system. The scanning direction is reversed in accordance with the size of band.

A VME bus interface buffer 415 accesses image data in a 32-bit width and commands in a 8-bit width.

A VME bus interface address buffer 416 accesses image data in a 24-bit address space and commands in a 16-bit address space.

A buffer 417 serves as a buffer for the parts other than the data and addresses of the VME bus interface.

A buffer 418 for an entry port to the image processing part carries out accessing from the VME bus and accessing to the DRAM in a 32-bit width. In the image processing part, processing is carried out in a 8-bit width. Therefore, 32-bit R, G, B and X data is serially converted to 8-bit data in order.

A buffer 419 for an exit of the image processing part, contrary to the buffer 418, carries out conversion of the data line of 8-bit width which varies in the sequence of colors to 32-bit wide data of four colors totally.

A buffer 420 for use after binary coding processing functions to expand one-bit data which is binary-coded by the image processing circuit 406 to 8-bit data, that is "0" to "0x00" and "1" to "0xFF".

A buffer 421 is used for bypassing binary coding processing by the image processing circuit 406, and one of outputs of the buffer 420 and the buffer 421 is selected to change over binary-coded data to multi-valued data.

A buffer 422 of the communications part is for interfacing the scanner 95A and the printer 95B.

A buffer 423 for input data is for interfacing the scanner 95A and the printer 95B.

A buffer 424 for output data is for interfacing the scanner 95A and the printer 95B.

An input buffer 425 for clock and control signals is for interfacing the scanner 95A and the printer 95B.

An output buffer 426 for clock and control signals is for interfacing the scanner 95A and the printer 95B. 429 is a clock input line.

430 is a 32-bit image data bus, 431 is a 24-bit address bus, 432 is a 8-bit image data bus, 433 is a 8-bit image data bus, 434 is a 16-bit local address bus, and 435 is a 8-bit local data bus. The following describes the operation of the printer 95B.

Operation for Printing

When various parameters for printing are written into the dual-port RAM 403 from the board circuit through the VME bus, the CPU 401 reads out the data and interprets and control it. For example, for printing RGB data, the CPU 401 sets a table with a through-operating characteristic which does not cause LUT data of the image processing circuit 404 to change, sets the coefficients for conversion from NTSC-RGB to 13J-RGB in the coefficient table for the matrix of the image processing circuit 405, and controls the gates of buffers 420 and 421 so as to pass through the binary coding processing of the image processing circuit 406.

In addition, parameters for data sizes are set. Parameters such as data sizes are sent to the printer 95B through the parallel/serial converter 407. Then, image data as much as one band is transferred from the board circuit to the memory 408 through the VME bus. At this time, image data from the VME bus is stored in the RGBX data format by 32-bit accessing. R, G and B are respectively image data for color components of red, green and blue, and X is control data including information of block characters. Next, a command for printing operation is transferred through the dual-port RAM 403. The CPU 401 transmits a start command for printing operation. When the start signal returns from the printer controller of the printer 95B, a timing pulse generator 411 starts accessing to the memory 408. In this case, the data is read out in a direction along the BJ head of the printer 95B and therefore the data is read out according to an address generated by the address generator 414. Data read out from the memory 408 is converted to 8-bit data in the order of R, G, B and X in the buffer 418 and entered into the image processing part. The image is processed in accordance with the predetermined parameters, and NTSC-RGB data is converted to RGB color spaces to be internally used in the printer 95B and transferred to the printer 95B through the buffer 421 and the interface 424. When the processing of one-band data is finished, next band data is received through the VME bus and the above described operation is repeated. Processing of one page data is completed after the predetermined number of times of processing. The following describes reading operation of the original by the scanner 95A according to a control program stored in the ROM 402.

Operation in Scanning

Various parameters for scanning operation are written from the board circuit into the dual-port RAM 403 through the VME bus. The read and interprets the data and carries out the control. For example, when binary-coded RGB data is scanned in the size of 1024×1024 at the position of 512×512, the CPU 401 sets a table with a through-operating characteristic in the LUT of the image processing circuit 404 and the coefficients for conversion from BJ-RGB to NTSC-RGB in the matrix coefficient table of the image processing circuit 406 and controls the gates of buffers 420 and 421 so as to pass through binary coding processing of the image processing circuit 406. In addition, a size of the image to be scanned is set to 1024×1024 and the scan start position is set to 512×512. These parameters are transferred to the scanner 95A through the parallel/serial converter 407. Then the CPU 401 transmits a scan start command to the scanner 95A.

Image data entered from the reader part of the scanner 95A is entered into image processing circuits 404, 405 and 406 through the interface 423. Here image processing is carried out according to the predetermined parameters and 32-bit format RGBX data is stored in the memory 408 through the buffer 419. At this time, the memory 408 stores RGBX data as described above. In this example, the scanner 95A is set to scan binary-coded RGB image data and therefore X is meaning less data. Though R, G and B color components are binary-coded data. One byte is assigned to one pixel. In this case, the board circuit carrier out a processing for which data is processed in a common format requested for binary-coded image data, for example, by packing bytes to arrange RGB data in the order of raster lines. Image data stored in the memory 408 is transferred to the board circuit through the VME bus interface 415. One scanning operation is completed by repeating the above processing as many times as the number of bands.

The following describes image data processing by the scanner 94A and the printer 95B shown in FIG. 1.

In this embodiment, the color image copier is formed integral with the scanner 94A and the printer 94B and therefore only one system for image processing function is provided. If the scanner 94A and the printer 94B are separated, the system configuration includes only one of them for each processing. In addition, the scanner is provided with almost all image processing functions, and the printer 94B mainly has those functions such as variation of magnification, designation of area, color space conversion, gamma conversion, and color masking processing.

Since the scanner 94A is provided with the color space converter and the color masking processor, standard RGB (RGB for NTSC, etc.) is prepared as the mouth of the video interface and RGB data can be obtained in point sequential or parallel simultaneous scanning. Accordingly, the image data should be given as C, M, Y and K data to the printer 94B because the printer is not provided with the image processing part. Image data should be transmitted to the video interface after such image processing as conversion to C, M and Y, black color generation (K), color masking, resolution conversion and trimming have been externally finished as required. Moreover, in this case, image data should be transmitted by repeating the processing four times for C, M, Y and K colors in plane sequential scanning. In addition, both the scanner 94A and the printer 94B cannot be stopped during processing.

On the other hand, the video interface includes the horizontal sync signal, vertical sync signal and video clock signal for synchronization with video data. Moreover, status information such as ON/OFF of the power supply for the scanner and the printer are provided to enable to externally check the status. A function for command interface in serial communications is provided to permit detection and setting of the status of the scanner 94A and the printer 94B and generation of execution commands such as for activating the scanner and the printer.

Figure 17:
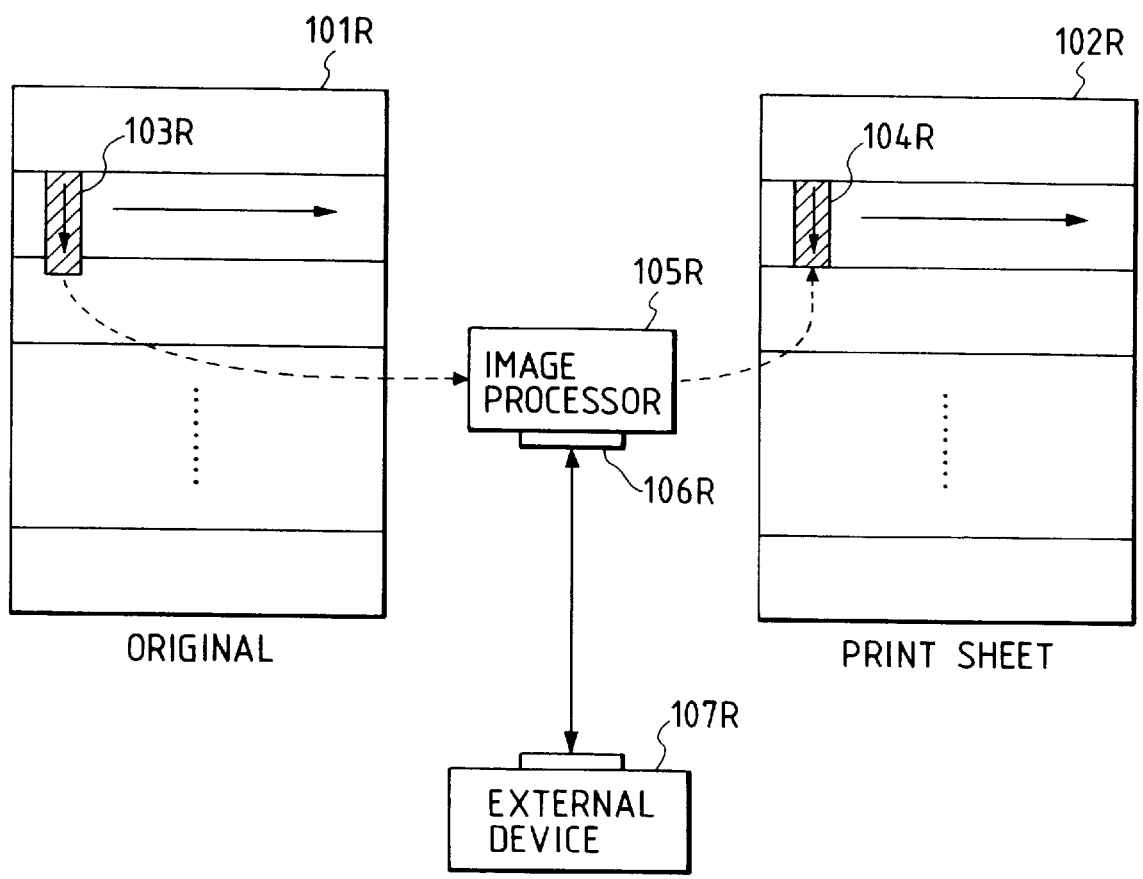
FIG. 17 is an explanatory view illustrating an image recording process of a scanner/printer shown in FIGS. 2A and 2B.

The following further describes the operation of the scanner 95A and the printer 95B, referring to FIGS. 17 and 18.

FIG. 17 is a typical diagram illustrating the image recording process of the scanner/printer 95 shown in FIGS. 2A and 2B.

In FIG. 17, 101R denotes an original to be scanned and 102R denotes a print sheet for printing. These original and the print sheet are of the A4 size. 103R denotes the sensor head of the scanner and 104R denotes the print head of the printer. The print head 104R of the printer is provided with an array of nozzles from which ink is injected by the bubble jet system and comprises, for example, nozzles 108.

On the other hand, the sensor can output data of, for example, 144 pixels so that more pixels than 128 can be scanned. For colors, the sensor head of the scanner has the scanning segments for three colors R, G and B and the printer head has the printing segments for four colors C, M, Y and K. 105R denotes the image processing part which processes RGB signals entered from the scanner sensor and transmits them as binary-coded CMYK signals with the characteristics adapted to the printer head.

The image processing part 105R can transfer 8-bit RGB color data from the interface 106R on the way of the image processing system to external sources. In the scanner/printer 95, the sensor of the scanner 95A and the printer head of the printer 95B operates in synchronization, and the image processing part 105R has a pipeline arrangement to make it possible to carry out processing without requiring a large capacity image memory. Therefore, the scanning method for data to be transferred through the interface 105R is of a specific type. 107R denotes external equipment.

Figure 18A:
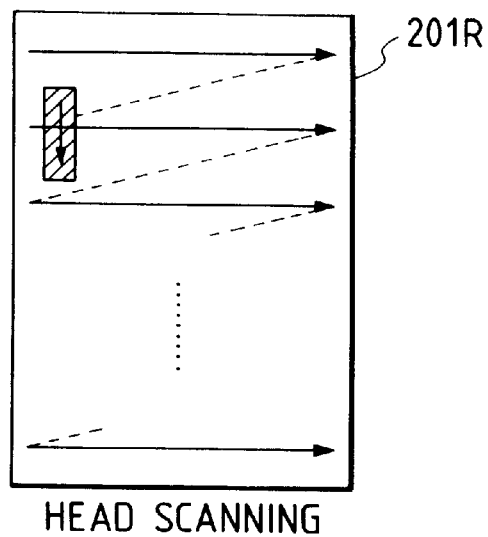
FIGS. 18A, 18B, and 18C are explanatory views illustrating a document scanning operation of a scanner/printer shown in FIGS. 2A and 2B.
Figure 18B:
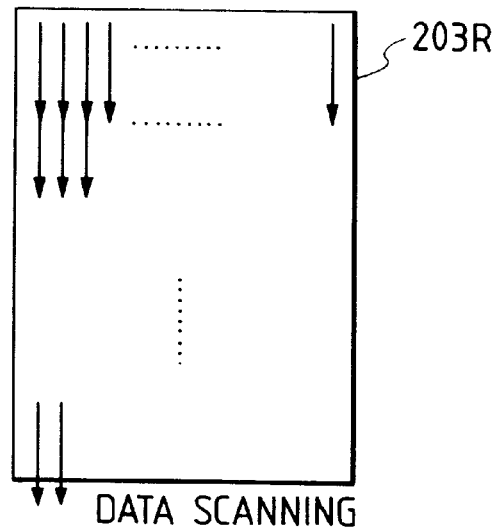
Figure 18C:
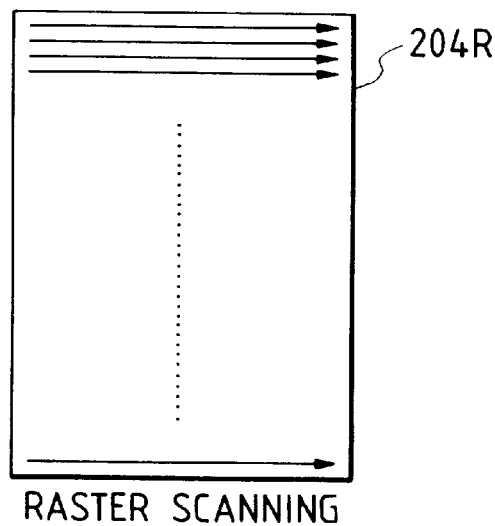

FIGS. 18A to 18C are typical diagrams illustrating the scanning status of the original by the scanner 95A of the scanner/printer 95 shown in FIGS. 2A and 2B.

In FIGS. 18A to 18C, 201R shows a motion of the sensor head of the scanner. The sensor head itself moves in a transversal direction main scanning direction) as shown for the original (print sheet) and the pixel segments of the sensor are arranged at right angles to this direction. Therefore data 203R is aligned to 201R. On the other hand, data is aligned as data 204R in general raster scanning systems.

Figures 19, 20:
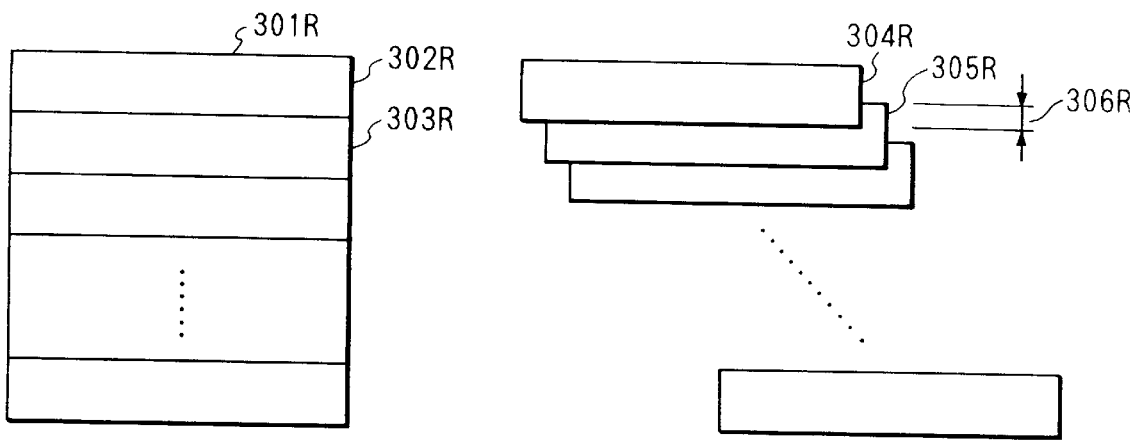
FIG. 19 is an explanatory view illustrating a band document scanning operation of a scanner/printer shown in FIGS. 2A and 2B.
FIG. 20 is a view illustrating an example of an interface signal between a server device according to the present invention and a printer.

FIG. 19 is a typical diagram illustrating the status of scanning of a band original by the scanner 95A of the scanner/printer 95 shown in FIGS. 2A and 2B.

In FIG. 19, 301R denotes one page, 302R denotes the first segment and the 303R denotes the second segment. In the case of the image data which is outputted from the scanner sensor and will be binary-coded through the image processing system, the segment 304R scans a larger image than for the segment 305R and the image as far as 306R is doubly scanned.

The following describes an example of the printer capable of using the Centronics interface software which can be controlled by the S/P server unit shown in this embodiment. The Centronics interface is the standard software for transfer of data from a computer to a printer developed by Centronics, Inc. in the United States, permitting inexpensive and high speed data transfer. Almost all printers are standardized according to this Centronics system.

Data transfer according to the Centronics software is carried out through three control lines for DATASTROBE signal, ACKNOWLEDGE (ACK) signal and BUSY signal and the DATA line as shown in FIG. 20.

The DATASTROBE signal indicates that data is outputted to the DATA line. The BUSY signal indicates that the printer is currently operating and the data cannot be received or that the data buffer is fully occupied.

The ACK signal indicates that reading of data is correctly completed.

Though the above three control lines are basically sufficient, the signal line for warning NO PRINT SHEET is also defined for proper control of the printer. In FIG. 20, the signal name, input/output and remarks are shown. Since the pin number varies as 36 pins, 25 pins and 14 pins, depending on the types of connectors and the definitions differ with manufacturers or deleted in some cases, the pin numbers are omitted.

Figure 21:
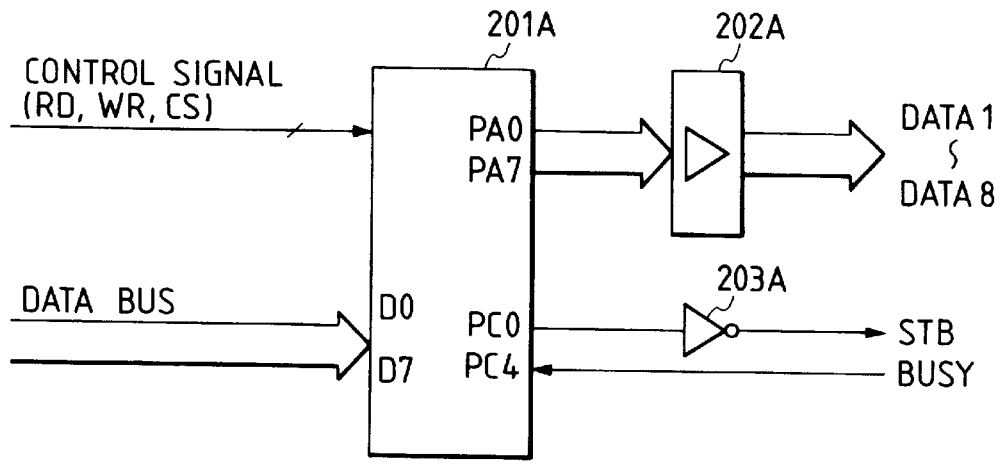
FIG. 21 is a circuit diagram illustrating an example of an interface between a server device according to the present invention and a printer.

FIG. 21 is a block diagram showing an example of the Centronics I/F control circuit.

Figure 22:
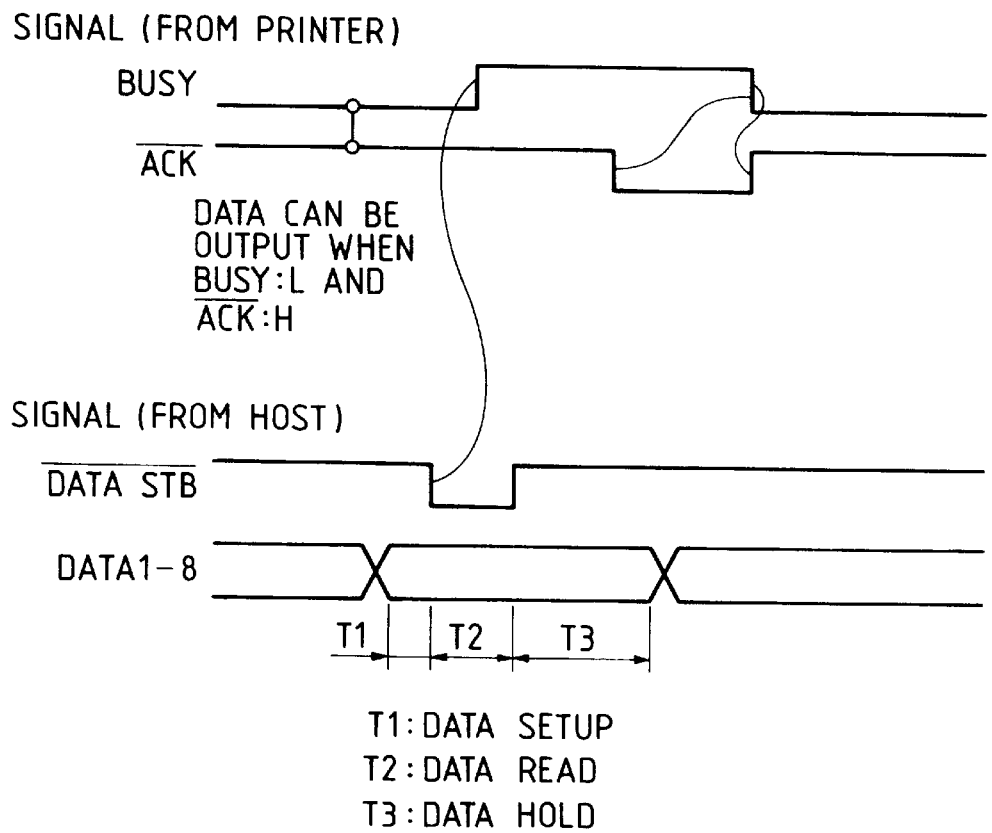
FIG. 22 is a timing chart illustrating an operation of the circuit shown in FIG. 21.

In FIG. 21, a Centronics I/F control circuit 201 is provided with the data buffer 202A and the control line buffer 203A, and data is processed according to the timing chart shown in FIG. 22.

Figure 23:
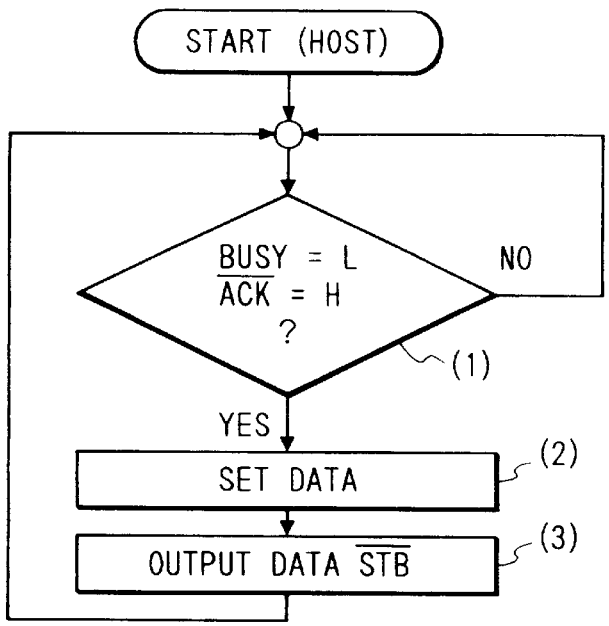
FIG. 23 is a flowchart illustrating an example of a signal processing procedure in a host of a Centronics I/F circuit shown in FIG. 21.

FIG. 23 is a flow chart showing an example of signal processing procedure between the host computer and the printer by the Centronics I/F control circuit shown in FIG. 21. (1)–(3) denote the steps of the procedure, particularly corresponding to the processing in the host computer.

When the BUSY signal is "L" and the ACK signal is "H" (1), data is set (2), the DATASTROBE signal is outputted (3) and the operation is returned to step (1).

Figure 24:
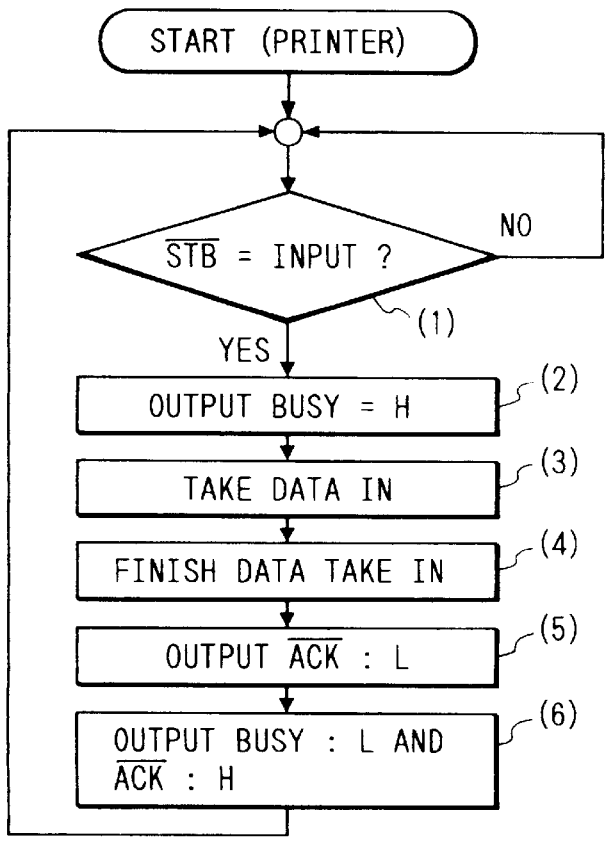
FIG. 24 is a flowchart illustrating an example of a signal processing procedure in a printer of a Centronics I/F circuit shown in FIG. 21.

FIG. 24 is a flow chart showing an example of signal processing procedure between the host computer and the printer by the Centronics I/F control circuit shown in FIG. 21. (1)–(6) denote the steps of the procedure, particularly corresponding to the processing in the printer adapted to the Centronics standard.

The BUSY signal is "L" (1), then the BUSY signal is set to "H" (2), and data fetching from the data bus is started (3). Subsequently, data fetching is finished (4), the ACK signal is set to "L" (5), the BUSY signal is set to "L" and the ACK signal to "H" (6), and the operation returns to step (1). Data transfer is carried out as described above.

In most cases, the Centronics printer is controlled by a method for which "ESC" (0×1B) is affixed to the top of a command and data. For example, for transferring data to a printer, a command is sent as ESC ( A COUNT COLOR DATA, (1B 28 41 COUNT COLOR DATA).

In this case, "ESC ( A " is a control code. "COUNT" is the number of data. "COLOR" defines the color spaces such as RGB and CMY. "DATA" is color image data. The printer performs printing by continuously transmitting such data commands as described above. The control codes and configuration differ with the printer manufacturers. However, the control methods using "ESC" are relatively identical.

This system allows to use various Centronics printers by connecting the Centronics printer to the Centronics port and supporting the control codes with a software program.

Figure 25:
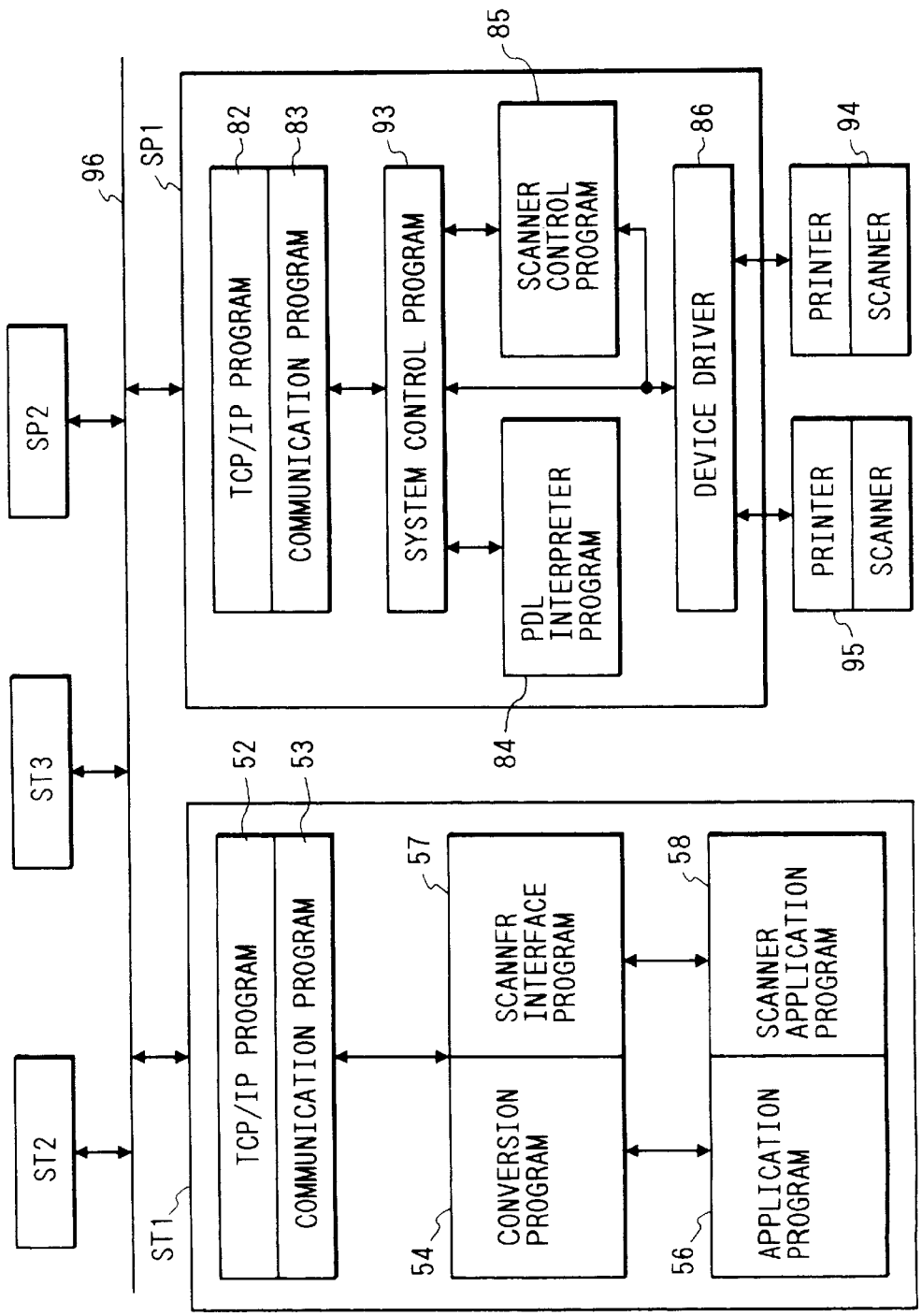
FIG. 25 is a view illustrating a program structure between a server device according to the present invention and a host computer.

FIG. 25 illustrates a program structure of the scanner printer server (network server) SP1 and the host computer in accordance with the present invention. The following briefly describes the overall flow of the system. The same components as in FIGS. 2A and 2B are given the same reference numbers and symbols. The host computer as an example shown in FIG. 25 is the Macintosh station ST1 and can be the station ST2 or ST3 or others.

When the operator for the host computer (station) selects and designates a desired scanner printer network server, printer, size of print sheet, and data format to be transferred to print the print data prepared by using the application program 56, the application program 56 transmits the data (including instructive information) to the conversion program 54. The conversion program 54 converts the data sent by the application program 56 to a data structure which can be accepted by the selected network server SP1 and transmits it to the communications program 53 and the TCP/IP program 52. For example, the Macintosh station ST1 converts QuickDraw data to CaPSL data and the IBM station ST2 converts GDI data to CaPSL data.

The communications program 53 transmits the data transferred from the conversion program 54 to the network server SP1 through the TCP/IP program, and the communications program 83 of the network server SP1 receives the data through the TCP/IP program 82 and transmits it to the overall system control program 93. The overall system control program 93 analyzes the data transferred and carries out the following processing according to the status of the network server at that time and the data transferred.

The overall system control program 93 sends print data to the PDL interpreter program 84. The PDL interpreter program 84 receives print data and converts it to data which can be accepted by the designated printer (for example, the printer of the scanner/printer 95). For example, the data is converted from PDL data such as Postscript (trade name) and CaPSL to the image data. The overall system control program 93 transfers the data converted by the PDL interpreter program 84 to the device driver 86 which serves as the image I/O unit control program and the device driver 86 transfers the data to the designated printer for printing.

When the operator for the host computer ST1 selects and designates a desired scanner printer network server, scanner, image area, resolution, multi-color or mono-color, type of compression for entry of image data by using the scanner application program 58, the scanner application program 58 transmits data to the communications program 53 through the scanner interface program 57. The communications program 53 transmits the data transferred through the scanner interface program 57 to the network server SP1 designated through the TCP/IP program, the communications program 83 of the network server SP1 receives the data through the TCP/IP program 82 and transmits the data to the overall system control program 93. The overall system control program 93 sends the entered selection and designation commands (image input commands) to the scanner control program 85, the scanner control program 85 sends the commands to the device driver 86 which serves as the image I/O unit control program according to the commands, and the device driver activates the designated scanner (for example, the scanner of the scanner printer 95) and transfers the image data to the scanner control program 85. The scanner control program 85 transfers the image data to the overall system control program 93, the overall system control program 93 transfers the image data to the communications program 83, the communications program 83 of the network server SP1 transfers the image data to the communications program (for example, the communications program 53) of the host computer designated through the TCP/IP program 82. The image data received by the communications programs 53 through the TCP/IP program 52 is further transferred to the scanner application program 58.

When an inquiry command as to the status of the scanner printer server is sent to the scanner printer server (for example, the scanner printer server SP1) designated by the work station ST1, the overall system control program 93 obtains the status (for example, the type of the scanner printer connected to the network server SP1, resolution, size of print sheet, color processing ability, etc.) of the network server SP1 and the communications program 83 transmits the data obtained to a host computer (for example, the work station ST1) through the TCP/IP program 82.

When an error occurs in the scanner printer 94, 95 serving as the image I/O unit or the network server SP1, the overall system control program 93 controls the actualities of error and the communications program 83 transmits the information to the host computer (for example, the host computer SP1) designated through the TCP/IP program 82.

With the program structure as described above, in this embodiment, the printer designated by the host computer can carry out printing according to the application program (for example, a DTP software) of the host computer. Furthermore, the image data can be entered from the scanner designated by the host computer according to the scanner application program (for example, a DTP software) of the host computer, and the image data entered from the designated scanner can be transferred to the other host computer. In addition, the status (status of the scanner printer to be connected) of the designated network server SP1 can be recognized.

In FIG. 25, no matter how many host computers and scanner printer servers are connected to the LAN 96, the application of the present invention will not be hampered.

The following describes network processing of the host computer and between the host computer and the network server SP1.

Processing for printing in the host computer is primarily divided into the first to third processing; the first processing for preparation of data according to the application program (for example, a DTP software), the second processing for conversion of prepared data to the CaPSL codes according to the application program, and the third processing for transfer of the CaPSL codes to the network server SP1.

Data prepared in the first processing depends on the type of a machine to be used and an application program. When, for example, the Frame Maker (trade name), a DTP program of Frame Technology, Inc., is used in the SUN work station, the data is outputted as an MIF (trade name) file or an IPL (trade name) file. When an application program adapted to the Windows (trade name) is used in an IBM personal computer, GDI functions are invoked.

Conversion of the data prepared according to the application program to the CaPSL codes in the first processing depends on the type of machine to be used and the file format to be applied. When, for example, the above described Frame Maker is used in the SUN work station, a program for converting the MIF file or the IPL file to the CaPSL codes is used. When an application program adapted to the Windows (trade name) is used in an IBM personal computer, conversion from GDI functions to the CaPSL codes is carried out according to a conversion program. In addition, when an Apple's Macintosh (trade name) computer is used, conversion of QuickDraw functions to the CaPSL codes is carried out according to a conversion program.

In addition, the transfer of CaPSL codes to the network server SP1 in the third processing depends on a program to be used in transmission. For example, the communications program 83 shown in FIGS. 2A and 2B is used, and a host computer which uses UNIX as the OS fuses the 1pq/1pd program 90.

When a scanner process is to be carried out in the host computer, the first and second processing is carried out.

First, image data is received from the network server SP1. Second, the image data is displayed and stored according to a scanner application program.

Image data received in the first processing is stored in the image format which can be processed by the scanner application program to be used in the second processing. The communication program 83 shown in FIGS. 2A and 2B is used as a program to be used to receive the image data from the network server SP1.

In the second processing, the image data format which can be used depending on the use of the scanner application program is determined. And the image data format which can be used for input and output is determined. For example, the bit map and the TIFF format are permitted as input. The TIFF format is used for storing as files. The bit map can be used for display.

A plurality of programs are used to connect the host computer and the network server SP1 with a network. The main program is the communications program 83 shown in FIGS. 2A and 2B.

The communications program 53 shown, for example, in FIG. 25 and the communications program 83 for the network server SP1 are available. The communications program for the host computer mainly performs the first to third processing.

The first processing is linked with the network server SP1 through a lower layer. In the second processing, the CaPSL data is transferred to the network server SP1. In the third processing, image data is received from the network server SP1 and transferred to a higher layer.

On the other hand, the network server SP1 mainly carries out the first and second processing. In the first processing, the CaPSL data received by the communications program 83 through the TCP/IP program 82 is transferred to the overall system control program 93. In the second processing, the image data received from the overall system control program 93 is transferred to the communications program 83.

Printing and scanning are started when a print request and a scan request from the upper layer of the host computer are received by the communications program 53. The communications program 53 forms a linkage using the lower layer. When the host computer is connected through, for example, the Ethernet, the TCP/IP program 52 uses for data transmission and reception. After the circuit is linked, the communications program 53 transfers the specific data for printing and scanning and sets the printer and the scanner to an adaptive condition. The CaPSL data is transmitted from the a client to a server for printing after the settings of the printer and the scanner have been completed, and the image data is transmitted from the server to the client for scanning after the setting of the scanner has been completed. As a program, the lpd program shown in FIGS. 2A and 2B can be used. When a UNIX machine is used as the host computer, printing is enabled by using lpr which is the standard print command for the UNIX. This lpd program 90 (see FIGS. 2A and 2B) is used only for printing. Even when there is no spool disk at the server side, the output by default setting is possible.

Basic operations of the overall system control program 93 are to carry out processing in response to an event to be entered, inquire a status of the input/output unit which has fallen in an error, and resume a job which has been interrupted due to the error and has restored from the error.

Figure 26:
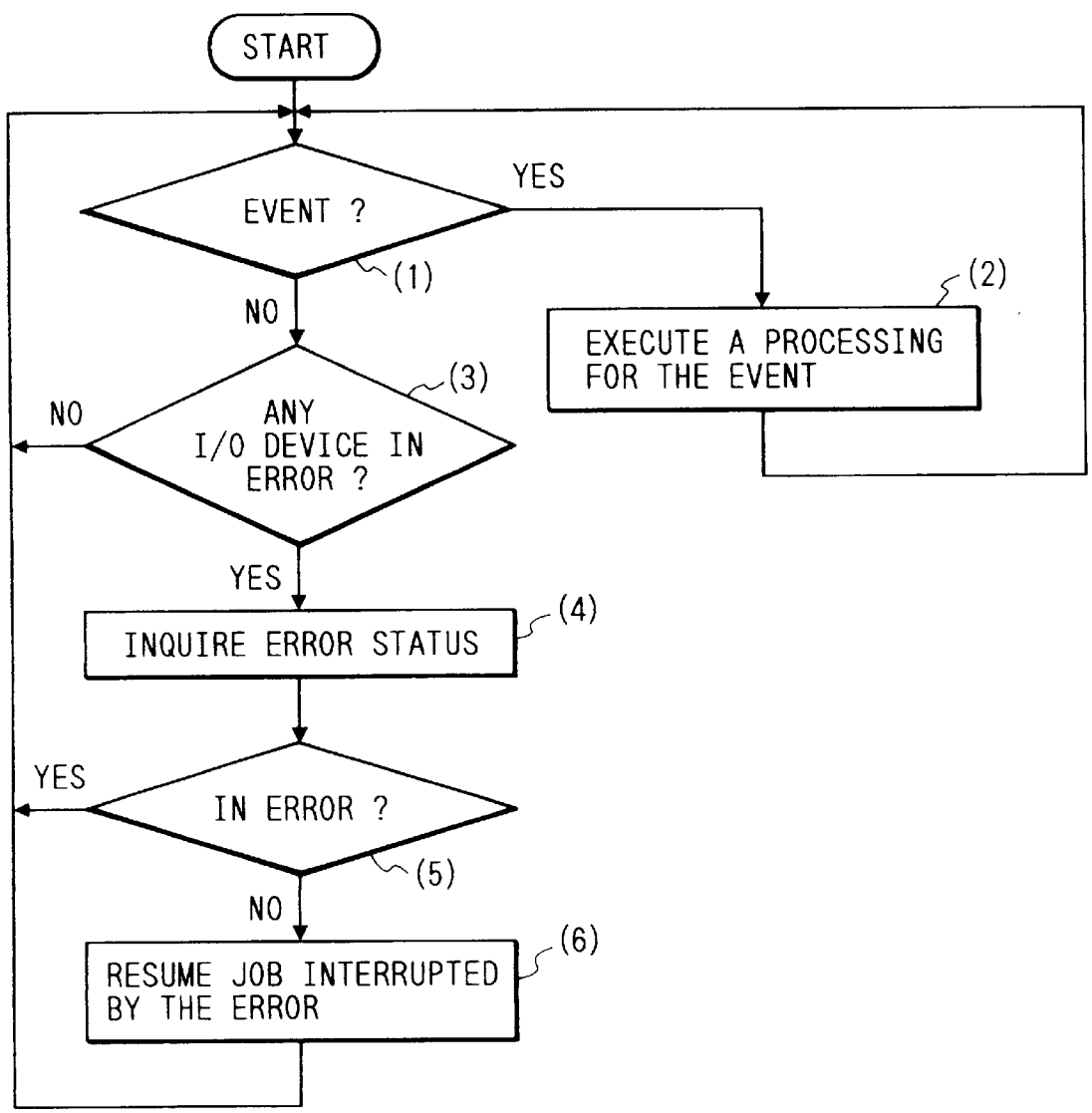
FIG. 26 is a flow chart illustrating an example of a total control procedure in a server device according to the preset invention.

The following describes the overall control operation in accordance with the present invention referring to the flow chart shown in FIG. 26.

FIG. 26 is a flow chart showing an example of the overall control procedure in the server unit in accordance with the present invention. (1)–(6) respectively denote the steps of the procedure.

In step (1), it is determined whether there is an event (1), a processing in response to the event is carried out in step (2) and, if it is determined that there is no event, it is checked in step (3) whether there is an input/output unit suffering from the error. If it is checked that there is an input/output unit suffering from the error, it is inquired in step (4) whether the unit is suffering from the error and it is determined in step (5) whether the unit is suffering from the error. If the unit is recovered from the error, a job which has been interrupted due to the error is resumed in step (6). The overall system control program 93 can communicate with the TCP/IP program 82, communications program 83, PDL interpreter program 84, scanner control program 85 and device driver 86 in the network server SP1 and receives various events. Those events sent from the communications program 83 include an arrival of a job and an end of data transfer, those events sent from the PDL interpreter program 84 include an end of processing of data received, end of page drawing and end of print job, and those events sent from the scanner control program 85 include an image data transfer request, end of page print, occurrence of error and normal status.

In the overall system control program 93, the operations for respective events are specified. For example, when a job arrival signal is sent from the communications program 83, the contents of the job are analyzed, the data of a print job is transferred to the PDL interpreter program 84 and the data of an image input job is transferred to the scanner control program 85.

In addition, error sent to be from the device driver 86 include no paper, no ink, paper jam and power off.

In this embodiment, the network server SP1 uses the CaPSL as the page descriptive language for the printer. The following describes the function and processing of the CaPSL. However, the page descriptive language for the printer is not limited to the CaPSL.

The function of the CaPSL is a task for producing an image in a drawing area referred to as a band memory of the network server SP1 by entering the control codes which denote a figure, character and image.

The overall system control program 93 maintains direct communication with the PDL interpreter program 84. The communication includes the first and second communications described below.

The first communication is transferred to the CaPSL by the overall system control program 93 and its contents are a file name of a file which stores the CaPSL codes, a leading address and size of a memory which stores the CaPSL codes, possibility of drawing of the band memory, etc.

The second communication is transferred to the overall system control program 93 by the PDL interpreter program 84 and its contents are an end of band memory drawing, end of page drawing, end of document drawing, band memory drawing area and information of the unoccupied band memory.

In this case, the following processing is carried out in the PDL interpreter program 84.

The network server SP1 has a memory called the band memory which has a certain width and the PDL interpreter program 84 should partially develop an image as much as the band width. The PDL interpreter program 84 enters a control command as shown in FIG. 27. The CaPSL code is replaced with an intermediate code shown in FIG. 28 in the PDL interpreter program 84 according to a program referred to as the layouter (not shown). In this embodiment, the intermediate code is a practical expression of an abstractive expression of a figure. If the intermediate codes as many as one page are prepared, a raster image is developed in the band memory while referring to the intermediate codes according to a program (not shown) referred to as a painter.

Figure 29:
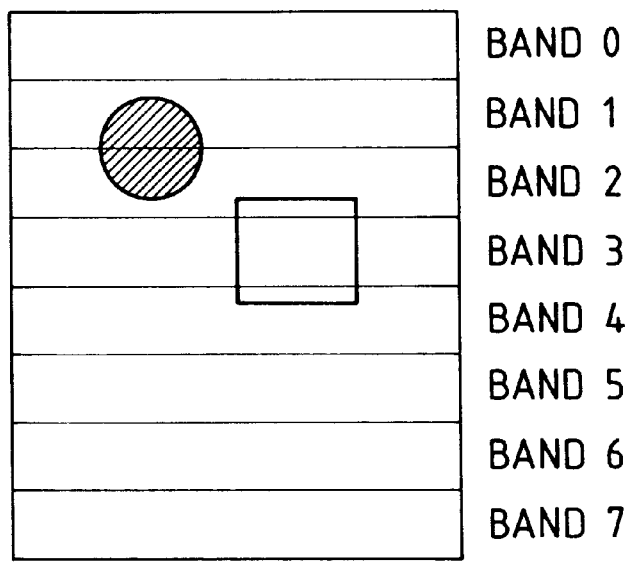
FIG. 29 is an explanatory view illustrating an expanding procedure of a graphic information to a band memory in a server device according to the present invention.

When the layouter receives, for example, a CaPSL code for drawing a figure as shown in FIG. 29, the layouter replaces the CaPSL code with an intermediate code shown in FIG. 28 which depends on the device. Then the layouter computes the numbers of bands in which the figure is drawn in accordance with the size of the figure and registers the result of computation in the intermediate code. In an example shown in FIG. 29, a circle is drawn in 1–2 bands and a rectangle is drawn in 2–4 bands. The numerals after the numbers of bands denote the position of the figure in the device coordinates and the diameter of the figure.

The painter (a program for actually drawing a figure on the memory) develops a figure as shown in FIG. 29 and draws it on the band memory while referring to the intermediate codes. Actually, the memory has a capacity as large as the band width and therefore, when a band is drawn, the data is sent to the printer, the memory is cleared and the next band is drawn. When the intermediate code is referred to draw the zeroth band, it is known that the zeroth band does not contain the data to be drawn and the painter starts the operation of the next band. Then the painter searches the data to be drawn in the first band, detects a circle and draws the circle as much as one band. Shifting to the second band, the painter knows that the circle and the rectangle be drawn and draws the continuing portion of the circle and the rectangle as much as one band. Thus, the painter draws the data as much as one page.

Figure 30:
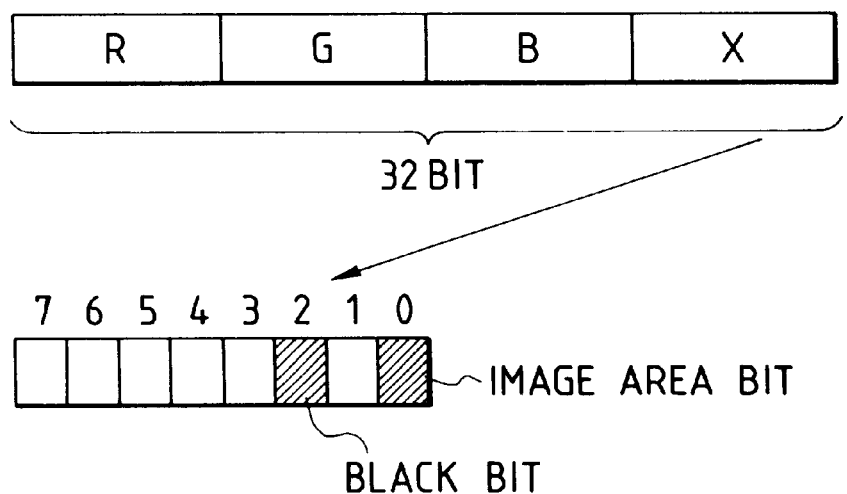
FIG. 30 is an explanatory view illustrating a structure of a single picture element expanded with a page description language in a server device according to the present invention.

A structure of one pixel of data to be developed by the CaPSL codes is composed of 32 RGBX bits as shown in FIG. 30. These bits include RGB 24 bits for color data and 8-bit additional information X for additional information. In this case, Bit 0 in the additional information X is the image area determining bit and, when an image is drawn on the band memory according to the CaPSL codes, this bit is turned on. Bit 2 is a black information bit and, when the color of a figure or character developed by the CaPSL codes is 0 for RGB, this bit 2 is turned on. These information are analyzed for printing out through the first interface circuit 4-1 and contribute to improvement of the image quality.

Next, with reference to a data process chart shown in FIG. 31, operations of scanners 94A and 95A will be described. For simplicity, the same portions as FIG. 25 are denoted by the same reference numerals.

Figure 31:
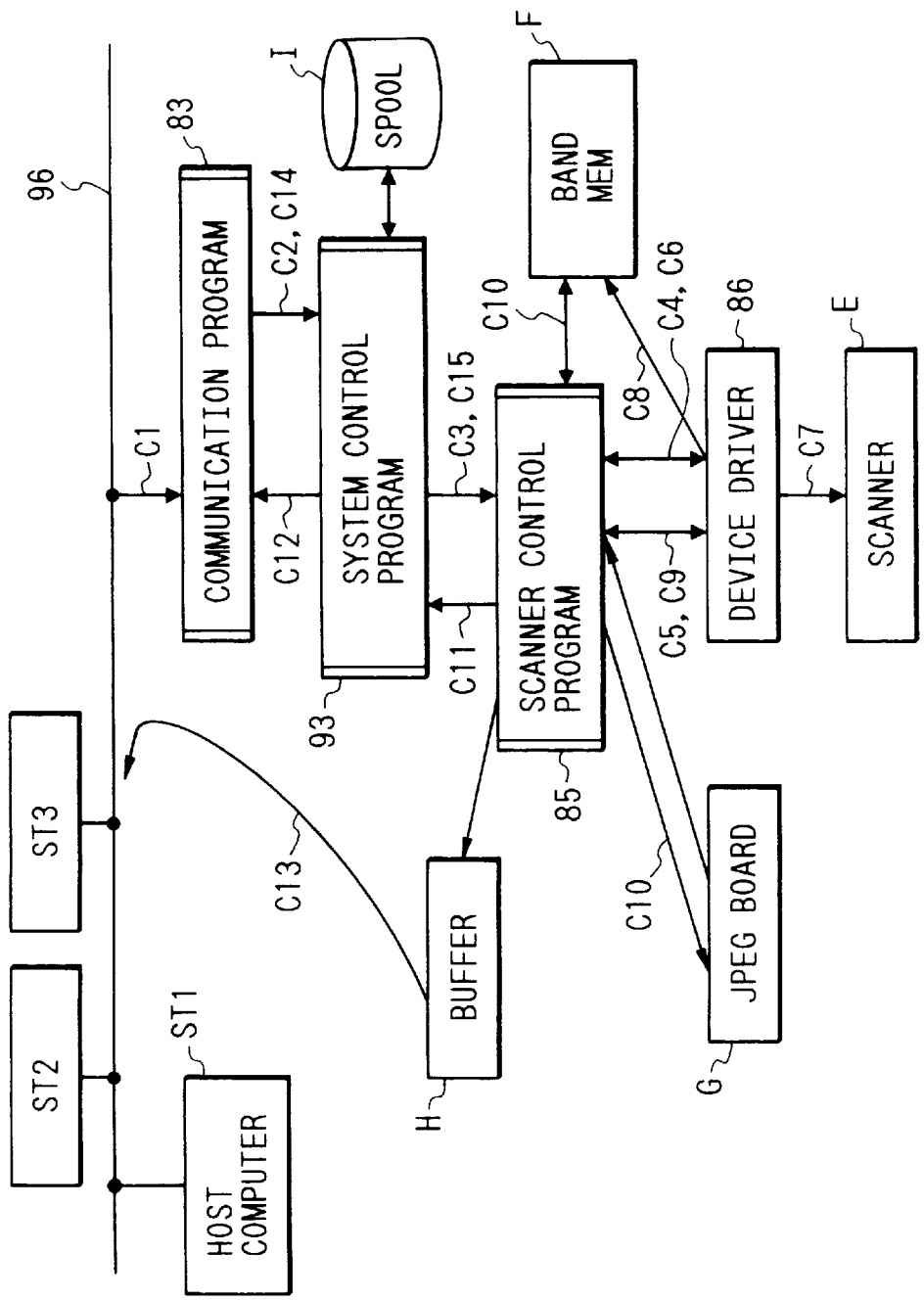
FIG. 31 is a view illustrating a data processing path for explaining an operation of a scanner shown in FIGS. 2A and 2B.

FIG. 31 is a data process chart for explaining the operations of scanners 94A and 95A shown in FIGS. 2A and 2B. Since the operation of a scanner that scans an image as divided bands is slightly different from the operation of a scanner that scans an entire image at a time, their tasks will be separately described.

In the case of the scanner that scans an image as divided bands, when receiving a scan command C1 from a host computer ST1 that is a client machine through a TCP/IP program 83, the communication program 83 sends a scan program C2 to a system overall control program 93.

When the apparatus has a spool I, the system overall control program 93 creates a spool file corresponding to the scan command C2, which has been received, and stores the spool file. The system overall control program 93 sends a file name C3 to a scanner control program 85. When the apparatus does not have the spool I, the system overall control program 93 sends the scanner command C3 directly to the scanner control program 85.

The scanner control program 85 interprets the scanner command C3 and sends a scanner condition setting command C4 to a device driver 86 so as to activate a designated scanner. The scanner condition setting command C4 contains for example resolution. The device driver 86 is a function corresponding to the scanner control program 85.

The device driver 86 that has set scanner conditions sends a return value C5 to the scanner control program 85. When receiving the return value C5, the scanner control program 85 sends a scan start command C6 to the device driver 86 so as to activate the designated scanner. The device driver 86 activates a scanner E so as to read image data and stores the image data in a band memory F. After having written one band of image data in the band memory F, the device driver 86 sends a scan completion return value C9 to the scanner control program 85. When receiving the return value C9, the scanner control program 85 performs image process for image data stored in the band memory F (namely, compresses the image data with for example a JPEG compressing board) and writes the compressed data in a buffer region H.

After having processed all data stored in the band memory F, the scanner control program 85 sends a transfer request C11 to the system overall control program 93. In addition, the scanner control program 85 sends a scan start command C6 to the device driver 86 so as to activate the scanner. The scanner control program 85 causes the scanner to read image data from the last end point of the preceding scanning operation.

When receiving the transfer request C11, the system overall control program 93 sends a transfer request C12 to the communication program 83. When receiving the transfer request C12, the communication program 83 sends the processed image data stored in the buffer region H to the host computer, which is a designated client machine. At this point, since the communication program 83 and the system overall control program 93 are programs different from the scanner control program 85, even if the scanner that is controlled by the device driver 86, which is a function of the scanner control program 85, is operating, the communication program 83 and the system overall control program can transfer image data.

After having transferred the image data, the communication program 83 sends a transfer completion signal C14 to the system overall control program 93. When receiving the transfer completion signal C14, the system overall control program 93 sends a transfer completion C15 to the scanner control program 85. When receiving both the return value C9 (which represents the completion of the scanning operation) from the device driver 86 and the transfer completion C15 from the system overall control program 93, the scanner control program 85 performs an image process for the image data stored in the band memory F and writes the processed data in the buffer region H. By repeating these steps, the image data is sent to the host computer ST1. When another host computer (for example, a host computer ST2 or a host computer ST3) is designated, image data can be sent to the designated host computer.

When having determined that all image data has been transferred, the scanner control program 85 informs the communication program 83 of the completion through the system overall control program 93.

On the other hand, in the case of the scanner that scans entire image at a time, when receiving a scan command C1 from for example a host computer ST1, which is a client machine, the communication program 83 sends a scan command C2 to the system overall control program.

When the apparatus has a spool I, the system overall control program 93 creates a spool file corresponding to the scan command C2 that has been received and stores this spool file. The system overall control program 93 sends a file name C3 to the scanner control program 85. When the apparatus does not have the spool I, the system overall control program 93 sends the scanner command C3 directly to the scanner control program 85.

The scanner control program 85 interprets the scanner command C3 and sends a scanner condition setting C4 (such as resolution) to the device driver 86 so as to activate a designated scanner. The device driver 86, which has set scanner conditions, sends a return value C5 to the scanner control program 85. When receiving the return value C5, the scanner control program 85 sends a scan start command C6 to the device driver 86 so as to activate a scanner E. The scanner E cannot be stopped in the middle of the reading operation thereof.

When receiving a command C10, the device driver 86 activates the scanner E so as to read all image data. In addition, the device driver 86 performs an image process or the image data being read (for example, JPEG compresses the image data with for example a JPEG board) and stores the compressed data in the buffer H.

Image data that has not been compressed may be written to the buffer H. When the buffer H becomes full, the scanner control program 85 sends a transfer request C11 to the system overall control program 93. When receiving the transfer request C11, the system overall control program 93 sends a transfer command C12 to the communication program 83. The communication program 83 transfers data stored in the buffer H to the designated host computer ST1. When another host computer (for example, a host computer ST2 or a host computer ST3) is designated, image data can be sent to another host computer.

After having transferred the data to the host computer, the communication program 83 sends a transfer completion signal C14 to the system overall control program 93. When receiving the transfer completion signal C14, the system overall control program 93 sends a transfer completion C15 to the scanner control program 85. When receiving the transfer completion C15, the scanner control program 85 performs an image process for the image data stored in the band memory and writes the processed data to the buffer H. By repeating these steps, image data can be sent to a designated host computer, which is a client machine.

When having determined that all the image data have been transferred, the scanner control program 85 informs the communication program 83 of the completion through the system overall control program 93.

Next, with reference to FIGS. 32 and 33, data flow from a host computer of the server apparatus according to the present invention to an S/P server apparatus will be described.

In the data flow from the host computer to a designated S/P server apparatus (network server) SP1, for example a host computer ST1 creates a document corresponding to a DTP application program 56 that is running. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent to a communication program 1pd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used. When data is printed out, the communication program 53 has two functions, one of which is to link with the communication program 83 through a lower layer (TCP/IP), the other of which is to transmit CaPSL data file generated by the converting program to the S/P server apparatus SP1.

The communication program 83 links with the communication program 53 and the system overall control program 93 so as to exchange information necessary for a print process and optimally print out data. In other words, the communication program 83 receives data from the communication program 53 and informs the system overall control program 93 of the data reception. At this point, the received CaPSL data and the associated information are temporarily stored in a reception buffer. When an error took place in the S/P server apparatus SP1, the communication program 83 sends information about the error to the communication program 53.

Next, a print-out process performed by the communication program 83 will be described.

The document data created by the DTP application program 56 has been sent to the S/P server apparatus SP1. The communication program 83 sends a job arrival event to the system overall control program 93. The job is for example a print-out process of a color laser copier (CLC). The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process. Now assume that an event representing "a job has arrived" has been received from the communication program 83. At this point, the system overall control program 93 analyzes the event and temporarily spools document data stored in the reception buffer when the apparatus has a hard disk 51. When a plurality of jobs are queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process.

Next, with reference to a block diagram shown in FIG. 33, this embodiment will be described in more detail.

Figure 33:
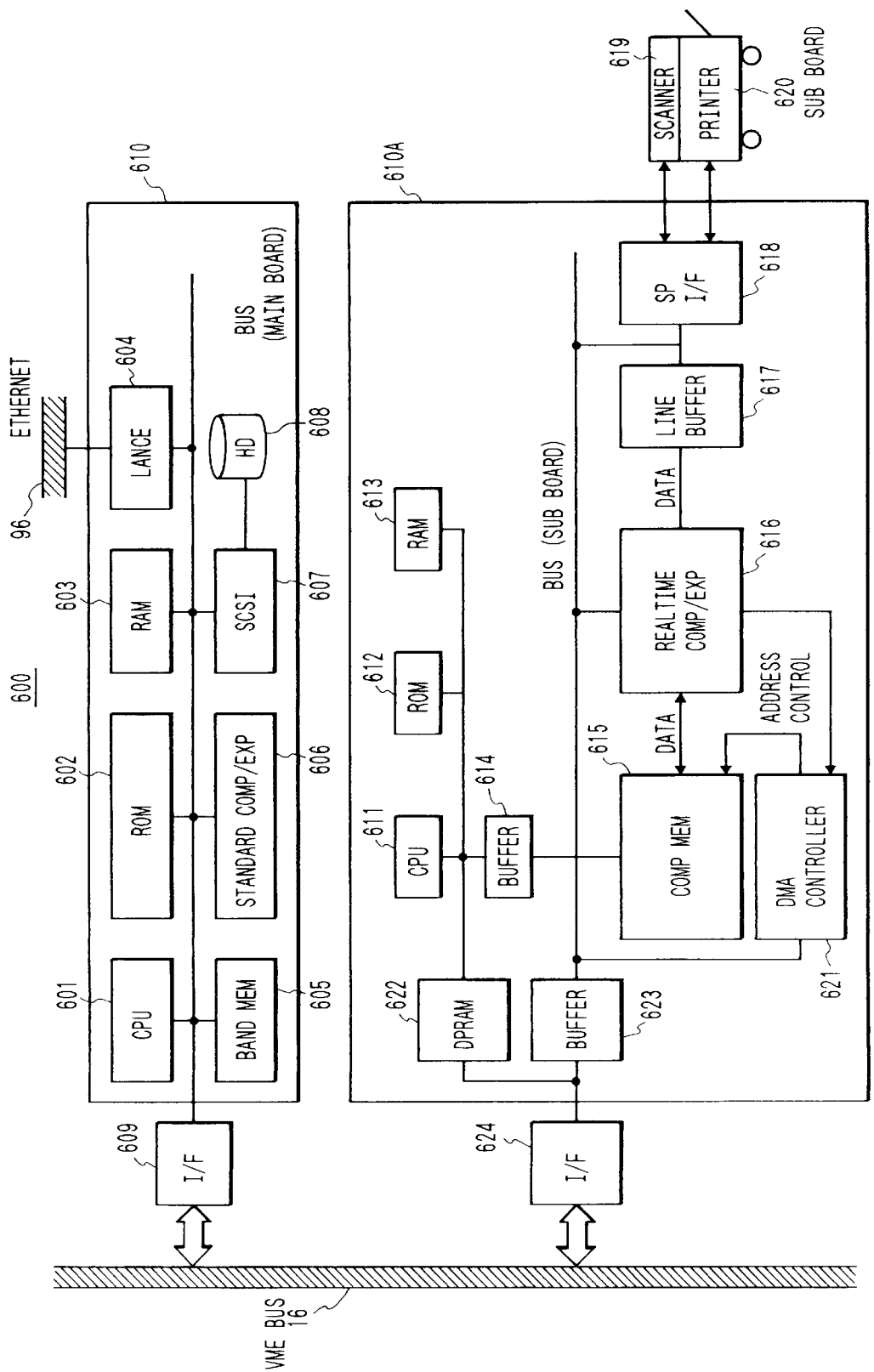
FIG. 33 is a block diagram illustrating a data processing state between a server device according to the present invention and a color laser copier.

FIG. 33 is a block diagram for explaining data processes of the S/P server apparatus SP1 according to the present invention and for example a color laser copier (CLC).

Figure 32:
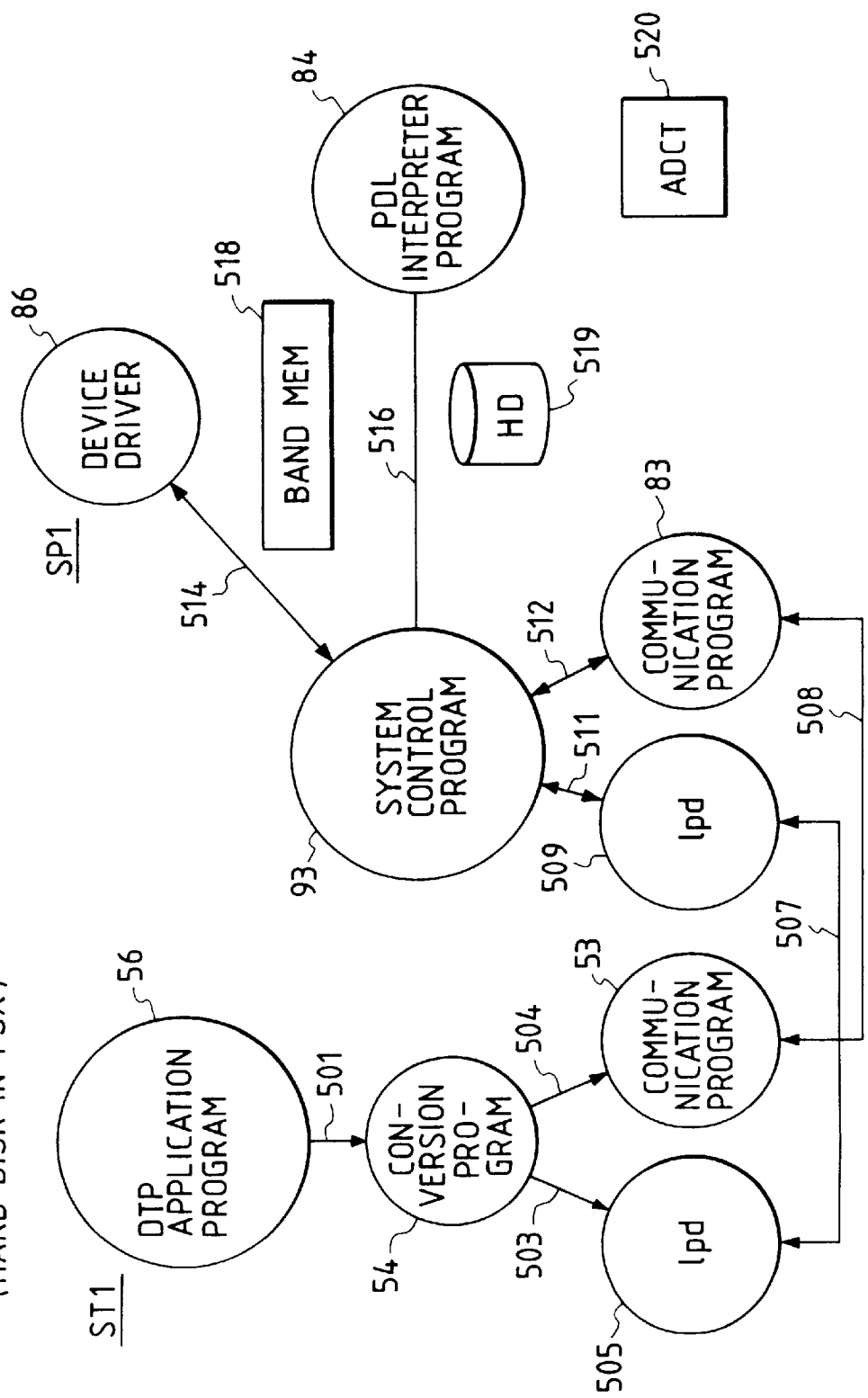
FIG. 32 is a block diagram illustrating a data processing state between a server device according to the present invention and a color laser copier.

A PDL interpreter program 84 shown in FIG. 32 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

Next, data flow from the band memory 605 to the compressing memory 615 will be described. First, the operation of the device driver 86 will be described.

When receiving the "one band paper output" event, the device driver 86 transfers data stored in the band memory 605 to a line buffer 617 of a sub board 610A. The data stored in the line buffer 617 is transferred to a real time compressing and decompressing portion 616, block by block. The real time compressing and decompressing portion 616 compresses image data, block by block, and stores the compressed image data in the compressing memory 615. Addresses and write signal for the compressing memory 615 are generated under the control of a DMA controller 621.

After having compressed one band of data, the device driver 86 sends a "one band paper output completion" event to the system overall control program 93. When receiving the event, the system overall control program 93 outputs a "one band write request" event to the PDL interpreter program 84. Whenever each band of data has been written, the compressing process is repeatedly performed until one page of compressed image is stored in the compressing memory 615. When the last band of data has been stored in the compressing memory 615, the PDL interpreter program 84 issues a "one page write completion" event to the system overall control program 93. When receiving the event, the system overall control program 93 issues a "one page paper output command" to the device driver 86.

When receiving the "one page paper output command", the device driver 86 performs the following process so as to print out one page of compressed image stored in the compressing memory 615.

The CPU 611 activates a DPRAM 622 and initializes the real time compressing and decompressing portion 616 and a DMA controller 621. In addition, the CPU 611 sends commands to a designated printer 620 and issues a decompression start command to the real time compressing and decompressing portion 616. The real time compressing and decompressing portion 616 accesses the DMA controller 621. The DMA controller 621 generates addresses and a read signal. The compressing memory 615 outputs the compressed data to the real time compressing and decompressing portion 616. After having decompressed the compressed data, the real time compressing and decompressing portion 616 outputs the decompressed data to the line buffer 617, block by block. The line buffer 617 converts block sequence data to raster sequence data and outputs the converted data to the printer 620 through an SP I/F 618. After one page of data has been printed out, the device driver 86 sends a "one page paper output completion" event to the system overall control program 93. The system overall control program 93 issues a "second page write command" to the PDL interpreter program 84. Thus, a plurality of pages of document are output.

After the last band of the last page of data has been written, the PDL interpreter program 84 issues a "document completion" event to the system overall control program 93. The system overall control program 93 issues a "one page paper output command" to the device driver 86. The device driver 86 performs a print process and issues a "one page paper output completion" event to the system overall control program 93. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 620), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

Next, with reference to FIGS. 32 and 34, a print data output process where the host computer outputs print data to for example a thermal jet color copier will be described.

Figure 34:
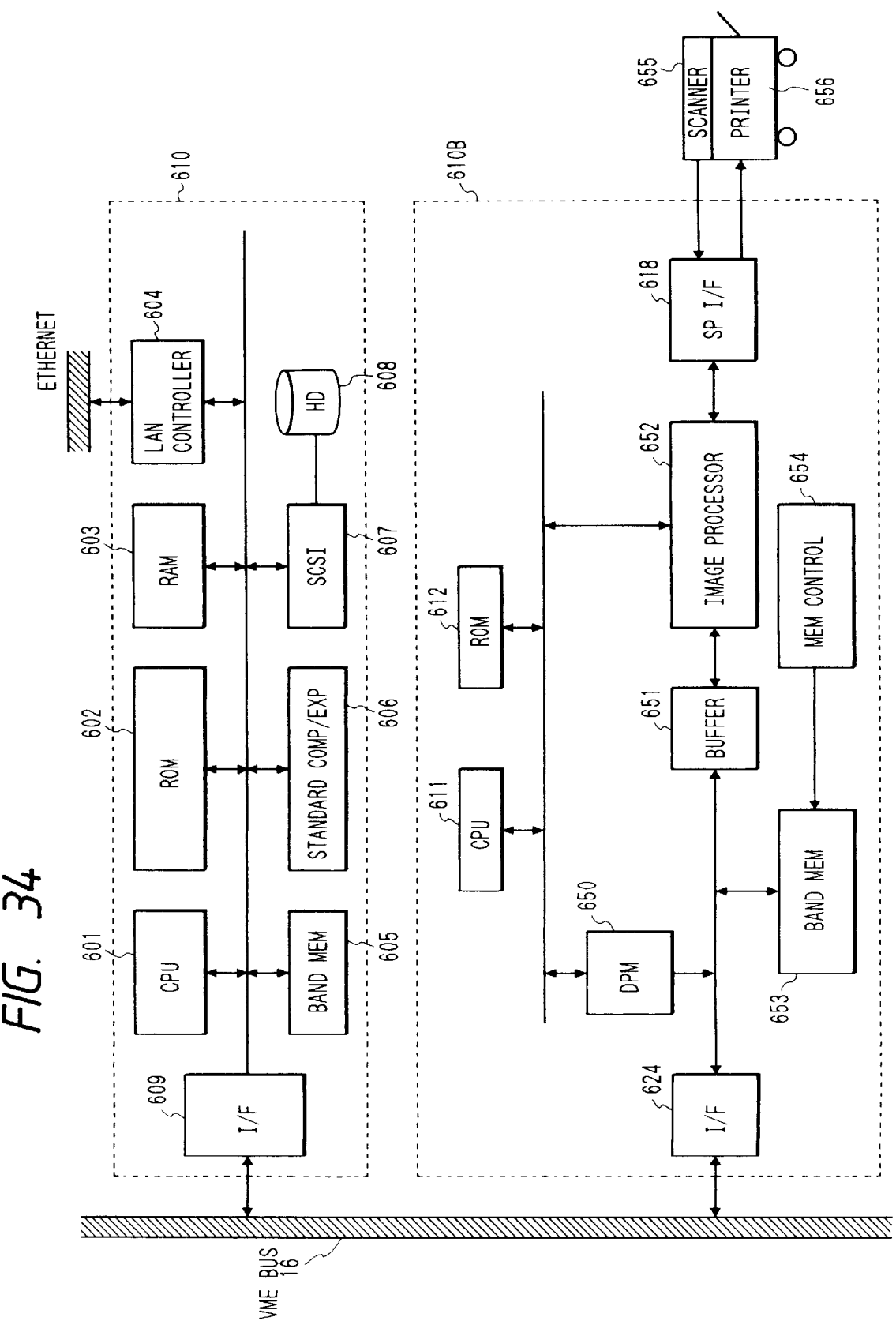
FIG. 34 is a block diagram illustrating a data processing state between a server device according to the present invention and a thermal jet color copier.

FIG. 34 is a block diagram for explaining data processes performed by the S/V server apparatus SP1 according to the present invention and for example a thermal jet color copier (BJC).

As data flow from the host computer to the S/P server apparatus SP1 shown in FIG. 32, the host computer executes a DTP application program 56 so as to create a document. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent to a communication program 1pd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used.

When data is printed out, the communication program 53 has two functions, one of which is to link with the communication program 83 through a lower layer (TCP/IP), the other of which is to transmit CaPSL data file generated by the converting program 54 to the communication program 83.

The communication program 83 links with the communication program 53 and the system overall control program so as to exchange information necessary for a print process and optimally print out data. In other words, the communication program 83 receives data from the communication program 53 and informs the system overall control program of the data reception. At this point, the received CaPSL data and the associated information are temporarily stored in a reception buffer.

When an error took place in the S/P server apparatus SP1, the communication program 83 sends information about the error to the communication program 53. When a print-out process is performed corresponding to the communication program 53 of the host computer, the document data created by the DTP application program 56 has been sent to the designated S/P server apparatus SP1. The communication program 83 sends a job arrival event to the system overall control program 93. The job is for example a print-out process of a BJ color laser copier. The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process.

Now assume that an event representing "a job has arrived" has been received from the communication program 83. At this point, the system overall control program 93 analyzes the event and temporarily spools document data stored in the reception buffer when the apparatus has a hard disk 51. When a plurality of jobs are queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process. A PDL interpreter program 84 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

When data stored in the band memory 518 is printed out, the device driver 86 that has received a "one band paper output" request event controls the interface board 610B so that the designated thermal jet color printer (BJ printer) 656 prints out the data. One band of image data stored in the band memory 605 of the main CPU board 610 is transferred to the band memory 653. The data stored in the band memory 653 is read corresponding to a scanning type of a head of the BJ printer 656 and sent to an image processing portion 652 through a buffer 651. The image processing portion 652 performs a process corresponding to predetermined parameters. Normally, the image processing portion 652 converts NTSC-RGB data stored in the band memory into RGB data for the BJ printer 656. The converted data is sent to a printer engine portion of the BJ printer 656 through an interface 618. The BJ printer 656 is controlled by a CPU 611 that interprets commands received from the CPU 601. Reference numeral 650 is a dual port RAM.

After the last band of data has been written, the PDL interpreter program 84 issues a "document completion" event to the system overall control program 93 so as to complete the print process. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 656), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

When a color image is transmitted between different type apparatuses, input and output devices of these apparatuses cannot be simply connected. Since characteristics of these apparatuses differ each other, colors cannot be properly reproduced. To prevent this problem, a technique where each device employs an intrinsic color space and a communication path uses a standard color space is being studied. A color space converting process based on such a requirement will be described.

Now assume that the color space of an input device on a transmitting side is referred to as A, the color space on a communication path is referred to as B, and the color space of a receiving printer is referred to as C.

Next, YCrCb color space, which is relatively well known as a color space for a communication path, will be described. The YCrCb color space has been widely used for a color image encoding process.

Normally, the color space A on the transmitting side differs from the YCrCb color space in color regions. Both the color spaces are coupled as given by formula (1).

$$\begin{bmatrix} Ra \\ Ga \\ Ba \end{bmatrix} = \begin{bmatrix} a11 & a12 & a13 \\ a21 & a22 & a23 \\ a31 & a32 & a33 \end{bmatrix} \begin{bmatrix} y \\ cr \\ cb \end{bmatrix} \quad (1)$$

where Ra, Ga, and Ba are coordinates (Ra, Ga, Ba) at any point in the color space A. The coordinates of the corresponding point in the YCrCb color space are (y, cr, cb). To approximate this formula for any color space, coefficients (a11 to a33) are obtained by for example least square method. Thus, the input color space of the device is converted into the color space on the communication path corresponding to the formula (1).

On the other hand, when a standard color space on a communication path is converted into a color space on a recording side, one of several methods may be used. In this embodiment, the following method is used.

When the standard color space on the communication path is YCrCb, YCrCb data is converted into RGB data. Since the YCrCb space is linearly converted into NTSC color space, the NTSC color space will be described in this embodiment.

Although the NTSC standard color space is based on additive mixture of color stimuli, printing color space is based on subtractive mixture of color stimuli. Thus, the additive mixture of color stimuli should be converted into the subtractive mixture of color stimuli. This conversion cannot be easily performed due to very complicated construction. In this embodiment, a color space of an additive mixture of color stimuli that is close to a color space on the recording side is treated as an inner standard color space on the recording side. In this embodiment, a HDTV (High Definition TV) color space that is narrower than the NTSC color space is treated as a standard color space D on the recording side.

The relation between the inner standard color space D on the recording side and the device color space C is given by formula (2).

$$\begin{bmatrix} Y \\ M \\ C \\ K \end{bmatrix} = \begin{bmatrix} A11 & A12 & A13 \\ A21 & A22 & A23 \\ A31 & A32 & A33 \\ A41 & A42 & A43 \end{bmatrix} \begin{bmatrix} Rh \\ Gh \\ Bh \end{bmatrix} \quad (2)$$

where Y, M, C, and K are printing prime colors that are yellow, magenta, cyan, and black components; Rh, Gh, and Bh are standard color space components on the recording side; A11 to A43 are coefficients at a plurality of points representing the relation between printing color space and recording inner standard color space. These coefficients A11 to A43 are calculated by least square method.

The standard color space on the communication path is converted into the inner standard color space on the recording side in the following method.

For the NTSC standard color space on the communication line, representative information on three-dimensional outermost peripheral plane of colors corresponding to basic stimuli represented by NTSC system is obtained. Likewise, representative position information on the outermost peripheral plane of the HDTV inner standard color space on the recording side can be obtained.

When components (Rh, Gh, Bh) on the HDTV color space are obtained from components (Rn, Gn, Bn) on the NTSC color space, Rn, Gn, and Bn are converted into Ln, an, bn with CIEL*a*b*. Likewise, (Rh, Gh, Bh) are converted into (Lh, ah, bh) with CIEL*a*b*. When Ln is constant, the outermost peripheral approximation positions on the HDTV and NTSC color spaces that almost satisfy θ=a tan (an/bn) are obtained from the above-mentioned table. When the NTSC outermost peripheral plane position is (Lon, aon, bon) and the HDTV outermost peripheral plane position is (Lon, aoh, boh), ah and bh are given by formula (3).

$$ah=(aoh/aon)*an$$
$$bh=(boh/bon)*bn \quad (3)$$

where ah and bh are color space compressed positions on the HDTV color space.

Thus, any point (Rn, Gn, Bn) on the NTSC color space is converted into (Rh, Gh, Bn) on the recording standard color space. Consequently, the amounts of components Y, M, C, and K to be printed are obtained by the formula (2).

In this embodiment, a standard color space is provided on a recording side. This is because the number of standard color spaces on the communication line is not limited to one. Thus, a plurality of standard color spaces may be used. However, according to this embodiment, even if a color space on a communication path is not an NTSC color space, when the color space can be defined, it may be converted into the standard color space.

Explanation will be made below as for the abnormal countermeasure process of a peripheral device with reference to FIG. 35.

Figure 35:
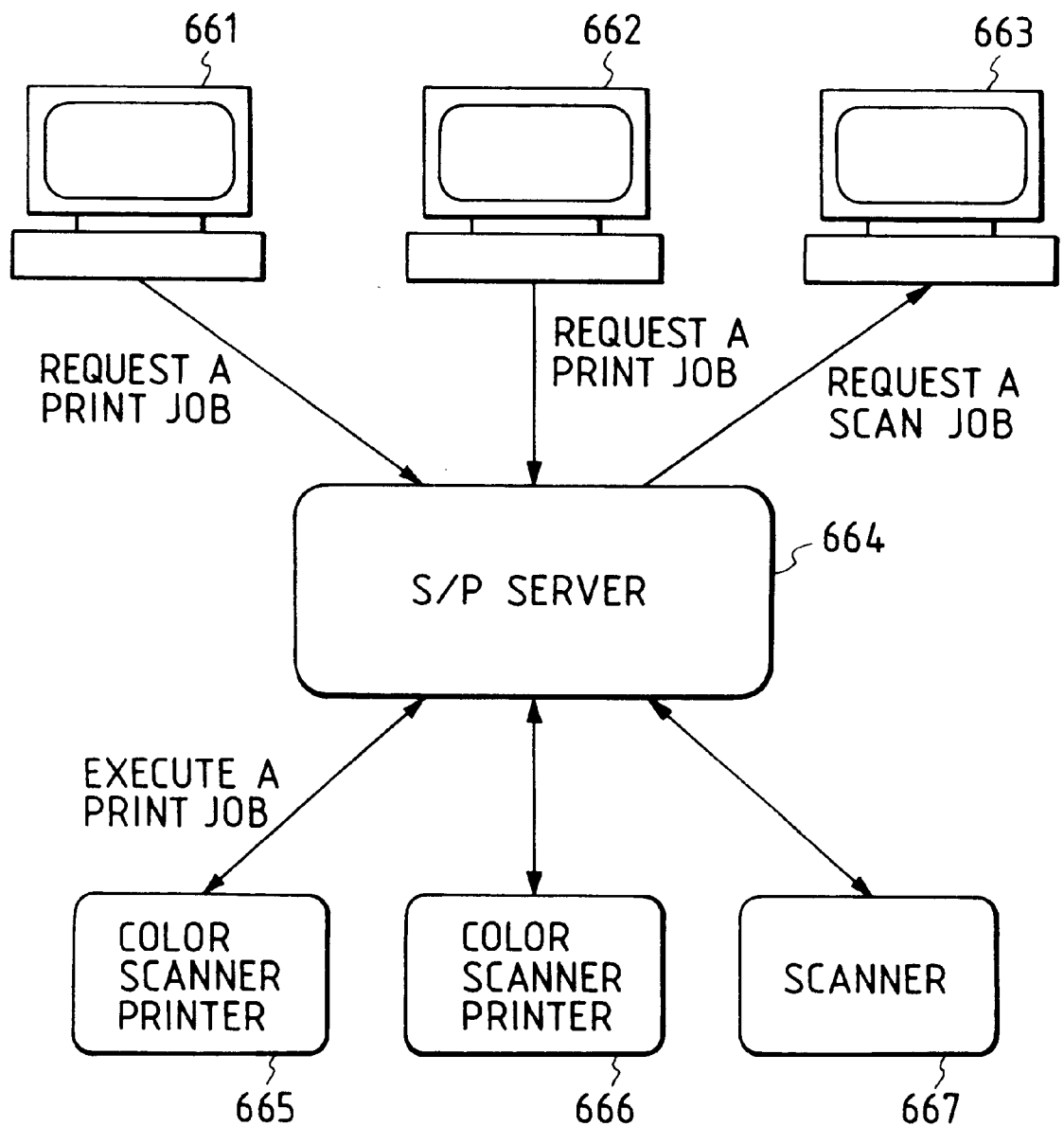
FIG. 35 is a block diagram illustrating a structure of a network system in which a server device according to the present invention is incorporated.

FIG. 35 is a block diagram used for explaining the configuration between the network system and the server device according to the present invention.

When an abnormal state occurs in a peripheral device during a job operation, the S/P server device SP1664 preferentially executes the job (to be described later) operable in the state, without waiting till the peripheral device is recovered from the trouble. The job can be resumed after a recovery of the troubled peripheral device by registering the job (hereinafter referred to an error job) in the S/P server device SP1664, the job dealing with the peripheral device in abnormal state as a process waiting job involved in an error state during an operation, after necessary information has been stored to resume the job. The registration to resume the error job depends on the degree of the abnormal state or the setting by the SP server.

An example will be explained as for the case where three computers 661 to 663, two color scanner printers 665 and 666, and a scanner 667 are connected together.

Figure 36:
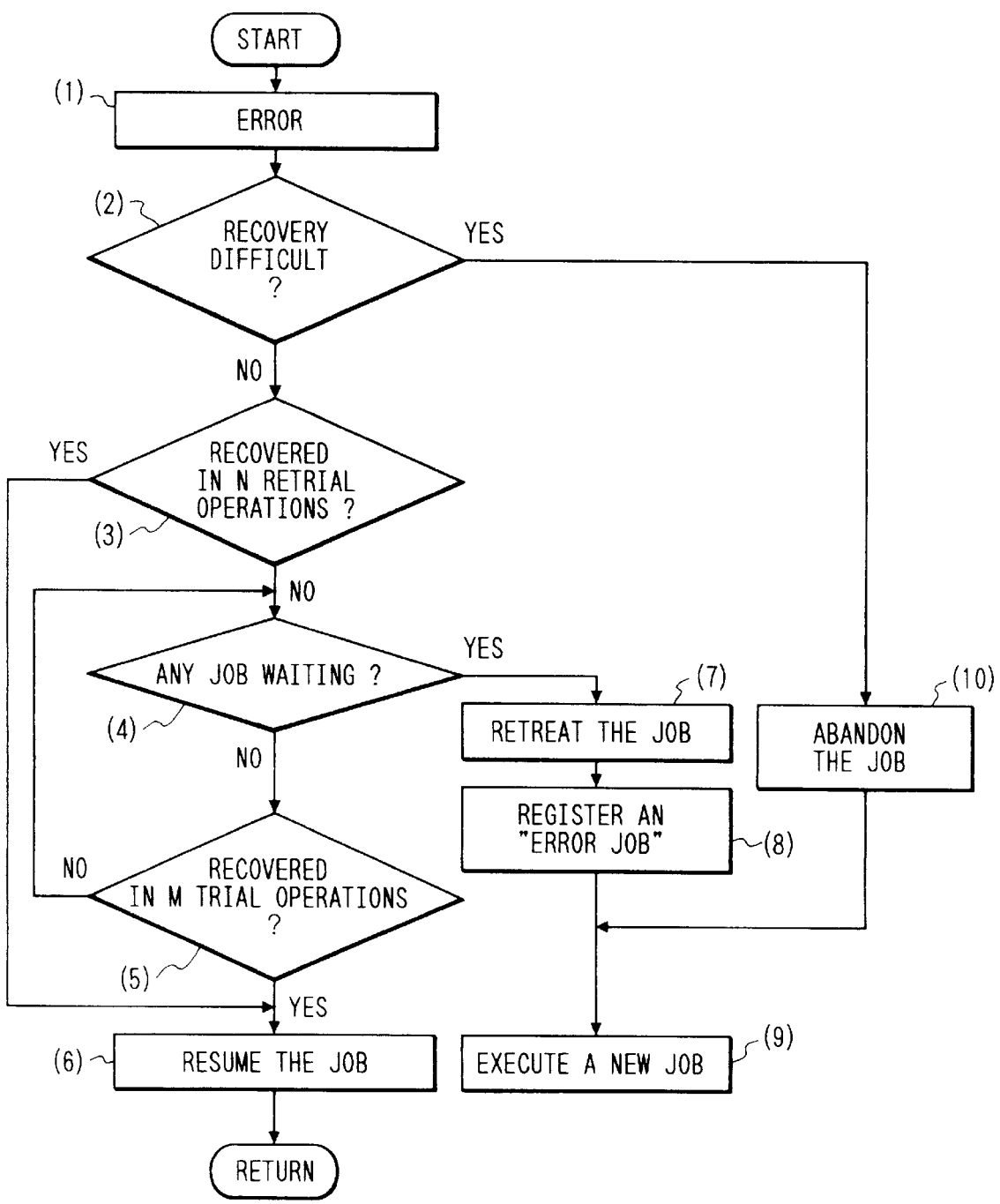
FIG. 36 is a flowchart illustrating an example of a procedure with which an abnormally generated job is processed in a server device according to the present invention.

The color scanner printers 665 and 666 can deal with printing and scanning job, respectively. Hereinafter, an abnormal occurrence job countermeasure operation will be explained with reference to the flow chart shown in FIG. 36. FIG. 36 is a flow chart showing an example of abnormal occurrence job countermeasure procedure in the server device according to the present invention. Numerals (1) to (10) represents steps.

For example, it is assumed that the host computer 661 requests the S/P server device 664 to execute a print job to the color scanner printer 665; the host computer 662 requests the entire system control program 93 to perform a print job and then is in a waiting state; and the host computer 663 requests the entire system control program 93 to perform a scan job and then is in a waiting state. If an abnormal state occurs in a printer portion of the color scanner printer 665 during printing (1), the S/P server device 664 examines whether it is difficult to recover the abnormal state (2). If the S/P server device SP1 judges that it is difficult to recover the abnormal state occurred in the color scanner printer 665, it immediately discards the error job (10) to select and execute the next operable job (9).

According to the present embodiment, an operable job represents a job except a print job done to the color scanner printer 665 in which an abnormal state occurs currently, that is, a scan job to the color scanner printer 665, a print job to the color scanner printer 666, a scan job to the color scanner printer 666, or a scan job to the color scanner printer 667. If there are plural operable jobs, the job is performed according to the following system.

If the S/P server device does not judge that the abnormal state occurring in the color scanner printer 665 is a fatal abnormal state, it executes a retrial process (refer to FIG. 37) to the color scanner printer 665.

The retrial is repeated up to N times (for example, 5 times) predetermined. When the color scanner printer 665 recovers from the abnormal state (or the retrial success) by the retrials of N times, the job is resumed (6). When the N times retrial cannot recover the abnormal state of the color scanner printer 665 (or fails), the S/P server device 664 examines whether there are other operable jobs (4). If there are no operable jobs, the S/P server device 664 executes M times (for example, once) the retrial process predetermined independently from the retrial number (5). If the retrial succeeds, the error job is resumed. If the retrial fails, it is judged again whether there are operable jobs (4). When there is operable jobs, the S/P server device 664 executes the job save of the error job (7); registers the error job as a job that an error has occurred on the way to processing (8); and executes the next operable job (9).

In the present embodiment, a job save is a process where information necessary for resuming job such as the status information of the S/P server 664 at an error job execution are stored, for example, in memory means (for example, hard disc), a memory in the S/P server device, or a program within the S/P server device.

Figure 37:
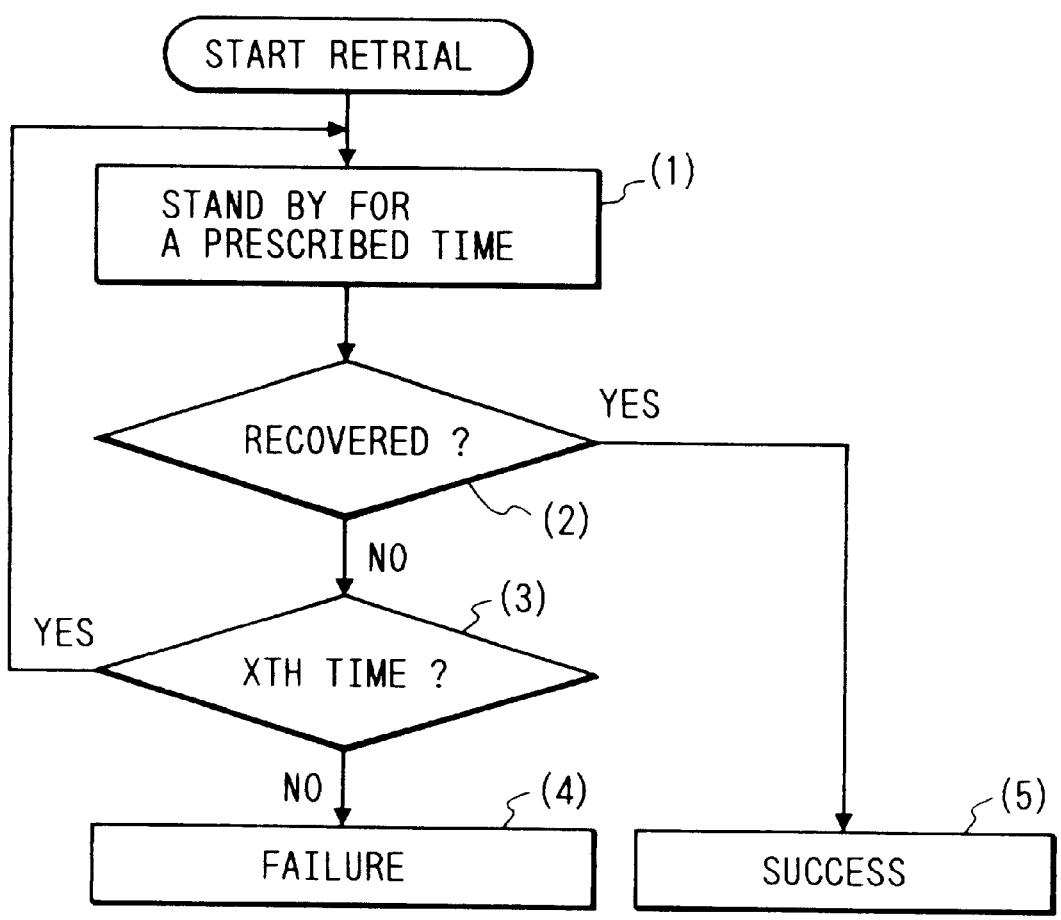
FIG. 37 is a flowchart illustrating an example of a procedure with which a retrial job is processed.

FIG. 37 is a flow chart showing an example of a retrial process procedure in the server device according to the present invention. Numerals (1) to (5) represents steps.

In the retrial process, it is examined whether the peripheral device in an abnormal state has been recovered the abnormal state (2) after waiting for a predetermined time (for example, 30 seconds) (1) and the process is repeated a predetermined times X (for example 5 times) (3). If the peripheral device is recovered from the abnormal state by the time the retrial is repeated the predetermined times, the retrial is judged to be succeeded. If the peripheral device is not recovered, it is judged that the retrial has been failed.

The multiprint control operation of the server device according to the present invention will be explained below.

The scanner/printer network server (SP network server) can be connectable to many devices including a color laser beam copying machine (CLC) constituted of a scanner and a printer, a thermal jet color copying machine (BJC) constituted of a scanner and a printer, a bit map printer connected to a standard interface, a PDL printer (CaPSL, PS), and commercially available scanners. The host machine on a network can control the following various jobs to use freely these devices.

For example, it is assumed that a request which outputs a 10 page document from the host computer A to the color laser beam copying machine is sent to the SP network server; the host computer B produces a request which inputs a color manuscript through the scanner of a thermal jet color copying machine (BJC); and the host computer C produces a request which outputs to the PDL printer. In such a manner, the SP network server receives various requests from the host computer on the network to execute the following job control to deal with the requests (jobs). In the present embodiment, each of the print request and the scan request is called a job. For example, it is assumed that a request that outputs a three-page document described with the CaPSL code on the printer of the color laser beam copying machine (CLC) is a single job. Under the SP network server, only two jobs can be run at a time. However, running three or more jobs can be similarly controlled by expanding the control.

Explanation will be made below as for the job control operation in the server device according to the present invention with reference to FIGS. 38A to 38E.

FIGS. 38A to 38E is a timing chart used for explaining the job control state of the server device according to the present invention. The job process can be roughly classified into any one of the job controls 1 to 5 shown in FIGS. 38A to 38E by considering whether the SP network server prepares a hard disc for spool. For convenience in explanation, it is assumed that the jobs 1 and 2 a three-page print request or a three-scan request.

Job Control 1

Figure 38A:
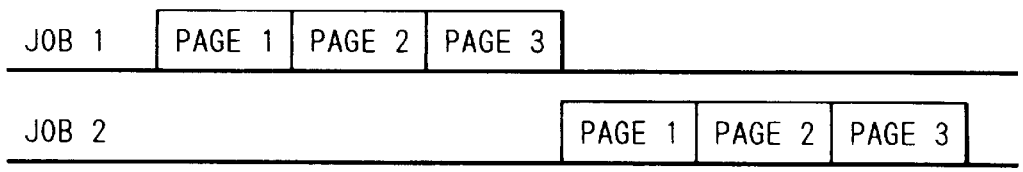
FIGS. 38A, 38B, 38C, 38D, and 38E are timing charts illustrating a job control state in a server device according to the present invention.

The job control 1, as shown in FIG. 38A, executes the job previously requested and then spools the next job 2 in a hard disc, and activates the job 2 at the job completion time.

Job Control 2

Figure 38B:
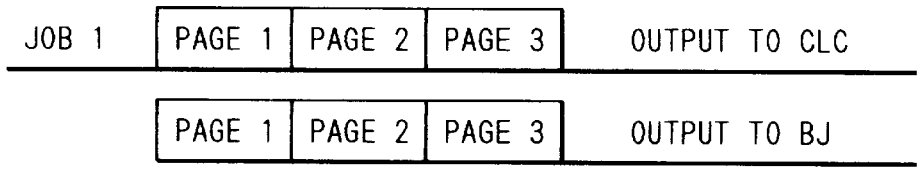

The job control 2, as shown in FIG. 38B, being a special case, corresponds to a control where two or more devices are operated with one job. For example, the situation corresponds to the image expanded in a memory output to the color laser beam copying machine (CLC) and a thermal jet color copying machine (BJC).

Job Control 3

Figure 38C:
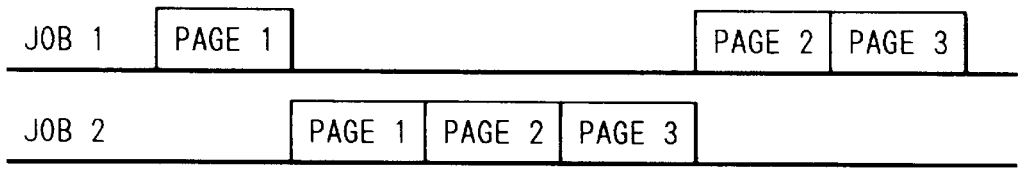

The job control 3, as shown in FIG. 38C, takes in a concept which considers page in a job. In this case, the printing is represented in a page unit of document and the scanner is represented in a scan unit of a page of manuscript. For example, when the job 2 is requested during executing the job 1, the job 1 is interrupted at a break of a page, whereby the job 2 is performed. In this case, the job 1 never run together with the job 2 at the same time.

Job Control 4

Figure 38D:
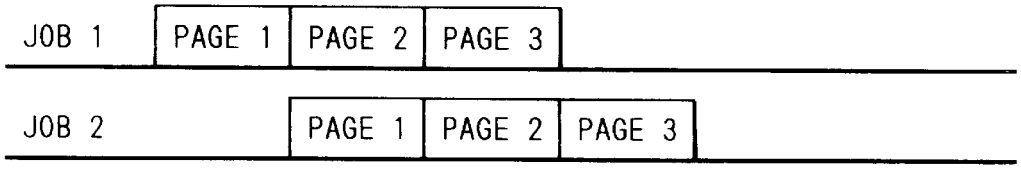

The job control 4, as shown in FIG. 38D, when being requested during executing the job 1, the job 2 is immediately executed with the job 1 operating.

Job Control 5

Figure 38E:
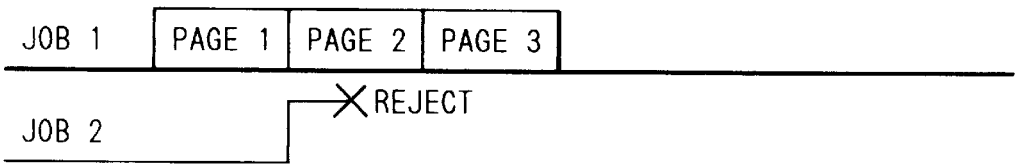

The job control 5, as shown in FIG. 38E, when being requested during executing the job 1, the job 2 is rejected.

In the case of the configuration of the server device shown in FIG. 1, the job is classified in the following items (1) to (7).

(1) Document is output to the printer of the color laser beam copying machine (CLC).

(2) A manuscript is read with a scanner of the color laser beam copying machine (CLC).

(3) Document is output to the printer of the thermal jet color copying machine (BJC).

(4) A manuscript is read with a scanner of the thermal jet color copying machine (BJC).

(5) Document is output to a printer including an interpreter of a commercially available page description language.

(6) Document is output to a commercially available bit map printer.

(7) A manuscript is read with a commercially available scanner.

The priority process of each job will be explained below.

According to the present embodiment, for example, when a scan job must be immediately performed during a printing job, three stages of the priorities 0 to 2 can be specified by interrupting the print job to execute the scanner job. The three stages includes the priority 0 representing no designation (fast-in fast-out), the priority 1 representing a priority interrupt designation in job unit, and the priority 2 representing a priority interrupt designation in page unit. Explanation will be made below as for the control operation of the SP manager in the server device according to the present invention with reference to FIG. 39.

Figure 39:
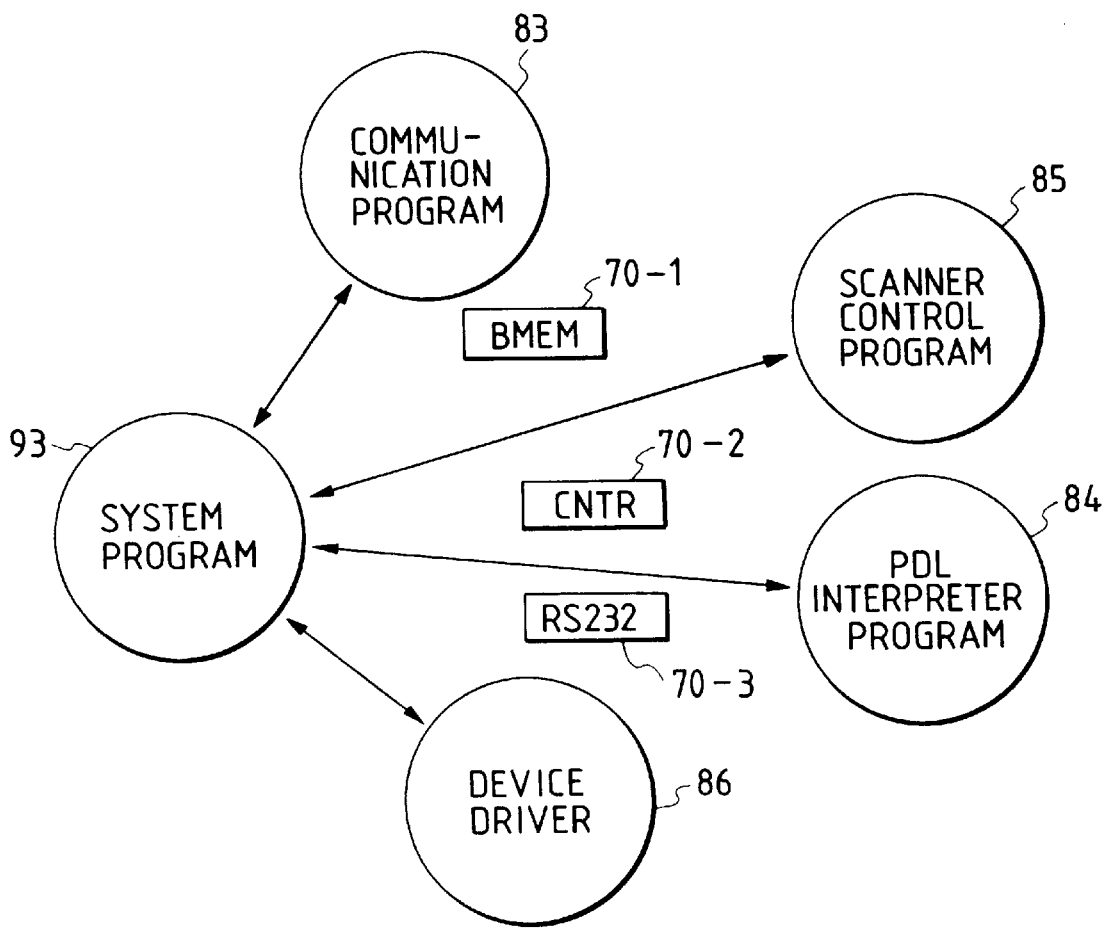
FIG. 39 is a view illustrating a processed state of a total system control program in a server device according to the present invention.

FIG. 39 is a diagram showing the control process status of the entire system control program 93 in the server device according to the present invention. In the present embodiment, the entire system control system 93 suitably controls the printer job with reference to the job priority and the job classification mainly sent from the host computer. The job management where a host computer on the network produces various requests to the SP network server will be explained below with the attached drawings.

First, the conceptual configuration of each program will be explained. As shown in FIG. 39, the program can be roughly classified into five programs including: the communication program 83 regarding communications; the entire system control program 93 controlling the entire SP network server; the scanner control program 85 controlling the scanner; the PDL interpreter program 84 regarding the print process (CaPSL interpreter); and device driver 86 actually controlling input/output devices. Moreover, there are as an actual data flowing interface the band memory (BMEM) 70-1, Centronics interface (CENTR) 70-2, and the RS232C interface (RS232) 70-3. The entire system control program 93 manages the above elements.

The entire system control program 93 basically runs based on events from four other programs. The event driven-type process is executed according to the flow chart shown in FIG. 40.

Figure 40:
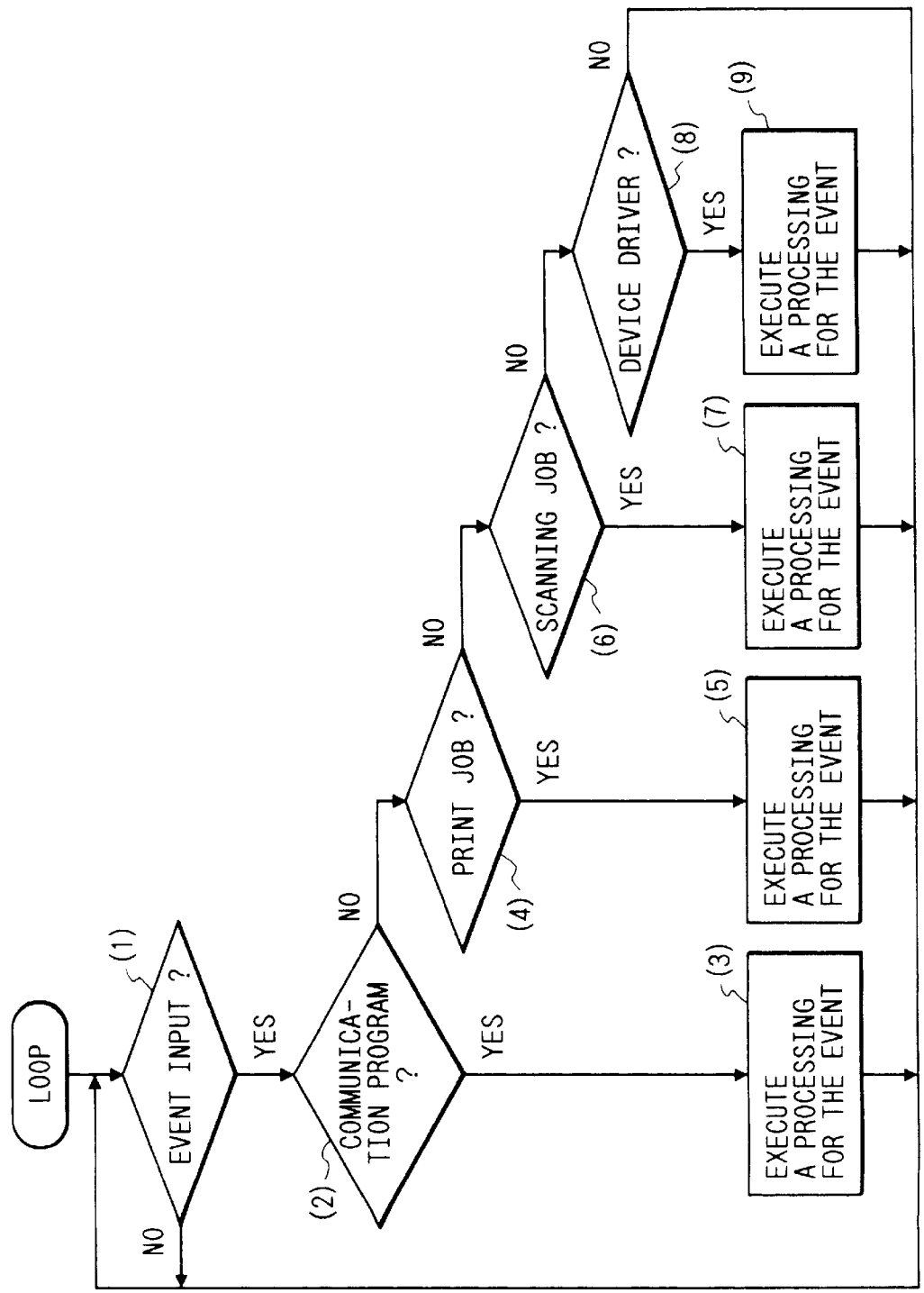
FIG. 40 is a flowchart illustrating an example of an event processing procedure performed by a total system control program shown in FIG. 39.

FIG. 40 is a flow chart showing an example of an event process procedure of the entire system control program 93 shown in FIG. 39. Numerals (1) to (9) represents steps.

First when the SP network server is powered on, the entire system control program is activated to make immediately an infinite loop in a waiting state. When the program starts to run, the situation becomes an event waiting state (1). When an event is input, the situation escapes from the loop. It is judged whether the event has come from the communication program 83 (2). If Yes, a process is performed corresponding to the event (3). Then the flow goes back to the step (1) to settle in an event waiting loop.

On the other hand, the judgment of the step (2) is No, it is judged whether the event issuance destination is the print job of the PDL interpreter program 84 (4). If Yes, a process is performed corresponding to the event (5).

On the other hand, the judgment of the step (4) is No, it is judged whether the event issuance destination is the scanner job of the scanner control program 85 (6). If Yes, a process is performed corresponding to the event (7).

On the other hand, if the judgment of the step (6) is No, it is judged whether the event issuance destination is the device driver 86 (8). If No, the process returns to the step (1). If Yes, a process is performed corresponding to the event (9) to return to the step (1).

The communication program 83 irregularly transmits various jobs including a job regarding the print of the color laser copying machine (CLC), a job regarding the scanner of the thermal jet color copying machine, and the like to the entire system control program 93. These plural jobs must be suitably distributed so far as the resources permit. The algorithm will be explained below with reference to FIG. 41.

Figures 41, 42:
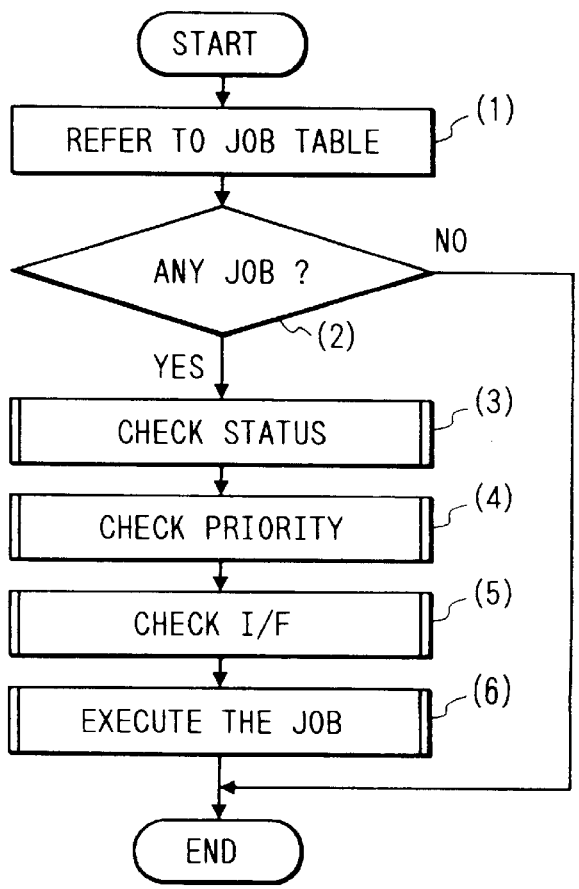
FIG. 41 is a view illustrating a job administration state in a server device according to the present invention.
FIG. 42 is a flowchart illustrating an example of a job execution procedure in a server device according to the present invention.

FIG. 41 is a diagram showing the job management status of the server device according to the present invention.

As shown in FIG. 41, a job table is used for the job management. The job table includes an ID to identify a job, a status showing a job state, a priority order to execute a job, a job kind, an end page, and an interrupt job ID.

ID represents a serial number or a job request accepting order. The status includes RUN indicating an execution, WAIT indicating a process waiting state, STOP indicating a stop state due to interruption, and ESTOP indicating a recovery waiting state after an error occurrence. The priority order includes LEVELs 0 to 2 including 0 usually indicating "no designation", 1 indicating "preferential interrupt in job unit" preferentially processed when some jobs are in a waiting state, and 3 indicating "interruption in page unit" processing the LEVEL 2 by interrupting the current job when there is a break in a page.

The interface, as shown in FIG. 39, indicating a hardware that the job uses, is arranged such that jobs can exclusively utilize the hardware. The job is CLCP for outputting document from the printer of the color laser copying machine (CLC), CLCS for reading a manuscript using a scanner of the color laser copying machine (CLC), BJP for delivering a manuscript using a printer of the thermal jet color printer, BJS for delivering a manuscript using a scanner of the thermal jet color printer, PDLP for delivering document to a printer included in a commercially available page description language interpreter, BITP for delivering document to a commercially available bit map printer, or a job for reading a manuscript using a commercially available scanner. The number of the page on which the job has completed is recorded on the end page. If an error occurs, the record is used to judge that from what page the process is resumed after an error recovery. The final interrupt job ID is used to judge whether the interrupt job has been terminated. If the job has been terminated, the job during STP is resumed.

Referring to the job table storing in the above information, the entire system control program 93 judges suitably whether any one of the following jobs is activated.

The job execution process operation of the server device according to the present invention will be explained below with reference to the flow chart shown in FIG. 42.

FIG. 42 is a flow chart showing an example of the job execution process procedure in the server according to the present invention. Numerals (1) to (6) represent steps.

The timing when the control is shifted to the flow is described next. (1) The control shifts to the flow at fixed intervals in an idle state while an event does not enter the entire system control program 93. If the job table does not include any job, the situation returns to an idle state. (2) There is an event from the communication program 83. (3) There is an event of page termination or an event of a document termination from the PDL interpreter program 84 and the scanner control program 85. (4) There is an event of error from the device driver 86.

First the job table shown in FIG. 41 is referred in the step (1). Next, in the step (2), it is judged whether there is a job.

When there is no job to be executed, the flow returns to the step (7). Then the entire system control program 93 become an idle state. When there is a job to be executed, some operable job candidates are selected in the step (3). In the step (4), a single job is finally selected in consideration with the priority order of the job candidates. Furthermore, it is judged whether the interface to be used for the job finally selected in the step (5) is empty. In the step (6), the job is actually performed and then the process is terminated.

The operation of the status check process in the server device according to the present invention will be explained below, with reference to the flow chart shown in FIG. 43.

Figure 43:
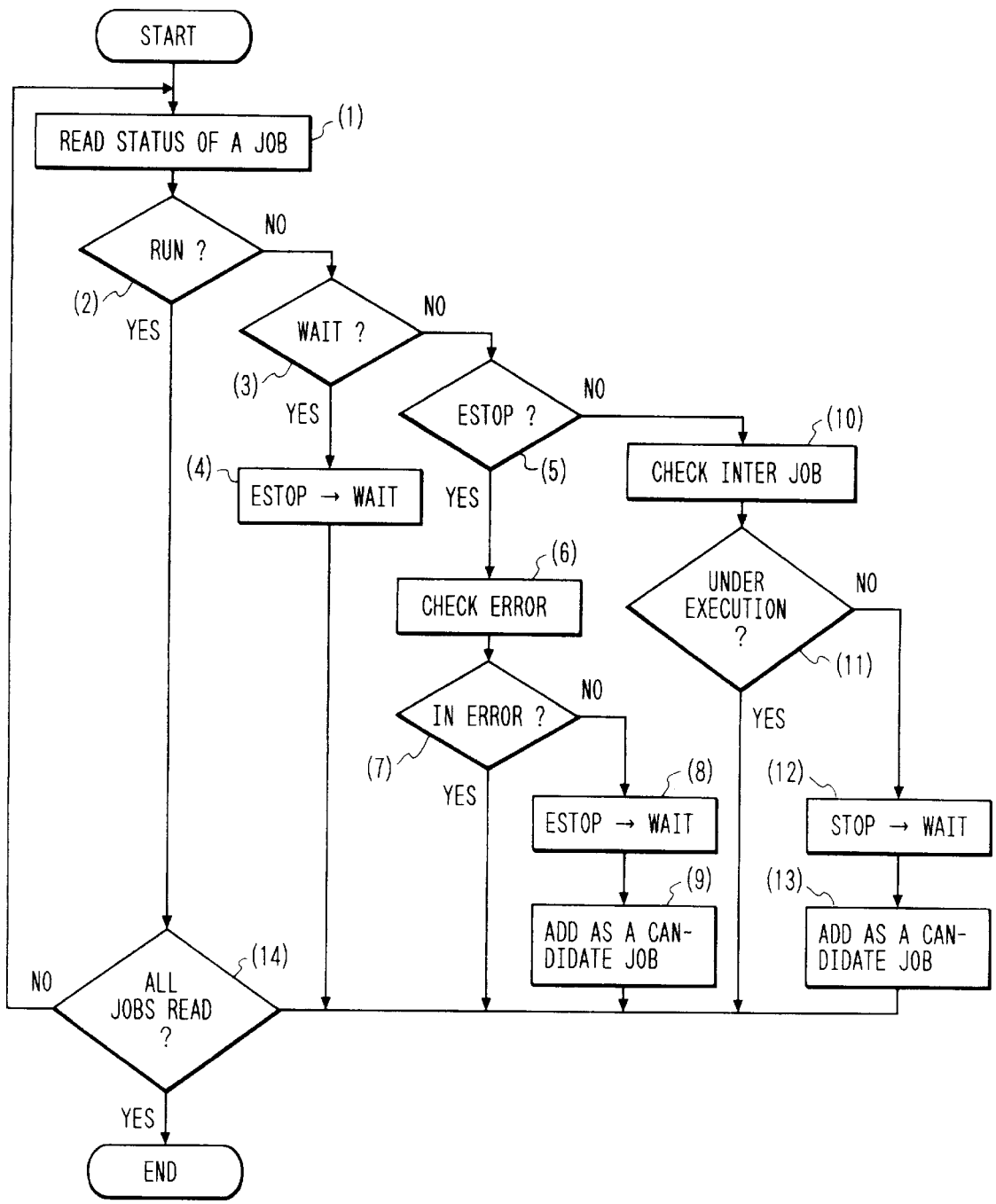
FIG. 43 is a flowchart illustrating an example of a status check procedure in a server device according to the present invention.

FIG. 43 is a flow chart showing an example of the status check process procedure in the server device according to the present invention. Numerals (1) to (14) represent steps.

First, in the step (1), a job status is read out of the job table. In the step (2), it is judged whether the job status is RUN. If RUN, the flow is shifted to the step (14) to judge whether all jobs in the job table have been read up. If some jobs remain unprocessed, the flow goes to the step (1) to read the next job status. If not RUN, the flow goes back to the step (3). In the step (3), it is judged whether the job status is WAIT. If WAIT, it is picked up as an operable job candidate in the step (14) and then the flow goes to the step (14). If not WAIT, it is judged whether the job status is ESOP. If the job status is ESOP, the job is interrupted due to an error occurrence. Hence, it is judged whether the error causing the job interruption is removed in the step (6). The step (7) is a branch for judging whether the job is in an erroneous state. If the job is still in the erroneous state, the flow goes to the step (14) without picking up an operable job candidate. When the error is removed, the status of the job in the job table is rewritten from ESTOP to WAIT. In the step (9), the written job is picked up as an operable job candidate. When the status is not ESTOP in the step (5), the status of the job which interrupts in the step (10) is checked because the flow is in STOP state being interrupted by another job. In the step (11), it is judged whether the interrupting job is in execution. If the job is being executed, the flow goes to the step (14) without picking up the operable job candidate. If the job is not being executed, the flow goes to the step (12) to rewrite the job in the table from STOP to WAIT. Thus the job is picked up as a job candidate operable in the step (13). Finally when all jobs have been read (14), the status checking is completed. In such a manner, plural operable job candidates are selected.

Explanation will be made below as for the priority checking operation in the server device according to the present invention with reference to the flow chart shown in FIG. 44.

Figure 44:
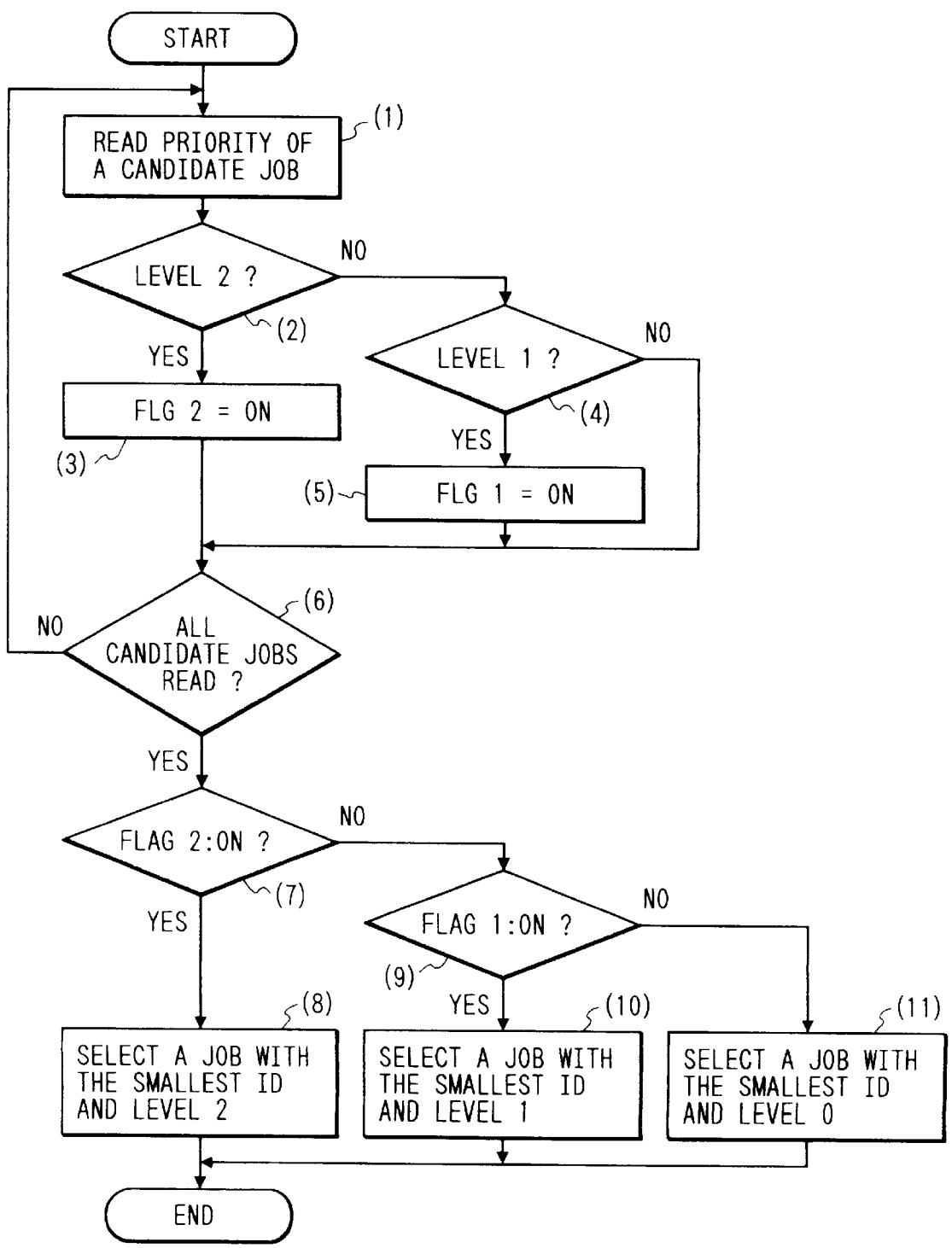
FIG. 44 is a flowchart illustrating an example of a status check procedure with a top priority order in a server device according to the present invention.

FIG. 44 is a flow chart showing an example of the priority checking procedure in the server device according to the present invention. Numerals (1) to (11) represent steps. In the present embodiment, only one job is finally selected in consideration of the priority of the job candidates.

In the step (1), the priority is read to one of the plural operable job candidates. In the step (2), it is judged whether the priority is the LEVEL 2. If LEVEL 2, the flow goes to the step (3) to set a flag FLG2 representing whether the job of the LEVEL2 exists. If not LEVEL2, the flow goes to the step (4) to judge whether the priority is LEVEL1. If LEVEL1, the flow goes to the step (5) to set a flag FLG1 representing whether the job of the LEVEL1 exists. If the priority is not LEVEL1, it becomes LEVEL0. That is, when neither or the FLG2 and FLG1 are set, the priority becomes the LEVEL0.

When the priority of one job has been completely judged, the flow goes to the step (6) to judge whether all job candidates have been checked. If the checking has not been completed, the flow goes to the step (1) to judge the next job. If the checking has been completed, the flow goes to the step (7). When the flag FLG2 is set, the flow goes to the step (8) to select a job with a priority of LEVEL2 and a small ID (accepted at earlier job request).

In the similar manner, a job with a priority LEVEL1 and a small ID is selected in the steps (9) and (10). In the step (11), a job with a priority LEVEL0 and a small ID is selected. Then the priority checking is finished.

As described above, only one next operable job can be selected. Even if an operable job is determined, the relationship between the job and the interface must be examined because the status of the interface determines the actual activation.

The interface checking operation in the server device according to the present invention will be explained below with reference to the flow chart shown in FIG. 45.

Figure 45:
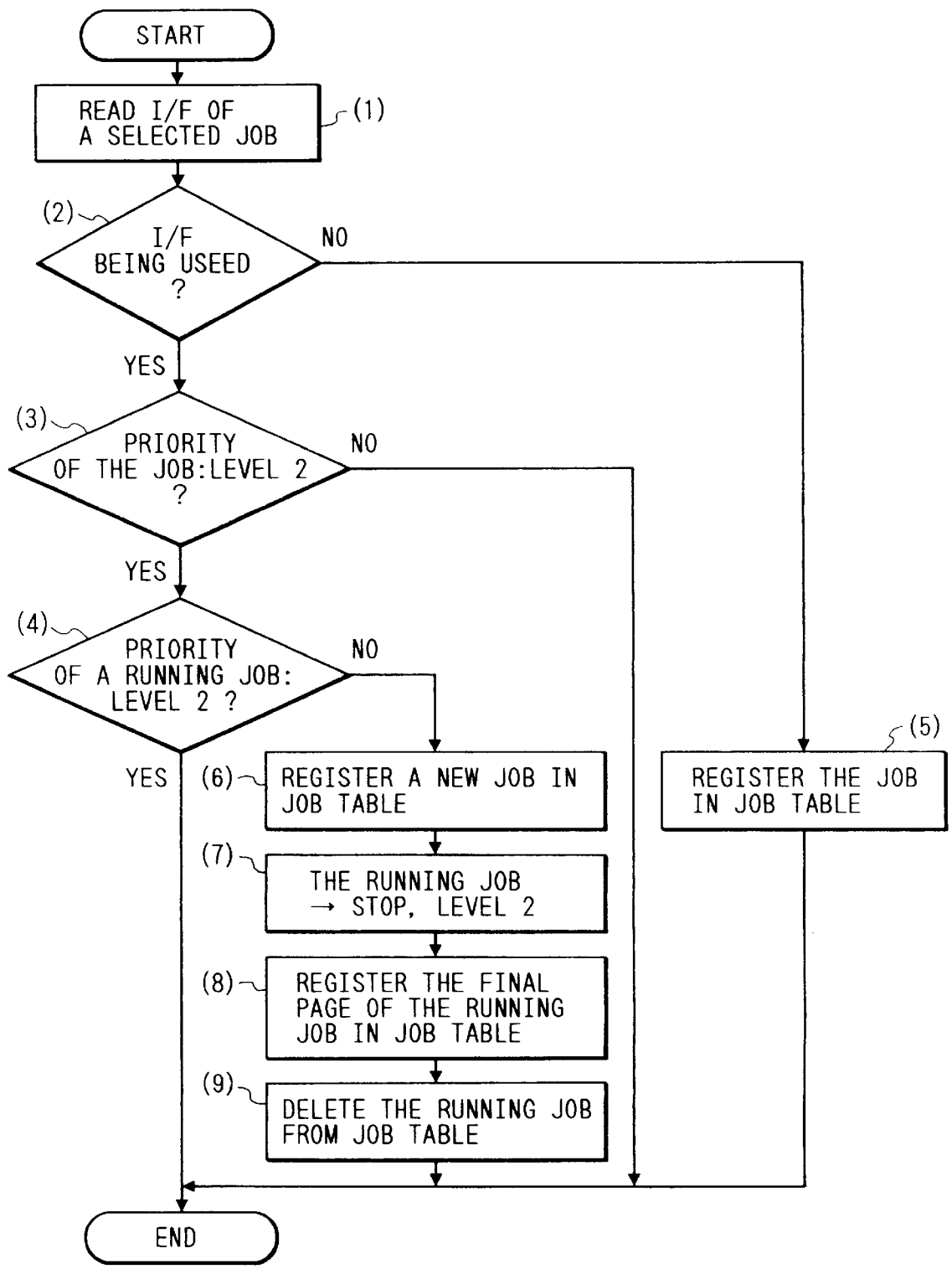
FIG. 45 is a flowchart illustrating an example of a interface check procedure in a server device according to the present invention.

FIG. 45 is a flow chart showing an example of the interface checking procedure in the server device according to the present invention shown in FIG. 45. Numerals (1) to (9) represent steps.

In the step (1), the interface of the job finally selected is read from the job table. The status of the interface is checked in the step (2). If the interface is not in use, the flow goes to the step (5) to register the job in the execution job table. The execution job table being a table representing an actually activated job can be run with a multi-job mode to register plural jobs.

The job process in the step (6) is activated with reference to the execution job table.

When the interface is in use, the flow goes to the step (3) to check the job priority. If the priority is not LEVEL2, the current job cannot be interrupted so that the process is ended without registering the execution job table. When the priority is LEVEL2 in the step (3), the step (4) judges whether the job of the current status RUN is LEVEL2. Since the job of RUN in LEVEL2 cannot interrupt the current job, the process is terminated without registering the selected job on the execution job table.

On the other hand, when the priority of the current job (status RUN) is LEVEL1 or LEVEL2, the current job is interrupted to activate a newly selected job. In this case, the flow goes to the step (6) to register the job selected in the step (4) in the execution job table. In the step (7), the current job is set to the status of STOP and the priority of LEVEL2 to execute preferentially when the job is recovered.

In the step (8), the number of end page is written in the job table to record that how many pages the current job has processed. Moreover, in the step (9), the current job is deleted from the execution job table. The current job is not activated while the status becomes STOP to wait for re-activating the job. Thus the interface checking is terminated.

Explanation will be made below regarding the job activation process operation in the server device according to the present invention with reference to the flow chart shown in FIG. 46.

Figure 46:
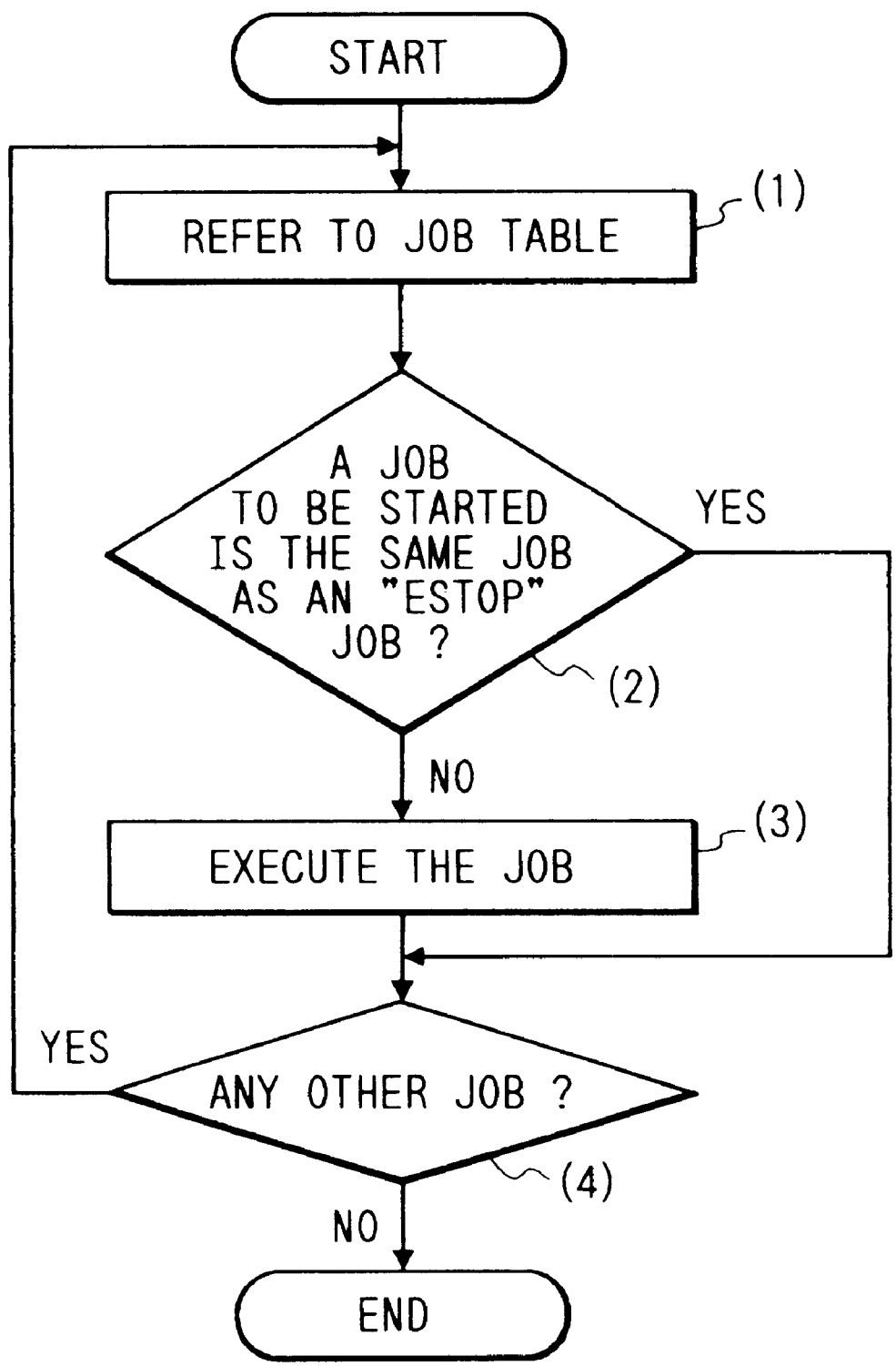
FIG. 46 is a flowchart illustrating an example of a job initiation procedure in a server device according to the present invention.

FIG. 46 is a flow chart showing an example of the job activation process procedure in the server device according to the present invention shown in FIG. 46. Numerals (1) to (4) represents steps.

In the step (1), the job to be activated is first read with reference to the execution job table. In the step (2), it is judged whether the job to be activated later resembles the job being in an error stop in the status ESTOP. Since the job being of the same kind cannot be activated, the flow goes to the step (4) to judge whether the execution job table have been completely read. If not so, the flow goes to the step (1) to activate the next job. If the job in an error stop is of a different kind, the flow goes to the step (3) to activate the job. When an actual job is activated, the status is changed from WAIT to RUN to ensure the interface. On contrary, when an error stop or an interruption stops the process, the interface is released.

It is judged whether a job is left in the execution job table in the step (4). If there is no job to be activated, the job activation process is ended.

A job process operation in the server device according to the present invention will be explained in concrete with reference to FIGS. 47 to 57.

Figure 47:
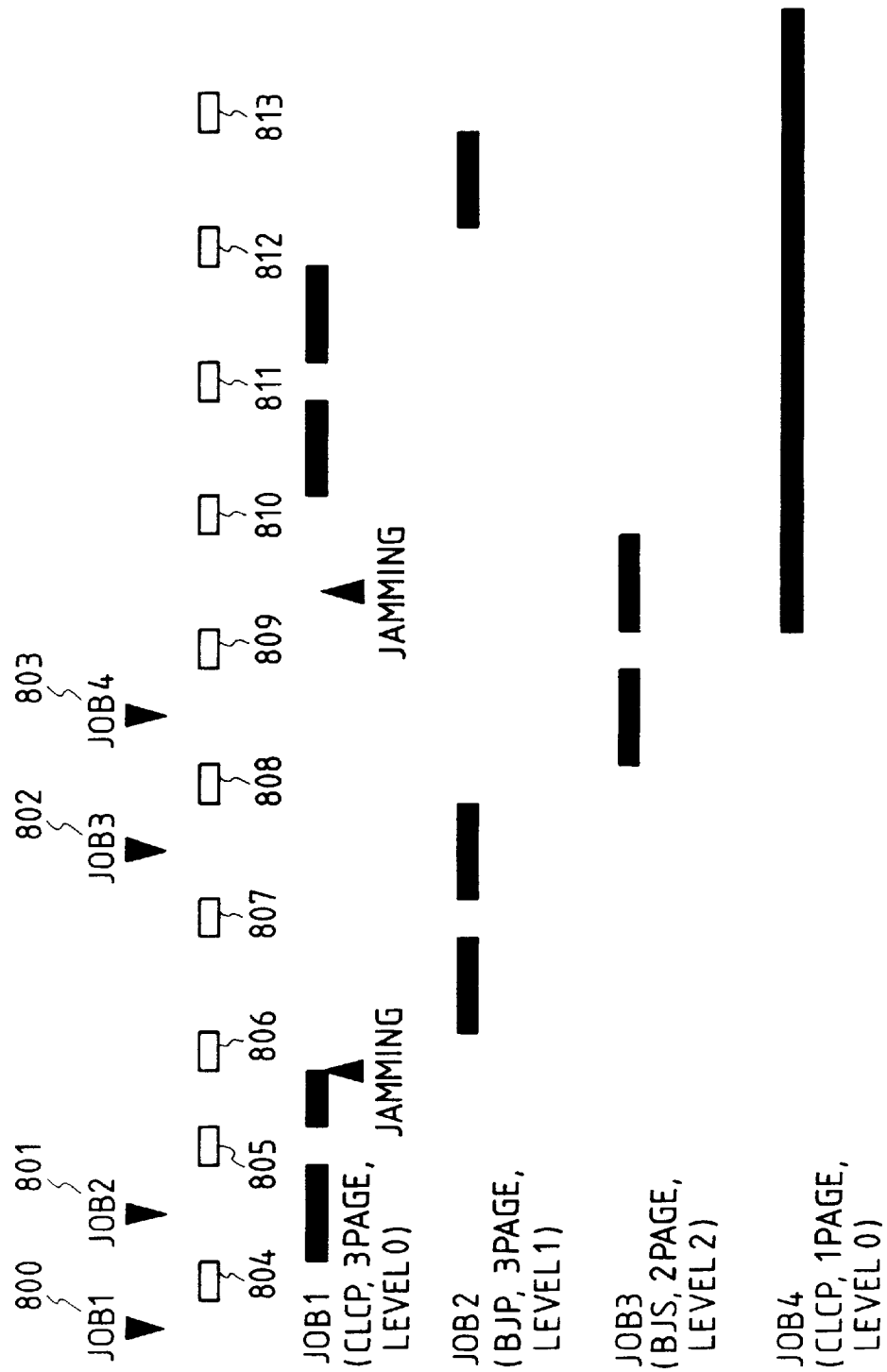
FIG. 47 is a timing chart illustrating a job processing transfer state in a server device according to the present invention.

FIG. 47 is a timing chart showing the changes of the job process status in the server device according to the present invention. In the figure, it is assumed that time passes in the right direction along the axis of abscissa.

In FIG. 47, numerals 801 to 813 represents a job table checking timing. The timings 800 to 803 respectively represent a timing that a job event enters from the communication program 83 to the entire system control program 93. The timings 804 to 813 respectively correspond to a job table checking timing.

Figures 57, 58:
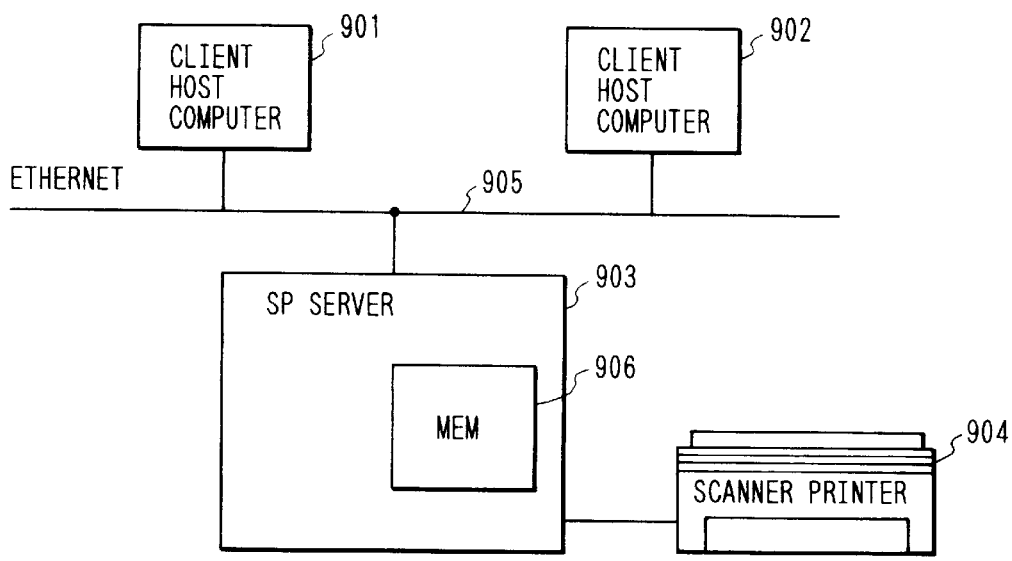
FIG. 57 is a table illustrating a content of a job table in response to a job processing in a server device according to the present invention.
FIG. 58 is a block diagram illustrating a structure of a server device of the second embodiment according to the present invention.

FIGS. 48 to 57 respectively are a diagram showing the content of the job table accompanying the job process in the server device according to the present invention. FIGS. 48 and 57 respectively correspond to the job table at the timings 804 to 813. The job table shows the content immediately before checking. The job is CLCP for delivering document from the printer of a color laser copying machine (CLC), CLCS for reading a manuscript through the scanner of a color laser copying machine (CLC), BJP for delivering document to the printer of the thermal jet color copying machine, BJS for reading a manuscript through the scanner of the thermal jet color copying machine, PDLP for delivering document to the printer including a commercially available page description language interpreter, BITP for delivering document to a commercially available bit map printer, or a job reading a manuscript through a commercially available scanner.

A job event enters at the timing 800. The content is a job 1 (the content of CLCP) which outputs document to the printer of the color laser copying machine (CLC) and includes an output page number of 3 pages, a priority of LEVEL0, and an interface BMEM. In the job table JOBT, the ID "25" shown in FIG. 48 is allocated, the status is WAIT, and the end page is 0 page because of no process.

In the job table checking at the timing 804, ID25 job is selected and activated. Then the status of the ID25 job is changed to RUN. A new job enters at the timing 801. When one page processing in the ID25 job has been completed, the entire system control program 93 examines again the job table. FIG. 49 is the corresponding job table JOBT, showing the status where the job of ID25 waits for processing the next page after a complete delivery of one page. The end page changes from 0 page to 1 page. A newly entered job is allocated with the ID26. The status is WAIT with the priority of LEVEL1. The interface is BMEM and the job is BJP. The entire system control program 93 judges with reference to the job table JOBT to activate to process 2 page of the ID25 job.

At this time, it is assumed that the ID25 job cannot be continued because a paper jam occurs in the printer on the way to printing the 2 page. The entire system control program 93 searches the next job to be activated with reference to the job table JOBT shown in FIG. 50. The status of ID25 is ESTOP. The priority is LEVEL2 to execute preferentially at a recovery time. The end page remains to be 1 page. Then the entire system control program 93 activates the job of ID26. When the ID26 job terminates the process of 1 page, the entire system control program 93 goes to the check 807 of the job table JOBT. This situation is shown in FIG. 51. The ID25 job is not activated because the error has not been recovered after the error checking. Then the entire system control program 93 requests the PDL interpreter program 84 to process the 2 page of the ID26 job.

While the job of ID26 is processing 2 page, a new job event enters the entire system control program. The content means reading the manuscript of 2 page by means of the scanner of the thermal jet color copying machine. When the job of ID26 has completely processed 2 page, the entire system control program 93 checks the job table JOBT, as shown in FIG. 52.

ID25 remains as it is because of no error recovery. When the job of ID26 has completed the 2 page processing, the end page changes to 2. Moreover a new job is allocated to ID27. Since the ID27 job has a priority of LEVEL2, the entire system control program 93 interrupts the ID26 job during currently operating to activate the ID27 job. In the ID26 job, the status becomes STOP and the priority becomes LEVEL2.

While the scanner control program 85 read a manuscript of 1 page, a new job event enters the entire system control program 93 at the timing 803. When the 1 page reading has completed, the entire system control program 93 checks the job table shown in FIG. 53 at the timing 809. The ID25 job remains ESTOP because the error state is not recovered. The ID26 has a status of STOP and an interrupt job ID of 27. Therefore, when the ID27 job is checked, the status cannot be resumed as it is in a RUN state. Thus ID28 is allocated to a newly entered job. The ID28, which a job where data enters a commercially available printer through a centronics interface, can be simultaneously run together with the currently activated job. The entire system control program 93 simultaneously activates the jobs which scan the second pages of the ID27 and ID28.

Next the entire system control program 93 goes to the job table JOBT checking (timing 810). The job table JOBT is shown in FIG. 54. Since the error of the job ID25 is removed prior to the job table JOBT checking (timing 810), the status returns to WAIT after error checking.

Since the interrupted ID27 job has completed, the status of the ID26 job returns to WAIT. However the ID28 job remains to be in RUN state. The entire system control program 93 activates the job of the ID25 or ID26 because the interface BMEM is empty. Since either job has a status of WAIT as well as a priority of LEVEL2, the precedently accepted job of ID25 is activated. In this case, since the end page is 1 page, the ID25 job must deliver a request to the PDL interpreter program 84 to start the process from the second page.

The job table JOBT checking (timing 811) follows the table shown in FIG. 55. In the ID25 job as well as the ID28 job, the status is RUN. In the ID26 job, the status is WAIT. The ID26 job has a priority of LEVEL2 and can interrupt to the currently activating job. However, since the ID25 is activated with LEVEL2, the ID26 cannot perform an interruption.

The process goes to the job table JOBT checking (timing 812) shown in FIG. 56. The ID25 job, already completed, is deleted from the job table JOBT. The entire system control program 93 activates from the third page of the ID26 job.

In the job table JOBT checking (timing 813), since the ID 28 job, as shown in FIG. 57, is running, the entire system control program 93 does not activate a new job.

As described above, the entire system control program 93 executes a suitable job management with reference to the job table JOBT.

In the above embodiment, after the host computer edits letters, drawings, and images, a print request communicated via the network is processed on the server device which drives a scanner/printer to deliver the result from the printer. However, as shown in FIG. 58, in the system where the SP server device 903, which drives the client host computers 901 and 902 and the scanner printer 904, is connected via the network 905, the SP server device 903 may synthetically edit various information such as letters and drawings transferred from the client host computers 901 and 902 to deliver the combined output.

FIG. 58 is a block diagram used for explaining the configuration of the server device showing the second embodiment of the present invention.

In FIG. 58, the memory device 906 in arranged within the SP server 903 to store various information such as letters and drawings transferred from the client host computers 901 and 902.

In the server device with such a structure, the processing load to the image information output from each host computer can be released and the stored image information can be effectively re-utilized because the memory means (memory device 906) arranged on the main body or the network stores the first image information delivered from the image processor or the second image information delivered from each host computer connected to a predetermined network.

Since the image synthesis means synthesizes the first and second image information stored in the memory means (memory device 906) to deliver the resultant output (the scanner printer 904 in the present embodiment), the image editing load on each host computer can be released.

In the present embodiment, an operator produces letter information and drawing information on the client host computers 901 and 902, for example, with a word processor or based on the graphic software. The information (first image information) regarding produced letters, drawings, or the like is transmitted to the SP server device 903 via the network 905. The information regarding letters and drawings received in the SP server device 903 is stored in the memory device 903 within the SP server device 906.

Figure 59:
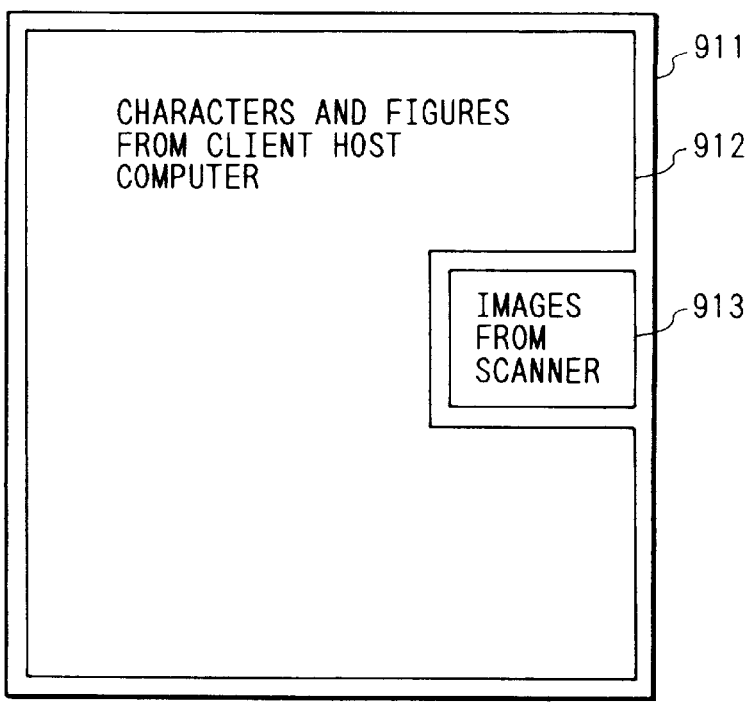
FIG. 59 is an explanatory view illustrating a printed layout synthesized by an SP server device shown in FIG. 58.

The image information (second image information) scanned with the scanner printer 904 is stored in the memory within the SP server device 903. As shown in FIG. 59, using the page description language operating on the SP server device, the information regarding letters, drawings and images (image data) are synthesized in the memory device 906 within the SP server device 903.

FIG. 59 is a model diagram showing a print layout synthesized using the SP server device, as shown in FIG. 58.

In figure, numeral 911 represents a one page region. The transfer information 911 regarding letters, drawings transferred from the client host computers 901 and 902 via the network 905, or the like, as well as image information 913 scanned by the scanner printer 904 controlled by the SP server 903 are allocated in the region 911 according to the layout information. The synthesized information can be output from the printer of the SP server device 903.

The scanner printer 904 controlled by the SP server device 903 may be constructed as a discrete configuration independent of the scanner and the printer. In order to perform a printing, the memory device 906 in the SP server device 903 successively reads in the image information read using the scanner in the scanner printer 904 to synthesize with the information letters and drawing sent from the client host computers 901 and 902. Instead, when another memory device with large memory capacity, or a magnetic optical disc device, is connected to the SP server 903, an image database can be constructed by sequentially memorizing scan images in the large memory device so that the image can be arbitrarily read out of the large memory device printed to print the image by synthesizing the letters and drawing information. Furthermore, when the large memory device is arranged independently of the memory device 906 of the SP server device 903, it is not necessary to directly connect the large memory device to the SP server device 903. The client host computers 901 and 902 may have a different configuration to transfer information to the SP server device 903. FIG. 60 is a diagram used for explaining the program configuration of the first station ST1 shown in FIGS. 2A and 2B. These programs, which are controlled by the CPU (not shown) in the station ST1, execute a desired operation.

In the figure, when a printing is begun from the DTP application 1500 (corresponding to the application 56 shown in FIG. 2A), the print manager 1501 being a part of the OS is called. The print manager 1501 makes the printer driver 1502 to ensure a drawing memory region and to provide the pointer thereof. The print manager 1501 also notifies the application 1500 of the pointer to make it to draw on the region in a Quick Draw format. Therefore, when the application 1500 has completed the drawing, the data is completely handed to the print driver 1502. The printer driver 1502 converts the Quick Draw function one by one and one after another to store the results in a memory, and then requests the S/P client 1503 to transfer the results to the scanner/printer server (S/P server) 1602. The data transfer protocol couples between the S/P client server 1503 (corresponding to the communication program 53 shown in FIG. 2A) and the S/P server 1602 (corresponding to the communication protocol 83 shown in FIG. 2B). The converted CaPSL code handed from the printer driver 1502 is transferred to the S/P server 1602. The numeral 1504 represents a communication protocol (corresponding to the TCP/IP program 52 shown in FIG. 2A), 1505 represents an Ethernet board, 1506 represents a compressed (ADCT) control function, and 1507 represents a compressed board. The numeral 1600 represents a specified printer, 1601 represents a CaPSL interpreter (corresponding to the PDL interpreter program 84 shown in FIG. 2B), 1603 represents a communication protocol (TCP/IP program 82), and 1604 represents an Ethernet protocol.

FIG. 61 is a detailed diagram showing the relationship between the OS of the first station ST1 shown in FIG. 60 and each driver. Like numerals are attached to those similar to elements shown in FIG. 60.

FIG. 61 also shows the relationship between the driver and the MacOS of the station ST1 constituted with a Macintosh.

In the figure, 1508 represents a QuickDraw/CaPSL conversion routine (program 54) which converts the drawing function of the QuickDraw to CaPSL codes.

The device manager and the print manager are constructed as drivers instead of an application. Since the interface is coupled via the MacOS, it is easy to standardize the specification. The MacOS for MultiFinder, in fact for a single task, can realize a multitasking of the processed portion by executing a driver operation. In the case of UNIX machines, only the physical devices and interface can be realized as drivers, and the remaining devices can be readily run as demon in the background mode.

The printer driver function can be classified into the QuickDraw/CaPSL conversion routine 1508 (corresponding to the conversion program 54 shown in FIG. 2A), and the printer driver 1502. The CaPSL code (combined) can be substituted for the whole drawing functions of the Quick-Draw.

The printer driver 1502 can provide the same service as the LaserWriter provides to the print manager 1501.

In concrete, when the application 1500 issues a function such as PFSt1Dialog( ) and PrJobDialog( ), it returns the parameters requested by the print manager 1501 and controls the command of the SPClient driver.

Figure 62:
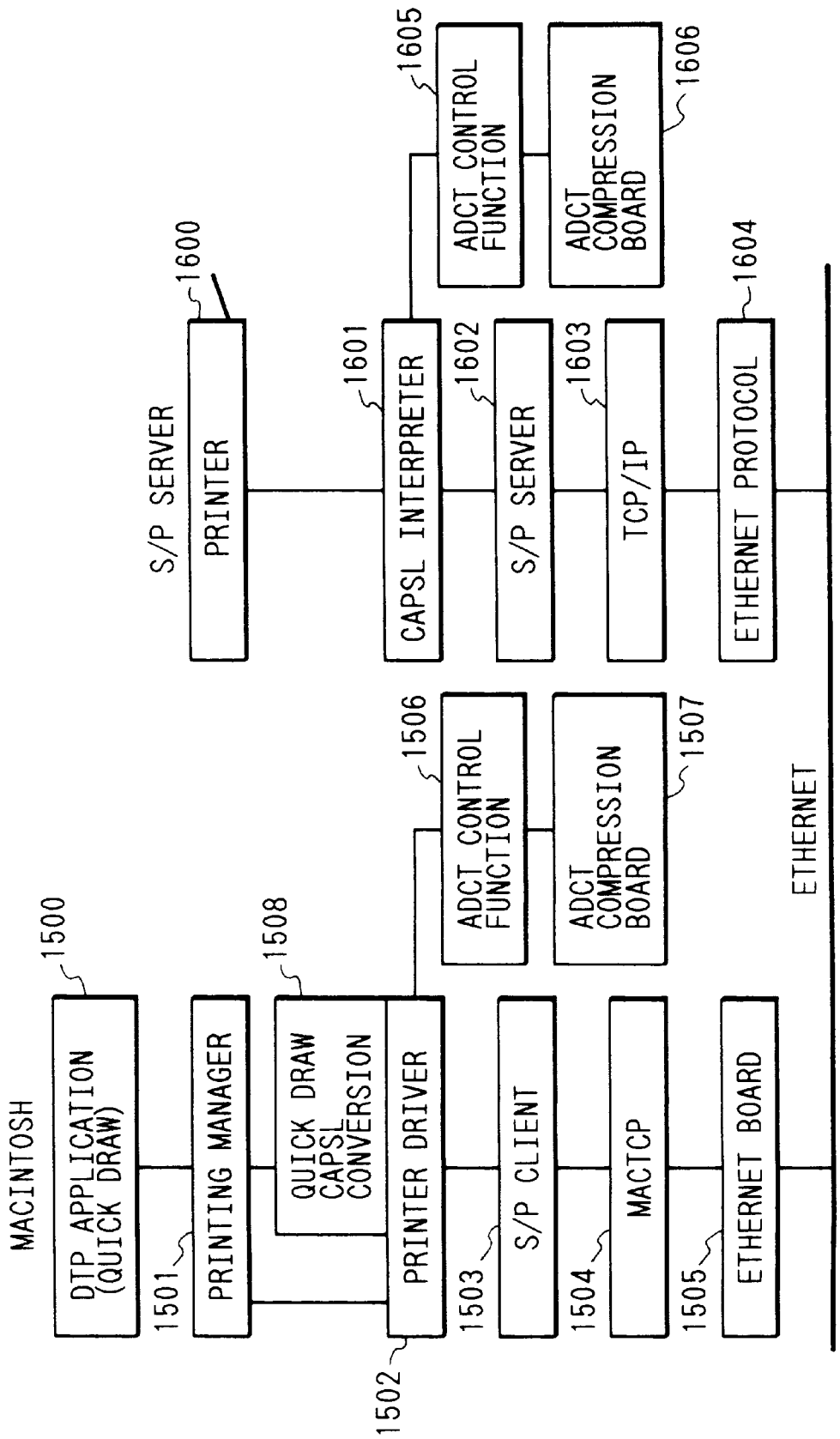
FIG. 62 is an explanatory view illustrating a functional operation between a printer driver and a printer manager shown in FIG. 60.

FIG. 62 is a drawing used for explaining the functional operations of the printer manager 1501 and the printer driver 1502.

The printer driver 1502 operates in the same draft mode as the LaserWriter. The printer driver 1502 also is activated by the print manager 1501 to provide a printer driver interface to the print manager 1501. The printer driver 1502 provides the following functions to the print manager.

| | |
|---|---|
| Open | (Lock the DRVR 28 resource of SPClient to a memory and then activate OpenConn) |
| Close | |
| Read | (Scan a manuscript) |
| Write | (Print CaPSL code) |
| Status | (Check SP server status) |
| Control | (Control SP server) |
| killIO | |

The printer driver 1502, a basic driver, is provided in the form of Cooser Document and can be selected from the Cooser DA together with the LaserWriter and ImageWriter. The printer driver 1502 also takes advantage of the communication function of the protocol (MacTCP) via the SP client 1503. The SP client server 1503 provides an interface in a standard driver form to the printer driver 1502.

The driver of the SP client 1503 automatically installs itself to the system when a power source is set up according to the mechanism of the initializing process (INIT-31). When the driver memory occupying size becomes large, a large part of codes in a code resource form are loaded to the system heap at an open time. In this case, the memory is released at a close time. The SP Client includes a resource of control panel document, and can set various parameters such as IP address from the control panel. For that reason, the SP Client has at least the following cdev resources.

| | |
|---|---|
| DITL | ID = −4064 |
| mach | ID = −4064 |
| nrct | ID = −4064 |
| ICN# | ID = −4064 |
| BNDL | ID = −4064 |
| FREF | ID = −4064 |
| cdef | ID = −4064 |

The Control routine provides the service of the SP Client 1503 with no standard driver interface. The following various commands can be utilized by setting csCode in the parameter block of the Control call to a predetermined value. Explanation will be made below as for the protocols of the SP Client 1503 and the SP server 1602.

The SP client 1503 writes directly all commands and data to the TCP protocol 1504, but conceptually acts as if it communicates with the layer of the SP server 1602 connected via the LAN 96. Hence this feature needs the protocol of the End-to-End. Interchanging packets between the server and the client provides communication services to upper layer. The packet can be divided to server/client packet and document control packet. This corresponds to the session layer and the document layer of the OSI. There is a difference in that how to use the packet in a single layer is adjusted, without clearly dividing into two layers like the OSI.

TCP and UDP are prepared for the interface on the MacTCP application side. The printer driver uses the TCP protocol. The MacTCP is a device driver.

According to the present embodiment, ADCT (Adaptive Discrete Cosine Transform) is an important element for a half tone image compression technique (referred to JPEG). The JPEG (Joint Photographic Expert Group) belongs to a lower study group of the CCITT (International Telegraph and Telephone Consultative Committee). The half tone image compression technique issued by the above organization is called the JPEG system.

Explanation will be made below regarding the case where the station ST2 (a personal computer manufactured by IBM) shown in FIGS. 2A and 2B is used as a client host and executes the data communications with the SP server 1602.

First, the feature of the network program in the Windows (Tradename) environment.

With an application program based printing, the application itself produces a control code peculiar to a printer made by a manufacturer in the conventional OS (MS-DOS) environment. However, the Windows 3.0 (Tradename) releases the load to the application because GDI separates and standardize the applications and printer drivers, whereby the peculiar control for each printer is closed in the printer driver. For that reason, printer manufacturers offer printer drivers each installed in the host computer by which a printing can be performed under any applications.

The Windows 3.0 supports a standard network as a printer port in addition to RS-232C and Centronics interface.

Figure 63:
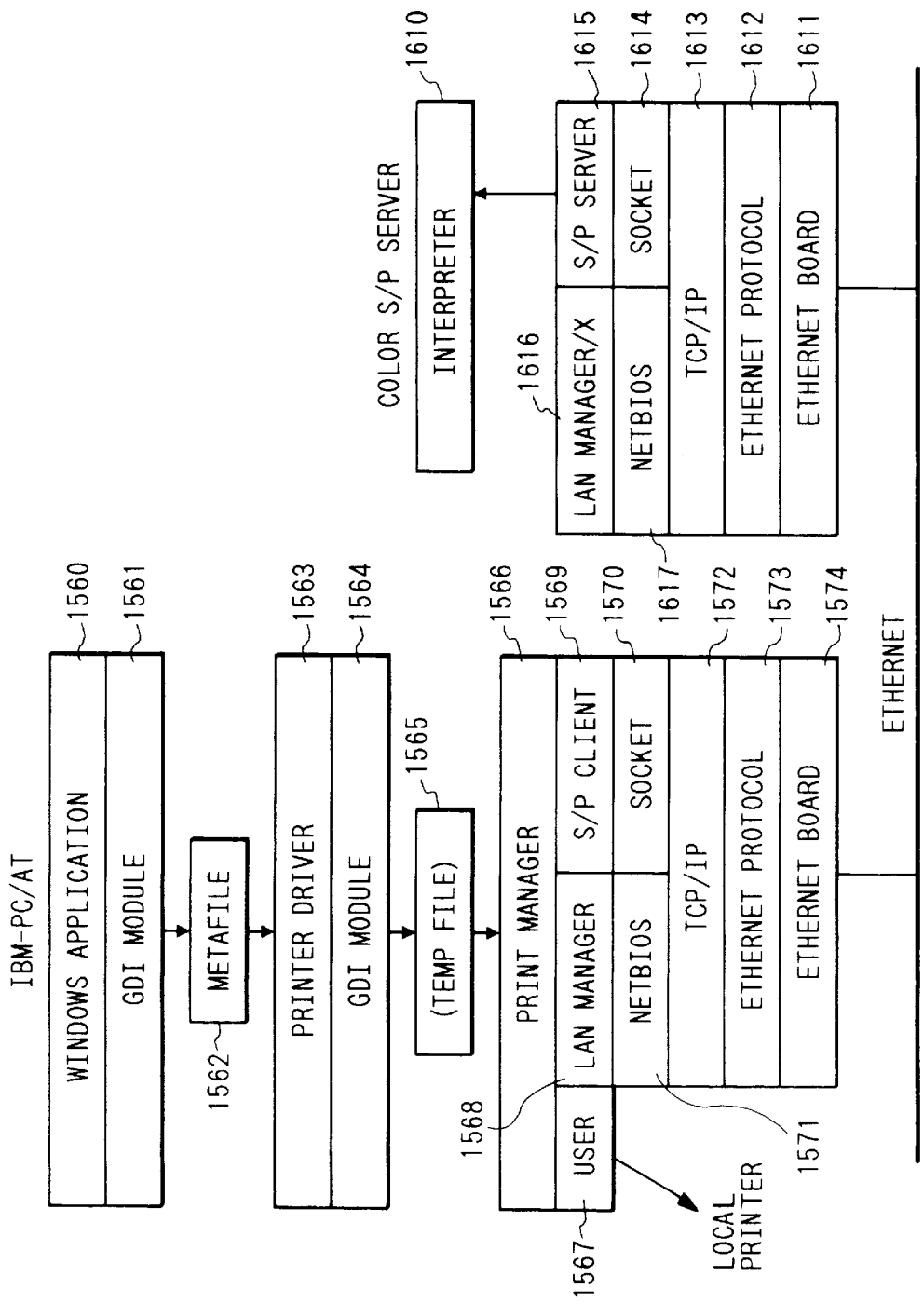
FIG. 63 is an explanatory view illustrating a protocol of a network printer in the second station shown in FIG. 2A and 2B.

The protocol of the network is constituted as shown in FIG. 63.

FIG. 63 is a diagram explaining the protocol for the network printer in the second station ST2 shown in FIG. 2.

In the figure, like the first station ST1 (Macintosh), the application 1560 (corresponding to the application program 66 shown in FIG. 2A) can draw to the GDI module, except the memory area managing itself. The GDI module makes the meta-file of the GDI function and then hands the control to the control printer driver 1563. The printer driver 1563 converts respectively the GDI functions into a CaPSL code to make a temporary file 1565, thus handing the control to the print manager 1566. The print manager 1566 (corresponding to the printer manager 65 shown in FIG. 2A) usually provides the temporary file 1565 from the serial port to the local printer. However, according to the present embodiment, the temporary file 1565 is transferred to a specified network printer (color SP server) via the SP client 1569 (corresponding to the communication program 63 shown in FIG. 2A).

Here the print manager 1566 functions as a network driver of the same level as those of the SP client 1569 and an LAN manager 1568. The numeral 1572 represents a protocol (TCP/IP program 62), 1573 represents an Ethernet protocol, 1574 represents an Ethernet board, 1610 represents an interpreter (corresponding to the PDL interpreter program 84 shown in FIG. 2B) on the SP server, 1611 represents an Ethernet board, 1612 represents an Ethernet protocol, 1613 represents a protocol (corresponding to the TCP/IP program 82 shown in FIG. 2B), 1617 represents an NetBIOS port, and 1615 represents an SP server (corresponding to the communication program 83).

The quasi-Windows application 1560 draws a picture or sentences per page while it calls the GDI module (function group for drawing). The GDI module 1561 converts the call into the GDI meta-file 1562 to save the result in the file. The GDI printer driver is loaded and activated at the end of the page to hand the file name of the meta-file (MF) 1562 to it. The printer driver 1563 executes to the process peculiar to the printer, for example, a meta-file/CaPSL code (MF-CaPSL) conversion, whereby the CaPSL file is filed. The printer driver 1563 again instructs the GDI module 564 to execute printing. In response to the instruction, the GDI module 1564 executes any one of the following steps (1) to (3).

(1) Activate the PrintManager (spooler), leave the post control, and return the print (spool) completion to the printer driver.

(2) Transfer directly the CaPSL file to a local printer or network printer without activating the PrintManager (while the application ceases its operation).

(3) Print to the virtual printer (file).

In the first server device constructed above, when the printer driver 1563 converts print image information into image output information, the print image information being converted based on the peculiar printer interface (printer interface GDI in the present embodiment) of each host, the image output information being based on the print language (CaPSL in the present embodiment) for the image processor (scanner printer) connected to the server device, the SP client 1569 and the SP server 1615 as the lower layer of the print driver 1563 forwards the image output information via the network 96. As a result, even image-processors operated based on any language specification connected to the server device can execute a high speed printing process according to a commercially-available application programs. In the present embodiment, the client communication control means corresponds to the SP client 1569. The server communication control means corresponds to the SP server 1615.

When the network printer performs a printing operation, it may be good not to use the PrintManager in some cases.

In the present embodiment, the NetBIOS port 1571 and the Socket port 1570 are prepared as a port utilizing the TCP/IP service. The network service protocol (such as NFS, FTP, LAN Manager, Client/server protocol) are formed on the ports 1571 and 1570. The UNIX machine uses Socket port 1570 to communicate with the compatibility with 4.3BSD of the UNIX maintained.

On the other hand, with the use of the network service protocol (LANManager) produced by Microsoft, the port 1571 is used for the NetBIOS developed by the same. This reason is that since the port has no compatibility with the Socket, the UNIX is needed to carry a protocol of LANManager/X.

Figure 64:
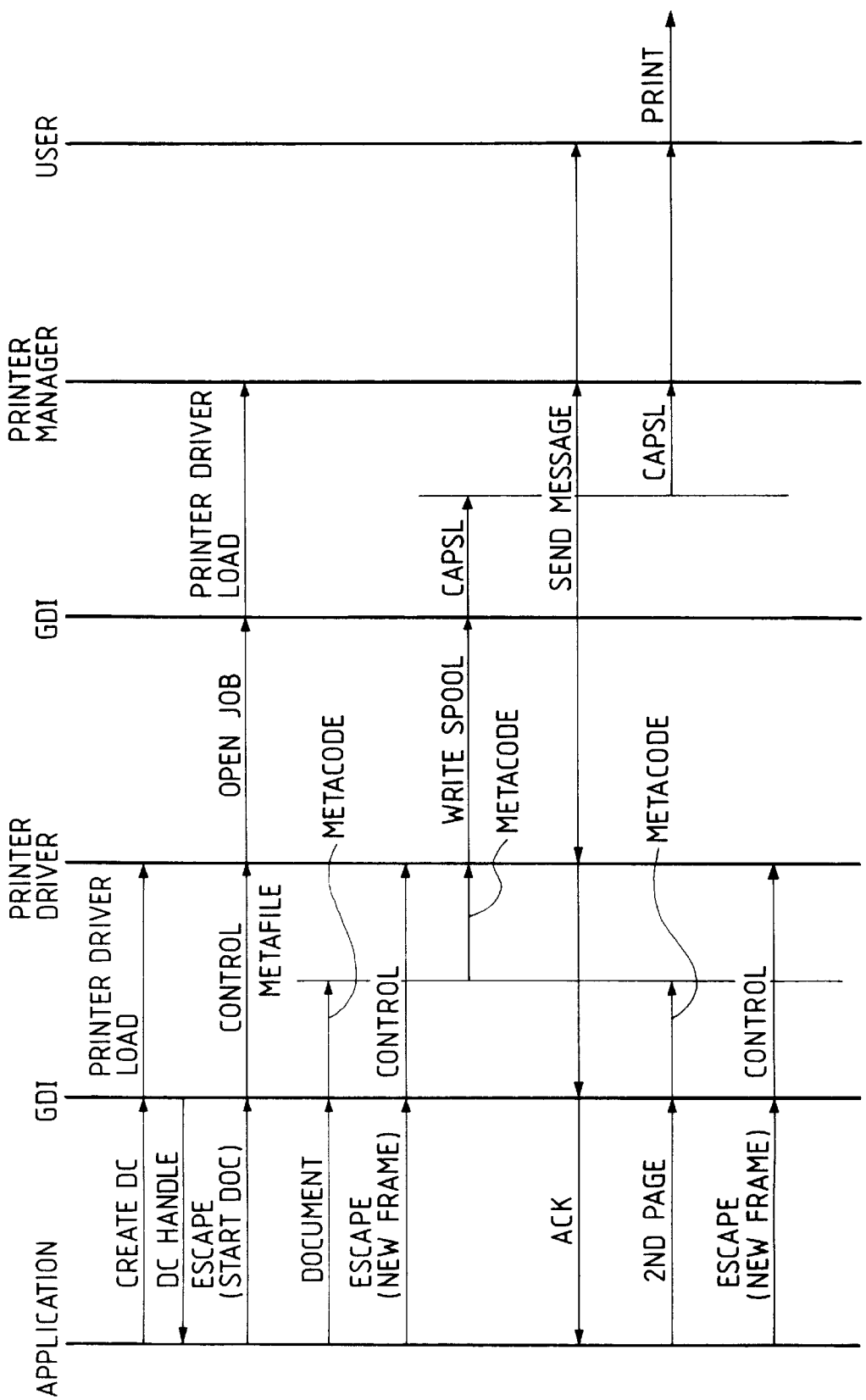
FIG. 64 is a sequential diagram illustrating an example of a printing process in the second station shown in FIGS. 2A and 2B.

FIG. 64 is a sequence diagram illustrating an example of a printing process by the second station ST2 shown in FIG. 2A. The standard Windows driver is represented with DLL.

Figure 65:
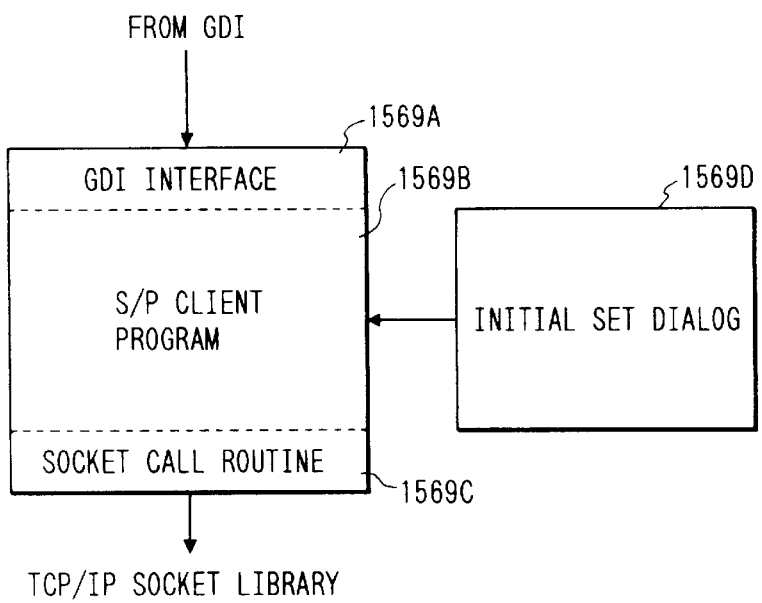
FIG. 65 is a structural view illustrating a program of an SP client shown in FIG. 63.

FIG. 65 is a diagram showing the program structure of the SP client 1569 shown in FIG. 63. The program is formed of the GDI interface 1569A, the SP client program 1569B, the Socket call routine 1569C, initial setting dialog 1569D, and the like.

In the Windows 3.0 (Trademark), the protocol 1572 of the SP client 1569 functions as a network printer driver. The protocol features that a client/server type protocol is necessarily formed by using the TCP/IP. This means that a Point-to-Point communication is performed.

On the other hand, in the case of the network distribution type protocol such as LANManager, the NetWare and the LANManager do not require to make a local spool file because data is written in the handle of the file name provided from the network. On contrary, in the protocol 1572 of the SP client 1569 showing the present embodiment, since the TCP/IP does not support the network OS, the client alone returns the handle of the file name so that the local spool file is made as mentioned below. For example, the micro sequence is as follows:

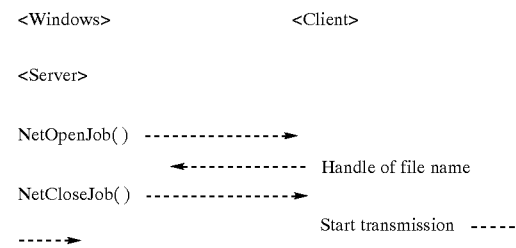

Figure 66:
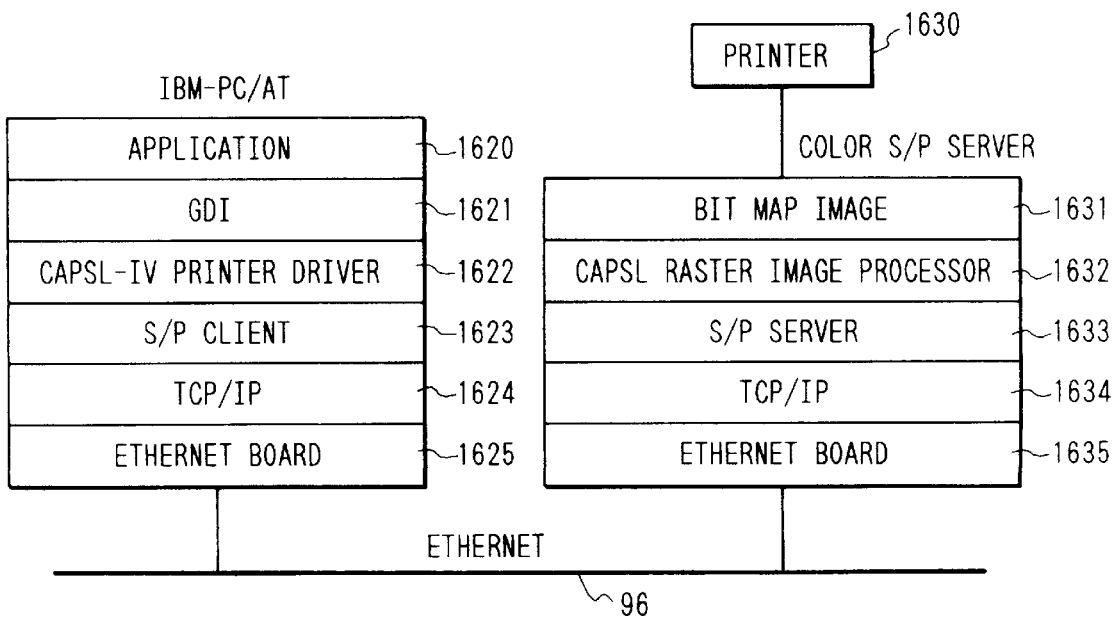
FIG. 66 is an explanatory view illustrating a network connection structure between an SP server and the second station shown in FIGS. 2A and 2B.

With reference to FIG. 66, an operation of the communication control between the station ST2 (IBM-PC/AT) shown in FIG. 2A and a specified SP server SP1 will be explained below.

FIG. 66 is a diagram explaining the state of the network connection between the second station ST2 and the SP server shown in FIG. 2A.

In the figure, numeral 1620 represents an application (corresponding to the application program 66 shown in FIG. 2A), 1621 represents the GDI, 1622 represents the CaPSL-IV printer driver, 1623 represents a S/P client (corresponding to the communication program 63 shown in FIG. 2A), 1624 represents a protocol (corresponding to the TCP/IP program 62 shown in FIG. 2A), 1625 represents an Ethernet board which communicates to the SP server specified via the LAN 96 and requires the printer 1630 specified acting as a network printer to execute a printing job. These programs are controlled by a CPU (not shown) in the station ST2 to execute a desired operation. The bit map image 1631 is output to the printer 1630. Numeral 1632 represents a CaPSL raster image processor (corresponding to the PDL interpreter program 84 shown in FIG. 2B). The processor 1632 converts the CaPSL code into a raster image via the Ethernet protocol 1635, the protocol 1634 (corresponding to the TCP/IP program 82 shown in FIG. 2B), and SP server 1633 (corresponding to the communication program 83 shown in FIG. 2B). These programs are controlled by, for example, the CPU 1000 shown in FIG. 9 in the SP server and execute a desired operation.

As shown in FIG. 9, the CaPSL-IV printer driver 1622 and the SP client 1623 is installed in the second station ST2. The SP server 1633 is installed in the SP server.

The printer driver 1622 functions as a scanner printer driver to print on the scanner printer server (SP server) on the network 96 from the IBM-PC/AT application via the TCP/IP protocol 1624. In concrete, the following steps (1) and (2) are performed.

(1) When the GDI drawing subroutine is called at a printing time, the printer driver 1622 produces the CaPSL code equivalent to the same.

(2) The SP client 1623 transmits the produced CaPSL code via the driver. The SP client 1623 is a communication control program for transmitting the CaPSL code to the printer 1630 connected to the SP server 1633 to communicate via the TCP/IP protocol 1624 and the network 96. The basic function of the SP client 1623 is as follows:

(1) The link between the SP server 1633 and the End-to-End is formed via the TCP/IP protocol 1624.

(2) The CaPSL data received from the CaPSL-IV printer driver 1622 is transmitted to the SP server 1633.

(3) When the SP server 1633 scans a manuscript based on the application program 68, the result is received to return to the scanner application program 68. The SP server 1633 runs always as a demon on the SP server device while it waits for being received by a client. The basic function of the SP server 1633 is as follows:

(1) The CaPSL data received from the SP client 1623 is handed to the CaPSL interpreter (corresponding to the PDL interpreter program 84 shown in FIG. 2B).

(2) The manuscript scan program is activated to send the received data to the SP client 1623.

Explanation will be made below as for the structure and method for preparing the initial setting dialog 1503D shown in FIG. 65.

Conventional application programs do not control many parameters regarding printing. Particularly, the parameters that the application program transmits the GDI interface of the Windows are as follows:

(1) Parameter regarding a page buffer memory region used at a drawing time based on GDI.

(2) Parameter regarding a GDI function corresponding to drawing data.

(3) Parameter regarding a print starting command.

As a result, if the GDI-CaPSL conversion driver (conversion program 64) is selected, the meta-file 1562 for the CaPSL is prepared. In response to the result, the WINDOWS's print manager requests the print driver to open the dialog box while it demands an operator to input the following parameters (1) to (3):

(1) The number of printed pages (a default value to a single piece)

(2) The number of pages to be printed (default value to all pages)

(3) Printing order (default value in reverse order (printing order from the last page to the initial page))

The print manager 1566 of the Windows requests the SP client 1569 to transmit the meta-file 1562 of the CaPSL to a specified local SP printer. In response to the result, the SP client 1569 transmits the CaPSL code to the S/P server 1615 via the network (LAN96), instead of transmitting the CaPSL code to the local printer.

Inputting parameters necessary to printing depends on the printer driver. In many cases, the parameters which are troublesome to set every printing time are set on demand from "paper setting" menu, instead of "printing" menu of the Windows. There are paper size (A4/A3), paper feed direction (portrait/landscape) and the like as parameters input in the paper menu. If the printer is a local printer, these parameters work enough. If an output is performed to a network printer, the IP address of the SP server, host computer name, and printer type (a selection of a color laser copying machine or an ink jet color copying machine) are further needed for the SP client 1569.

The initial setting dialog 1569D according to the present embodiment requires the following parameter setting:

| | |
|---|---|
| (1) IP address of SP server | (for example 192.9.200.101) |
| (2) Class | (B) |
| (3) Subnet mask | (255.255.255.0) |
| (4) Default printer type | (CLC/BJ) |
| (5) Communication protocol | (TCP/IP) |

These parameters must be saved in a specific file after setting. The SP client refers to the file at an activating time to set a desired parameter. Following the Windows model, the initial setting dialog 1569D includes "OK" (indicating a setting completion and a file update status) button, "Cancel" (indicating a set value returned to a previous state and a file in no update status) button, and "Option" (indicating that it is needed to open the second dialog) button.

Figure 67:
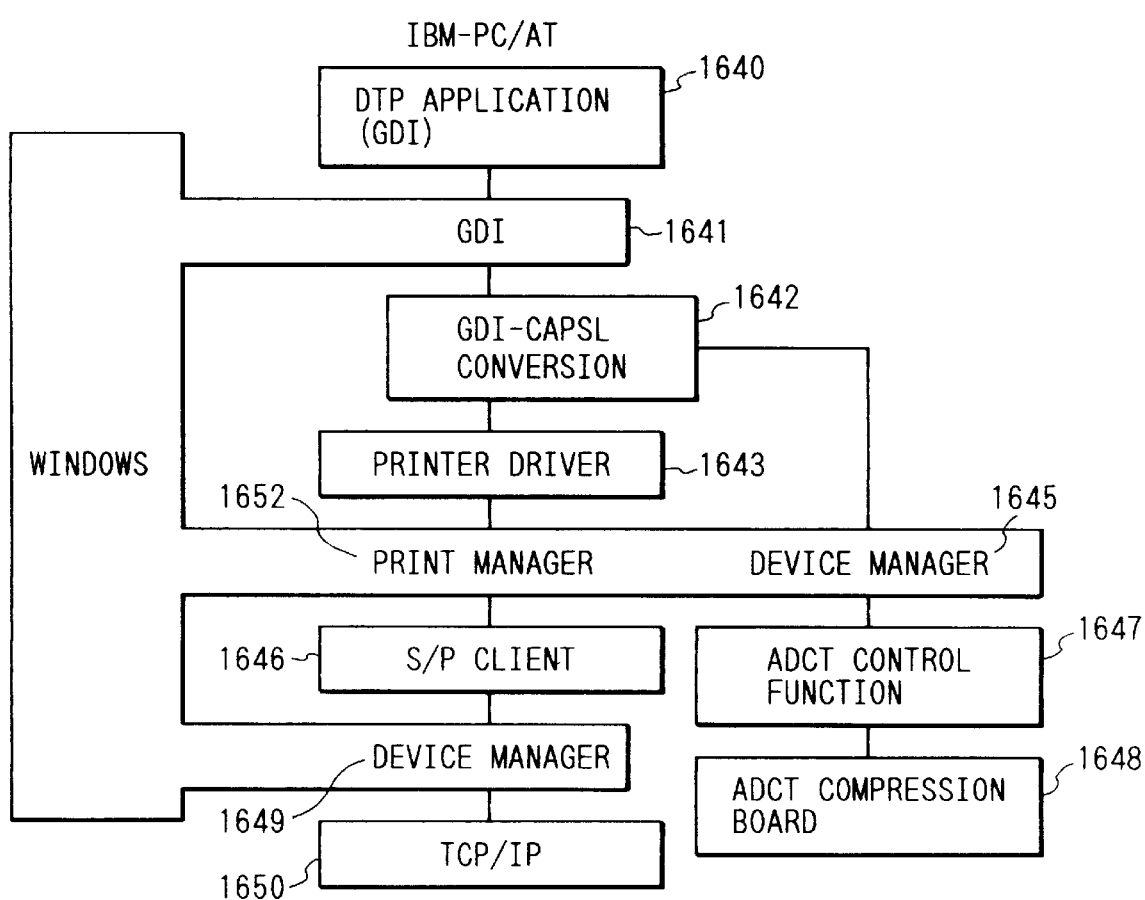
FIG. 67 is an explanatory view illustrating a relation between each driver and windows in the second station shown in FIGS. 2A and 2B.

Referring to FIG. 67, the relationship between the Windows on the second station ST2 and each driver, shown in FIG. 2A, will be explained below.

In the figure, when a printing is started from the DTP application 1640 (corresponding to the application program 66 shown in FIG. 2A), the print manager 1645 (corresponding to the print manager 65 shown in FIG. 2A) is called. The print manager 1645 makes the printer driver 1643 to ensure a drawing memory region and to provide its pointer. The print manager 1645 also informs the application 1640 of the pointer to draw in the GDI format. Hence the application has completed the drawing while the data has been completely handed to the printer driver 1643. The printer driver 1643 converts the GDI functions one by one and in order into the CaPSL code and then stores in a memory. The printer driver 1643 requests the S/P client (corresponding to the communication protocol 63 shown in FIG. 2A) 1646 to transmit the result to the S/P server 1602 (corresponding to 83 shown in FIG. 2B). The S/P client (corresponding to the communication protocol 63 shown in FIG. 2A) 1646 and the S/P server 1602 are coupled via the data transfer protocol to transfer the converted CaPSL code handed down from the printer driver 1643 to the S/P server 1602.

Numeral 1650 represents a communication protocol (corresponding to TCP/IP program 62 shown in FIG. 2A), 1647 represents a compressed (ADCT) control function, and 1648 represents a compressed board. Numeral 1642 represents a GDI-CaPSL conversion routine (corresponding to the conversion program shown in FIGS. 2A and 2B) which converts all drawing functions of the output GDI call of the application into the CaPSL code. The CaPSL in use is one obtained by subjecting the CaPSL-IV to the ADCT expansion.

In the figure, the printer driver 1643 executes a control regarding an interchange of data converted in a part of the GDI-CaPSL conversion routine 1642. In concrete, when the application program issues a function such as Escape (STARTDOC) or Escape (ENDDOC), it returns the parameter requested from the print manager 1652 or controls the command for the driver of the SP client 1646. The printer driver 1643 operates in a draft mode (without Spool). The printer driver 1643 is activated by the GDI1641 and issues a command necessary for the print manager 1652. The printer driver 1643 notifies the GDI module 1644 shown later in FIG. 68 of the process result.

Figure 68:
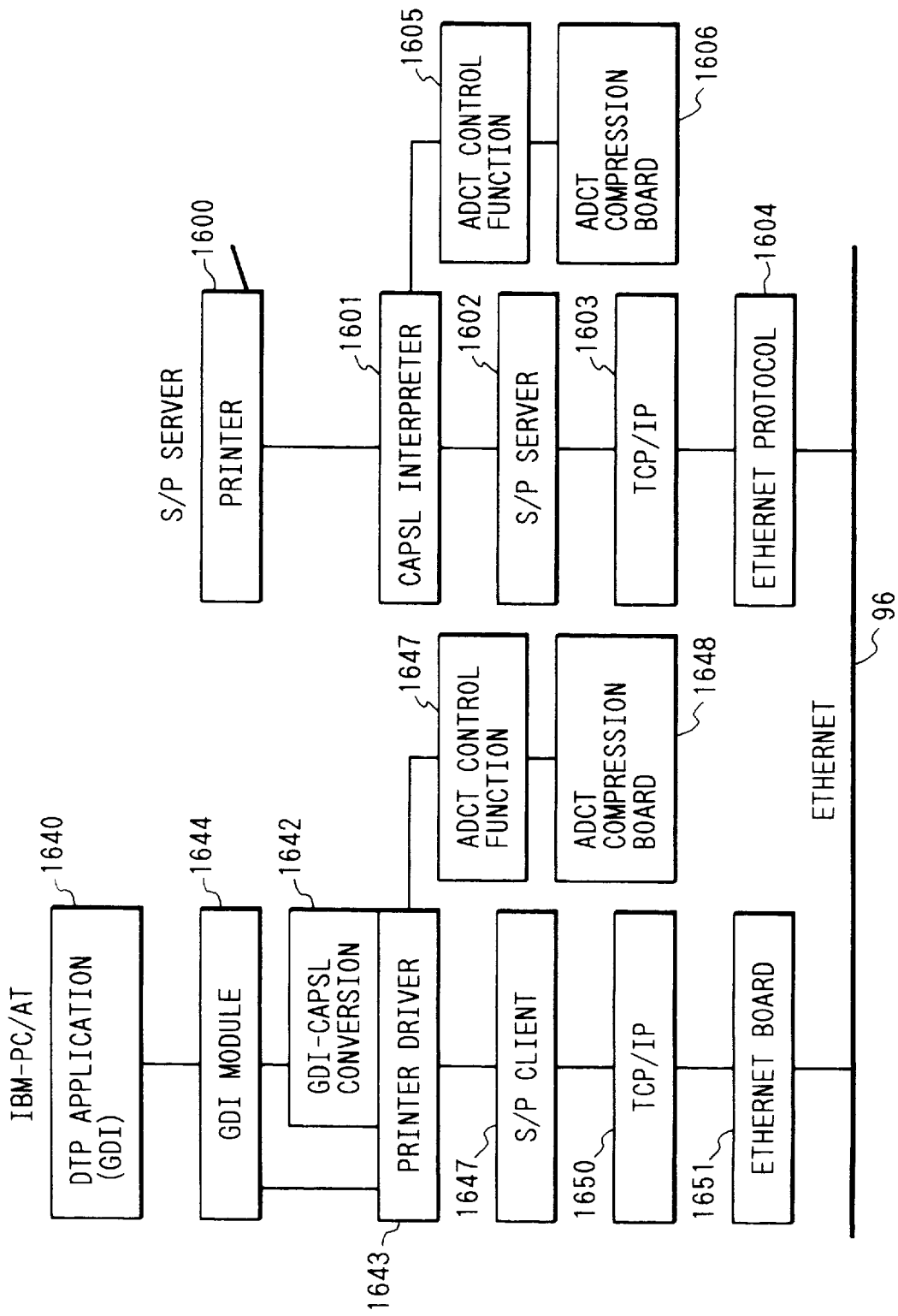
FIG. 68 is an explanatory view illustrating a relation between each driver and an SP server in the second station shown in FIGS. 2A and 2B.

FIG. 68 is a diagram used for explaining the relationship between the SP server on the second station ST2 and each driver, shown in FIG. 2A. Like numerals are attached to elements similar to those in FIG. 67.

In the figure, the driver of the SP client 1647 provides various high-level device manager routines (such as DriverOpen, DriverClose, Control, FSRead, FSWrite, Status, KillIO) requested from the print manager 1652.

Figure 69:
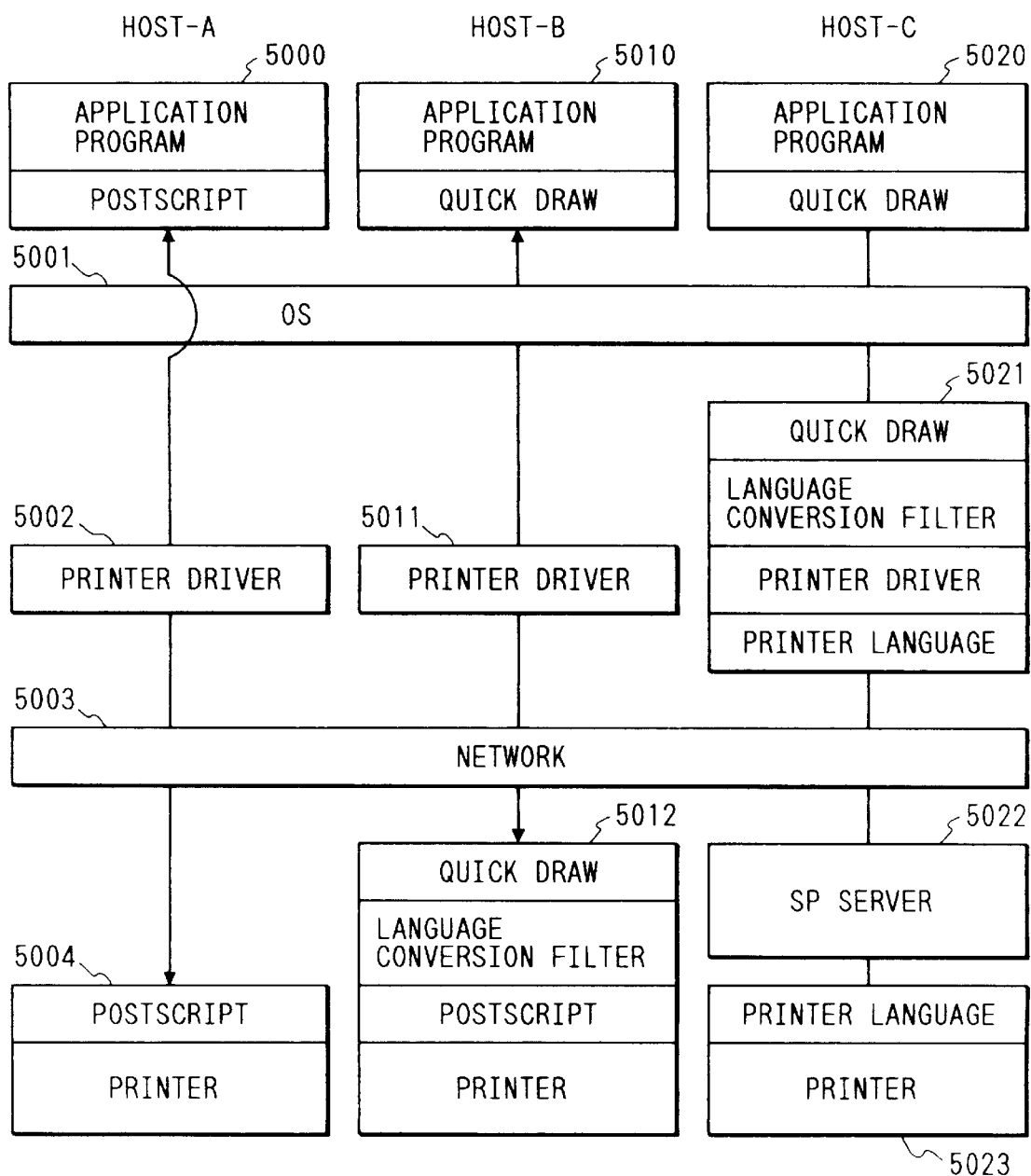
FIG. 69 is a conceptional view illustrating a network printer process of each host shown in FIGS. 2A and 2B.
Figure 70:
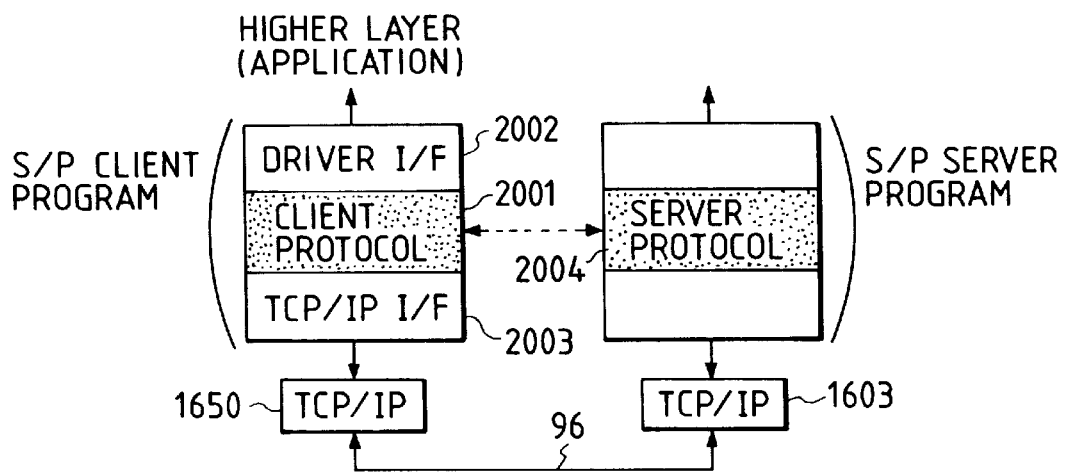
FIG. 70 is a conceptional view illustrating a communication process between an SP client of each host and an SP server of a server device according to the present invention.

FIG. 69 is used to explain a communication process to the SP server of the image information converted by the printer interface of each host computer, with reference to FIG. 70.

FIG. 69 is a conceptual diagram explaining a network printer operating process in each host computer according to the present invention.

The figure shows the case where the host computer HOST-A prints to the printer 5004 corresponding to the PostScript on the network 5003 via the printer driver 5002 from the application 5000 corresponding to the PostScript. The application ranging from the application 5000 to the printer 5004 are entirely unified with the PostScript. In this case, since the application 5000 and the pre-driver 5002 do not execute the print data process via the OS5001, printers other than the printers coping with the PostScript cannot connected to the network 5003.

On the other hand, the host computer HOST-B prints to the printer 5012 corresponding to the PostScript on the network 5003 via both the OS5001 and the printer driver 5011 from the application 5010 corresponding to the Quick-Draw. Particularly, the case corresponds to that the printer 5012 coping with the PostScript executes a printer data operating process of the Quickdraw type using the PostScript emulation function (installed in the printer 5012).

In the host computer HOST-C, the Quickdraw is converted to a specific printer language on the printer driver 5021 from the application 5020 corresponding to the Quickdraw via the OS 5001, and then a specific printer 5023 (such as a color laser copying machine (CLC) and an ink jet color copying machine (IJC) employed as a scanner printer in the present embodiment) which is driven by the SP server 5022 is subjected to a print data process coping with a specific printer language via the SP server 5022 on the network 5003. The printer language (page description language) includes CaPSL (Tradename), LIPS (Tradename), and PCL (tradename). As described above, constructing the printer driver 5021 corresponding to each printer language allows any kinds of printers to constitute a system as a network printer, thus expanding largely printer selection range. That is, a printer can be selected corresponding to the purpose of printing. This feature leads to functioning a suitable printer as a network printer corresponding to color printing classification, printer process rate, and printing cost.

FIG. 70 is a conceptual diagram used for explaining the communication process between the SP server of the server device and the SP client of each host computer according to the present invention. Like numerals are attached to elements similar to those in FIG. 68.

For example, the SP client 1647 shown in FIG. 68 directly writes all commands and data to the TCP protocol 1650B. Conceptually, the SP client 1647 processes so as to communicate with the SP server 1602 connected via the network 96. Hence the End-to-End protocol (client protocol 2001-the server protocol 2004) are needed. In this case, the SP client 1647 and the SP server 1602 provide the communication service for the upper layer through interchanging packets to each other. The packet is classified into a server/client packet and a document control packet.

Particularly, the SP client communication program is divided to the driver interface 2002, the client protocol body 2001, and the TCP/IP interface 1603. The TCP/IP protocol 1650 and the TCP/IP protocol 1603 must be strictly matched with standard. However, the TCP/IP interface 2003 depends on each host machine (IBM host, Mac host, SUN host, and NeXT host).

According to the present embodiment, the client protocol 2001 as the lower layer of the printer driver is connected to the server protocol 2004 via the network 96 to transfer image information, for example, converted in the CaPSL to the SP server device. The image information is printed by a color laser copying machine (CLC) or an ink jet copying machine (IJC) acting as a scanner printer. In this embodiment, a scanner printer is used as an image input/output device. However, an integrated input/output device in a network environment, which is constituted of a copying machine, a FAX, a printer, and other devices, may be used in place of the scanner printer.

Figure 71:
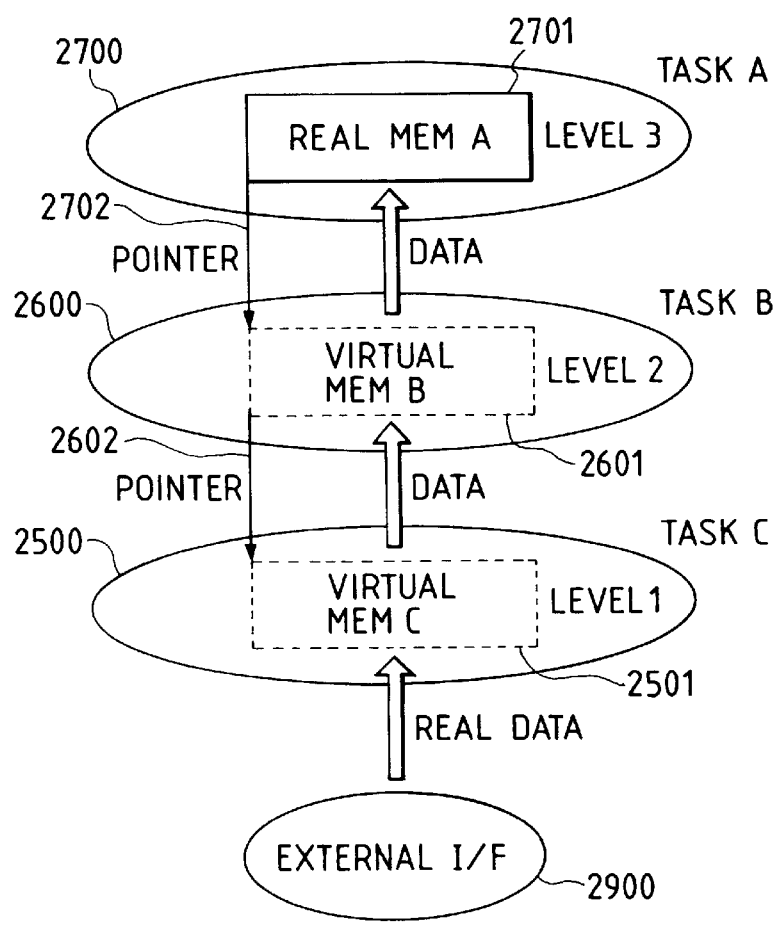
FIG. 71 is a view illustrating an example of a packet procedure step by an SP server shown in FIG. 3.

FIG. 71 is a diagram showing an embodiment of the packet processing procedure of the server device according to the present invention.

In the figure, numerals 2500, 2600 and 2700 represent respectively an independent program process unit (tasks C to A), each corresponding to, for example, the packet process routine of communication program divided every layers. In the present embodiment, each layer is called a level to distinguish the conventional layer concept. For convenience, three levels are explained in the embodiment, but the situation is identical to four and more levels.

As shown in the figure, the task A showing the program process unit 2700 corresponds to the level 3 (LVEL-3); the task B showing the program process unit 2600 corresponds to the level 3 (LVEL-2); and the task C showing the program process unit 2500 corresponds to the level 1 (LVEL-1).

Particularly, the level 1 is a protocol which interchanges directly data to an external interface 2900 via the Ethernet to process mainly tasks relating the network. The level 2 is an intermediate level protocol to process mainly the reliable data interchange between terminals and the network. The level 3 is an upper level protocol to ensure a reliable communication through the End-to-End via the network. In actual, the application is constructed with three levels or more.

According to the communication process of the fifth server device of the present invention, when image information is stored in a buffer memory by executing sequentially the upper communication program from the lower communication program, the lower communication program demands the upper communication program for an expansion address for the image information to the buffer memory, and then makes the buffer memory to expand the image information based on the expansion start address transmitted from the upper communication program to the lower communication program. For that reason, the overhead between communication programs can be suppressed when the image information is transferred and stored to the buffer memory by executing sequentially the process from the lower communication program to the upper communication program.

In concrete, first, when the task C (level 1) receives data from the external interface 2900, it requests the pointer (address) of an actual memory from the task B (level 2), without ensuring an actual reception buffer. The task C writes the received data to a predetermined memory area (virtual memory) with a start address being the pointer received from the task B. The pointer 2602 by which the task B is handed down to the task C may not be the memory pointer actually held by the task B. In the present embodiment, only the task A holds the actual memory 2701. The tasks A and B recognize only that the pointers 2702 and 2602 have been sent to the actual memory 2701. Thus the task B hands down as the pointer 2602 the pointer 2702 received by the task A. In this case, the data 2800 received by the task C is directly written to the actual memory 2701 in the task A. The tasks B and C can be directly referred to the content of the data. Such a configuration can finish an internal read/write operation to a single data reception at a single attempt, thus processing the data at a minimum number of transmission. As a result, comparing to the case where a reception buffer memory is arranged for every task, the process rate (packet communication processing rate) can be greatly increased. In the present embodiment, the packet communication process is executed in program process unit expressed by level, without including any layer structure leading to an obstacle to high speed operation. The details will be omitted on the packet. The packet is defined by a common header for the levels 1 to 3, for example, a 8-byte configuration: protocol, channel, packet type, packet id, modifier, pk size [2]. Only the upper 4 bits of "Packet type" are separated for three levels and the remaining bits are used in common for all levels. Each level processes only the packet sent to itself. However, the packets of other levels can be freely called, but forbidden from writing.

On contrary, in the conventional or usual protocol, all the packets of the upper layers are transmitted by the data packets of the lower layers. However, since the packets of the layer 1, for example, must have respectively the headers of the levels 1 to 3, the transmission efficiency is decreased. Moreover, requiring the header analysis routine causes waste of memory resource and process time. As shown in the present embodiment, if the "Packet type" is of an upper type to itself, the load on the header analysis process can be decreased in each level by transmitting all to the upper level. In the embodiment, the data reception process has been explained as an example. However, it is apparent that the present invention is applicable to the data transmission process.

The color/monochrome printing control operation in an image input/output device connected to the server device according to the present invention will be explained below with reference to the flow chart shown in FIG. 72.

FIG. 72 is a flow chart showing an example of the color/monochrome printing control procedure in the printer (image input/output device) connected to the server device (image input/output control device) according to the present invention. The procedure is executed by the entire system control program 93 shown in FIG. 2B. The CPU 1000 shown in FIG. 9, for example, executes the operation of each of the steps (1) to (11) based on the entire system control program 93.

First, in the step (1), the CPU 1000 judges whether an application program is classified for color or monochrome, from the image information input based on the communication program 83 (1). If the program is a color application program, it is judged whether the print designation is color print or monochrome print in the step (2). If the color print is selected, it is judged whether the printer is a color printer or a monochrome printer in the step (3). If the color printer (for example, a color laser copying machine (CLC)) is selected, the color application program controls the color printer to execute a color printing based on the color print information, in the step (6).

On the other hand, in the step (7), when the step (3) has judged that the printer is a monochrome printer, the color application program controls the monochrome printer to execute a monochrome printing based on the color print information.

When the step (2) judges the monochrome information, it is judged whether the printer designation is a color printer designation or a monochrome printer designation (4). If the color printer (for example, color laser copying machine (CLC)) is selected, the color application program controls such that the color printer executes a monochrome printing based on the monochrome print information in the step (8).

When the step (4) judges that the printer is a monochrome printer, the color application program controls such that the monochrome printer executes a monochrome printing based on the monochrome print information in the step (9).

When the step (1) judges that the application program is a monochrome application program, it is judged whether the printer is selected to color printer designation or monochrome designation (5). When the printer is a color printer (for example, a color laser copying machine (CLC)), the monochrome application program controls such that the color printer executes a monochrome printing based on the monochrome print information (step (10)).

When the step (5) judges that the printer is a monochrome printer, the monochrome application program controls such that the monochrome printer executes a monochrome printing based on the monochrome information in the step (11).

As described above, a monochrome print is finally performed when the color application program specifies a color print setting and a monochrome printer; when the color application program specifies a monochrome print setting and a color printer; when a color application program specifies a monochrome print setting and a monochrome printer; when a monochrome application program specifies a color printer; or a monochrome application program specifies a monochrome printer.

In the above classification, the normal printing is performed when the color application program specifies a monochrome print setting and a monochrome printer, or the monochrome application program specifies a monochrome printer. In other cases, the printing is exceptionally processed because the print setting of the application program is matched with the color and monochrome setting in the printer hardware of the SP server.

The printer connectable to the network is classified into a color printer such as the color laser copying machine (CLC), an ink jet color copying machine (IJC) and a commercially available color printer, and a monochrome printer such as a commercially available page printer and a commercially available line printer.

Explanation will be made below as for the flow of a printing job of the server device according to the present invention with reference to FIG. 73.

FIG. 73 is a diagram used for explaining the flow of the printing job in each image input/output device connected to the server device according to the present invention.

As shown in FIG. 73, an operator of the host machine inputs data to the application program using a pointing device (not shown) such as a keyboard and a mouse. When a printer designation and a print output designation are performed to the host computer, the application program hands down output data and printer designation information to the PDL conversion software (for example, conversion program 54). The PDL conversion software 3001 subjects the data received from the application program to the PDL conversion based on the printer designation information, and hands the PDL converted data to the SP server and the SP client software 3002 (for example, the communication program 53). The SP client software 3002 communicates with the SP server software (communication program 83) 3003 of the SP server via the network (not shown, Ethernet), and transmits the PDL converted data to the SP server software. The SP server software 3003 receives data from the SP client software and notifies that data has been sent to the entire control software (entire system control program 93) 3004. The entire control software 3004 requests the print process software 3005 such as the PDL interpreter program 84 to execute a data process based on the data sent and the state of the SP server. The print process software 3005 processes the requested data so as to be received by the image input device control software (device driver 86) 3007, and then stores the result to the band memory 3006. When the print process software 3005 finishes the process, it informs the entire control software 3004 of the completion. The entire control software 3004 requests the image input/output device control software 3007 to execute a print outputting. The image input /output device control software 3007 reads data from the band memory 3006 and then transmits the data to the image input/output device interface 3008. The image input/output device interface 3008 outputs the data sent from the image input/output device control software 3007 to the scanner printer (image input/output device) such as the printer unit of the color laser copying machine connected to a specified S/P server device. The above process enables the printer on the network specified by the application program for the host computer on the network (the application program of the page description language different from the page description language of the printer on the network) to print out desired data.

Executing a monochrome print finally results in a monochrome output. In this case, the problem is what process recognizes and absorbs the difference in the application program setting, the SP server setting, and the like. In the present embodiment, the color/monochrome process setting in the entire printing process flow can be absorbed by the PDL conversion software 3001, the SP server print process software 3005, and the SP server image input/output device control software 3007 which process output data from the application program on the host side.

As described above, the monochrome print in the monochrome/color printing process will be explained according to the following categories: (1) The color application program specifies a color print setting and a monochrome printer. (2) The color application program specifies a monochrome print setting and a color printer. (3) The color application program specifies a monochrome print setting and a monochrome printer. (4) The monochrome application program specifies a color printer. (5) The monochrome application program specifies a monochrome printer.

First, when the color application program specifies a color print setting and a monochrome printer, the warning displayed in the dialog on the host computer of an operator is, for example, "Color print setting is selected but specified printer is a monochrome printer. Do you print with this printer?". In this case, data from the application program is color data. A color/monochrome conversion is needed because of a monochrome printer. The color/monochrome absorption can be performed by the PDL conversion software 3001 and the print process software 3005. In the case of the monochrome printer, the image input/output device control software unit 3007 can usually perform a color/monochrome conversion. However, the color/monochrome conversion can be performed when the monochrome printer has a color input capability.

In order to absorb with the print process software 3005, the PDL conversion software 3001 recognizes the monochrome print setting and converts the color data into monochrome data at the time of the PDL conversion.

In order to absorb with the print process software 3005, the color data sent is subjected to a monochrome expansion in the band memory according to the designation by the entire control software 3004.

In order to absorb with the image input/output device control software 3007, the entire control software must inform that the band memory 3006 includes the color data because the monochrome printer software is used on the self side. When the data transmission is performed to the image input/output device interface 3008, the color data is converted to the monochrome data.

When the color application program specifies a monochrome print setting and a color printer, the warning displayed in the dialog on the host computer of an operator is, for example, "Monochrome print setting is selected but specified printer is a color printer. Do you print with this printer?". In this case, data from the application program is monochrome data. A color/monochrome conversion is needed because of a color printer. The monochrome/color absorption can be performed by the PDL conversion software 3001 and the print process software 3005. Usually the monochrome/color conversion cannot be performed because the image input/output device control software 3007 is prepared for the color printer. However, the conversion can be performed if the color printer has a monochrome input capability.

In order to absorb with the PDL conversion software 3001, the PDL conversion software 3001 recognizes the color printer designation to converts the monochrome data into color data at the PDL conversion.

In order to absorb with the print process software 3005, the monochrome data sent is subjected to a color expansion in the band memory according to the entire control software 3004.

Furthermore, in order to absorb with the image input/output device software 3007, the entire control software 3004 must transmit that the monochrome data is in the band memory 3006 because the self side is a software for a color printer. When the data transmission is performed to the image input/output device interface 3008, the monochrome data is converted into monochrome data.

When the color application program specifies a monochrome setting and a monochrome printer, the PDL converter 3001 converts in monochrome mode without warning (normally) from the beginning. The print process software 3005 performs at monochrome mode. The image input/output device control software 3007 operates normally.

On the other hand, when the monochrome application program specifies a color printer, the warning displayed in the dialog on the host computer of an operator is "Specified printer is a color printer. Do you print with this printer?". Other process follows the case of the item (2).

When the monochrome application program specifies a monochrome printer, the process described in the item (3) is performed without a warning (normally).

FIG. 74 shows the absorption conditions in the above embodiments. FIG. 74 is a diagram showing the monochrome print absorption condition of each image input/output device shown in FIG. 73.

Referring to the figure, symbol ○ shows the process execution portions of the items (1) to (5). Alphabets a to c show the conditions of the process starting positions including: the print condition specified at a stage near to the host computer (a condition); the print condition specified at the S/P server (b condition); and the print condition specified as the entire data flow and with good efficiency (c condition).

Portions which absorb each process under such conditions are classified as follows:

That is, when the condition a is satisfied, the color (designation)/monochrome (printer) conversion and the monochrome (designation)/color (printer) conversion can be performed with the PDL conversion software 3001 on the host computer side. In this case, the S/P server does not require any special process.

In order to satisfy the condition b, there are four cases: the print process software 3005 performs all color (designation)/monochrome (printer) conversion, and monochrome (designation)/color (printer) conversion; the image input/output device control software 3007 performs all color (designation)/monochrome (printer) conversion, and monochrome (designation)/color (printer) conversion; the print process software 3005 performs a color (designation)/monochrome (printer) conversion; the image input/output device control software 3007 performs monochrome (designation)/color (printer) conversion; and the print process software 3005 performs monochrome (designation)/color (printer) conversion while the image input/output device control software 3007 performs a monochrome (printer) conversion.

Furthermore, in order to satisfy the condition c, the print process software 3005 executes the monochrome/color conversion when the printer is a color printer; when the color application program specifies a monochrome print setting and a color printer, as described in the item (2); or when the monochrome application program specifies a color printer, as described in the item (4).

With the condition a satisfied and the conversion needed, the PDL conversion software 3001 performs a color/monochrome conversion when the printer is a monochrome printer, that is, when the color application program shown in the item (1) specifies a color print setting and a monochrome printer; when the color application program specifies shown in the item (3) specifies a monochrome print setting and a monochrome printer; or when the monochrome application program shown in the item (5) specifies a monochrome printer. In the case of the conversion, all communication data become monochrome PDL converted data. As described above, a monochrome print is performed based on the standard application program. The above conversion timing may be controlled by the CPU in the host computer, the S/P server, or the printer, by comparing the processing capabilities of the host computer, the S/P server, and the printer.

Next, explanation will be made below as for the network process between the specified SP server device SP1 and the station ST3 (UNIX machine) shown in FIG. 2B, with reference to FIGS. 75 to 77.

Figure 75:
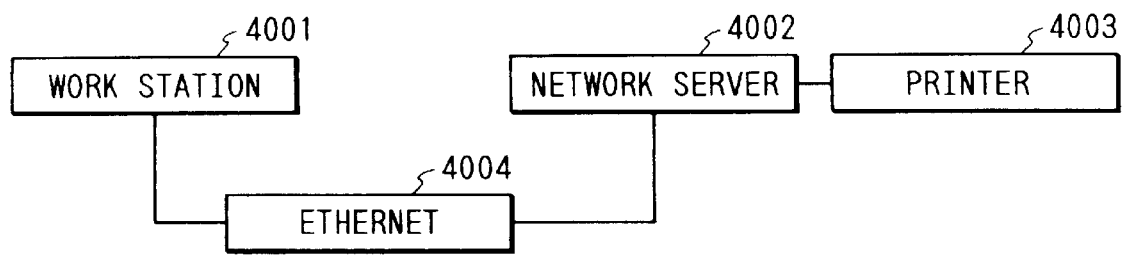
FIG. 75 is a schematic block diagram illustrating a network system between the third station and an SP server device shown in FIGS. 2A and 2B.

FIG. 75 is a block diagram used for generally explaining the network system between the SP server device SP1 and the third station ST3 shown in FIG. 2B.

In FIG. 75, numeral 4001 represents a work station (corresponding to the station ST3 shown in FIG. 2B) constituted of a UNIX machine, and 4002 represents a SP server (corresponding to the communication program 83 shown in FIG. 2B). The SP server 4002 communicates with the work station 4001 via the Ethernet (the Ethernet LAN96 shown in FIGS. 2A and 2B) 4004 as a network, processes the print job requested from the work station 4001, and controls the print output from the printer 4003 specified as the network printer.

Figure 76:
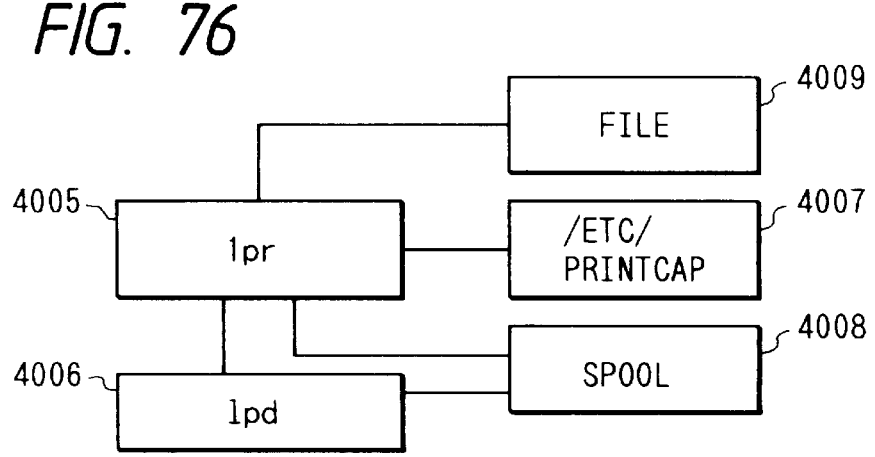
FIG. 76 is a block diagram illustrating a function of a workstation shown in FIG. 75.

FIG. 76 is a block diagram used for explaining the function of the work station 4001 shown in FIG. 75.

In FIG. 75, numeral 4005 represents a print command (1pr) being standard in the UNIX machine, and 4006 represents 1pr program as a print demon (resident program) being standard in the UNIX machine, corresponding to the 1pr/1pd program 90 shown in FIG. 2B. Numeral 4007 represents a printer manager file (/etc/printcap) stored in the external memory device in the work station 4001 which registers the entry of the printer 4003 connected to the SP server 4002. Numeral 4008 represents the spool region in the external memory device temporary storing the control information (control file) at printing and copy (data file) of the content of a file to be printed. Numeral 4009 represents a file stored in the external memory device.

Figure 77:
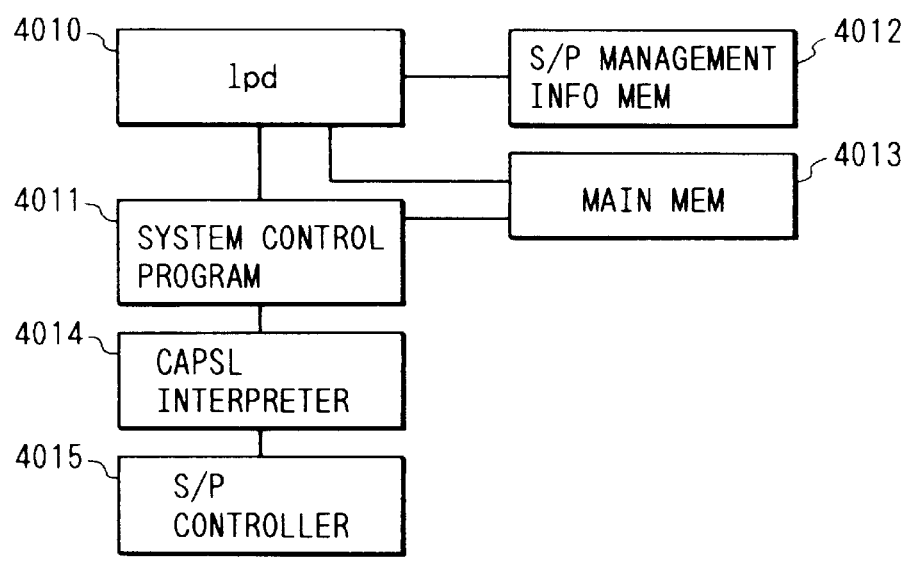
FIG. 77 is a block diagram illustrating a functional structure of an SP server shown in FIG. 75.

FIG. 77 is a block diagram used for explaining the functional configuration of the SP server 4002 shown in FIG. 75.

Referring to FIG. 75, numeral 4010 represents a server 1pd program being the print resident program in the SP server 4002, 4011 represents an entire control software (corresponding to the entire system control program 93 shown in FIG. 2B) in the SP server, and 4012 represents a SP management information memory unit in the SP network server which registers the information of the printer and the scanner connected to the SP server 4002. Numeral 4013 represents a main memory device in the SP server 4002, 4014 represents a CaPSL interpreter (corresponding to the PDL interpreter program 84 shown in FIG. 2B), and 4015 represents a SP controller (device driver 86 shown in FIG. 2B).

The output operation of the printer 4003 will be explained below, which is connected to the SP server using a standard print command 1pr in the UNUX machine.

First, in order to activate the print command (1pr) 4005, the work station 4001 specifies with argument the file name of the file 4009 to be output and the printer name of the printer 4003 to be output registered in the printer management file 4007. The print command (1pr) 4005 prepares a copy as a data file of the file 4009 specified with the argument in the spool region 4008. The control file storing the control information at printing is prepared in the spool region 4008. The printer name specified with argument is transmitted to the print command (1pr) 4005 through 1pd4006. 1pd4006 receives the printer name specified with argument from the print command (1pr) 4005, and transmits a response to the print command (1pr) 4005 after verifying that the printer name is one which is registered in the printer management file 4007.

The operation is ended after responding to the print command (1pr) 4005. After being linked via the SP server 4002 and the Ethernet 4004 as a communication line, the 1pd4006 transmits the printer name registered in the printer management file 4007 to the 1pd4010 running on the SP server 4002. The 1pd4010 receives the printer name to collate with the printer name registered in the SP management information memory unit 4012. Then the 1pd4010 transmits a response to the 1pd4006 and a printer open request to the entire control software 4011.

After performing a necessary setting to the printer, the entire control software 4011 transmits the printer open request response to the 1pd4010. After the 1pd4010 has received the printer request response from the entire control software 4011, it waits for a transmission from the 1pd4006. After receiving a response from the 1pd4010, the 1pd4006 transmits the size and name of the data file prepared in the spool region 4008 to the 1pd 4010. After receiving the size and mane of the data file from the 1pd4006, the 1pd4010 examines whether the main memory device 4013 in the SP server 4002 can obtain a RAN disc larger than the size of the data file. If the RAM disc can be obtained, a response is transmitted to the 1pd4006 after obtaining the RAM disc for the data file. If the RAM disc cannot be obtained, a response is transmitted to the 1pd4006 after obtaining the set value of the default regarding the printer registered in the SP management information memory unit 4012. When receiving a response from 1pd4010, 1pd4006 reads the content of the data file prepared in the spool region 4008 and then transmits sequentially it to the 1pd4010. After all data is transmitted, 1pd4006 transmits a transmission completion to the 1pd4010. 1pd4010 receives the content of the data file from the 1pd4006. If the RAM disc for the data file can be obtained, data file is prepared in the RAM disc to store the content of the received data file. If the RAM for data file cannot be obtained, the content of the received data file is sequentially transmitted to the entire control software 4011. After data having the size of the data file is received and transmitted, a response is transmitted to the 1pd4006. If the RAM disc for the data file cannot be obtained, a print completion is transmitted to the entire control software 4011. When receiving a response from the 1pd4010, 1pd4006 transmits the size and name of the control file prepared in the spool region 4008 to the 1pd4010. When receiving the size of the control file from 1pd4006, 1pd4010 examines whether the RAM disc larger than the size of the control file can be obtained in the main memory device 4013 in the SP server 4002. If the RAM disc can be obtained, a response is transmitted to the 1pd4006 after obtaining the RAM disc for control file. If the RAM disc cannot be obtained, a response is transmitted to the 1pd4006 after obtaining the set value of the default regarding the printer registered in the SP management information memory unit 4012. When receiving the response from 1pd4010, 1pd4006 reads the content of the control file prepared in the spool region 4008 and transmits sequentially it to the 1pd4010. Furthermore 1pd4006 also transmits a transmission completion to 1pd4010 after all control files have been transmitted.

1pd4010 receives the content of the control file from the 1pd4006. If the RAM disc for the control file can be obtained, the control file is prepared in the RAM disk to store the content of the received control file. If the RAM disc for the control file cannot be obtained, the content of the received control file is discarded. When data of the size of the control file is received, a response is transmitted to 1pd4006 after receiving a transmission completion. When receiving the response from 1pd4010, 1pd4006 deletes the data file and control file prepared in the spool region 4008, thus disconnecting the link formed via the SP server 4002 and the Ethernet 4004.

When there is the control file prepared in the RAM disc for the control file, 1pd4010 reads the content to determine a set value regarding the printer. When there is the control file prepared in the RAM disc for the control file, 1pd4010 reads the content of the data file to transmit sequentially it to the entire control software 4011. After the contents of all data files are transmitted, a print completion is transmitted to the entire control software 4011. The entire control software 4011 transmits the content of the data file received from the 1pd4010 to the CaPSL interpreter 4014, and transmits a print request to the SP controller 4015 after executing an image expansion according to the CaPSL. The SP controller 4015 outputs it to the printer 4003 in response to the print request from the entire control software 4011.

Figure 78:
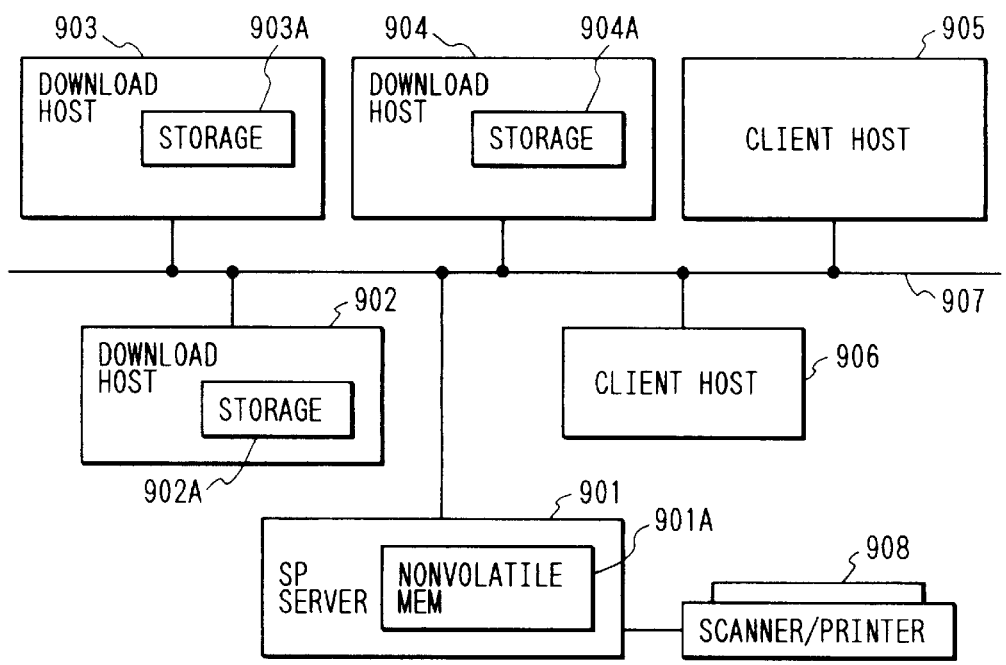
FIG. 78 is a network view illustrating a data load processing between each host and a server device according to the present invention.

FIG. 78 is a network diagram used for explaining the data load process status of the server device and each host according to the present invention.

In FIG. 78, the SP server 901 has the nonvolatile memory 901A to store various lists and programs. The scanner printer (image input/output device) 908 is connected to the SP server 901 via the interface board. Numerals 902 and 903 represent down load host computers (down load hosts) including respectively memory devices 902A and 903A each formed of, for example, a hard disc corresponding to a host computer. The client hosts 905 and 906 produce a print request and a scanner request to the SP server 901 via the network 907.

Figure 79:
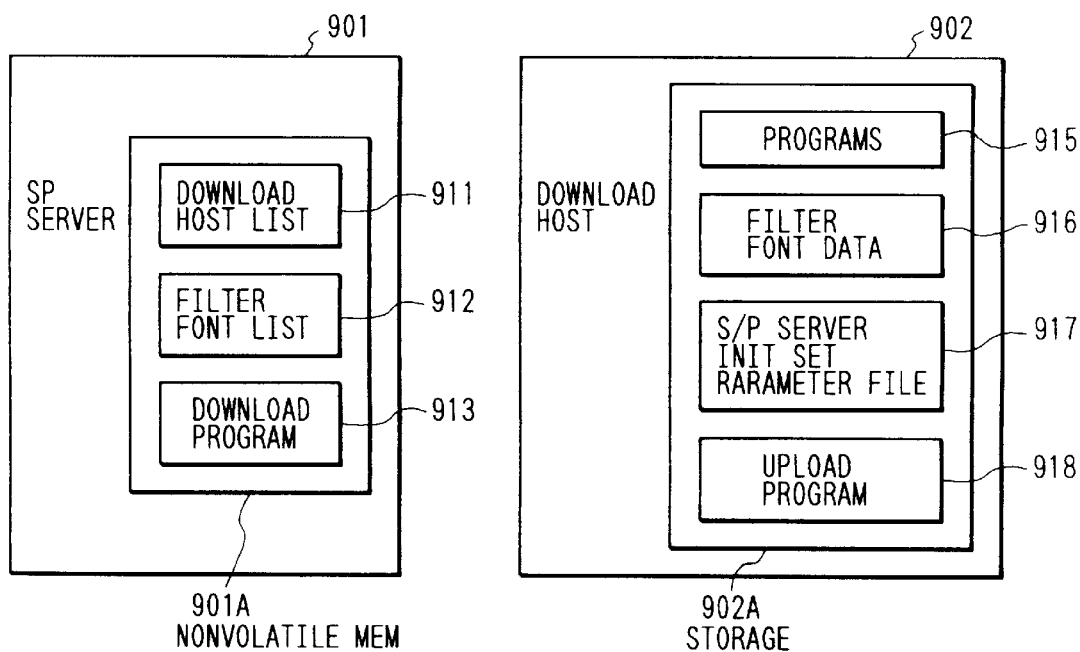
FIG. 79 is a data structural view illustrating a memory information of a down load host and an SP server shown in FIG. 78.

FIG. 79 is a data structural diagram used for explaining the memory information of the SP server 901 and the down load hosts 902 and 903 shown in FIG. 78.

As shown in FIG. 79, the nonvolatile memory 901A of the SP server 901 stores the information list (download hosts 902 and 903 in the present embodiment) of one specific download host or plural download hosts with priority previously prepared by an operator, the filter font information list (filter font list) 912 necessary at printing, and the download program 913. The information list (download host list) 911 of one specific download host or plural download hosts with priority previous prepared by an operator, the filter font information list (filter font list) 912 necessary at printing, and the download program 913 are stored, for example, in a text file form.

On the other hand, the memory device 902A of the download host 902 stores the various programs 915 necessary for the SP server 901 (various programs such as the entire system control program 93 in the SP server SP1 shown in FIG. 2B), the filter and font data (filter font data) 916 necessary at printing, the initial setting parameter filter 917 necessary at the set-up of the SP server 901, and the up-load program 918 which up-loads the items 915 to 917 to the SP server 901.

According to the second server device with the above mentioned structure of the present invention, nonvolatile memory 901A arranged on the body stores host computer designation information to down-load desired information from one specific host computer or plural host computers with priority, a download program to down-load the desired information, font information necessary print process function execution, and print control information necessary for print process function execution. Thus, when desired information from one specific host computer or plural host computers with priority is down-loaded, it is possible to centrally control the varied process of the host computer destination and print control information.

By down-loading both predetermined information and the system program for activating and initializing the server device stored in one specific host computer or plural host computers with priority, it is possible to down-load timely both the predetermined information and the system program, if necessary, for activating and initializing the server device from one specific host computer or plural host computers with priority.

Moreover, by confirming the operational conditions of plural host computers based on host computer destination designation information at setting up a power source and by registering one specific host computer as a master download host computer, it is possible to down-load timely both the predetermined information and the system program, if necessary, for activating and initializing the server device from one specific host computer or plural host computers with priority.

The SP server 901 checks the download host on the network 907 at setting up a power source (described later). When plural download hosts are arranged, one which is in operation and has the top priority acts as a master download host while other download hosts act as a slave host. When a single download host is arranged, its host computer acts as a master download host.

Furthermore, when a download host checking finds that any download hosts have not operated, the fact is recorded, as described later, in the error log file of the SP server 901. Then the download host checking is performed every preset fixed waiting time and till a lapse of a preset maximum waiting period. When the maximum waiting time has passed, the process is finished as a set-up failure.

Various programs, filters, and font data 916 for the SP server 901 stored in the download host are downloaded to the SP server 901 based on the request from the SP server 901, if necessary, at and during the power source set-up of the SP server 901, as described later.

Moreover, the filters and font data 916 downloaded from the download host to the SP server 901 are held in the memory on the SP server 901 till a new filter and font are downloaded based on the filter and font information list previously prepared by an operator.

The parameter file 917 of the SP server 901 previously initialized by an operator, for example a text file, is stored in a predetermined directory in the download host.

Furthermore, the parameter of the SP server 901 stored as a file in the download host has a protocol to memorize a parameter file in a predetermined directory. The protocol establishes an End-to-End session path between the download host and the SP server 901 when a parameter setting change is performed from a terminal (not shown) connected to the SP server 901. The protocol establishes an End-to-End session path between the master download host and the slave download host when a parameter setting change is performed from the slave download host. Thus the parameter file is forwarded from the master download host to the SP server 901 or the slave download host. If there is a change in the parameter, the parameter file is reversely forwarded to the master download host via the session communication path.

The parameter of the SP sever 901 stored as a file in the download host can be changed by the download host itself.

Moreover, the execution of a download and a parameter transfer is tried every predetermined setting time when one specific download host or the master download host is in no operation or the download and parameter file transfer are failed, when there is only a single master download host, or no remaining slave hosts, or when a predetermined maximum waiting time has not passed after recording in the error log file of the SP server 901. The execution of a download and a parameter transfer is tried to the host computer with the next higher priority acting as a master download host if there are remaining slave hosts. When the maximum waiting time has passed, the download host controls to execute an error completion due to the download and parameter transfer failure.

When plural download hosts are set and the parameter file of the master download host is changed, the master download host automatically establishes an End-to-End session path to the slave host to control the slave download host to transfer all the changed parameter file.

Moreover, under the network environment, the SP server 901 includes a download host automatic changing mechanism for an automatic check of a download host at a setup time, a download, and an initial set parameter change, and an automatic transfer mechanism to plural download hosts after changing an initial set parameter.

Figure 80:
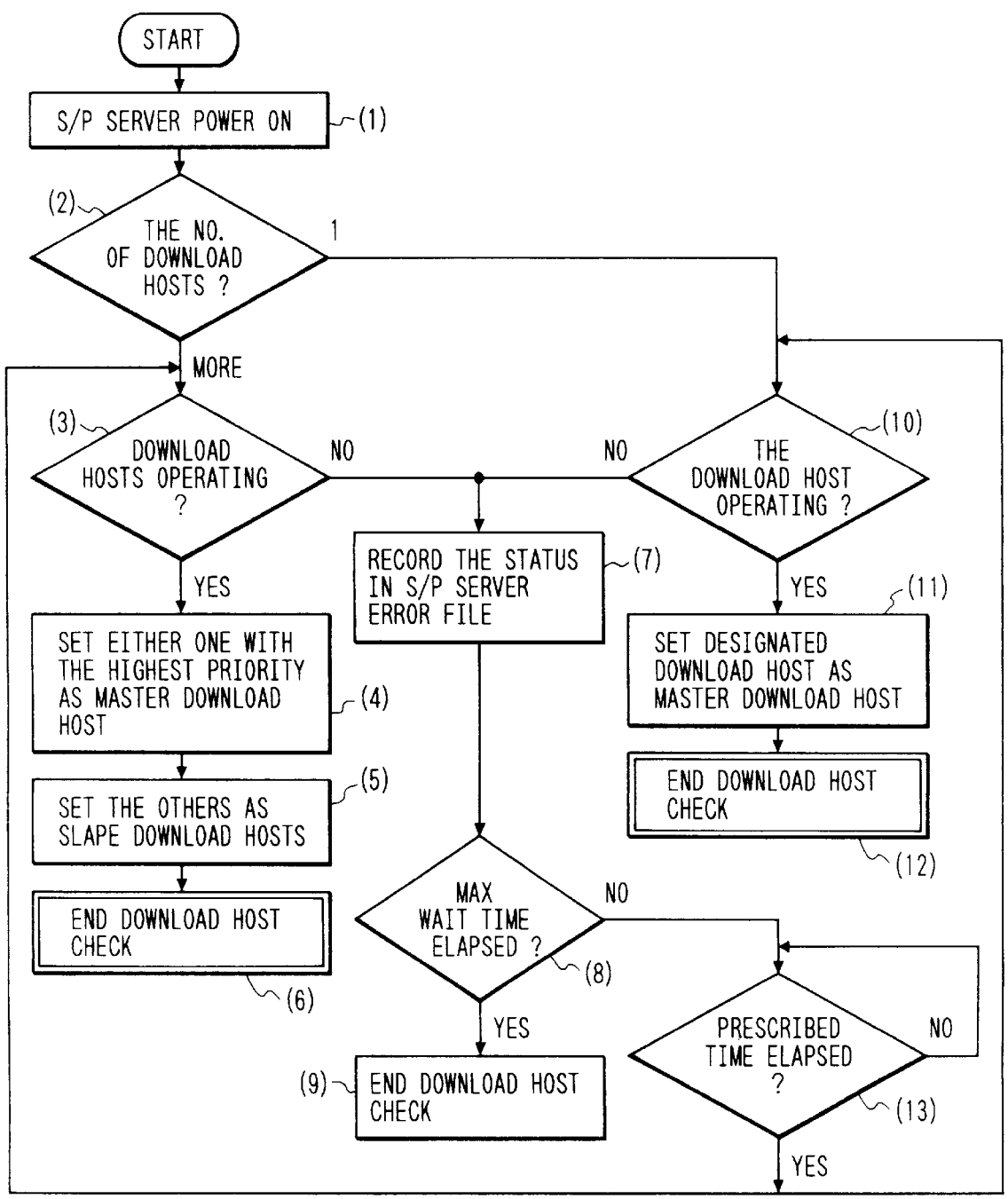
FIG. 80 is a flow chart illustrating an example of a down load host checking process in an SP server shown in FIG. 78.

FIG. 80 is a flow chart showing an example of the download host checking process procedure in the SP server 901 shown in FIG. 78. Numerals (1) to (11) represents steps.

When the SP server 901 is powered on (1), the number of download hosts (for example, one specific download host or plural download hosts) is first judged (2). If the judgment indicates plural hosts, it is judged the download hosts 902 and 903 are in operation (3). If Yes, the host with the highest priority in operation acts as a master download host (4). Other download hosts act as a slave download host (5). The download host checking is completed at a server setup time (6).

When the step (3) judges No, the result is recorded in the SP server error log file (7). Then it is judged whether a predetermined maximum waiting time has passed (8). If Yes, the download host checking is completed at a server setup time (step 9).

During judging in the step (8), the process returns to the step (3) every fixed period to execute the operational check of the download host.

When the judgment in the step (2) recognizes a single host, it is judged whether the download host is running (10). If No, the process returns to the step (7). If Yes, the specified download host acts as a master download host (11). The download host checking is finished at the server setup time (12).

Figure 81:
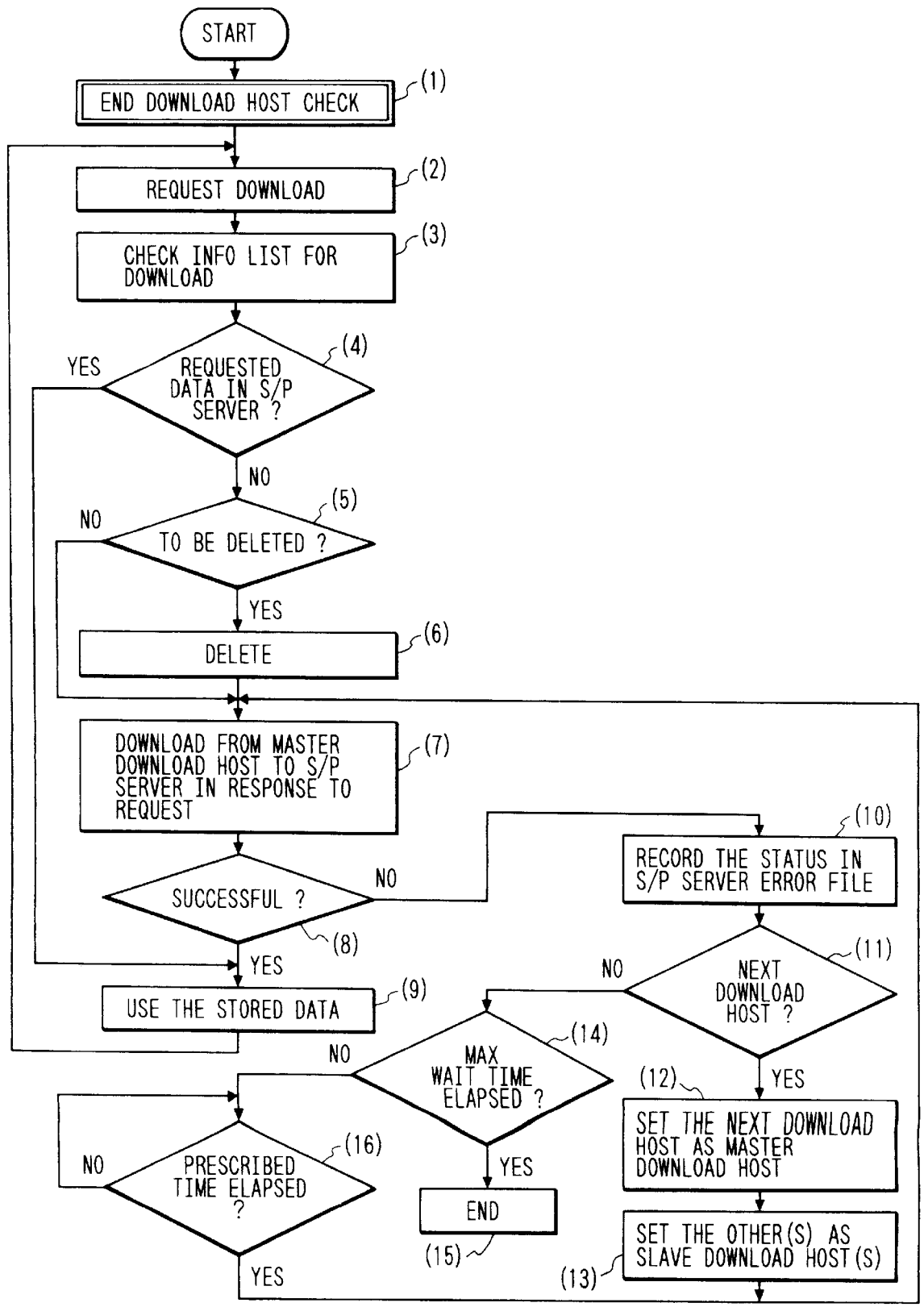
FIG. 81 is a flow chart illustrating an example of a down load processing step of a program, a font and a filter in an SP server shown in FIG. 78.

FIG. 81 is a flow chart showing an example of the download process procedure of various programs 915, fonts and filter data 916 in the SP server 901 shown in FIG. 78. Numerals (1) to (11) represent steps.

When the download host checking is completed at the server power source setup time (1), the download program in the SP server 901 or other SP server program in operation executes the download request of various programs 915, filter, and font data 916 (2) so that the download host information list, filter, and font information list in the SP server 901 are previously checked (3). It is judged whether there is the information corresponding to the download request in the SP server 901(4). If Yes, the process goes to the step (9) to use the program, filter, and font stored. Then when the process goes back to the step (2), the download program becomes an idle state till the next download request occurs.

On the other hand, when the step (4) judges No, it is judged based on the information list whether the information is left in the nonvolatile memory 901A in the current SP server 901. That is, it is judged whether deletion is designated (5). If No, the process goes to the step (7). If Yes, the program, filter, and font currently memorized are deleted (6).

Next, a download request is performed from the SP server 901 to the master download host to download a target from the master download host to the SP server (7). Next it is judged whether the download has succeeded (8). If Yes, the process goes to the step (9). If No, the information is recorded in the SP server error log file (10) to judge whether there is the next download host (11). If yes, the host computer acts as a master download host (12) and the other download hosts act as a slave download host (13). Then, the process goes back to the step (7).

On the other hand, if the step (11) judges No, it is judged whether a predetermined maximum waiting time has passed (14). If Yes, the process is finally processed as a download error (15).

During judging in the step (14), the process returns to the step (7) every fixed period (16) to re-execute the download of a program, filter, font, or the like.

Figure 82:
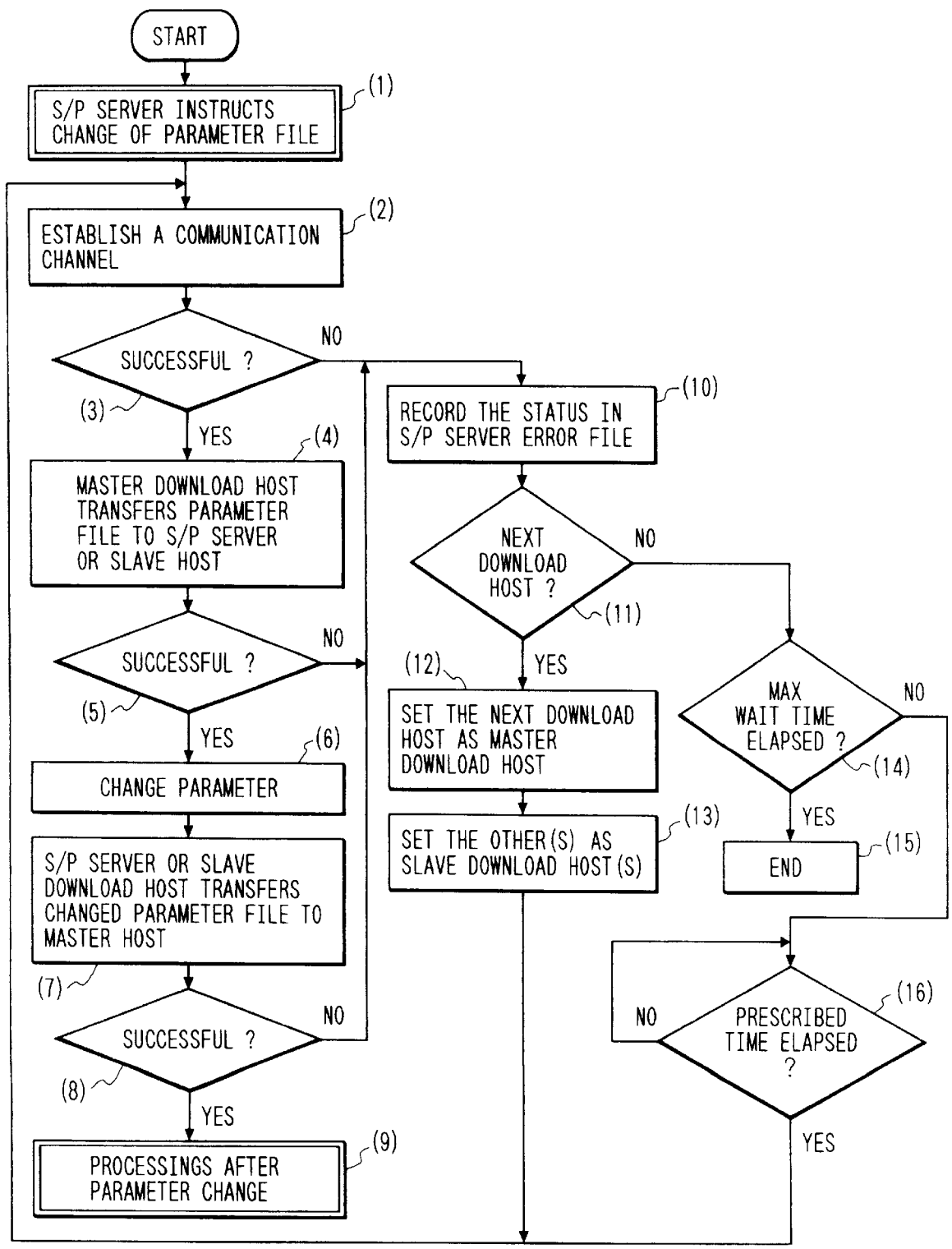
FIG. 82 is a flow chart illustrating an example of an alternation processing step of an initially set parameter file in an SP server shown in FIG. 78.

FIG. 82 is a flow chart showing an example of the changing process procedure of the initial set parameter file in the SP server 901 shown in FIG. 78. Numerals (1) to (16) represent steps. The change designation of the initial set parameter file 917 is performed to a master download host which stores the initial set parameter file 917 from the SP server 901 or the slave download host.

When the change designation of the initial set parameter file 917 is performed from the terminal of the SP server 901 to the master down load host (1), a session communication path is established between the SP server 901 or the slave download host (2). Next, it is judged whether the communication path has been established (succeeded) (3). If Yes, a parameter is forwarded from the master download host to the SP server 901 or slave download host (4). Next it is judged whether the forwarding has succeeded (5). If No, the process goes to the step (10). If Yes, the parameter change is executed from the SP server 901 or the slave download host (6). Next, the changed parameter file is reversely transferred from the SP server 901 or the slave download host to the master download host (7). it is judged whether the forwarding has succeeded (8). If Yes, the process goes to the steps after the parameter changing step (9).

If the steps (8) and (3) judges No, the process goes to the step (10) to record the fact in the SP server error log file. It is judged whether there is the next download (11). If Yes, the next download host acts as a master download host (12) while other download hosts act as a slave download host (13). Then the process goes back to the step (2).

On the other hand, when the step (11) judges No, it is judged whether a predetermined maximum waiting time has passed (14). If Yes, the judgment is finally processed as an parameter change error (15).

During judging in the step (14), the process goes back to the step (2) every fixed period to re-execute the changing process.

Figure 83:
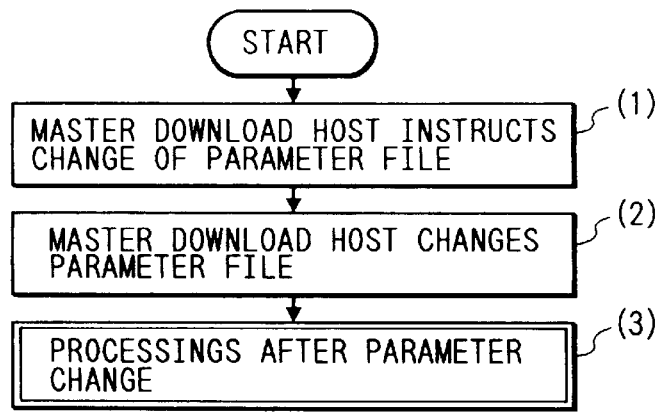
FIG. 83 is a flow chart illustrating an example of an alternation processing step of an initially set parameter file from a down load host of a master shown in FIG. 78.

FIG. 83 is a flow chart showing an example of the changing process of the initial set parameter file from the master download host shown in FIG. 78. Numerals (1) to (3) represents steps.

When the designation for changing the initial set parameter file is issued from the master download host (1), the master download host changes the initial set parameter file 917 on the master download host (2). Then the flow returns to the steps after the changing process.

Figure 84:
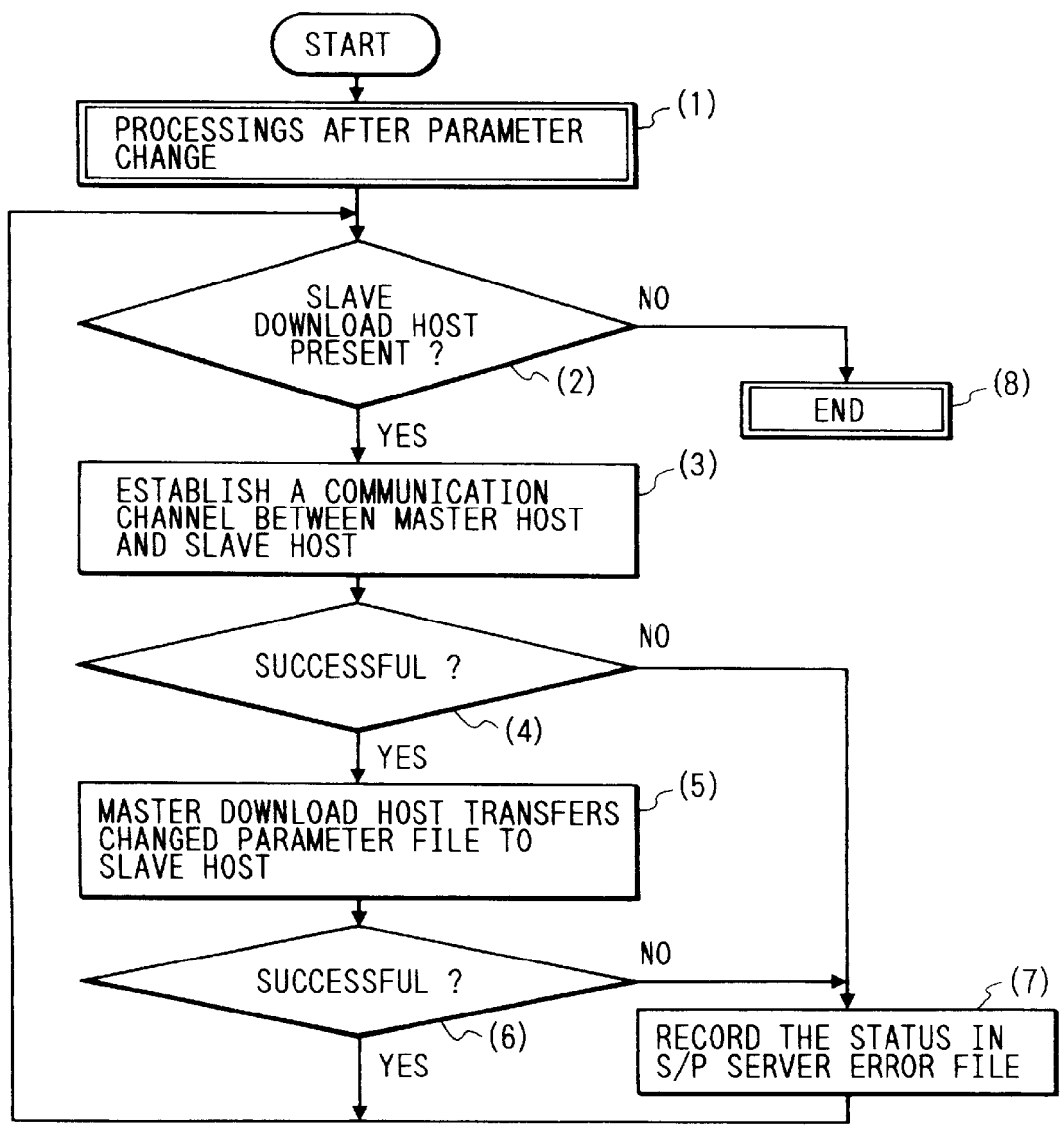
FIG. 84 is a flow chart illustrating an example of a post-alternation processing step of an initially set parameter file from a down load host of a master shown in FIG. 78.

FIG. 84 is a flow chart showing an example of the process procedure after a change in the initial set parameter file by the master download host shown in FIG. 78. Numerals (1) to (8) represent steps.

When the initial set parameter file 917 is changed (1), the master download host judges whether there is a slave download host (2). If No, the process is ended.

On the other hand, if the step (2) judges Yes, the master download host establishes to the slave download host (3). It is judged whether a communication path has been established (4). If No, the process goes to the step (7). If Yes, the changed parameter file is forwarded from the master download host to the slave download host (5). Next it is judged whether the transfer of the parameter file has succeeded (6). If Yes, the process returns to the step (2). If No, the SP server error log file records the fact. The process (2) returns to the step (2) to retrieve the next slave download host.

In the above embodiment, it has been explained that the server device is constituted of a SP server 901 for executing a remote print and remote a scan service. However, instead of the SP server 901, if being used in the download setting network environment, a server device for executing other various processes, for example, a server device for providing an OCR process, facsimile process, document process, and database process to a client can perform a download and a parameter change in the similar manner.

Furthermore, if each machine is in a network environment and the communication between machines can be conditionally established, the above download system can be applied to other devices. For example, it is apparent that the server device function can be applied to other host computer, a scanner printer acting as an image input/output device, or the like.

Figure 85:
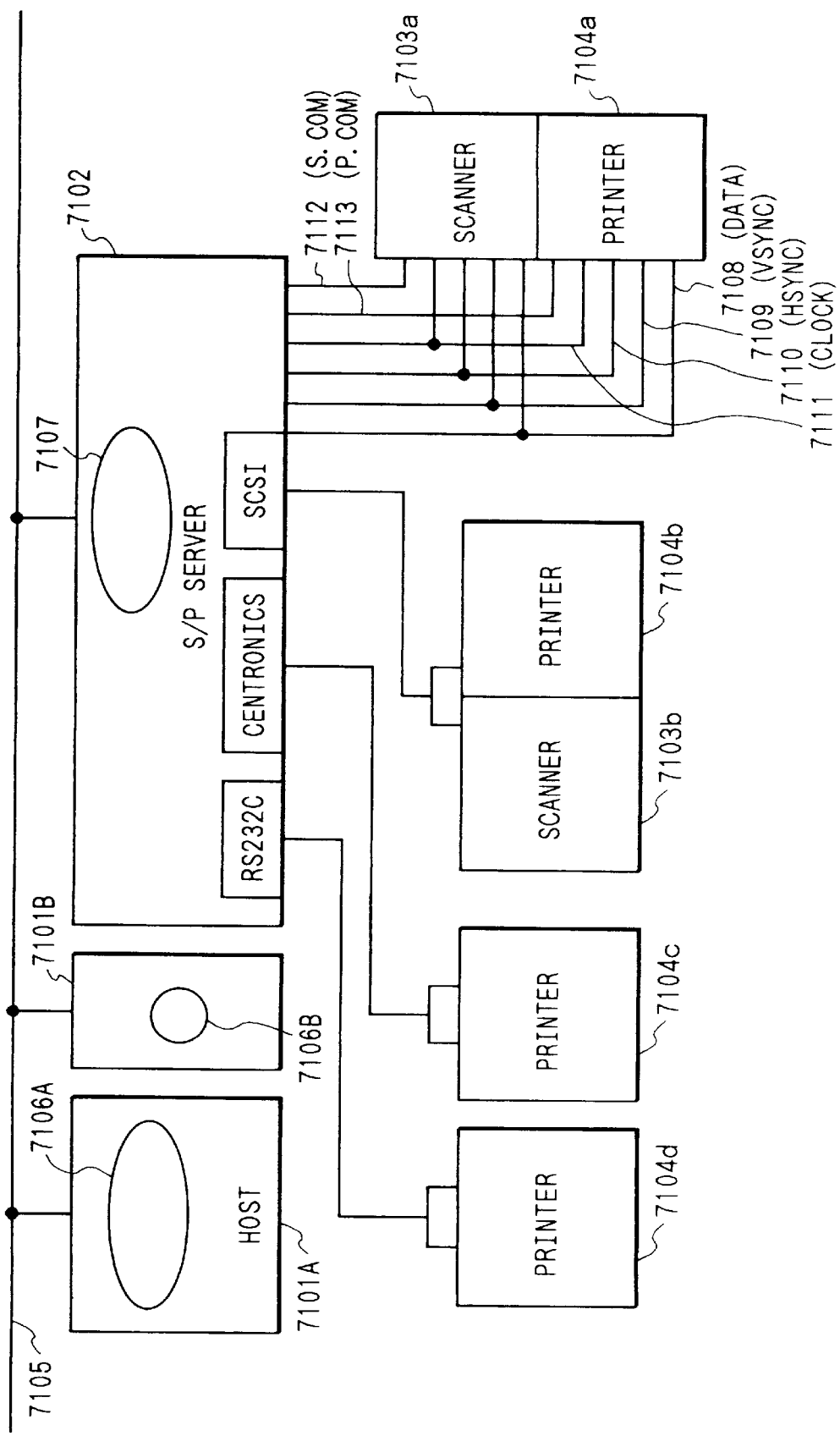
FIG. 85 is a block diagram illustrating a communication control structure of a server device according to the embodiment of the invention.

FIG. 85 is a block diagram used for explaining the communication control configuration of the server device showing an embodiment according to the present invention.

In FIG. 85, the host computers (client) 7101A and 7101B are constituted so as to communicate with the scanner printer server (SP server) via the network 7105. The host computers 7101A and 7101B include the communication protocols 7106A (for example, communication program 53) and 7106B (for example, communication program 63) corresponding to the individual data process rate to execute a mutual communication process to the server protocol (for example, communication program 83) 7107 according to the flow chart (described later). The SP server 7102 includes an interface board (RS232C, centronics, SCSI, or the like) for producing print data received by various printers to control the I/Os of the printers 7104b, 7104c, and 7104d, and the scanner 7103b. The scanner 7103a is integrated with the printer 7104a to execute the scanner function process and the print function process. The control lines 7108 to 7113 produce various control signals to the printer 7104a and the scanner 7103a.

As shown in the figure, in order to execute the scanner function process and the print function process by the host computers 7101A and 7101B on the network 7105, or to utilize the resources of the scanner and the printer, the response time during the communication process (described later) is monitored when information is exchanged at an inquiry to the SP server 7102. At this time, the network 7105 causes a delay to the communication which provides a normal response with a long response time. In this case, by regarding the communication as a normal communication, the feature provides a function that automatically resets the time-out to a longer value.

Figure 86:
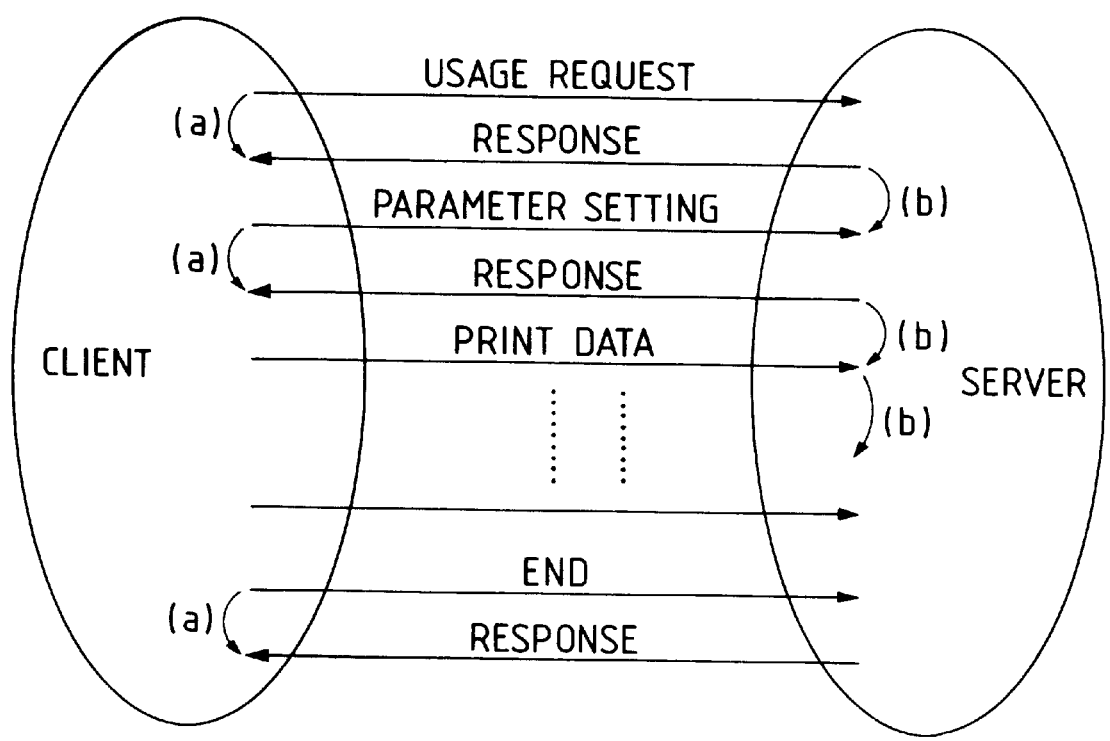
FIG. 86 is a view illustrating an example of the first communication protocol and a client server device shown in FIG. 85.

FIG. 86 is a diagram showing an example of the first communication protocol to the client and server shown in FIG. 85, and particularly the communication for a print process.

As shown in the figure, an elapse of time (a) corresponds to the period that the client protocol 7106A of the host computer 7101A operates the timer T1 to monitor a response time and to automatically make time-out if there is no response from the SP server protocol 7107. The elapse of time (b) corresponds to the response time monitoring period that the SP server protocol 7107 provides the next designation or data to the client protocol 7106A.

As described above, according to the third aspect of the present invention, after issuing a communication command issued based any commands from the server, if a response is not received at a response time exceeding the first monitoring time and the second monitoring time, it is regarded that an abnormal state has occurred in the communication to the client so that the communication state between the server device and the network is automatically returned to a waiting time. Therefore the communication to other host computer can be fast and normally resumed, which requires each function process execution due to printer resources and scanner resources without recovering the host computer in the abnormal communication state.

In concrete, when no response occurs even if the lapses of time (a) and (b) are measured to extend a predetermined monitoring time, the mutual deadlock of the communications can be avoided by breaking the communication in no response state and switching to the waiting state.

In concrete, the SP server 7102 receives a designation from the host computer on the network 7105 to produce the communication command thereto. When a predetermined first timer (for example, 5 second timer) is activated (every communication command issuance) if there is no response from the opposite side after the timer has finished its time measuring operation, the communication command is re-produced. Furthermore, when there is no response after the second timer (for example, 30 second timer) has finished its time measuring operation, the second timer measuring a predetermined number of re-issuance or a period passed from a first issued retransmission command, it is regarded that a fatal failure occurred on the opposite side so that a communication interrupt command (for example, Abort) is produced to wait in an initial state.

In actual, in the SP server 7102, a client protocol is activated on the host computer side on the network 7105. In the SP server 7102, the SP server protocol 7107 is activated. The resources of the scanner and the printer connected to each other are controlled based on the above protocols communicating to each other.

While the SP server 7107 is activated, the timer 110 shown in FIG. 4 is activated. When there are no responses from the SP clients (host computers 7106A and 7106B) over a predetermined period, the communication command is automatically reproduced. When there is no responses from the SP clients (host computers 7106A and 7101B) to a response request from the communication command, the SP server protocol 7107 breaks automatically the communication process program according to the flow chart (described later) to return to the initial state.

In the present embodiment, the above timer process is executed by the watch dog timer function process of the timer process real time OS (VsWorks). In this case, a time out has come, the interrupt control mechanism of the system management in the real time OS (VxWorks) temporarily controls the situation under the OS management and soon notifies the SP manager (system entire control program 93) administering the system management so that a countermeasure against the abnormal system is performed according to the flow chart shown in FIG. 87. The cause of the above system failure includes abnormal communication, system down, memory overflow, or the like in the host computer on the network 7105. However, the cause should not be limited to only the mentioned factors.

Figure 87:
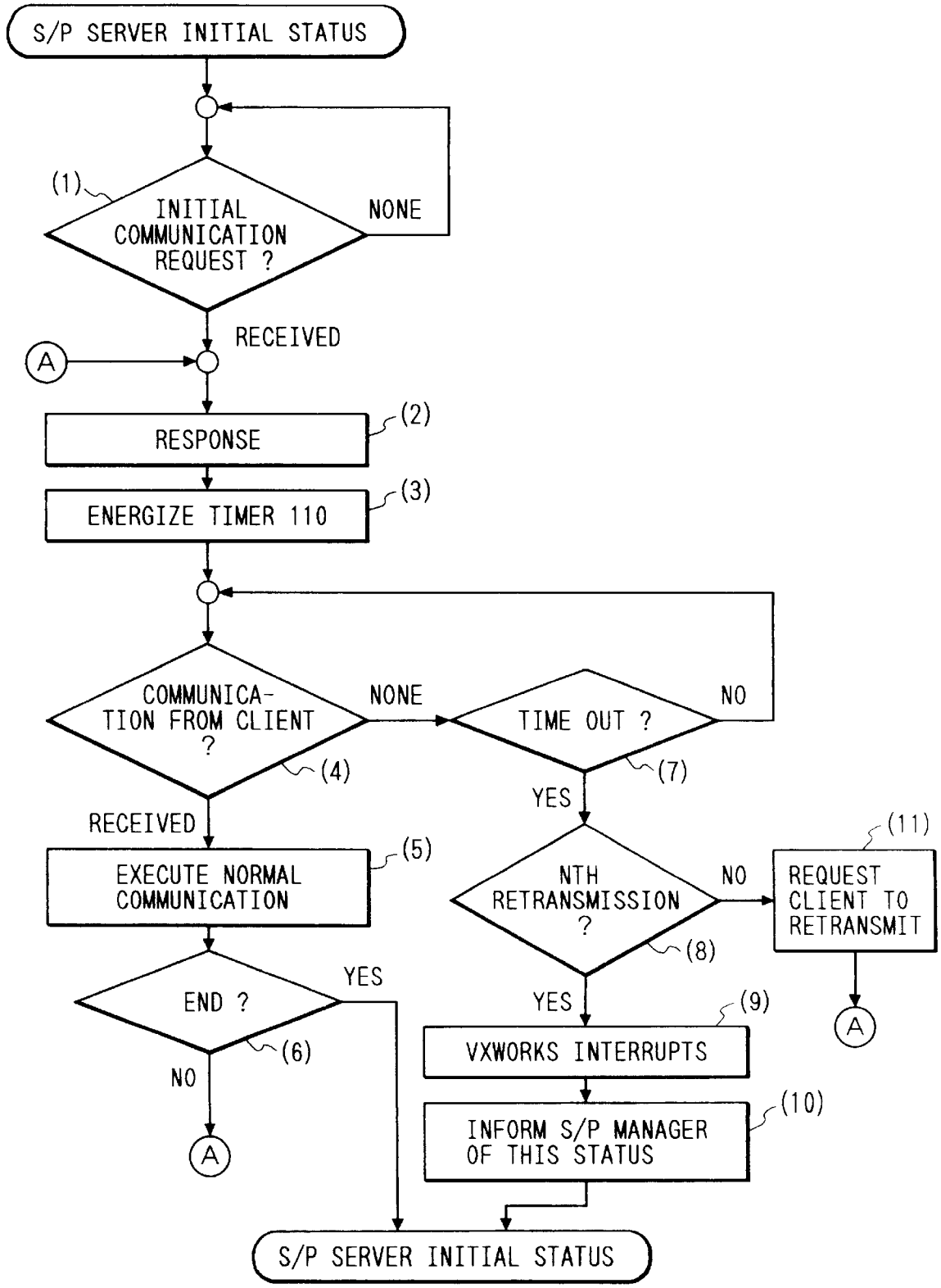
FIG. 87 is a flow chart illustrating a communication control method of a server device according to the embodiment of the present invention.

FIG. 87 is a flow chart used for explaining the communication control method of the server device showing an embodiment of the present invention. Numerals (1) to (11) represent steps. The steps correspond to the timer monitoring communication control procedure (server protocol 7107) of the SP server 7102 shown in FIG. 85. The operation according to each of the steps (1) to (11) is controlled by the CPU 1000.

When an initial communication request from a client via the network 7105 is waited (1) and received, the reception success is sent to the client side (2). Then the timer 110 shown in FIG. 4 is activated (3) to wait for a communication from the client (4). When a communication request is received, a normal communication procedure is started (5) to judge whether an end command has been received (6). If No, the process returns to the step (2). If Yes, the SP server 7102 is set to the initial state.

On the other hand, when the judgment of the step (4) indicates no response, it is judged whether the timer activated in the step (3) has reached a time out (5 seconds in the present embodiment) (7). If No, the process returns to the step (4). If Yes, it is judged whether the response corresponds to the retransmission at a predetermined number (n) (8). If Yes, the interrupt function of the OS (VxWorks in the present embodiment) starts (9). The situation is informed the SP manager 7102 (10) to set it to the initial state.

When there is a response request something in the judgment of the step (8), a rewarding request is sent to the client (12) to return to the step (2).

In the description of the above embodiment, when the SP client and the SP server 7102 during the current communication operation are in abnormal state, a process against the abnormal state is dealt with by using the timer 110 and an internal timer for functioning as time measuring means of the present invention, whereby the SP server 7102 finally returns to the initial state. However, in order to perform the process against the abnormal state, another task may be activated to communicate with the host computer every fixed period so that a communication process is resumed after confirming the return of the host computer.

In the above embodiment, it has been explained that the monitoring time passed after the re-issuance of the communication command is measured with times of the retransmission number (for example, 6 times) of the communication command sent every time the timer 110 times up. However, the communication waiting state may be controlled by measuring the second monitoring time (for example, 30 seconds) by means of the second timer (not shown) when the timer 110 has been timed up, and by producing the communication interrupt command (Abort) when the host computer does not produce a response at a lapse of the second monitoring time.

Figure 88A:
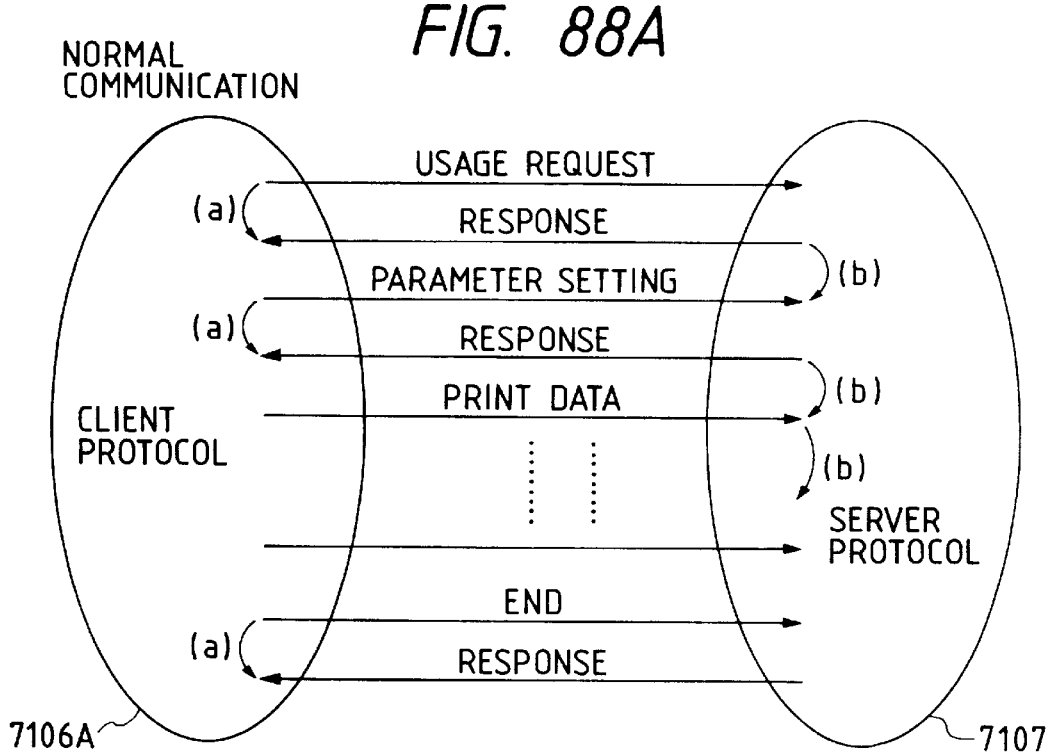
FIGS. 88A and 88B are views illustrating an example of the second communication protocol, a server device and a client shown in FIG. 85.
Figure 88B:
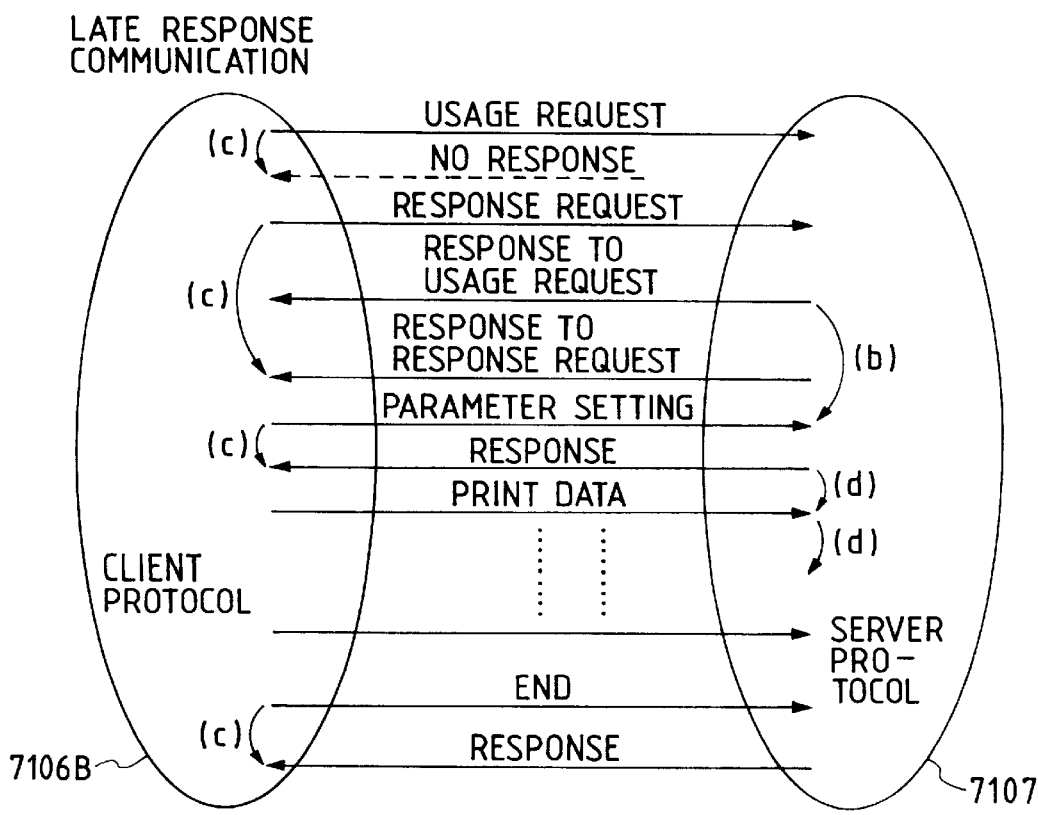

FIGS. 88A and 88B are diagrams showing an example of the second communication protocol for the client and the server shown in FIG. 85. FIG. 88A corresponds to a normal communication state and FIG. 88B corresponds to a communication state with long response time. Particularly the example shows a print process communication.

At a normal communication time shown in FIG. 88A, if there is no response from the SP server protocol 7107A at the lapse time (a), the client protocol 7106A on the host computer 7101A activates the timer T1 to monitor the response time and to automatically times out.

The response time monitoring timer T2 activates at the lapse time (b) until the SP server protocol 7107 produces the next command or data to the client protocol 7106A. In the normal communication process, the monitoring time for measuring at the pointers (a) and (b) is set to a predetermined value. If the monitoring time exceeds the predetermined value, a retransmission request is issued to wait for a response from the opponent side. If there is no response, the communication is regarded as an abnormal state and an anti-abnormality process is performed to switch to the initial state (communication waiting state).

When the communication with long response time shown in FIG. 88B is performed, for example, via a low network or a network communication with many traffic volume, the lapses of time (a) and (b) are determined by the timer activating at the timer set value, in the above mentioned manner. The lapse time corresponds to the time-out state of the timer which is reset in response to the period during which the client protocol 7106B produces a response request and receives a return response when the response from the SP server protocol 7107 is slow. In the similar manner, the lapse time (d) corresponds to the period during which a timer out value is reset to the next command from the SP server protocol in response to the request from the client protocol 7106B.

As described above, according to the fourth aspect of the present invention, in the communication process with the host computer 7106B with long response time, the server device or each host computer measures a response period during which either each host computer or the server device produces a command for measuring a response time on the network. Based on the time measuring result, since the timer monitoring time is extended to measure the normal response period between each host computer and the server device, it is possible to continue normally the later communication process even if the response signal transmission timing becomes long during the communication to each host on each host computer on the network.

For that reason, even if the response time from the opposite side has passed a predetermined time, the monitoring time is adjusted so as to extend the predetermined time without directly regarding as an abnormal communication. The normal communication process can be performed to the communication process with long response period without causing an abnormal communication.

In concrete, the SP server 7102 receives a command from the host computer on the network 7105 and produces a communication command thereto. The predetermined first timer (for example, 5 second timer) activates. After the timer has finished the time measuring operation if there is no response from the opposite side, the communication command is re-produced. After the second timer (for example, 30 second timer), which measures the predetermined number (for example 6 times) of reissuance or the period passed after a retransmission command is first produced, has finished its time measuring operation, if there is no response from the opposite side, it is regarded that there is a fatal failure on the opposite side. Then a communication interrupt command (for example, Abort) is produced to stand by in the initial state.

However, when the host computer and the SP server 7102 are connected to a different network, the time-out period (monitoring period) of the timer is set longer.

In actual, in the SP server 7102, the client protocol is activated to the host computer on the network 7105 while the SP server protocol 7107 is activated to the SP server 7102. The resources of the scanner and the printer connected are controlled based on the program for mutual communication.

In the present embodiment, the SP server 7102 always sends back a response to a resource utilization request (printer request/scan request) from the SP client (host computers 7106A and 7106B). However, when the delay of the network is large, the SP client produces a response request to examine the delay time of the network. The SP server 7102 immediately transmits a response in reception of the response request. The SP client produces a response request to examine the delay time of the network. The SP server 7102 varies the set value of the timer out accordance with the response time to further continue the normal communication. The SP server 7102 measures the time when the next communication comes in response to a response request to vary the timer-out set value of the SP server 7102.

Thereafter, in the manner similar to the normal communication, the protocol of the SP server 7102 is activated, the timer 110 is activated as shown in FIG. 4. When there is no response based on the protocol of the SP client after a lapse of a predetermined time, a retransmission request is automatically produced. If there is no response, the communication is automatically interrupted to return to an initial state.

In the embodiment, the timer process is established by performing the watch dog timer function process of the real time OS (VxWorks). In this case, when the time-out is established, the interrupt control mechanism of the system management in the real time OS (VxWorks) temporarily is under the OS control, and soon is informed the SP manager administering the system management. The system anti-abnormality process is performed according to the flow chart shown in FIGS. 89 and 90 (described later). As the causes of the troubles are listed abnormal communications, system-down, memory overflow, and the like on the host computer side. However other factors may be considered.

Figure 89:
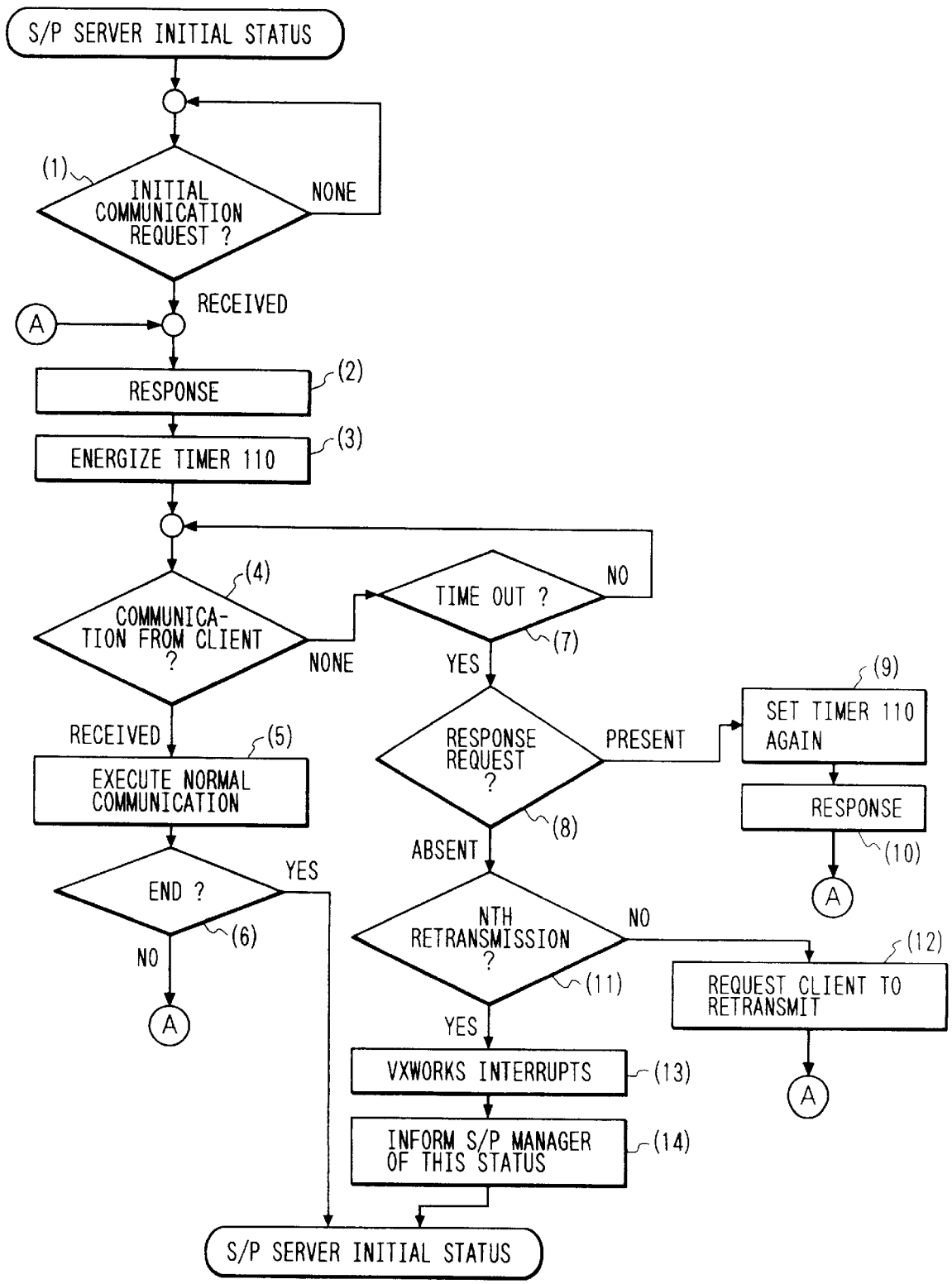
FIG. 89 is a flow chart illustrating the first communication control method of a server device according to the embodiment of the present invention.

FIG. 89 is a flowchart used for explaining the communication control method of the server device showing an embodiment of the present invention. Numerals (1) to (14) represents steps. The flow corresponds to the timer monitor communication control procedure (server protocol 7107) of the SP server 7102 shown in FIG. 85. The operation corresponding to each of the steps (1) to (14) controlled by the CPU 1000.

When the SP server waits for an initial communication request from the client via the network 7105 waits (1) and then receives, the reception success is sent to the client (2) so that the timer 110 shown in FIG. 4 is activated (3) to wait for a communication from the client (4). When a communication request is received, a normal communication procedure is started (5) to judge whether the end command has been received (6). If No, the process returns to the step (2). If Yes, the SP server 7102 is set to the initial state.

On the other hand, when the judgment in the step (4) indicates no response, it is judged whether the timer activated in the step (3) has been timed out (7). If No, the process returns to the step (4). If Yes, it is judged that there is a response request (8). If there is no response, it is judged whether the retransmission is one corresponding to times of the a predetermined number (n) (11). If Yes, the interrupt function of the OS (in the present embodiment, VxWorks) is started (13) to inform the SP manager (14) of the result so that the SP server 7102 is set to the initial state.

On the other hand, when the judgment in the step (8) indicates a response request, the timer 110 is reset to a longer predetermined time (9) to continue the response procedure (10), whereby the process returns to the step (2). If the judgment in the step (11) is No, the retransmission request is sent to the client (12) to return to the step (2).

Figure 90B:
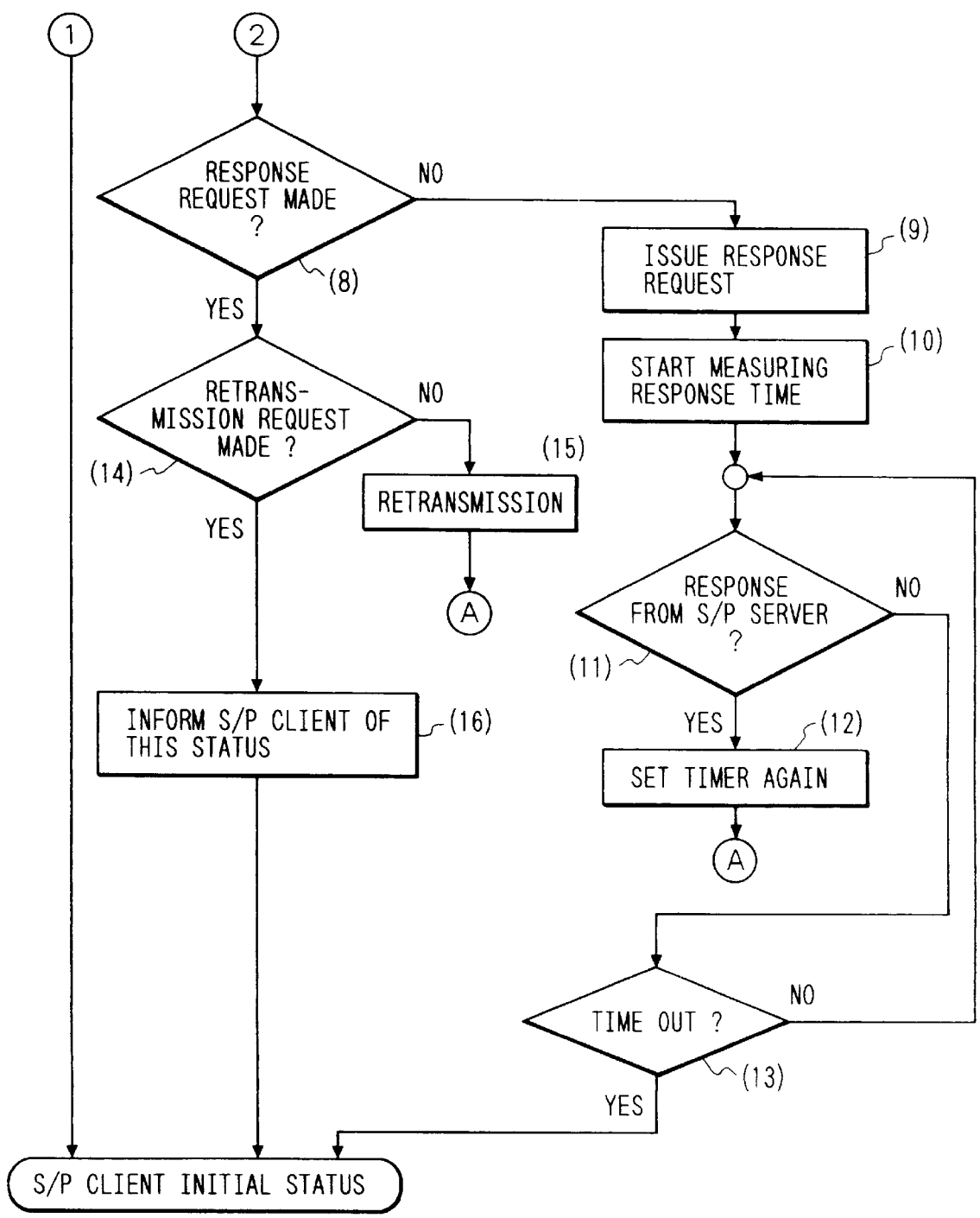
FIG. 90 is comprised of FIGS. 90A and 90B showing flow charts illustrataing the second communication control method of a server device according to the embodiment of the present invention.

FIG. 90 is a flow chart used for explaining the communication control method of the server device showing an embodiment of the present invention. Numerals (1) to (16) represent steps. The flow corresponds to the timer monitor communication control procedure (client protocols 7106A and 7106B) of the client as shown in FIG. 85.

When an initial communication request from the SP server 7101 via the network 7105 is waited (1) and then received, the reception success is transmitted to the SP server 7101 (2). The internal timers of the host computers 7106A and 7106B are activated (3) to wait for a communication from the SP server 7101 (4). When any communication is received, it is judged whether the received command is an end command (5). If No, the next communication procedure is started (6) to go back to the step (2). If yes, the SP client is initialized.

On the other hand, if the judgment of the step (4) is No, it is judged whether the timer activated in the step (3) has timed out (7). If No, the flow returns to the step (4). If Yes, it is judged whether the retransmission request has been made (14). If No, the fact is informed the SP client protocols 7106A and 7106B (16) to initialize the SP client.

If the judgment of the step (14) is Yes, the retransmission procedure is started (15) to return to the step (2). If the judgment of the step (8) is No, the response request is issued to the SP server 102 (9) to start measuring the response time (10). Next, it is judged whether a response has been received from the SP server 7102 in the response waiting state (11). If Yes, the timer is set to a longer predetermined time (12) to return to the step (2).

If the step (11) judges No, it is judged whether the internal timer for measuring a response period has been timed out (13). If No, the flow returns to the step (11). If Yes, the SP client is initialized.

In the explanation of the above embodiment, when the current communication between the SP client and the SP server 7102 becomes an abnormal state, the time measuring means (a timer 110, an internal timer, and the like) deals with the trouble so that the SP server 7102 is finally initialized. However, in order to execute an anti-abnormality process, another task may be activated to communicate with the host computer every predetermined time, whereby the recovery of the host computer is confirmed to resume the communication process.

As described above, according to the first embodiment, when the print driver converts the image information converted based on the a printer interface peculiar to each host into the image information based on the printer language for the input/output device connected to the server device, the image information based on the printer language for an image input/output device transfers via the network. As a result, the image information according to a printer language process system peculiar to each host computer can be communicated at a high speed on a network based on a commercially available application on a host, without being limiting by the printer language process system of the image input/output device connected to the server device.

According to the second embodiment, in a host computer or a nonvolatile memory on a predetermined network are stored the host computer destination designation information to download predetermined information from a specific one host computer or plural host computers with priority, various download programs to download the desire information, font information necessary to the print function process execution, and print control information necessary to the print function process execution. Therefore, the process for changing the host destination or print control information can be centrally controlled when desired information is downloaded from the specific one host computer or plural host computers with priority.

According to the third embodiment, after a communication command is produced based on any instruction from the server device when a response is not received after a lapse of the first monitoring time and the second monitoring time, it is regarded that a trouble has occurred in the communication to the host computer and the communication between the server device so that the network is automatically recovered to a waiting state. Thus the communication can be begun normally and at high speed to another host which requires each function process execution using printer resources and scanner resources, without waiting the recovery of the host computer in an abnormal communication state.

According to the fourth embodiment, the server device or each host computer measures a response period passed after the time when each host computer or the server device has issued a command for measuring a response time on the network, and the timer monitoring time for measuring the normal response time between each host computer and the server device based on the time measuring result is extended. Therefore the later communication process can be normally continued even if the transmission timing of the response signal is prolonged in the communication to each host computer on the network.

According to the fifth embodiment, when the CPU executes continuously from the high level communication program to the low communication program to store the image information in the buffer memory, an expansion start address for the buffer memory to the image information is demanded from the high level program to the low level program, so that the image information is expanded to the buffer memory based on the low level communication program based on the expansion start address transmitted from the high communication program to the low communication program. Therefore the overhead between communication programs can be suppressed when the image information is transferred and stored to the buffer memory by continuously executing the communication programs from high level to the low level.

The server device can match the difference between the language specification for each host and the language specification for each image output device; moderate largely the limitation of the host computer in the system structure and the limitation of the image output device, particularly a printer device; and improve the degree of freedom of the system structure.

One of plural host computers on the network can be controlled as a master download host or a slave download host while a change in parameters necessary to an initial operation can centrally controlled. Therefore even if a download error, parameter change information error, or the like occurs on the network, the system state can be normally recovered by obtaining necessary information from the slave download host with reference to a registered host destination designation information. The state can be instantaneously recovered, in which the print service and scanner service to another host are interrupted due to a communication error between an arbitrary host computer and a server device. Therefore, the failure resistance of the server device can be largely improved in the printer service and scanner service. Furthermore, the network structure including server devices can be simplified while the memory resources distributed on the network can be effectively put in service at low cost.

Moreover, even if a response time from each host computer according to a communication command is prolonged, the situation can be automatically recovered to a waiting state by avoiding the conventional deadlock state and interrupting the communication after a lapse of a predetermined monitoring time, whereby resuming a communication process to another host can be assured.

When the monitoring time of the response signal returned in accordance with the communication state is prolonged, the normal communication process can be continued on the network.

Moreover, there is good advantage in that while color image information requested by each host computer is subjected to a high speed packet transmission, a desired image process can be effectively performed.

The image input/output device may be an integrated input/output device in a network environment which is constituted of a copying machine, FAX, printer, and similar elements. The function of the image input/output control device (server device) according to the above embodiment may be undertook by a host computer or a image input/output device (integrated input/output device). For example, various programs in the SP1 in FIG. 2A are stored in a floppy disc or a hard disc. The disc may be mounted to the host computer or the image input/output device, or may be previously arranged in the memory of the host computer or the image input/output device. It is apparent that such usage can provide an operation similar to the various operations mentioned above.

What is claimed is:

1. An input/output apparatus, connected to first and second host computers via a network, for executing a scanning function and for executing a printing function, said apparatus comprising:

reception means for receiving data for a job from the first and second host computers through a network interface;

determining means for determining whether a job corresponding to the data received by said reception means is a print job or a scan job;

memory means for storing the printing job or the scan job;

generating means for generating output data from print data received from the first host computer via the network, and printing the generated output data by executing the printing function on the print job stored in said memory means, when said determining means determines that the job is the print job from the first host computer; and sending means for, in response to command data received from the second host computer via the network, obtaining input data by executing the scanning function on the scan job stored in said memory means, and sending the obtained input data to the second host computer via the network, when said determining means determines that the job is the scan job from the second host computer, wherein said memory means is able to store the print job from the first host computer and the scan job from the second host computer at the same time.

2. An apparatus according to claim 1, wherein said apparatus is a copying machine.

3. An apparatus according to claim 1, wherein the print data comprises data written in a page description language.

4. An apparatus according to claim 1, further comprising command receiving means for receiving the command data from the second host computer via the network.

5. An apparatus according to claim 1, further comprising connection means for establishing a connection with the network to receive the print data from the first host computer and to send the input data to the second host computer.

6. An apparatus according to claim 1, wherein the print data is generated by a printer driver.

7. An apparatus according to claim 1, wherein the print data comprises image data.

8. An apparatus according to claim 1, further comprising job management means for managing an order in which the print job and the scan job are executed.

9. A control apparatus for an input/output apparatus which is connected to first and second host computers via a network and executes a scanning function or a printing function, said control apparatus comprising:

reception means for receiving data for a job from the first and second host computers through a network interface;

determining means for determining whether a job corresponding to the data received by said reception means is a print job or a scan job;

memory means for storing the printing job or the scan job;

first control means for generating output data from print data received from the first host computer via the network, sending the generated output data to the input/output apparatus, and controlling the input/output apparatus to print the sent output data by executing the printing function on the print job stored in said memory means, when said determining means determines that the job is the print job from the first host computer; and second control means for, in response to command data received from the second host computer via the network, controlling the input/output means to obtain input data by executing the scanning function on the scan job stored in said memory means, and sending the obtained input data to the second host computer via the network, when said determining means determines that the job is the scan job from the second host computer, wherein said memory means is able to store the print job from the first host computer and the scan job from the second host computer at the same time.

10. An apparatus according to claim 9, wherein the input/output apparatus is a copying machine.

11. An apparatus according to claim 10, wherein said control apparatus intervenes between the host computers and the copying machine.

12. A control apparatus according to claim 9, wherein the print data comprises data written in a page description language.

13. A control apparatus according to claim 9, further comprising command receiving means for receiving the command data from the second host computer via the network.

14. A control apparatus according to claim 9, further comprising connection means for establishing connection with the network to receive the print data from the first host computer and to send the input data to the second host computer.

15. A control apparatus according to claim 9, wherein the print data is generated by a printer driver.

16. A control apparatus according to claim 9, wherein the print data comprises image data.

17. A control apparatus according to claim 9, further comprising job management means for managing an order in which the print job and the scan job are executed.

18. An input/output method, for use in an input/output apparatus connected to first and second host computers via a network, for executing a scanning function and for executing a printing function, said method comprising the steps of:

receiving data for a job from the first and second host computers through a network interface;

determining whether a job corresponding to the data received in said receiving step is a print job or a scan job;

storing, in memory, the printing job or the scan job;

generating output data from print data received from the first host computer via the network, and printing the generated output data by executing the printing function on the print job stored in said storing step, when said determining means determines that the job is the print job from the first host computer; and in response to command data received from the second host computer via the network, obtaining input data by executing the scanning function on the scan job stored in the memory, and sending the obtained input data to the second host computer via the network, when it is determined in said determining step that the job is the scan job from the second host computer, wherein the memory is able to store the print job from the first host computer and the scan job from the second host computer at the same time.

19. A method according to claim 18, wherein the input/output apparatus is a copying machine.

20. A method according to claim 18, wherein the print data comprises data written in a page description language.

21. A method according to claim 18, further comprising the step of receiving the command data from the second host computer via the network.

22. A method according to claim 18, further comprising the step of establishing a connection with the network to receive the print data from the first host computer and to send the input data to the second host computer.

23. A method according to claim 18, wherein the print data is generated by a printer driver.

24. A method according to claim 18, wherein the print data comprises image data.

25. A method according to claim 18, further comprising the step of managing an order in which the print job and the scan job are executed.

26. A control method for use with a control apparatus for an input/output apparatus which is connected to first and second host computers via a network and executes a scanning function or a printing function, said control method comprising the steps of:

receiving data for a job from the first and second host computers through a network interface;

determining whether a job corresponding to the data received in said receiving step is a print job or a scan job;

storing, in memory, the printing job or the scan job;

controlling the input/output apparatus to generate output data from print data received from the first host computer via the network, sending the generated output data to the input/output apparatus, and controlling the input/output apparatus to print the sent output data by executing the printing function on the print job stored in said storing step, when it is determined in said determining step that the job is the print job from the first host computer; and in response to command data received from the second host computer via the network, controlling the input/output means to obtain input data by executing the scanning function on the scan job stored in the memory, and sending the obtained input data to the second host computer via the network, when it is determined in said determining step that the job is the scan job from the second host computer, wherein the memory is able to store the print job from the first host computer and the scan job from the second host computer at the same time.

27. A method according to claim 26, wherein the input/output apparatus is a copying machine.

28. A method according to claim 27, wherein the control apparatus intervenes between the host computers and the copying machine.

29. A method according to claim 26, wherein the print data comprises data written in a page description language.

30. A control method according to claim 26, further comprising the step of receiving the command data from the second host computer via the network.

31. A control method according to claim 26, further comprising the step of establishing a connection with the network to receive the print data from the first host computer and to send the input data to the second host computer.

32. A control method according to claim 26, wherein the print data is generated by a printer driver.

33. A control method according to claim 26, wherein the print data comprises image data.

34. A control method according to claim 26, further comprising job management means for managing an order in which the print job and the scan job are executed.

35. A storage medium for storing a program executed in an input/output apparatus which is connected to first and second host computers via a network and executes a scanning function or a printing function, the program comprising:

code for receiving data for a job from the first and second host computers through a network interface;

code for determining whether a job corresponding to the data received through execution of said code for receiving is a print job or a scan job;

code for storing, in memory, the printing job or the scan job;

code for generating output data from print data received from the first host computer via the network, and printing the generated output data by executing the printing function on the print job in the memory, when execution of said code for determining results in a determination that the job is the print job from the first host computer; and code for, in response to command data received from the second host computer via the network, obtaining input data by executing the scanning function on the scan job stored in the memory, and sending the obtained input data to the second host computer via the network, when execution of said code for determining results in a determination that the job is the scan job from the second host computer, wherein the memory is able to store the print job from the first host computer and the scan job from the second host computer at the same time.

36. A storage medium according to claim 35, wherein the input/output apparatus is a copying machine.

37. A storage medium according to claim 35, wherein the print data comprises data written in a page description language.

38. A storage medium according to claim 35, wherein the program further comprises code for receiving the command data from the second host computer via the network.

39. A storage medium according to claim 35, wherein the program further comprises code for establishing a connection with the network to receive the print data from the first host computer and to send the input data to the second host computer.

40. A storage medium according to claim 35, wherein the print data is generated by a printer driver.

41. A storage medium according to claim 35, wherein the print data comprises image data.

42. A storage medium according to claim 35, wherein the program further comprises code for managing an order in which the print job and the scan job are executed.

43. A storage medium for storing a control program executed in an input/output apparatus which is connected to first and second host computers via a network and executes a scanning function or a printing function, the control program comprising:

code for receiving data for a job from the first and second host computers through a network interface;

code for controlling the input/output apparatus to generate output data from print data received from the first host computer via the network, sending the generated output data to the input/output apparatus, and controlling the input/output apparatus to print the sent output data by executing the printing function on the print job stored in the memory, when execution of said code for determining results in a determination that the job is the print job from the first host computer; and code for, in response to command data received from the second host computer via the network, controlling the input/output apparatus to obtain input data by executing the scanning function on the scan job stored in the memory and sending the obtained input data to the second host computer via the network in response to the request command, when execution of said code for determining results in a determination that the job is the scan job from the second host computer, wherein the memory is able to store the print job from the first host computer and the scan job from the second host computer at the same time.

44. A storage medium according to claim 43, wherein the input/output apparatus is a copying machine.

45. A storage medium according to claim 44, wherein the control program intervenes between the host computers and the copying machine.

46. A storage medium according to claim 43, wherein the print data comprises data written in a page description language.

47. A storage medium according to claim 43, wherein the control program further comprises code for receiving the command data from the second host computer via the network.

48. A storage medium according to claim 43, wherein the control program further comprises code for establishing a connection with the network to receive the print data from the first host computer and to send the input data to the second host computer.

49. A storage medium according to claim 43, wherein the print data is generated by a printer driver.

50. A storage medium according to claim 43, wherein the print data comprises image data.

51. A storage medium according to claim 43, wherein the control program further comprises code for managing an order in which the print job and the scan job are executed.

* * * * *

UNITED STATES PATENT AND TRADEMARK OFFICE
CERTIFICATE OF CORRECTION

PATENT NO.    : 6,321,266 B1
DATED         : November 20, 2001
INVENTOR(S)   : Yoshikazu Yokomizo et al.

It is certified that error appears in the above-identified patent and that said Letters Patent is hereby corrected as shown below:

Column 2,
Line 8, "informations," should read -- information, --.
Line 49, "slaver" should read -- slave --.

Column 9,
Line 39, "an d" should read -- and --.

Column 12,
Line 1, "Explanation" should read -- explanation --.

Column 16,
Line 25, "programs are" should read -- program is --.

Column 20,
Line 46, "imge" should read -- image --.

Column 27,
Line 62, "requires." should read -- required. --.

Column 29,
Line 11, "control" should read -- controls --.

Column 30,
Line 9, "meaning less" should read -- meaningless --.
Line 11, "carrier" should read -- carries --.

Column 32,
Line 36, ""ESC(A"" should read -- "ESC" A --.

Column 37,
Line 35, "These information are" should read -- This information is --.

Column 47,
Line 24, "is" should read -- are --.
Line 46, "been" should be deleted.

Column 48,
Line 11, "is a timing chart" should read -- are timing charts --.

Column 57,
Line 55, "cdev" should read -- code --.

UNITED STATES PATENT AND TRADEMARK OFFICE
CERTIFICATE OF CORRECTION

PATENT NO. : 6,321,266 B1
DATED : November 20, 2001
INVENTOR(S) : Yoshikazu Yokomizo et al.

It is certified that error appears in the above-identified patent and that said Letters Patent is hereby corrected as shown below:

Column 58,
Line 46, "standardize" should read -- standarizes --.

Column 59,
Line 44, "programs" should read -- program --.

Column 62,
Line 67, "GD11641" should read -- GDI 1641 --.

Column 63,
Line 47, "(tradename)." should read -- (Tradename). --.

Column 64,
Line 37, "level 3" should read -- level 2 --.

Column 68,
Line 38, "converts" should read -- convert --.

Column 75,
Line 1, "If yes," should read -- If Yes, --.

Column 77,
Line 47, "is" should read -- are --.

Column 81,
Line 13, "If yes," should read -- If Yes, --.

Signed and Sealed this

Nineteenth Day of November, 2002

*Attest:*

JAMES E. ROGAN
*Attesting Officer*     *Director of the United States Patent and Trademark Office*